(12) United States Patent
Markhovsky et al.

(10) Patent No.: US 10,863,313 B2
(45) Date of Patent: Dec. 8, 2020

(54) NETWORK ARCHITECTURE AND METHODS FOR LOCATION SERVICES

(71) Applicant: POLTE CORPORATION, Richardson, TX (US)

(72) Inventors: Felix Markhovsky, Dallas, TX (US); Truman Prevatt, Dallas, TX (US); Russ Markhovsky, Dallas, TX (US); David Goodwin Shaw, Dallas, TX (US); Tyler Matthew Smith, Dallas, TX (US)

(73) Assignee: POLTE CORPORATION, Addison, TX (US)

( * ) Notice: Subject to any disclaimer, the term of this patent is extended or adjusted under 35 U.S.C. 154(b) by 5 days.

(21) Appl. No.: 16/164,724

(22) Filed: Oct. 18, 2018

(65) Prior Publication Data

US 2019/0053013 A1     Feb. 14, 2019

Related U.S. Application Data

(63) Continuation-in-part of application No. 15/501,169, filed as application No. PCT/US2015/043321 on Jul. 31, 2015, now Pat. No. 10,281,557.

(Continued)

(51) Int. Cl.
*H04W 4/029*     (2018.01)
*H04W 64/00*    (2009.01)
(Continued)

(52) U.S. Cl.
CPC .......... *H04W 4/029* (2018.02); *G01S 5/0273* (2013.01); *G01S 5/06* (2013.01); *G01S 5/10* (2013.01);
(Continued)

(58) Field of Classification Search
CPC ..... H04W 4/029; H04W 4/025; H04W 64/00; H04W 24/10; G01S 5/06; G01S 5/10;
(Continued)

(56) References Cited

U.S. PATENT DOCUMENTS

| 4,334,314 A | 6/1982 | Nard et al. |
| 4,455,556 A | 6/1984 | Koshio et al. |

(Continued)

FOREIGN PATENT DOCUMENTS

| CN | 1484769 A | 3/2004 |
| CN | 1997911 A | 7/2007 |

(Continued)

OTHER PUBLICATIONS

European Patent Application No. 15827815.0; Partial Supplementary Search Report; dated Apr. 30, 2018; 14 pages.
(Continued)

*Primary Examiner* — James J Yang
(74) *Attorney, Agent, or Firm* — BakerHostetler

(57) ABSTRACT

UE location determined by collecting and preprocessing signal data at a detector and sending extracted data to a remote locate server. The detector buffers samples from signals provided by receive channels, detects known reference signals from receive channels based on reference signal parameters, isolates symbols carrying the reference signal from frames, extracts data from symbols, and sends extracted data to locate server. The locate server receives the extracted data, estimates locate observables based on the extracted data and calculates the UE location based on the estimated locate observables, the reference signal parameters and the extracted data. The detector and/or the server may also generate correlation coefficients between reference signals carrying spectrum received from a serving cell and utilize the correlation coefficients to cancel a serving cell (Continued)

signal in symbols that include known in advance reference signals from the serving cell and one or more neighboring cells of the wireless system.

39 Claims, 35 Drawing Sheets

Related U.S. Application Data

(60) Provisional application No. 62/578,340, filed on Oct. 27, 2017, provisional application No. 62/032,371, filed on Aug. 1, 2014.

(51) Int. Cl.
| | |
|---|---|
| H04B 17/336 | (2015.01) |
| H04W 24/10 | (2009.01) |
| H04L 12/26 | (2006.01) |
| G01S 5/06 | (2006.01) |
| H04B 17/27 | (2015.01) |
| G01S 5/10 | (2006.01) |
| G01S 5/02 | (2010.01) |
| H04W 4/02 | (2018.01) |
| G01S 5/00 | (2006.01) |

(52) U.S. Cl.
CPC ........... *H04B 17/27* (2015.01); *H04B 17/336* (2015.01); *H04L 43/0864* (2013.01); *H04W 4/025* (2013.01); *H04W 24/10* (2013.01); *H04W 64/00* (2013.01); *G01S 5/00* (2013.01)

(58) Field of Classification Search
CPC ......... G01S 5/0273; G01S 5/00; H04B 17/27; H04B 17/336; H04L 43/0864
See application file for complete search history.

(56) References Cited

U.S. PATENT DOCUMENTS

| | | | |
|---|---|---|---|
| 5,045,860 A | 9/1991 | Hodson | |
| 5,525,967 A | 6/1996 | Azizi et al. | |
| 5,564,025 A | 10/1996 | De Freese et al. | |
| 5,604,503 A | 2/1997 | Fowler et al. | |
| 5,774,876 A | 6/1998 | Woolley et al. | |
| 5,881,055 A | 3/1999 | Kondo | |
| 5,973,643 A | 10/1999 | Hawkes et al. | |
| 6,091,362 A | 7/2000 | Stilp et al. | |
| 6,208,295 B1 | 3/2001 | Dogan et al. | |
| 6,211,818 B1 | 4/2001 | Zach | |
| 6,266,014 B1 | 7/2001 | Fattouche et al. | |
| 6,275,186 B1* | 8/2001 | Kong ..................... G01S 5/10 |
| | | | 342/457 |
| 6,435,286 B1 | 8/2002 | Stump et al. | |
| 6,515,623 B2 | 2/2003 | Johnson | |
| 6,788,199 B2 | 9/2004 | Crabtree et al. | |
| 6,810,293 B1 | 10/2004 | Chou et al. | |
| 6,812,824 B1 | 11/2004 | Goldinger et al. | |
| 6,856,280 B1 | 2/2005 | Eder et al. | |
| 7,110,774 B1 | 9/2006 | Davis et al. | |
| 7,167,456 B2 | 1/2007 | Iwamatsu et al. | |
| 7,245,677 B1 | 7/2007 | Pare | |
| 7,271,764 B2 | 9/2007 | Golden et al. | |
| 7,292,189 B2 | 11/2007 | Orr et al. | |
| 7,561,048 B2 | 7/2009 | Yushkov et al. | |
| 7,668,124 B2 | 2/2010 | Karaoguz | |
| 7,668,228 B2 | 2/2010 | Feller et al. | |
| 7,696,923 B2 | 4/2010 | Houri et al. | |
| 7,872,583 B1 | 1/2011 | Yushkov et al. | |
| 7,898,977 B2 | 3/2011 | Roese et al. | |
| 7,969,311 B2 | 6/2011 | Markhovsky et al. | |
| 7,974,627 B2* | 7/2011 | Mia ..................... H04W 64/003 |
| | | | 455/440 |
| 8,140,102 B2 | 3/2012 | Nory et al. | |
| 8,305,215 B2 | 11/2012 | Markhovsky et al. | |
| 8,681,809 B2 | 3/2014 | Sambhwani et al. | |
| 9,288,623 B2 | 3/2016 | Markhovsky et al. | |
| 9,699,607 B2 | 7/2017 | Markhovsky et al. | |
| 9,955,301 B2 | 4/2018 | Markhovsky et al. | |
| 10,506,376 B2 | 12/2019 | Markhovsky et al. | |
| 2001/0044309 A1* | 11/2001 | Bar ..................... G01S 1/026 |
| | | | 455/456.5 |
| 2002/0155845 A1 | 10/2002 | Martorana | |
| 2003/0008156 A1 | 1/2003 | Pocius et al. | |
| 2003/0139188 A1 | 7/2003 | Chen et al. | |
| 2003/0146871 A1 | 8/2003 | Karr et al. | |
| 2004/0021599 A1 | 2/2004 | Hall et al. | |
| 2004/0203429 A1 | 10/2004 | Anderson et al. | |
| 2005/0035897 A1 | 2/2005 | Perl et al. | |
| 2005/0085257 A1 | 4/2005 | Laird et al. | |
| 2005/0093709 A1 | 5/2005 | Franco et al. | |
| 2005/0285782 A1 | 12/2005 | Bennett | |
| 2005/0285793 A1 | 12/2005 | Sugar et al. | |
| 2006/0009235 A1 | 1/2006 | Sheynblat et al. | |
| 2006/0050625 A1 | 3/2006 | Krasner | |
| 2006/0145853 A1 | 7/2006 | Richards et al. | |
| 2006/0193371 A1* | 8/2006 | Maravic ............... H04L 25/0212 |
| | | | 375/130 |
| 2006/0220851 A1 | 10/2006 | Wisherd | |
| 2006/0267841 A1 | 11/2006 | Lee et al. | |
| 2006/0273955 A1 | 12/2006 | Manz | |
| 2007/0053340 A1* | 3/2007 | Guilford ................. G01S 5/021 |
| | | | 370/350 |
| 2007/0139200 A1 | 6/2007 | Yushkov et al. | |
| 2007/0248180 A1 | 10/2007 | Bowman et al. | |
| 2008/0030345 A1 | 2/2008 | Austin et al. | |
| 2008/0037512 A1 | 2/2008 | Aljadeff et al. | |
| 2008/0123608 A1 | 5/2008 | Edge et al. | |
| 2008/0285505 A1 | 11/2008 | Carlson et al. | |
| 2008/0311870 A1 | 12/2008 | Walley et al. | |
| 2008/0318596 A1 | 12/2008 | Tenny | |
| 2009/0017841 A1 | 1/2009 | Lewis et al. | |
| 2009/0176507 A1 | 7/2009 | Wu et al. | |
| 2010/0013712 A1 | 1/2010 | Yano | |
| 2010/0091826 A1 | 4/2010 | Chen et al. | |
| 2010/0120394 A1 | 5/2010 | Mia et al. | |
| 2010/0178936 A1 | 7/2010 | Wala et al. | |
| 2010/0273504 A1 | 10/2010 | Bull et al. | |
| 2010/0273506 A1 | 10/2010 | Stern-Berkowitz et al. | |
| 2010/0311437 A1 | 12/2010 | Palanki et al. | |
| 2010/0317343 A1 | 12/2010 | Krishnamurthy et al. | |
| 2010/0317351 A1 | 12/2010 | Gerstenberger et al. | |
| 2011/0039574 A1 | 2/2011 | Charbit et al. | |
| 2011/0105144 A1 | 5/2011 | Siomina et al. | |
| 2011/0111751 A1 | 5/2011 | Markhovsky et al. | |
| 2011/0117926 A1 | 5/2011 | Hwang et al. | |
| 2011/0124347 A1 | 5/2011 | Chen et al. | |
| 2011/0143770 A1 | 6/2011 | Charbit et al. | |
| 2011/0143773 A1 | 6/2011 | Kangas et al. | |
| 2011/0149887 A1 | 6/2011 | Khandekar et al. | |
| 2011/0159893 A1 | 6/2011 | Siomina et al. | |
| 2011/0256882 A1 | 10/2011 | Markhovsky et al. | |
| 2011/0286349 A1 | 11/2011 | Tee et al. | |
| 2011/0309983 A1 | 12/2011 | Holzer et al. | |
| 2012/0009948 A1 | 1/2012 | Powers et al. | |
| 2012/0093400 A1 | 4/2012 | Saito | |
| 2012/0129550 A1 | 5/2012 | Hannan et al. | |
| 2012/0182180 A1 | 7/2012 | Wolf et al. | |
| 2012/0188889 A1 | 7/2012 | Sambhwani et al. | |
| 2012/0232367 A1* | 9/2012 | Allegri ................... G16H 10/40 |
| | | | 600/365 |
| 2012/0258729 A1 | 10/2012 | Siomina et al. | |
| 2012/0293373 A1 | 11/2012 | You | |
| 2012/0302254 A1 | 11/2012 | Charbit et al. | |
| 2013/0023285 A1 | 1/2013 | Markhovsky et al. | |
| 2013/0045754 A1 | 2/2013 | Markhovsky et al. | |
| 2013/0083683 A1 | 4/2013 | Hwang et al. | |
| 2013/0130710 A1 | 5/2013 | Boyer et al. | |
| 2013/0237260 A1 | 9/2013 | Lin et al. | |
| 2013/0244653 A1 | 9/2013 | Song et al. | |
| 2013/0252629 A1 | 9/2013 | Wigren et al. | |
| 2013/0288692 A1 | 10/2013 | Duprey et al. | |
| 2014/0045520 A1 | 2/2014 | Lim et al. | |

(56) References Cited

U.S. PATENT DOCUMENTS

| | | | |
|---|---|---|---|
| 2014/0120947 | A1 | 5/2014 | Siomina |
| 2014/0177745 | A1 | 6/2014 | Krishnamurthy et al. |
| 2017/0248678 | A1 | 8/2017 | Markhovsky et al. |

FOREIGN PATENT DOCUMENTS

| | | | |
|---|---|---|---|
| CN | 101238648 | A | 8/2008 |
| CN | 102137488 | A | 7/2011 |
| CN | 102203634 | A | 9/2011 |
| CN | 102210168 | A | 10/2011 |
| CN | 102379141 | A | 3/2012 |
| CN | 102388319 | A | 3/2012 |
| CN | 102648422 | A | 8/2012 |
| CN | 103502836 | A | 1/2014 |
| CN | 103842840 | A | 6/2014 |
| EP | 0467036 | | 1/1992 |
| EP | 1245967 | A1 | 10/2002 |
| EP | 1863190 | A1 | 12/2007 |
| JP | 02-247590 | | 10/1990 |
| JP | 08-265250 | | 10/1996 |
| JP | 09-139708 | | 5/1997 |
| JP | H11-178043 | | 7/1999 |
| JP | 2000-511369 | A | 8/2000 |
| JP | 2000-241523 | | 9/2000 |
| JP | 2000-354268 | | 12/2000 |
| JP | 2001-503576 | | 3/2001 |
| JP | 2001-147262 | | 5/2001 |
| JP | 2001-197548 | | 7/2001 |
| JP | 2002-044706 | A | 2/2002 |
| JP | 2002-058058 | | 2/2002 |
| JP | 2002-532979 | | 10/2002 |
| JP | 2003-501664 | | 1/2003 |
| JP | 2003-174662 | | 6/2003 |
| JP | 2005-521060 | | 7/2005 |
| JP | 2006-080681 | | 3/2006 |
| JP | 2007-013500 | | 1/2007 |
| JP | 2007-502414 | A | 2/2007 |
| JP | 2007-298503 | | 11/2007 |
| JP | 2008-503758 | | 2/2008 |
| JP | 2008-202996 | | 9/2008 |
| JP | 2008-249333 | A | 10/2008 |
| JP | 2009-520193 | | 5/2009 |
| JP | 2009-528546 | | 8/2009 |
| JP | 2010-230467 | | 10/2010 |
| JP | 2010-239395 | | 10/2010 |
| JP | 2011-510265 | | 3/2011 |
| JP | 2011-080799 | A | 4/2011 |
| JP | 2011-149809 | | 8/2011 |
| JP | 2011-227089 | | 11/2011 |
| JP | 2012-526491 | | 10/2012 |
| JP | 2012-529842 | | 11/2012 |
| JP | 2012-530394 | | 11/2012 |
| JP | 2012-531830 | | 12/2012 |
| JP | 2013-181876 | | 9/2013 |
| JP | 2017-531934 | A | 10/2017 |
| KR | 2001-0108081 | A | 12/2001 |
| KR | 2002-0065830 | A | 8/2002 |
| KR | 2005-0062550 | A | 6/2005 |
| KR | 10-2008-0086889 | | 9/2008 |
| KR | 2011-0067120 | A | 6/2011 |
| KR | 2014-0068911 | A | 6/2014 |
| WO | WO 1997/046034 | A1 | 12/1997 |
| WO | WO 1998/019488 | | 5/1998 |
| WO | WO 2000/035208 | | 6/2000 |
| WO | WO 2000/075681 | | 12/2000 |
| WO | WO 2002/071093 | | 9/2002 |
| WO | WO 2003/081277 | | 10/2003 |
| WO | WO 2005/088561 | | 9/2005 |
| WO | WO 2006/095463 | | 9/2006 |
| WO | WO 2007/136419 | | 11/2007 |
| WO | WO 2008/126694 | | 10/2008 |
| WO | WO 2010/104436 | | 9/2010 |
| WO | WO 2010/129885 | | 11/2010 |
| WO | WO 2010/134933 | | 11/2010 |
| WO | WO 2010/151829 | | 12/2010 |
| WO | WO 2011/016804 | | 2/2011 |
| WO | WO 2011/021974 | | 2/2011 |
| WO | WO 2012/108813 | | 8/2012 |
| WO | WO 2013/020122 | A2 | 2/2013 |
| WO | WO 2014/053487 | A1 | 4/2014 |
| WO | WO 2014/064656 | | 5/2014 |
| WO | WO 2014/093400 | | 6/2014 |
| WO | WO 2015/116322 | A2 | 8/2015 |
| WO | WO 2016/019354 | | 2/2016 |

OTHER PUBLICATIONS

European Patent Application No. 15827815.0; Extended Search Report; dated Jul. 13, 2018; 12 pages.
European Patent Application No. 15853177.2; Extended Search Report; dated May 15, 2018; 11 pages.
European Patent Application No. 18157335.3; Extended Search Report; dated Jun. 18, 2018; 10 pages.
International Patent Application No. PCT/US2013/74212; Int'l Preliminary Report on Patentability; dated Mar. 27, 2015; 38 pages.
European Patent Application No. 09845044.8; Extend European Search Report; dated Mar. 3, 2014; 7 pages.
International Patent Application No. PCT/US2013/074212; International Search Report and the Written Opinion; dated May 20, 2014; 19 pages.
European Patent Application No. 06851205.2: Extended European Search Report dated Aug. 21, 2013, 13 pages.
3.sup.rd Generation Partnership Project EST TSI 136 214, V9.1.0, "LTE; Evolved Universal Terrestrial Radio Access (E-UTRA); Physical Layer—Measurements" (Release 9), Apr. 2010, 15 pages.
3.sup.rd Generation Partnership Project ETSI TS 136 211 V9.1.0, "LTE; Evolved Universal Terrestrial Radio Access (E-UTRA); Physical Channels and Modulation" (Release 9), Apr. 2010, 87 pages.
3.sup.rd Generation Partnership Project TS 36.211 V9.1.0, "Technical Specification Group Radio Access Network; Evolved Universal Terrestrial Radio Access (E-UTRA); Physical Channels and Modulation" (Release 9), Mar. 2010, 85 pages.
3.sup.rd Generation Partnership Project, (3GPP) TS 25.215 V3.0.0, "3.sup.rd Generation Partnership Project; Technical Specification Group Radio Access Network; Physical layer—Measurements", Oct. 1999, 19 pages.
3.sup.rd Generation Partnership Project, (3GPP) TS 36.211 V10.0.0 "Third Generation Partnership Project; Technical Specification Group Radio Access Network; Evolved Universal Terrestrial Radio Access (E-UTRA); Physical Channels and Modulation", (Release 10), Dec. 2010, 102 pages.
3.sup.rd Generation Partnership Project, (3GPP) TS 36.305 V9.3.0, "3.sup.rd Generation Partnership Project; Technical Specification Group Radio Access Network; Evolved Universal Terrestrial Radio Access Network; (E-UTRAN) Stage 2 Functional Specification of User Equipment (UE) Positioning in E-Utran)" (Release 9), Jun. 2010, 52 pages.
Alsindi, "Performance of TOA estimation algorithms in different indoor multipath conditions", Worcester Polytchnic Institute, Apr. 2004, 123 pages.
Dobkin, "Indoor Propagation and Wavelength" WJ Communications, Jul. 10, 2002, V 1.4, 8 pages.
Goldsmith, "EE359—Lecture Outline 2: Wireless Communications", Aug. 2010, http://www.stanford.edu/class/ee359/lectures2.sub.--1pp.pdf, 12 pages.
Goldsmith, "Wireless Communication", Cambridge University Press, 2005, 644 pages.
Hashemi et al., MRI: the basics, Lippincott Williams & Wilkinson, Chapter 23 thru 31, Philadelphia, PA, Apr. 2010, 269-356.
Rantala et al., "Indoor propagation comparison between 2.45 GHz and 433 MHz transmissions", IEEE Antennas and Propagation Society International Symposium, 2002, 1, 240-243.
Ruiter, "Factors to consider when selecting a wireless network for vital signs monitoring", 1999, 9 pages.

(56) References Cited

OTHER PUBLICATIONS

Salous, "Indoor and Outdoor UHF Measurements with a 90MHz Bandwidth", IEEE Coloquium on Propagation Chracteristics and Related System Techniques for Beyond Line-of-Site Radio, 1997, 6 pages.
Stone, "Electromagnetic signal attenuation in construction materials", NIST Construction Automation Program Report No. 3, Oct. 1997, NISTIR 6055, 101 pages.
Zyren, "Overview of the 3GPP Long Term Evolution Physical Layer", White Paper, Jul. 2007, 27 pages.
International Patent Application No. PCT/US2014/070184; Int'l Search Report and the Written Opinion; dated Oct. 28, 2015; 15 pages.
International Patent Application No. PCT/US2014/70184; Int'l Preliminary Report on Patentability; Apr. 11, 2016; 20 pages.
European Patent Application No. 13863113.0; Extended Search Report; dated Jun. 10, 2016; 7 pages.
U.S. Appl. No. 14/105,098, filed Dec. 12, 2003, Markhovsky et al.
European Patent Application No. 12819568.2; Extended Search Report; dated May 8, 2015; 7 pages.
Sahad, "Signal Propagation & Path Loss Models"; p. 17-30.
Sakaguchi et al.; "Influence of the Model Order Estimation Error in the ESPIRIT Based High Resolution Techniques"; IEICE Trans. Commun.; vol. E82-B No. 3; Mar. 1999; p. 561-563.
Borkowski et al.; "Performance of Cell ID+RTT Hybrid Positioning Method for UMTS Radio Networks"; Institute of Comm. Engineering; Tampere Univ. of Tech.; 2004; 6 pages.
Lin et al.; "Microscopic Examination of an RSSI-Signature-Based Indoor Localization System"; Dept. of Electrical Engineering; HotEmNets; Jun. 2-3, 2008; 5 pages.
Lee; "Accuracy Limitations of Hyperbolic Multilateration Systems"; Technical Note 1973-11; Massachusetts Institute of Technology, Lincoln Laboratory; 1973; 117 pages.
International Patent Application No. PCT/US2015/43321; Int'l Search Report and the Written Opinion; dated Dec. 22, 2015; 23 pages.
International Patent Application No. PCT/US2015/57418; Int'l Search Report; dated Feb. 26, 2016; 5 pages.
International Patent Application No. PCT/US2015/043321; Int'l Preliminary Report on Patentability; dated Jun. 16, 2016; 26 pages.
European Patent Application No. 16173140.1; Extended Search Report; dated Oct. 11, 2016; 8 pages.
International Patent Application No. PCT/US2019/024415; Int'l Search Report and the Written Opinion; dated Jun. 19, 2019; 13 pages.
International Patent Application No. PCT/US2019/024415; Int'l Preliminary Report on Patentability; dated Apr. 27, 2020; 21 pages.

\* cited by examiner

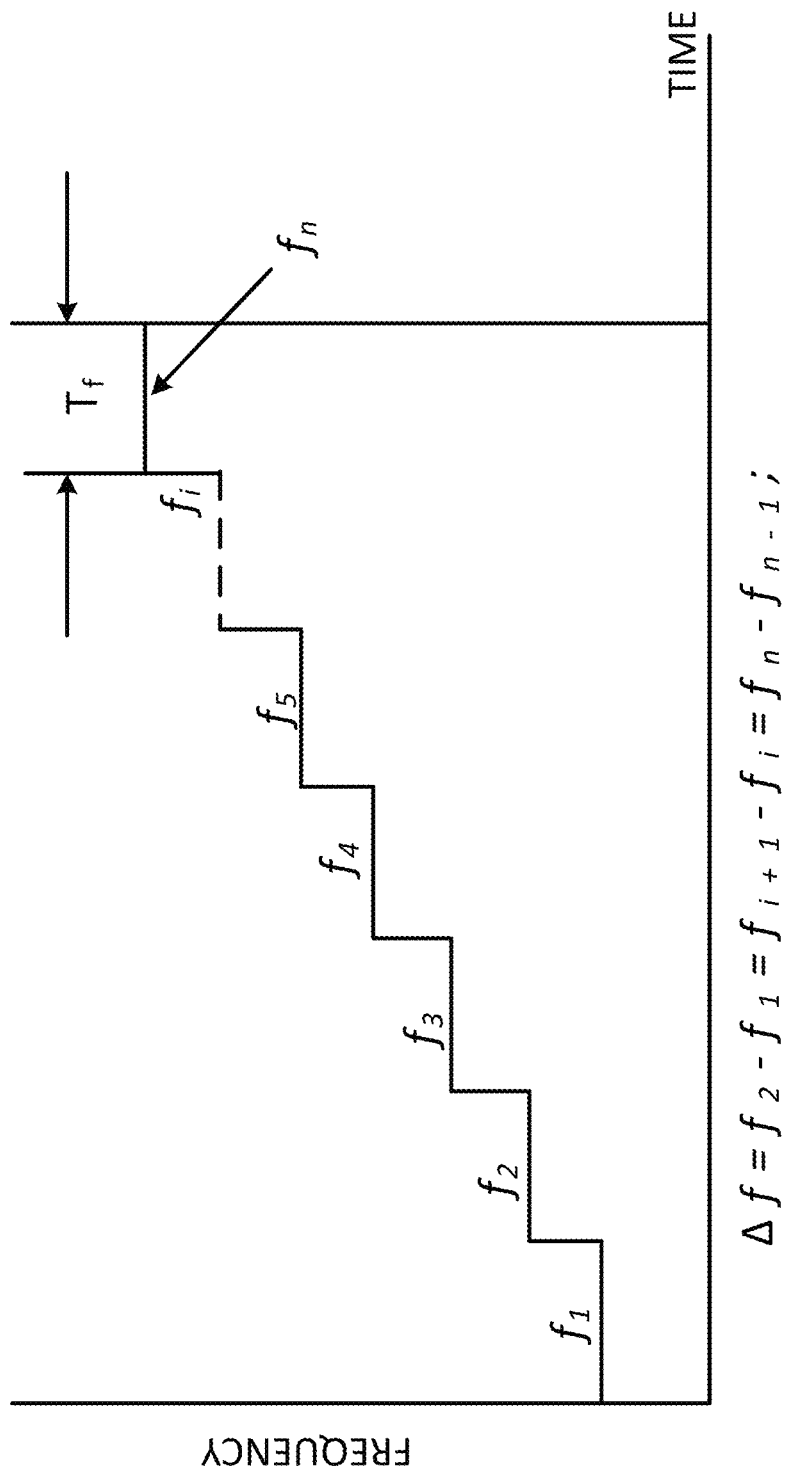

NETWORK ARCHITECTURE AND METHODS FOR LOCATION SERVICES

CROSS REFERENCE TO RELATED APPLICATIONS

This application claims the benefit of U.S. Provisional Patent Application No. 62/578,340, filed Oct. 27, 2017, and is a continuation-in-part of U.S. patent application Ser. No. 15/501,169, filed Feb. 1, 2017, which is a National Stage application of International Application No. PCT/US2015/043321, filed Jul. 31, 2015, and claims the benefit of U.S. Provisional Patent Application No. 62/032,371, filed Aug. 1, 2014.

TECHNICAL FIELD

The present embodiment relates to wireless communications and wireless networks systems and systems for a Radio Frequency (RF)-based identification, tracking and locating of objects, including RTLS (Real Time Locating Service), LTE based locating services, and Location-as-a-Service (LaaS).

BACKGROUND

RF-based identification and location-finding systems for determination of relative or geographic position of objects are generally used for tracking single objects or groups of objects, as well as for tracking individuals. Conventional location-finding systems have been used for position determination in an open, outdoor environment. RF-based, Global Positioning System (GPS)/Global Navigation Satellite System (GNSS), and assisted GPSs/GNSSs are typically used. However, conventional location-finding systems suffer from certain inaccuracies when locating the objects in closed (i.e., indoor) environments, as well as outdoors.

Cellular wireless communication systems provide various methods of locating user equipment (UE) position indoors and in environments that are not well suited for GPS. The most accurate methods are positioning techniques that are based on the multilateration/trilateration methods. For example, LTE (Long Term Evolution) standard release 9 specifies the DL-OTDOA (Downlink Observed Time Difference of Arrival) and release 11 specifies the U-TDOA (Uplink Time Difference of Arrival) techniques that are derivatives of the multilateration/trilateration methods.

Since time synchronization errors impact locate accuracy, the fundamental requirement for multilateration/trilateration based systems is the complete and precise time synchronization of the system to a single common reference time. In cellular networks, the DL-OTDOA and the U-TDOA locating methods also require, in the case of DL-OTDOA, that transmissions from multiple antennas be time synchronized, or in the case of U-TDOA, that multiple receivers be time synchronized.

The LTE standards release 9 and release 11 do not specify the time synchronization accuracy for the purpose of locating, leaving this to wireless/cellular service providers. On the other hand, these standards do provide limits for the ranging accuracy. For example, when using 10 MHz ranging signal bandwidth, the requirement is 50 meters @67% reliability for the DL-OTDOA and 100 meters @67% reliability for the U-TDOA.

The above noted limits are the result of a combination of ranging measurements errors and errors caused by the lack of precision synchronization, e.g. time synchronization errors. From the relevant LTE test specifications (3GPP TS 36.133 version 10.1.0 release 10) and other documents, it is possible to estimate the time synchronization error, assuming that the synchronization error is uniformly distributed. One such estimate amounts to 200 ns (100 ns peak-to-peak). It should be noted that the Voice over LTE (VoLTE) functionality also requires cellular network synchronization down to 150 nanoseconds (75 ns peak-to-peak), assuming that the synchronization error is uniformly distributed. Therefore, going forward, the LTE network's time synchronization accuracy will be assumed to be within 150 ns.

As for distance location accuracy, FCC directive NG 911 specifies locate accuracy requirements of 50 meters and 100 meters. However, for the Location Based Services (LBS) market, the indoors location requirements are much more stringent—3 meters @67% reliability. As such, the ranging and locate error introduced by the time synchronization error of 150 ns (the standard deviation of 43 ns) is much larger than the 3 meters ranging error (standard deviation of 10 ns).

While a cellular network's time synchronization might be adequate to satisfy the mandatory FCC NG E911 emergency location requirements, this synchronization accuracy falls short of the needs of LBS or RTLS system users, who require significantly more accurate locating. Thus, there is a need in the art for mitigating the locate error induced by lack of accurate time synchronization for cellular/wireless networks for the purpose of supporting LBS and RTLS.

While LTE 4G deployments support Location Based Service (LBS) that utilize available location information of the terminal, proposed 5G deployment are going to replace LBS support with Location-as-a-Service (LaaS) data delivery. In accordance with this model, location data will be collected by communication service carriers and made available to client through APIs. This approach is intended to better protect the privacy of physical location data for enterprise customers and consumers, but it raises a number of issues as well.

Positioning in 5G networks can be carried out either within UE devices (device-centric) or in a network-centric manner, or in both (as per LTE standards). However, the network-centric option has several advantages over other approaches. First, network-centric positioning enables more advanced positioning technology to be utilized and updated with computational capabilities greatly exceeding those available in UE devices. Network-centric positioning also makes it easier to upgrade positioning algorithms and make other changes. Positioning within UE devices tends to create logistical burdens (for carriers) because the carriers are dependent on the device manufacturers to implement necessary changes and the computational resources of the devices are more limited. Furthermore, the network-centric option allows the positioning engine to be continuously running in the background enabling ubiquitous high-accuracy positioning that provide up-to-date location information with a low latency, while also allowing location information to be obtained everywhere under the network coverage area, including indoors and within urban corridor environments. And, because the network-centric option relieves the UEs of the heavy computational burden required for positioning, network-centric positioning is more energy efficient from the device's perspective; achieving significant UE power consumption improvements.

In general, wireless networks utilize two positioning methods: uplink Observed Time Difference of Arrival (OTDOA) and downlink OTDOA. The uplink method makes use of signals that are transmitted by the UE to the network elements and the downlink method makes use of signals that are transmitted from the network elements to the UE. Specifically, these network elements are the various types of cells (macro, small, distributed, etc.) and the signals are reference signals. Each method has its own tradeoffs and, depending upon the environment, one method can be more advantageous than another. Both methods rely on the multilateration locate method. However, in case of the downlink OTDOA, the cell-tower transmit power is two orders magnitude higher than the UE transmitter power. As a result, the downlink OTDOA method provides more ubiquitous coverage. At the same time, uplink OTDOA may also support the Angle of Arrival (AoA) method, where AoA is measured based on uplink transmissions from the UE and the known configuration of the eNodeB antenna array. This approach has a potential for a higher locate accuracy, but that accuracy depends heavily on characteristics of a particular cell's antennas. On the other hand, the uplink OTDOA method is inherently network-centric as the relevant UE transmissions can be received and collected by the network elements of the cell.

Traditional implementations of the downlink OTDOA are either UE assisted (e.g., 3GPP 36.305 v14) or UE based. In the UE assisted scheme, the UE must perform the downlink timing measurements. These measurements involve estimating the Reference Signals Time Difference (RSTD) between reference signals from several cells such as eNodeB element. Those time differences are then reported to a network element called the Evolved Serving Mobile Location Center (E-SMLC) for further processing. As a result, a considerable amount of technology is required to mitigate the downlink timing measurements errors that are caused by the RF propagation phenomena. Otherwise, the UE positioning accuracy is severely impacted. However, mitigating such errors requires employing state of the art locating signal processing technology, which comes at a cost of heavy computational burden on the UE resources. There is therefore a need to improve downlink OTDOA performance without requiring the UEs to have greater computational resources and without creating logistical burdens for carriers and UR manufacturers.

SUMMARY

The present disclosure relates to methods and systems for Radio Frequency (RF)-based identification, tracking and locating of objects, including Real Time Locating Service (RTLS) systems that substantially obviate one or more of the disadvantages associated with existing systems. The methods and systems can use partially synchronized (in time) receivers and/or transmitters. According to an embodiment, RF-based tracking and locating is implemented in cellular networks, but could be also implemented in any wireless system and RTLS environments. The proposed system can use software implemented digital signal processing and software defined radio technologies (SDR). Digital signal processing (DSP) can be used as well.

One approach described herein employs clusters of receivers and/or transmitters precisely time synchronized within each cluster, while the inter-cluster time synchronization can be much less accurate or not required at all. The present embodiment can be used in all wireless systems/networks and include simplex, half duplex and full duplex modes of operation. The embodiment described below operates with wireless networks that employ various modulation types, including OFDM modulation and/or its derivatives. Thus, the embodiment described below operates with LTE networks and it is also applicable to other wireless systems/networks.

As described in one embodiment, RF-based tracking and locating is implemented on 3GPP LTE cellular networks will significantly benefit from the precisely synchronized (in time) receivers and/or transmitters clusters. The proposed system can use software- and/or hardware-implemented digital signal processing.

As described in embodiments, a network-centric architecture supports LaaS data delivery, and which is designed for 5G and other networks when all signal processing and position estimates are done in the cloud, i.e., outside of the EU and/or eNodeB. There are several options in terms of how this can be done. In the case of uplink locate, the relevant UE reference signals transmissions can be collected/pre-processed by the eNodeB and forwarded to the Locate Server Unit (LSU) for further processing and UE position determination. In case of the downlink (OTDOA), the task of collecting and pre-processing of the downlink reference signals may be performed by the UE. The UE may then send collected downlink data to the LSU. In case of the downlink (OTDOA), the UE may also handle the communication with the LSU, using the Control Plane and/or the LTE User Plane. Consequently, signaling may be in line with OMA Secure User Plane Location (SUPL) protocol and/or 3GPP, for example LTE Positioning Protocol (LPP). In case of the uplink AoA/DoA the eNodeB may handle the communication with the LSU, using the LPPa and SLmAP (SLm Application Protocol) protocols.

As described in embodiments, this network-centric architecture may enable advanced features that were not feasible before. These include: (a) utilizing the downlink OTDOA to determine the distance between the serving cell/tower and the UE and uplink AoA/DoA to determine the UE location, while also mitigating the OTDOA synchronization error impact on this uplink/downlink UE positioning by utilizing tracking algorithms/technology; (b) utilizing tracking algorithms/technology to improve the UE positioning in cases where the uplink AoA/DoA plus RTT method is used to determine the UE position; and (c) utilizing tracking algorithms/technology to estimate and to correct/mitigate the synchronization error in the downlink OTDOA locating method.

As described in embodiments, downlink (OTDOA) UE locate methods include a navigation processor utilizing the multilateration technique/method, aka hyperbolic navigation. This multilateration technique entails solving a number of hyperbolic (RSTD/TDOA) equations. There are iterative methods and non-iterative (close form) solutions. In one embodiment, a hybrid approach is described that splits the number of available (hearable) reference points (base stations) to have multiple sets of three RSTD/TDOA subsets and finds closed-form solutions for each subset. Thereafter, location consistency algorithms may be utilized to finalize the position fix. In a second embodiment, the position fix may be improved utilizing a combination of iterative and non-iterative solutions from the same set of RSTD/TDOA values. In a third embodiment, initial position estimates may be determined for the UE location, based on iterative and non-iterative algorithms, by utilizing the uplink AoA/DoA estimate(s) and the RTT.

As described in embodiments, a wireless network environment sometimes defies the multilateration method, which requires at least three reference points (for 2-D locate) to obtain the locate fix because only two high power cells are used to flood a large area with RF signals. Accordingly, when RTT is available, the UE is located along an arc defined by the serving sector azimuth beam width and the RTT/2 range. When AoA/DoA estimates are available, that the UE position may be determined at the hyperbola and arc intersection vicinity. Both of these methods may also be used. When neither RTT nor AoA/DoA estimates are available, the UE location is determined by scoring intersection points corresponding to each cell/tower (sector) on a chosen hyperbola 3608. Scoring is based on a difference in angles between the direction a cell is pointing and the direction to a point on the hyperbola and a distance from each point to the corresponding cell/tower. Scores may be weighted according to their corresponding cell/tower's SNR.

As described in embodiments, the LSU may include a communication processor that is configured for signaling and information exchange with UEs, the eNodeB, and/or network elements. The signaling may be in line with the OMA SUPL protocol and/or 3GPP LPP/LPPa, or a combination of LPP, LPPa and SUPL, as well as other protocols that are or may be used for communication with the network, for example LCS-AP protocol.

As described in embodiments, the LSU components may be instructions stored in memory and configured to execute on a processor of a 4.5G MEC (Mobile Edge Computing) server located at a communication network's edge, The LSU components may be integrated as a hosted app on 4.5G MEC. In a 5G deployment, the LSU components may be hosted in the core network computing cloud. The LSU being hosted in the core network computing cloud may support LaaS data delivery, whereby the UEs act as gateways to the core network computing cloud and LaaS specifically for protected physical location data.

As described in embodiments, the LSU may include a downlink signal processor as well as an uplink signal processor and a navigation processor.

Additional features and advantages of the embodiments will be set forth in the description that follows, and in part will be apparent from the description, or may be learned by practice of the embodiments. The advantages of the embodiments will be realized and attained by the structure particularly pointed out in the written description and claims hereof as well as the appended drawings.

It is to be understood that both the foregoing general description and the following detailed description are exemplary and explanatory and are intended to provide further explanation of the embodiments as claimed.

BRIEF DESCRIPTION OF THE DRAWINGS

The accompanying drawings, which are included to provide a further understanding of the embodiments and are incorporated in and constitute a part of this specification, illustrate embodiments and together with the description serve to explain the principles of the embodiments. In the drawings:

FIG. 1 and FIG. 1A illustrate narrow bandwidth ranging signal frequency components, in accordance with an embodiment;

DETAILED DESCRIPTION OF ILLUSTRATIVE EMBODIMENTS

Figure 1A:
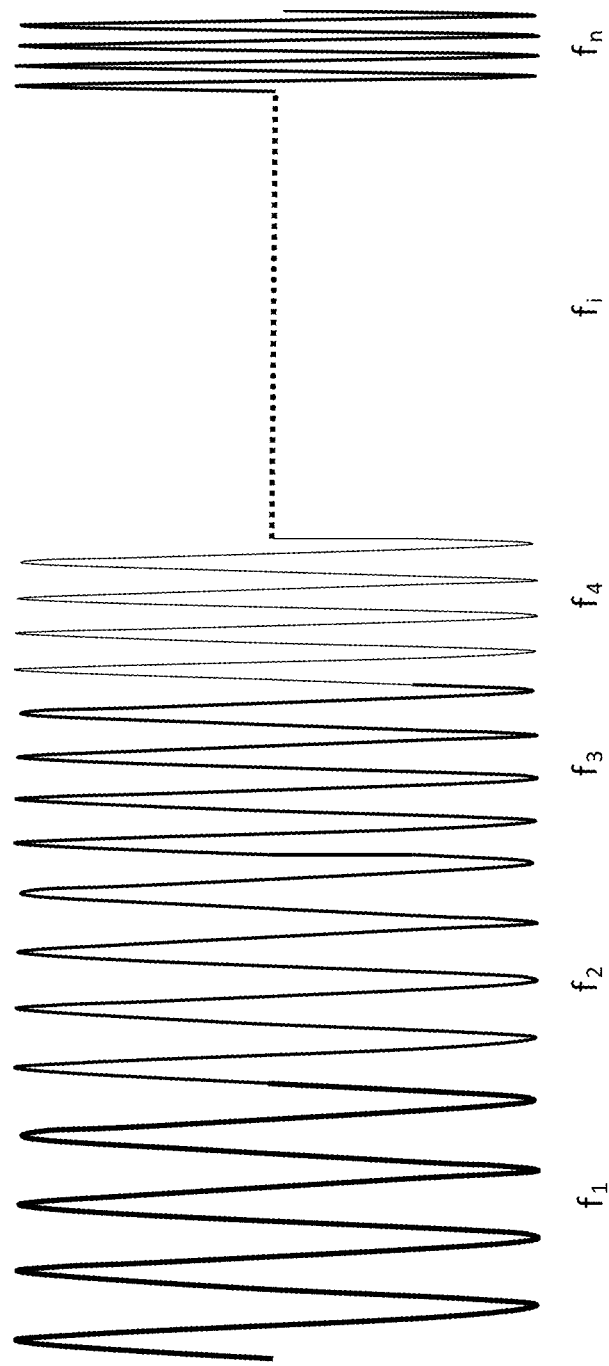

Reference will now be made in detail to the preferred embodiments of the present embodiments, examples of which are illustrated in the accompanying drawings.

The present embodiments relate to a method and system for RF-based identification, tracking and locating of objects, including RTLS. According to an embodiment, the method and system employs a narrow bandwidth ranging signal. The embodiment operates in VHF band, but can be also used in HF, LF and VLF bands as well as UHF band and higher frequencies. It employs multi-path mitigation processor. Employing multi-path mitigation processor increases the accuracy of tracking and locating implemented by a system.

The embodiment includes small, highly portable base units that allow users to track, locate and monitor multiple persons and objects. Each unit has its own ID. Each unit broadcasts an RF signal with its ID, and each unit is able to send back a return signal, which can include its ID as well as voice, data and additional information. Each unit processes the returned signals from the other units and, depending on the triangulation or trilateration and/or other methods used, continuously determines their relative and/or actual locations. The preferred embodiment can also be easily integrated with products such as GPS devices, smart phones, two-way radios and PDAs. The resulting product will have all of the functions of the stand-alone devices while leveraging the existing display, sensors (such as altimeters, GPS, accelerometers and compasses) and processing capacity of its host. For example, a GPS device with the device technology describe herein will be able to provide the user's location on a map as well as to map the locations of the other members of the group.

The size of the preferred embodiment based on an FPGA implementation is between approximately 2×4×1 inches and 2×2×0.5 inches, or smaller, as integrated circuit technology improves. Depending on the frequency used, the antenna will be either integrated into the device or protrude through the device enclosure. An ASIC (Application Specific Integrated Circuit) based version of the device will be able to incorporate the functions of the FPGA and most of the other electronic components in the unit or Tag. The ASIC-based stand-alone version of the product will result in the device size of 1×0.5×0.5 inches or smaller. The antenna size will be determined by the frequency used and part of the antenna can be integrated into the enclosure. The ASIC based embodiment is designed to be integrated into products can consist of nothing more than a chipset. There should not be any substantial physical size difference between the Master or Tag units.

The devices can use standard system components (off-the-shelf components) operating at multiple frequency ranges (bands) for processing of multi-path mitigation algorithms. The software for digital signal processing and software-defined radio can be used. The signal processing software combined with minimal hardware, allows assembling the radios that have transmitted and received waveforms defined by the software.

U.S. Pat. No. 7,561,048 discloses a narrow-bandwidth ranging signal system, whereby the narrow-bandwidth ranging signal is designed to fit into a low-bandwidth channel, for example using voice channels that are only several kilohertz wide (though some of low-bandwidth channels may extend into a few tens of kilohertz). This is in contrast to conventional location-finding systems that use channels from hundreds of kilohertz to tens of megahertz wide.

The advantage of this narrow-bandwidth ranging signal system is as follows: 1) at lower operating frequencies/bands, conventional location-finding systems ranging signal bandwidth exceeds the carrier (operating) frequency value. Thus, such systems cannot be deployed at LF/VLF and other lower frequencies bands, including HF. Unlike conventional location-finding systems, the narrow-bandwidth ranging signal system described in U.S. Pat. No. 7,561,048 can be successfully deployed on LF, VLF and other bands because its ranging signal bandwidth is far below the carrier frequency value; 2) at lower end of RF spectrum (some VLF, LF, HF and VHF bands), e.g., up to UHF band, conventional location-finding systems cannot be used because the FCC severely limits the allowable channel bandwidth (12-25 kHz), which makes it impossible to use conventional ranging signals. Unlike conventional location-finding systems, the narrow-bandwidth ranging signal system's ranging signal bandwidth is fully compliant with FCC regulations and other international spectrum regulatory bodies; and 3) it is well known (see MRI: the basics, by Ray H. Hashemi, William G. Bradley . . . 2003) that independently of operating frequency/band, a narrow-bandwidth signal has inherently higher SNR (Signal-to-Noise-Ratio) as compared to a wide-bandwidth signal. This increases the operating range of the narrow-bandwidth ranging signal location-finding system independently of the frequency/band it operates, including UHF band.

Thus, unlike conventional location-finding systems, the narrow-bandwidth ranging signal location-finding system can be deployed on lower end of the RF spectrum for example VHF and lower frequencies bands, down to LF/VLF bands, where the multipath phenomena is less pronounced. At the same time, the narrow-bandwidth ranging location-finding system can be also deployed on UHF band and beyond, improving the ranging signal SNR and, as a result, increasing the location-finding system operating range.

To minimize multipath, e.g., RF energy reflections, it is desirable to operate on VLF/LF bands. However, at these frequencies the efficiency of a portable/mobile antenna is very small (about 0.1% or less because of small antenna length (size) relative to the RF wave length). In addition, at these low frequencies the noise level from natural and manmade sources is much higher than on higher frequencies/bands, for example VHF. Together, these two phenomena may limit the applicability of location-finding system, e.g. its operating range and/or mobility/portability. Therefore, for certain applications where operating range and/or mobility/portability are very important a higher RF frequencies/bands may be used, for example HF, VHF, UHF and UWB.

At VHF and UHF bands, the noise level from natural and manmade sources is significantly lower compared to VLF, LF and HF bands; and at VHF and HF frequencies the multi-path phenomena (e.g., RF energy reflections) is less severe than at UHF and higher frequencies. Also, at VHF, the antenna efficiency is significantly better, than on HF and lower frequencies, and at VHF the RF penetration capabilities are much better than at UHF. Thus, the VHF band provides a good compromise for mobile/portable applications. On the other hand in some special cases, for example GPS where VHF frequencies (or lower frequencies) cannot penetrate the ionosphere (or get deflected/refracted), the UHF can be a good choice. However, in any case (and all cases/applications) the narrow-bandwidth ranging signal system will have advantages over the conventional wide-bandwidth ranging signal location-finding systems.

The actual application(s) will determine the exact technical specifications (such as power, emissions, bandwidth and operating frequencies/band). Narrow bandwidth ranging allows the user to either receive licenses or receive exemption from licenses, or use unlicensed bands as set forth in the FCC because narrow band ranging allows for operation on many different bandwidths/frequencies, including the most stringent narrow bandwidths: 6.25 kHz, 11.25 kHz, 12.5 kHz, 25 kHz and 50 kHz set forth in the FCC and comply with the corresponding technical requirements for the appropriate sections. As a result, multiple FCC sections and exemptions within such sections will be applicable. The primary FCC Regulations that are applicable are: 47 CFR Part 90—Private Land Mobile Radio Services, 47 CFR Part 94 personal Radio Services, 47 CFR Part 15 Radio Frequency Devices. (By comparison, a wideband signal in this context is from several hundred KHz up to 10-20 MHz.)

Typically, for Part 90 and Part 94, VHF implementations allow the user to operate the device up to 100 mW under certain exemptions (Low Power Radio Service being an example). For certain applications the allowable transmitted power at VHF band is between 2 and 5 Watts. For 900 MHz (UHF band) it is 1 W. On 160 kHz 190 kHz frequencies (LF band) the allowable transmitted power is 1 Watt.

Narrow band ranging can comply with many if not all of the different spectrum allowances and allows for accurate ranging while still complying with the most stringent regulatory requirements. This holds true not just for the FCC, but for other international organizations that regulate the use of spectrum throughout the world, including Europe, Japan and Korea.

The following is a list of the common frequencies used, with typical power usage and the distance the tag can communicate with another reader in a real world environment (see Indoor Propagation and Wavelength Dan Dobkin, W J Communications, V 1.4 7/10/02):

| 915 MHz | 100 mW | 150 feet |
| 2.4 GHz | 100 mW | 100 feet |
| 5.6 Ghz | 100 mW | 75 feet |

The proposed system works at VHF frequencies and employs a proprietary method for sending and processing the RF signals. More specifically, it uses DSP techniques and software-defined radio (SDR) to overcome the limitations of the narrow bandwidth requirements at VHF frequencies.

Operating at lower (VHF) frequencies reduces scatter and provides much better wall penetration. The net result is a roughly ten-fold increase in range over commonly used frequencies. Compare, for example, the measured range of a prototype to that of the RFID technologies listed above:

| 216 MHz | 100 mw | 700 feet |

Utilizing narrow band ranging techniques, the range of commonly used frequencies, with typical power usage and the distance the tag communication range will be able to communicate with another reader in a real world environment would increase significantly:

| | | From: | To: |
|---|---|---|---|
| 915 MHz | 100 mW | 150 feet | 500 feet |
| 2.4 GHz | 100 mW | 100 feet | 450 feet |
| 5.6 Ghz | 100 mW | 75 feet | 400 feet |

Battery consumption is a function of design, transmitted power and the duty cycle of the device, e.g., the time interval between two consecutive distance (location) measurements. In many applications the duty cycle is large, 10× to 1000×. In applications with large duty cycle, for example 100×, an FPGA version that transmits 100 mW of power will have an up time of approximately three weeks. An ASIC based version is expected to increase the up time by 10×. Also, ASICs have inherently lower noise level. Thus, the ASIC-based version may also increase the operating range by about 40%.

Those skilled in the art will appreciate that the embodiment does not compromise the system long operating range while significantly increases the location-finding accuracy in RF challenging environments (such as, for example, buildings, urban corridors, etc.)

Typically, tracking and location systems employ Track-Locate-Navigate methods. These methods include Time-Of-Arrival (TOA), Differential-Time-Of-Arrival (DTOA) and combination of TOA and DTOA. Time-Of-Arrival (TOA) as the distance measurement technique is generally described in U.S. Pat. No. 5,525,967. A TOA/DTOA-based system measures the RF ranging signal Direct-Line-Of-Site (DLOS) time-of-flight, e.g., time-delay, which is then converted to a distance range.

In case of RF reflections (e.g., multi-path), multiple copies of the RF ranging signal with various delay times are superimposed onto the DLOS RF ranging signal. A track-locate system that uses a narrow bandwidth ranging signal cannot differentiate between the DLOS signal and reflected signals without multi-path mitigation. As a result, these reflected signals induce an error in the estimated ranging signal DLOS time-of-flight, which, in turn, impacts the range estimating accuracy.

The embodiment advantageously uses the multi-path mitigation processor to separate the DLOS signal and reflected signals. Thus, the embodiment significantly lowers the error in the estimated ranging signal DLOS time-of-flight. The proposed multi-path mitigation method can be used on all RF bands. It can also be used with wide bandwidth ranging signal location-finding systems. And it can support various modulation/demodulation techniques, including Spread Spectrum techniques, such as DSS (Direct Spread Spectrum) and FH (Frequency Hopping).

Additionally, noise reduction methods can be applied in order to further improve the method's accuracy. These noise reduction methods can include, but are not limited to, coherent summing, non-coherent summing, Matched filtering, temporal diversity techniques, etc. The remnants of the multi-path interference error can be further reduced by applying the post-processing techniques, such as, maximum likelihood estimation (e.g., Viterbi Algorithm), minimal variance estimation (e.g., Kalman Filter), etc.

The embodiment can be used in systems with simplex, half-duplex and full duplex modes of operation. Full-duplex operation is very demanding in terms of complexity, cost and logistics on the RF transceiver, which limits the system operating range in portable/mobile device implementations. In a half-duplex mode of operation the reader (often referred to as the "master") and the tags (sometimes also referred to as "slaves" or "targets") are controlled by a protocol that only allows the master or the slave to transmit at any given time.

The alternation of sending and receiving allows a single frequency to be used in distance measurement. Such an arrangement reduces the costs and complexity of the system in comparison with full duplex systems. The simplex mode of operation is conceptually simpler, but requires a more rigorous synchronization of events between master and target unit(s), including the start of the ranging signal sequence.

In present embodiments the narrow bandwidth ranging signal multi-path mitigation processor does not increase the ranging signal bandwidth. It uses different frequency components, advantageously, to allow propagation of a narrow bandwidth ranging signal. Further ranging signal processing can be carried out in the frequency domain by way of employing super resolution spectrum estimation algorithms (MUSIC, rootMUSIC, ESPRIT) and/or statistical algorithms like RELAX, or in time-domain by assembling a synthetic ranging signal with a relatively large bandwidth and applying a further processing to this signal. The different frequency component of narrow bandwidth ranging signal can be pseudo randomly selected, it can also be contiguous or spaced apart in frequency, and it can have uniform and/or non-uniform spacing in frequency.

The embodiment expands multipath mitigation technology. The signal model for the narrowband ranging is a complex exponential (as introduced elsewhere in this document) whose frequency is directly proportional to the delay defined by the range plus similar terms whose delay is defined by the time delay related to the multipath. The model is independent of the actual implementation of the signal structure, e.g., stepped frequency, Linear Frequency Modulation, etc.

The frequency separation between the direct path and multipath is nominally extremely small and normal frequency domain processing is not sufficient to estimate the direct path range. For example, a stepped frequency ranging signal at a 100 KHz stepping rate over 5 MHz at a range of 30 meters (100.07 nanoseconds delay) results in a frequency of 0.062875 radians/sec. A multipath reflection with a path length of 35 meters would result in a frequency of 0.073355. The separation is 0.0104792. Frequency resolution of the 50 sample observable has a native frequency resolution of 0.12566 Hz. Consequently, it is not possible to use conventional frequency estimation techniques for the separation of the direct path from the reflected path and accurately estimate the direct path range.

To overcome this limitation the embodiments use a unique combination of implementations of subspace decomposition high resolution spectral estimation methodologies and multimodal cluster analysis. The subspace decomposition technology relies on breaking the estimated covariance matrix of the observed data into two orthogonal subspaces, the noise subspace and the signal subspace. The theory behind the subspace decomposition methodology is that the projection of the observable onto the noise subspace consists of only the noise and the projection of the observable onto the signal subspace consists of only the signal.

The super resolution spectrum estimation algorithms and RELAX algorithm are capable of distinguishing closely placed frequencies (sinusoids) in spectrum in presence of noise. The frequencies do not have to be harmonically related and, unlike the Digital Fourier Transform (DFT), the signal model does not introduce any artificial periodicity. For a given bandwidth, these algorithms provide significantly higher resolution than Fourier Transform. Thus, the Direct Line Of Sight (DLOS) can be reliably distinguished from other multi-paths (MP) with high accuracy. Similarly, applying a threshold method, which will be explained below, to the artificially produced synthetic wider bandwidth ranging signal makes it possible to reliably distinguish DLOS from other paths with high accuracy.

In accordance with the embodiment, the Digital signal processing (DSP), can be employed by the multi-path mitigation processor to reliably distinguish the DLOS from other MP paths. A variety of super-resolution algorithms/techniques exist in the spectral analysis (spectrum estimation) technology. Examples include subspace based methods: MUltiple SIgnal Characterization (MUSIC) algorithm or root-MUSIC algorithm, Estimation of Signal Parameters via Rotational Invariance Techniques (ESPRIT) algorithm, Pisarenko Harmonic Decomposition (PHD) algorithm, RELAX algorithm, etc.

The noted super-resolution algorithms work on the premise that the signals impinging on the antennas are not fully correlated. Thus, the performance degrades severely in a highly correlated signal environment as may be encountered in multipath propagation. Multipath mitigation techniques may involve a preprocessing scheme called spatial smoothing. As a result, the multipath mitigation process may become computationally intensive, complicated, i.e., increases the complexity of the system implementation. Multipath mitigation with lower system computational costs and implementation complexity may be achieved by using the super-resolution Matrix Pencil (MP) algorithm. The MP algorithm is classified as a non-search procedure. Therefore, it is computationally less complicated and eliminates problems encountered in search procedures used in other super-resolution algorithms. Moreover, the MP algorithm is not sensitive to correlated signals and only requires a single channel estimate and can also estimate the delays associated with coherent multipath components.

In all of the abovementioned super-resolution algorithms the incoming (i.e., received) signal is modeled as a linear combination of complex exponentials and their complex amplitudes of frequencies. In case of a multi-path, the received signal will be as follows:

$$r(t) = \beta \times e^{i2\pi f \times t} \sum_{k=0}^{k=L-1} \alpha_k \times e^{-i2\pi f \times \tau_K}, \quad (1)$$

where $\beta \times e^{i2\pi f \times t}$ is the transmitted signal, f is the operating frequency, L is the number of multi-path components, and $\alpha_K = |\alpha_K| \times e^{j\theta_K}$ and $\tau_K$ are the complex attenuation and propagation delay of the K-th path, respectively. The multi-path components are indexed so that the propagation delays are considered in ascending order. As a result, in this model $\tau_0$ denotes the propagation delay of the DLOS path. Obviously, the $\tau_0$ value is of the most interest, as it is the smallest value of all $\tau_K$. The phase $\theta_K$ is normally assumed random from one measurement cycle to another with a uniform probability density function U (0,2π). Thus, we assume that $\alpha_K$=const (i.e., constant value)

Parameters $\alpha_K$ and $\tau_K$ are random time-variant functions reflecting motions of people and equipment in and around buildings. However, since the rate of their variations is very slow as compared to the measurement time interval, these parameters can be treated as time-invariant random variables within a given measurement cycle.

All these parameters are frequency-dependent since they are related to radio signal characteristics, such as, transmission and reflection coefficients. However, in the embodiment, the operating frequency changes very little. Thus, the abovementioned parameters can be assumed frequency-independent.

Equation (1) can be presented in frequency domain as:

$$A(f) = \sum_{k=0}^{k=L-1} \alpha_k \times e^{-i(2\pi \times \tau_K)f}, \quad (2)$$

where: A) is complex amplitude of the received signal, $(2\pi \times \tau_K)$ are the artificial "frequencies" to be estimated by a super-resolution algorithm and the operating frequency f is the independent variable; $\alpha_K$ is the K-th path amplitude.

In the equation (2) the super-resolution estimation of $(2\pi \times \tau_K)$ and subsequently $\tau_K$ values are based on continuous frequency. In practice, there is a finite number of measurements. Thus, the variable f will not be a continuous variable, but rather a discrete one. Accordingly, the complex amplitude A(f) can be calculated as follows:

$$\hat{A}(f_n) = \sum_{k=0}^{k=L-1} \alpha_k \times e^{-i(2\pi \times \tau_k) \times f_n}, \quad (3)$$

where $\hat{A}(f_n)$ are discrete complex amplitude estimates (i.e., measurements) at discrete frequencies $f_n$.

In equation (3) $\hat{A}(f_n)$ can be interpreted as an amplitude and a phase of a sinusoidal signal of frequency $f_n$ after it propagates through the multi-path channel. Note that all spectrum estimation based super-resolution algorithms require complex input data (i.e. complex amplitude).

In some cases, it is possible to convert real signal data, e.g. Re $(\hat{A}(f_n))$, into a complex signal (e.g., analytical signal). For example, such a conversion can be accomplished by using Hilbert transformation or other methods. However, in case of short distances the value $\tau_0$ is very small, which results in very low $(2\pi \times \tau_K)$ "frequencies".

These low "frequencies" create problems with Hilbert transform (or other methods) implementations. In addition, if only amplitude values (e.g., Re($\hat{A}(f_n)$)) are to be used, then the number of frequencies to be estimated will include not only the $(2\pi \times \tau_K)$ "frequencies", but also their combinations. As a rule, increasing the number of unknown frequencies impacts the accuracy of the super-resolution algorithms. Thus, reliable and accurate separation of DLOS path from other multi-path (MP) paths requires complex amplitude estimation.

The following is a description of a method and the multi-path mitigation processor operation during the task of obtaining complex amplitude $\hat{A}(f_n)$ in presence of multi-path. Note that, while the description is focused on the half-duplex mode of operation, it can be easily extended for the full-duplex mode. The simplex mode of operation is a subset of the half-duplex mode, but would require additional events synchronization.

In half-duplex mode of operation the reader (often referred to as the "master") and the tags (also referred to as "slaves" or "targets") are controlled by a protocol that only allows the master or the slave to transmit at any given time. In this mode of operation, the tags (target devices) serve as Transponders. The tags receive the ranging signal from a reader (master device), store it in the memory and then, after certain time (delay), re-transmit the signal back to the master.

An example of ranging signal is shown in FIG. 1 and FIG. 1A. The exemplary ranging signal employs different frequency components that are contiguous. Other waveforms, including pseudo random, spaced in frequency and/or time or orthogonal, etc. can be also used for as long as the ranging signal bandwidth remains narrow. In FIG. 1 the time duration $T_f$ for every frequency component is long enough to obtain the ranging signal narrow-bandwidth property.

Figure 2:
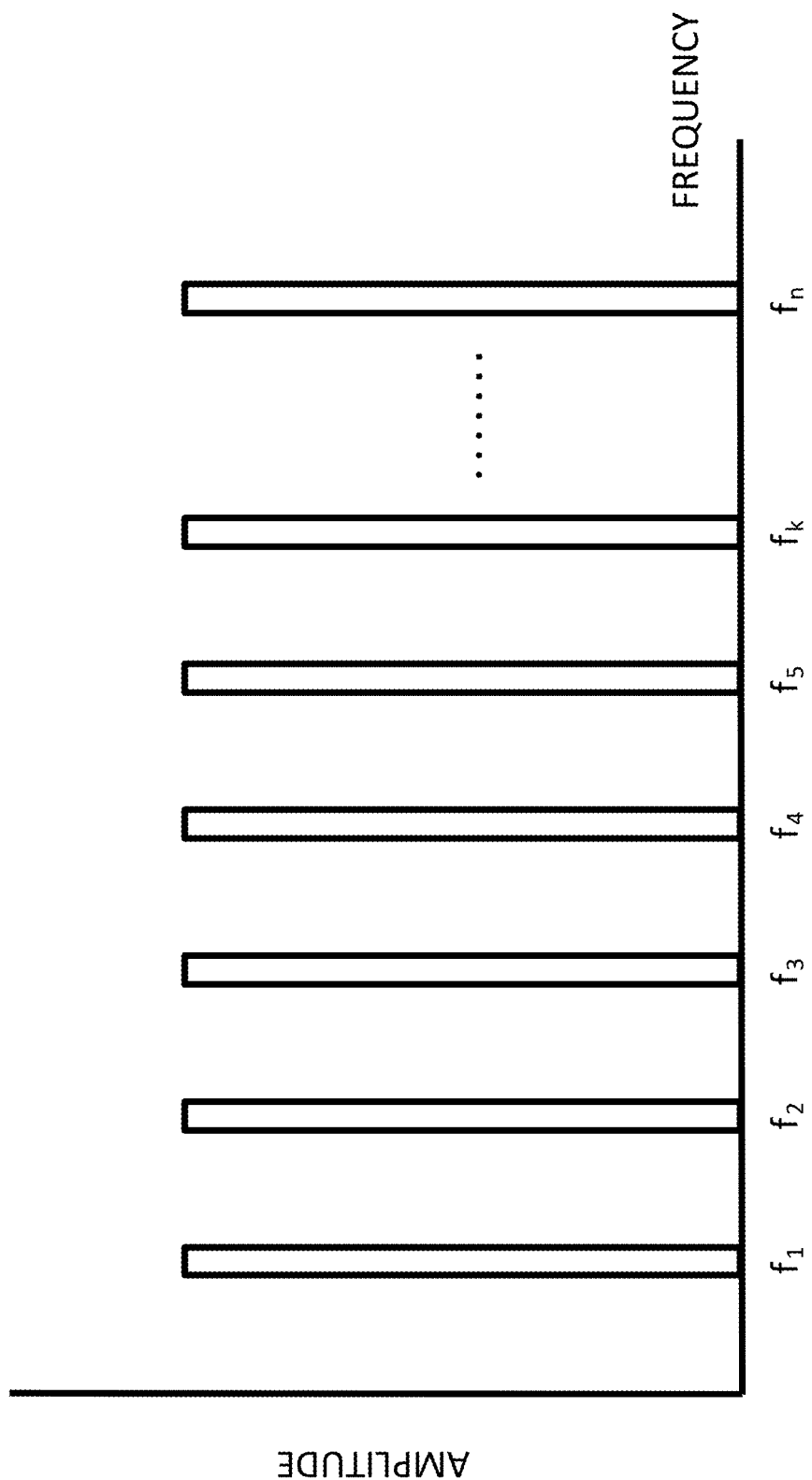
FIG. 2 illustrates exemplary wide bandwidth ranging signal frequency components.

Another variation of a ranging signal with different frequency components is shown on FIG. 2. It includes multiple frequencies ($f_1$, $f_2$, $f_3$, $f_4$, $f_n$) transmitted over long period of time to make individual frequencies narrow-band. Such signal is more efficient, but it occupies in a wide bandwidth and a wide bandwidth ranging signal impacts the SNR, which, in turn, reduces the operating range. Also, such wide bandwidth ranging signal will violate FCC requirements on the VHF band or lower frequencies bands. However, in certain applications this wide-bandwidth ranging signal allows an easier integration into existing signal and transmission protocols. Also, such a signal decreases the track-locate time.

These multiple-frequency ($f_1$, $f_2$, $f_3$, $f_4$, $f_n$) bursts may be also contiguous and/or pseudo random, spaced in frequency and/or time or orthogonal, etc.

The narrowband ranging mode will produce the accuracy in the form of instantaneous wide band ranging while increasing the range at which this accuracy can be realized, compared to wide band ranging. This performance is achieved because at a fixed transmit power, the SNR (in the appropriate signal bandwidths) at the receiver of the narrow band ranging signal is greater than the SNR at the receiver of a wideband ranging signal. The SNR gain is on the order of the ratio of the total bandwidth of the wideband ranging signal and the bandwidth of each channel of the narrow band ranging signal. This provides a good trade-off when very rapid ranging is not required, e.g., for stationary and slow-moving targets, such as a person walking or running.

Master devices and Tag devices are identical and can operate either in Master or Transponder mode. All devices include data/remote control communication channels. The devices can exchange the information and master device(s) can remotely control tag devices. In this example depicted in FIG. 1 during an operation of a master (i.e., reader) multi-path mitigation processor originates the ranging signal to tag(s) and, after a certain delay, the master/reader receives the repeated ranging signal from the tag(s).

Thereafter, master's multi-path mitigation processor compares the received ranging signal with the one that was originally sent from the master and determines the $\hat{A}(f_n)$ estimates in form of an amplitude and a phase for every frequency component $f_1$. Note that in the equation (3) $\hat{A}(f_n)$ is defined for one-way ranging signal trip. In the embodiment the ranging signal makes a round-trip. In other words, it travels both ways: from a master/reader to a target/slave and from the target/slave back to the master/reader. Thus, this round-trip signal complex amplitude, which is received back by the master, can be calculated as follows:

$$|\hat{A}_{RT}(f_n)|=|\hat{A}_{RT}(f_n)|^2 \text{ and } \angle \hat{A}_{RT}(f_n)=2\times(\angle \hat{A}_{RT}(f_n)) \quad (4)$$

There are many techniques available for estimating the complex amplitude and phase values, including, for example, matching filtering $|\hat{A}(f_n)|$ and $\angle \hat{A}(f_n)$. According to the embodiment, a complex amplitude determination is based on $|\hat{A}(f_n)|$ values derived from the master and/or tag receiver RSSI (Received Signal Strength Indicator) values. The phase values $\angle \hat{A}_{RT}(f_n)$ are obtained by comparing the received by a reader/master returned base-band ranging signal phase and the original (i.e., sent by reader/master) base band ranging signal phase. In addition, because master and tag devices have independent clock systems a detailed explanation of devices operation is augmented by analysis of the clock accuracy impact on the phase estimation error. As the above description shows, the one-way amplitude $|\hat{A}(f_n)|$ values are directly obtainable from target/slave device. However, the one-way phase $\angle \hat{A}(f_n)$ values cannot be measured directly.

In the embodiment, the ranging base band signal is the same as the one depicted in FIG. 1. However, for the sake of simplicity, it is assumed herein that the ranging base band signal consists of only two frequency components each containing multiple periods of cosine or sine waves of different frequency: $F_1$ and $F_2$. Note that $F_1=f_1$ and $F_2=f_2$. The number of periods in a first frequency component is L and the number of periods in a second frequency component is P. Note that L may or may not be equal to P, because for $T_f$=constant each frequency component can have different number of periods. Also, there is no time gap between each frequency component, and both $F_1$ and $F_2$ start from the initial phase equal to zero.

Figure 3A:
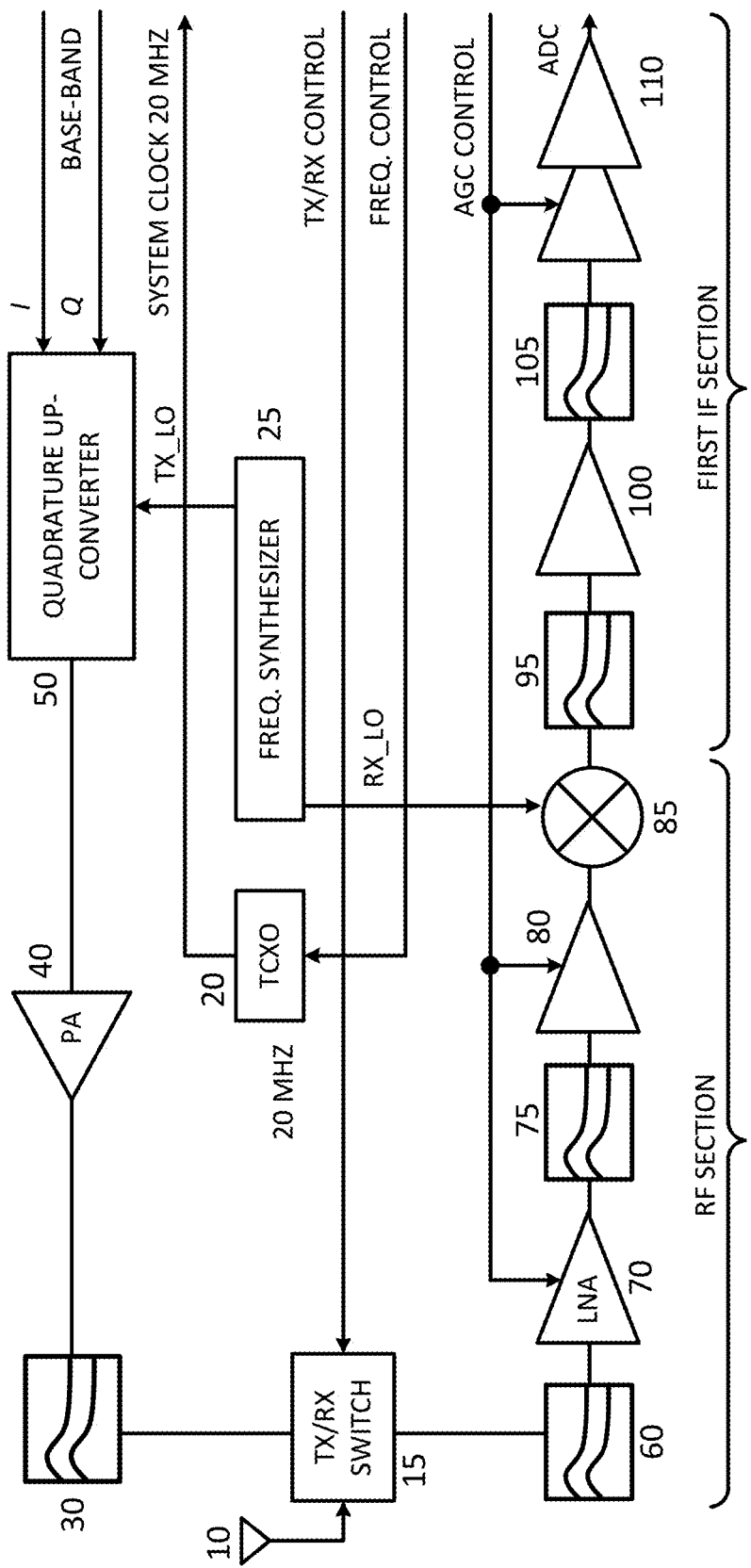
FIG. 3A, FIG. 3B and FIG. 3C illustrate block diagrams of master and slave units of an RF mobile tracking and locating system, in accordance with an embodiment.
Figure 3B:
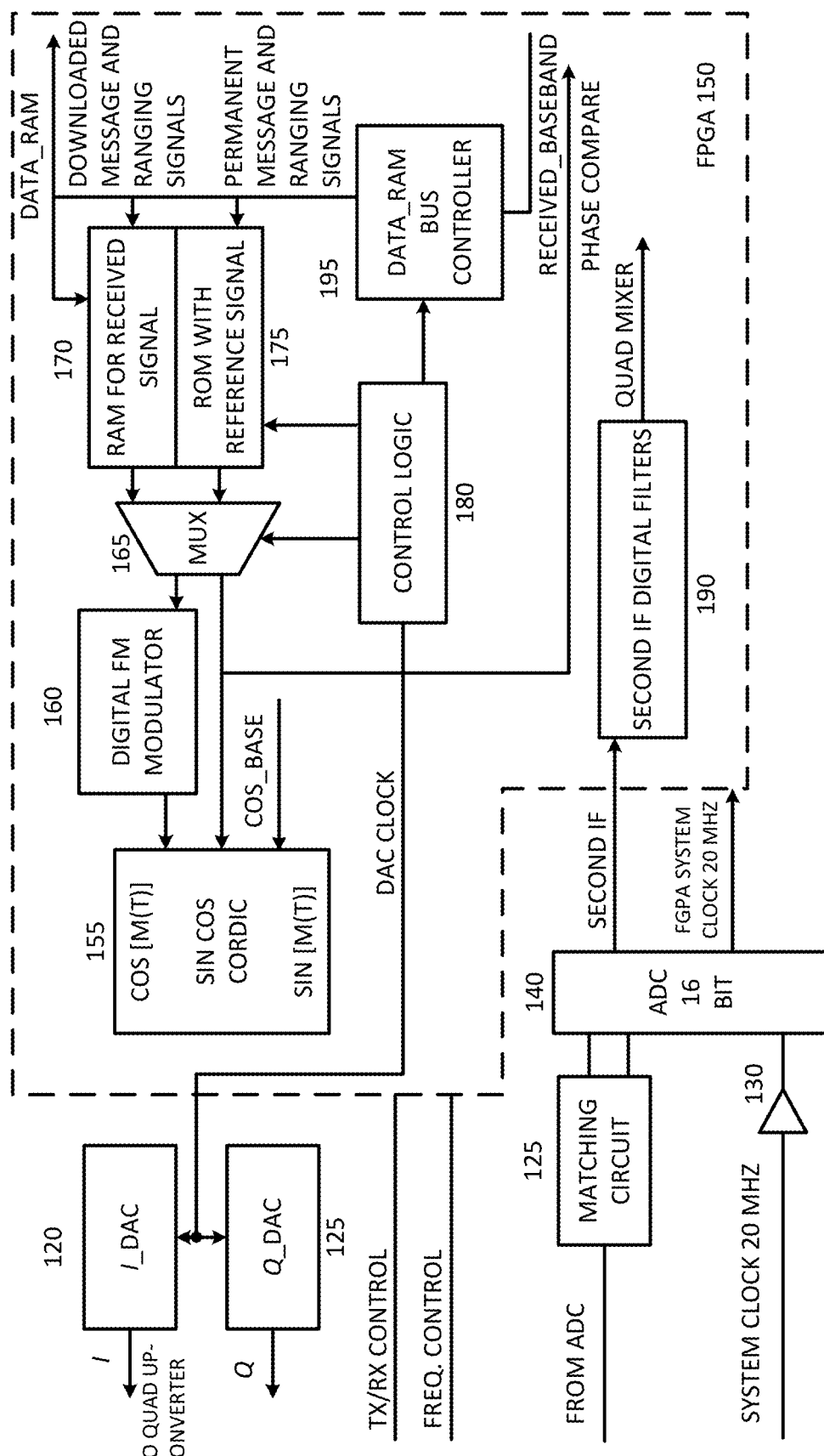
Figure 3C:
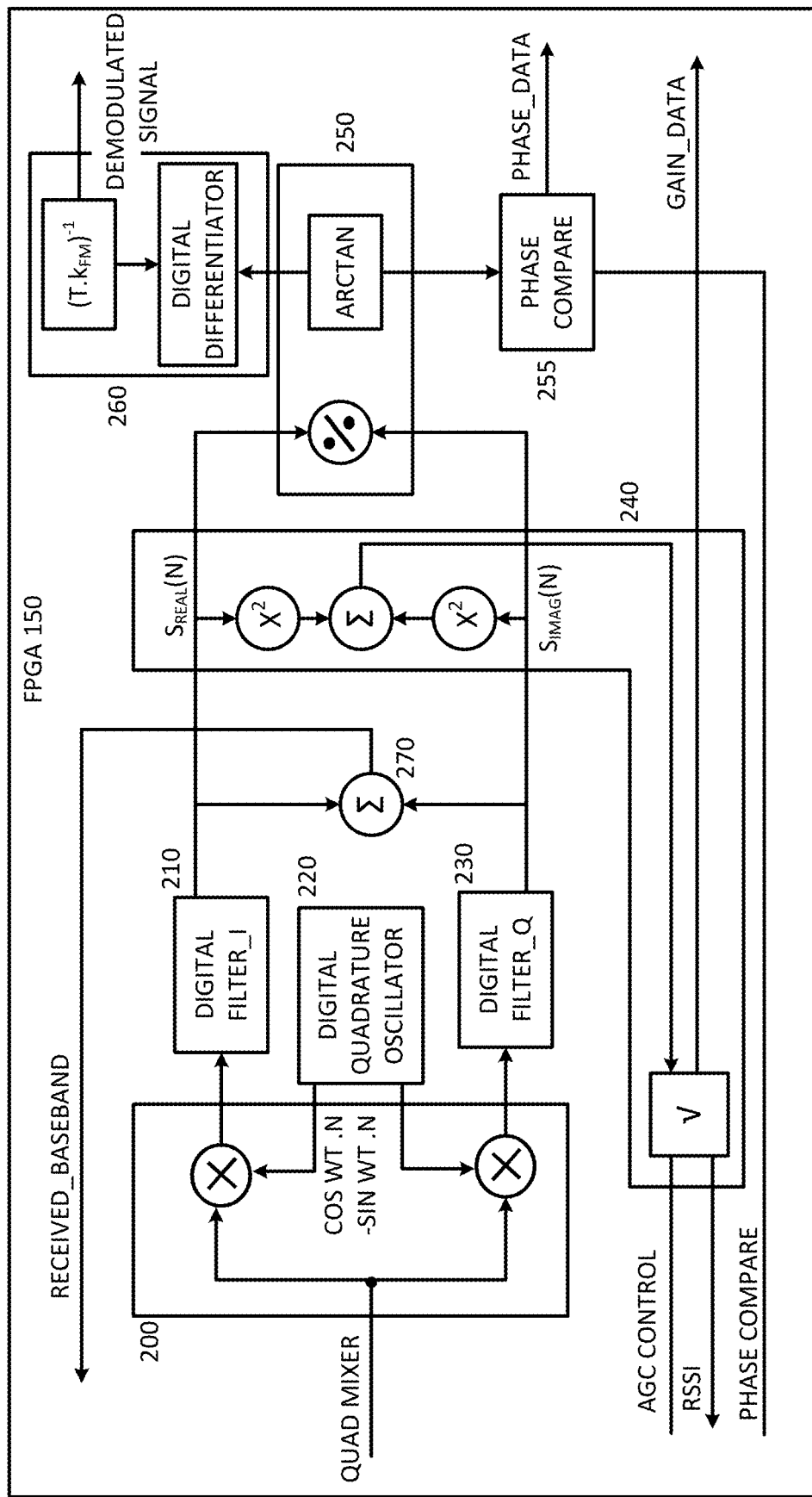

FIGS. 3A, 3B and 3C depict block diagrams of a master or a slave unit (tag) of an RF mobile tracking and locating system. $F_{OSC}$ refers to the frequency of the device system clock (crystal oscillator 20 in FIG. 3A). All frequencies generated within the device are generated from this system clock crystal oscillator. The following definitions are used: M is a master device (unit); AM is a tag (target) device (unit). The tag device is operating in the transponder mode and is referred to as transponder (AM) unit.

In the preferred embodiment the device consists of the RF front-end and the RF back-end, base-band and the multi-path mitigation processor. The RF back-end, base-band and the multi-path mitigation processor are implemented in the FPGA 150 (see FIGS. 3B and 3C). The system clock generator 20 (see FIG. 3A) oscillates at: $F_{OSC}$=20 MHz; or $\omega_{OSC}=2\pi\times20\times10^6$. This is an ideal frequency because in actual devices the system clocks frequencies are not always equal to 20 MHz: $F_{OSC}^M=F_{OSC}\gamma^M$; $F_{OSC}^{AM}=F_{OSC}\gamma^{AM}$.

Note that $$\gamma^M = \frac{F_{OSC}^M}{F_{OSC}}, \gamma^{AM} = \frac{F_{OSC}^{AM}}{F_{OSC}}; \text{ and } \beta^M = \frac{1}{\gamma^M}, \beta^{AM} = \frac{1}{\gamma^{AM}}$$

It should be noted that other than 20 MHz $F_{OSC}$ frequencies can be used without any impact on system performance.

Both units' (master and tag) electronic makeup is identical and the different modes of operations are software programmable. The base band ranging signal is generated in digital format by the master' FPGA 150, blocks 155-180 (see FIG. 2B). It consists of two frequency components each containing multiple periods of cosine or sine waves of different frequency. At the beginning, t=0, the FPGA 150 in a master device (FIG. 3B) outputs the digital base-band ranging signal to its up-converter 50 via I/Q DACs 120 and 125. The FPGA 150 starts with $F_1$ frequency and after time $T_1$ start generating $F_2$ frequency for time duration of $T_2$.

Since crystal oscillator's frequency might differ from 20 MHz the actual frequencies generated by the FPGA will be $F_1\gamma^M$ and $F_2\gamma^M$. Also, time $T_1$ will be $T_1\beta^M$ and $T_2$ will be $T_2\beta^M$. IT is also assumed that $T_1$, $T_2$, $F_2$ are such that $F_1\gamma^M*T_1\beta^M=F_1T_1$ and $F_2\gamma^M*T_2\beta^M=F_2T_2$, where both $F_1T_1$ & $F_2T_2$ are integer numbers. That means that the initial phases of $F_1$ and $F_2$ are equal to zero.

Since all frequencies are generated from the system crystal oscillator 20 clocks, the master' base-band I/Q DAC(s) 120 and 125 outputs are as follows: $F_1=\gamma^M 20\times10^6 \times K_{F_1}$ and $F_2=\gamma^M 20\times10^6 \times K_{F_2}$, where $K_{F_1}$ and $K_{F_2}$ are constant coefficients. Similarly, the output frequencies TX_LO and RX_LO from frequency synthesizer 25 (LO signals for mixers 50 and 85) can be expressed through constant coefficients. These constant coefficients are the same for the master (M) and the transponder (AM)—the difference is in the system crystal oscillator 20 clock frequency of each device.

The master (M) and the transponder (AM) work in a half-duplex mode. Master's RF front-end up-converts the base-band ranging signal, generated by the multi-path mitigation processor, using quadrature up-converter (i.e., mixer) 50 and transmits this up-converted signal. After the base-band signal is transmitted the master switches from TX to RX mode using RF Front-end TX/RX Switch 15. The transponder receives and down-converts the received signal back using its RF Front-end mixer 85 (producing First IF) and ADC 140 (producing Second IF).

Thereafter, this second IF signal is digitally filtered in the Transponder RF back-end processor using digital filters 190 and further down-converted to the base-band ranging signal using the RF back-end quadrature mixer 200, digital I/Q filters 210 and 230, a digital quadrature oscillator 220 and a summer 270. This base-band ranging signal is stored in the transponder's memory 170 using Ram Data Bus Controller 195 and control logic 180.

Subsequently, the transponder switches from RX to TX mode using RF front-end switch 15 and after certain delay $t_{RTX}$ begins re-transmitting the stored base-band signal. Note that the delay is measured in the AM (transponder) system clock. Thus, $t_{RTX}^{AM}=t_{RTX}^{AM}$. The master receives the transponder transmission and down-converts the received signal back to the base-band signal using its RF back-end quadrature mixer 200, the digital I and Q filters 210 and 230, the digital quadrature oscillator 220 (see FIG. 3C).

Thereafter, the master calculates the phase difference between $F_1$ and $F_2$ in the received (i.e., recovered) base-band signal using multi-path mitigation processor arctan block 250 and phase compare block 255. The amplitude values are derived from the RF back-end RSSI block 240.

For improving the estimation accuracy it is always desirable to improve the SNR of the amplitude estimates from block 240 and phase difference estimates from block 255. In the preferred embodiment the multi-path mitigation processor calculates amplitude and phase difference estimates for many time instances over the ranging signal frequency component duration ($T_f$). These values, when averaged, improve SNR. The SNR improvement can be in an order that is proportional to $\sqrt{N}$, where N is a number of instances when amplitude and phase difference values were taken (i.e., determined).

Another approach to the SNR improvement is to determine amplitude and phase difference values by applying matching filter techniques over a period of time. Yet, another approach would be to estimate the phase and the amplitude of the received (i.e., repeated) base band ranging signal frequency components by sampling them and integrating over period $T \le T_f$ against the original (i.e., sent by the master/reader) base-band ranging signal frequency components in the I/Q form. The integration has the effect of averaging of multiple instances of the amplitude and the phase in the I/Q format. Thereafter, the phase and the amplitude values can be translated from the I/Q format to the $|\hat{A}(f_n)|$ and $\angle \hat{A}(f_n)$ format.

Let's assume that at t=0 under master' multi-path processor control the master base-band processor (both in FPGA 150) start the base-band ranging sequence.

$$\varphi_{FPGA}{}^M(t) = \gamma^M \times \omega_{OSC} \times (K_{F_1}(t)), t < T_1\beta^M, t < T_1\beta^M;$$

$$\varphi_{FPGA}{}^M(t) = \gamma^M \times \omega_{OSC} \times (K_{F_1}(T_1\beta^M) + K_{F_2}(t - T_1\beta^M)), t > T_1\beta^M,$$

where $T_f \geq T_1\beta^M$.

The phase at master's DAC(s) 120 and 125 outputs are as follows:

$$\varphi_{DAC}{}^M(t) = \gamma^M \times \omega_{OSC} \times (K_{F_1}(t - t_{DAC}{}^M)) + \varphi_{DAC}{}^M(0), t < T_1\beta^{M+t_{DAC}{}^M};$$

$$\varphi_{DAC}{}^M(t) = \gamma^M \times \omega_{OSC} \times (K_{F_1}(T_1\beta^M) + K_{F_2}(t - T_1\beta^M - t_{DAC}{}^M)) + \varphi_{DAC}{}^M(0), t > T_1\beta^M + t_{DAC}{}^M$$

Note that DACs 120 and 125 have internal propagation delay, $t_{DAC}{}^M$, that does not depend upon the system clock.

Similarly, the transmitter circuitry components 15, 30, 40 and 50 will introduce additional delay, $t_{TX}{}^M$, that does not depend upon the system clock.

As a result, the phase of the transmitted RF signal by the master can be calculated as follows:

$$\varphi_{RF}{}^M(t) = \gamma^M \times \omega_{OSC} \times (K_{F_1}(t - t_{DAC}{}^M - t_{TX}{}^M) + K_{SYN\_TX}(t - t_{TX}{}^M)) + \varphi_{DAC}{}^M(0) + \varphi_{SYN\_TX}{}^M(0), t < T_1\beta^M + t_{DAC}{}^M + t_{TX}{}^M;$$

$$\varphi_{RF}{}^M(t) = \gamma^M \times \omega_{OSC} \times (K_{F_1}(T_1\beta^M) + K_{F_2}(t - T_{1\beta}{}^M - t_{DAC}{}^M - t_{TX}{}^M) + K_{SYN\_TX}(t - t_{TX}{}^M)) + \varphi_{DAC}{}^M(0) + \varphi_{SYN\_TX}{}^M(0), t > T_1\beta^M + t_{DAC}{}^M + t_{TX}{}^M$$

The RF signal from the master (M) experiences a phase shift $\varphi^{MULT}$ that is a function of the multi-path phenomena between the master and tag.

The $\varphi^{MULT}$ values depend upon the transmitted frequencies, e.g. $F_1$ and $F_2$. The transponder (AM) receiver' is not able to resolve each path because of limited (i.e., narrow) bandwidth of the RF portion of the receiver. Thus, after a certain time, for example, 1 microsecond (equivalent to ~300 meters of flight), when all reflected signals have arrived at the receiver antenna, the following formulas apply:

$$\varphi_{ANT}{}^M(t) = \gamma^M \times \omega_{OSC} \times (K_{F_1}(t - t_{DAC}{}^M - t_{TX}{}^M) + K_{SYN\_TX}(t - t_{TX}{}^M)) + \varphi_{F_1}{}^{MULT} + \varphi_{DAC}{}^M(0) + \varphi_{SYN\_TX}{}^M(0), 10^{-6} < t < T_1\beta^M + t_{DAC}{}^M + t_{TX}{}^M;$$

$$\varphi_{ANT}{}^M(t) = \gamma^M \times \omega_{OSC} \times (K_{F_1}(T_1\beta^M) + K_{F_2}(t - T_{1\beta}{}^M - t_{DAC}{}^M - t_{TX}{}^M) + K_{SYN\_TX}(t - t_{TX}{}^M)) + \varphi_{F_2}{}^{MULT} + \varphi_{DAC}{}^M(0) + \varphi_{SYN\_TX}{}^M(0), t > T_1\beta^M + t_{DAC}{}^M + t_{TX}{}^M + 10^{-6}$$

In the AM (transponder) receiver at the first down converter, element 85, an output, e.g. first IF, the phase of the signal is as follows:

$$\varphi_{IF\_1}^{AM}(t) = \gamma^M \times \omega_{OSC} \times (K_{F_1}(t - t_{DAC}^M - t_{TX}^M - t_{RX}^{AM}) + K_{SYN\_TX}(t - t_{TX}^M - t_{RX}^{AM})) - \gamma^{AM} \times \omega_{OSC} \times (K_{SYN\_RX\_1}t) + \varphi_{F_1}^{MULT} + \varphi_{SYN\_TX}^M(0) - \varphi_{SYN\_RX\_1}^{AM}(0),$$
$$10^{-6} < t < T_1\beta^M + t_{DAC}^M + t_{TX}^M + t_{RX}^{AM};$$

$$\varphi_{IF\_1}^{AM}(t) = \gamma^M \times \omega_{OSC} \times (K_{F_1}(T_1\beta^M) + K_{F_2}(t - T_1\beta^M - t_{DAC}^M - t_{TX}^M - t_{RX}^{AM}) + K_{SYN\_TX}(t - t_{TX}^M - t_{RX}^{AM})) - \gamma^{AM} \times \omega_{OSC} \times (K_{SYN\_RX\_1}t) + \varphi_{F_2}^{MULT} + \varphi_{SYN\_TX}^M(0) - \varphi_{SYN\_RX\_1}^{AM}(0),$$
$$t > T_1\beta^M + t_{DAC}^M + t_{TX}^M + t_{RX}^{AM} + 10^{-6}$$

Note that the propagation delay $t_{RX}{}^{AM}$ in the receiver RF section (elements 15 and 60-85) does not depend upon the system clock. After passing through RF Front-end filters and amplifiers (elements 95-110 and 125) the first IF signal is sampled by the RF Back-end ADC 140. It is assumed that ADC 140 is under-sampling the input signal (e.g., first IF). Thus, the ADC also acts like a down-converter producing the second IF. The first IF filters, amplifiers and the ADC add propagation delay time. At the ADC output (second IF):

$$\varphi_{ADC}^{AM}(t) = \gamma^M \times \omega_{OSC} \times (K_{F_1}(t - t_{DAC}^M - t_{TX}^M - t_{RX}^{AM} - t_{IF\_1}^{AM} - t_{ADC}^{AM}) + K_{SYN\_TX}(t - t_{TX}^M - t_{RX}^{AM} - t_{IF\_1}^{AM} - t_{ADC}^{AM})) - \gamma^{AM} \times \omega_{OSC} \times (K_{SYN\_RX\_1}(t - t_{IF\_1}^{AM} - t_{ADC}^{AM}) + K_{ADC}(t)) + \varphi_{F_1}^{MULT} + \varphi_{SYN\_TX}^M(0) - \varphi_{SYN\_RX\_1}^{AM}(0) - \varphi_{ADC\_CLK}^{AM}(0),$$
$$10^{-6} < t < T_1\beta^M + t_{DAC}^M + t_{TX}^M + t_{RX}^{AM} + t_{IF\_1}^{AM} + t_{ADC}^{AM};$$

$$\varphi_{ADC}^{AM}(t) = \gamma^M \times \omega_{OSC} \times (K_{F_1}(T_1\beta^M) + K_{F_2}(t - T_1\beta^M - t_{DAC}^M - t_{TX}^M - t_{RX}^{AM} - t_{IF\_1}^{AM} - t_{ADC}^{AM}) + K_{SYN\_TX}(t - t_{TX}^M - t_{RX}^{AM} - t_{IF\_1}^{AM} - t_{ADC}^{AM})) - \gamma^{AM} \times \omega_{OSC} \times (K_{SYN\_RX\_1}(t - t_{IF\_1}^{AM} - t_{ADC}^{AM}) + K_{ADC}(t)) + \varphi_{F_2}^{MULT} + \varphi_{SYN\_TX}^M(0) - \varphi_{SYN\_RX\_1}^{AM}(0) - \varphi_{ADC\_CLK}^{AM}(0),$$
$$t > T_1\beta^M + t_{DAC}^M + t_{TX}^M + t_{RX}^{AM} + t_{IF\_1}^{AM} + t_{ADC}^{AM} + 10^{-6}$$

In the FPGA 150 the second IF signal (from the ADC output) is filtered by the RF Back-end digital filters 190 and further down-converted back to base-band ranging signal by the third down-converter (i.e., quadrature mixer 200, digital filters 230 and 210 and digital quadrature oscillator 220), summed in the summer 270 and is stored in the memory 170. At the third down-converter output (i.e., quadrature mixer):

$$\varphi_{BB}^{AM}(t) = \gamma^M \times \omega_{OSC} \times (K_{F_1}(t - t_{DAC}^M - t_{TX}^M - t_{RX}^{AM} - t_{IF\_1}^{AM} - t_{ADC}^{AM} - t_{FIR}\beta^{AM}) + K_{SYN\_TX}(t - t_{TX}^M - t_{RX}^{AM} - t_{IF\_1}^{AM} - t_{ADC}^{AM} - t_{FIR}\beta^{AM})) - \gamma^{AM} \times \omega_{OSC} \times (K_{SYN\_RX\_1}(t - t_{IF\_1}^{AM} - t_{ADC}^{AM} - t_{FIR}\beta^{AM}) + K_{ADC}(t - t_{FIR}\beta^{AM}) + K_{SYN\_RX\_2}t) + \varphi_{F_1}^{MULT} + \varphi_{SYN\_TX}^M(0) - \varphi_{SYN\_RX\_1}^{AM}(0) - \varphi_{ADC\_CLK}^{AM}(0) - \varphi_{SYN\_RX\_2}^{AM}(0),$$
$$10^{-6} < t < T_1\beta^M + t_{DAC}^M + t_{TX}^M + t_{RX}^{AM} + t_{IF\_1}^{AM} + t_{ADC}^{AM} + t_{FIR}\beta^{AM};$$

$$\varphi_{BB}^{AM}(t) = \gamma^M \times \omega_{OSC} \times (K_{F_1}(T_1\beta^M) + K_{F_2}(t - T_1\beta^M - t_{DAC}^M - t_{TX}^M - t_{RX}^{AM} - t_{IF\_1}^{AM} - t_{ADC}^{AM} - t_{FIR}\beta^{AM}) + K_{SYN\_TX}(t - t_{TX}^M - t_{RX}^{AM} - t_{IF\_1}^{AM} - t_{ADC}^{AM} - t_{FIR}\beta^{AM})) - \gamma^{AM} \times \omega_{OSC} \times (K_{SYN\_RX\_1}(t - t_{IF\_1}^{AM} - t_{ADC}^{AM} - t_{FIR}\beta^{AM}) + K_{ADC}(t - t_{FIR}\beta^{AM}) + K_{SYN\_RX\_2}t) + \varphi_{F_2}^{MULT} + \varphi_{SYN\_TX}^M(0) - \varphi_{SYN\_RX\_1}^{AM}(0) - \varphi_{ADC\_CLK}^{AM}(0) - \varphi_{SYN\_RX\_2}^{AM}(0),$$
$$t > T_1\beta^M + t_{DAC}^M + t_{TX}^M + t_{RX}^{AM} + t_{IF\_1}^{AM} + t_{ADC}^{AM} + t_{FIR}\beta^{AM} + 10^{-6}$$

Note that propagation delay $t = t_{FIR}{}^{AM} = t_{FIR}{}^{AM}$ in the FIR section 190 does not depend upon the system clock.

After RX→TX delay the stored (in memory 170) baseband ranging signal from the master (M) is retransmitted. Note that RX→TX delay $t_{RTX}{}^{AM} = t_{RTX}\beta^{AM}$.

$$\varphi_{RF}^{AM}(t) =$$

$$\gamma^M \times \omega_{OSC} \times (K_{F_1}(t - t_{DAC}^M - t_{TX}^M - t_{RX}^{AM} - t_{IF\_1}^{AM} - t_{ADC}^{AM} - t_{FIR}\beta^{AM} -$$

$$t_{RTX}\beta^{AM} - t_{DAC}^{AM} - t_{TX}^{AM}) + K_{SYN\_TX}(t - t_{TX}^M - t_{RX}^{AM} - t_{IF\_1}^{AM} -$$

$$t_{ADC}^{AM} - t_{FIR}\beta^{AM} - t_{RTX}\beta^{AM} - t_{DAC}^{AM} - t_{TX}^{AM})) - \gamma^{AM} \times \omega_{OSC} \times$$

$$(K_{SYN\_RX\_1}(t - t_{IF\_1}^{AM} - t_{ADC}^{AM} - t_{FIR}\beta^{AM} - t_{RTX}\beta^{AM} - t_{DAC}^{AM} - t_{TX}^{AM}) +$$

$$K_{ADC}(t - t_{FIR}\beta^{AM} - t_{RTX}\beta^{AM} - t_{DAC}^{AM} - t_{TX}^{AM}) +$$

$$K_{SYN\_RX\_2}(t - t_{RTX}\beta^{AM} - t_{DAC}^{AM} - t_{TX}^{AM}) - K_{SYN\_TX}(t - t_{TX}^{AM})) +$$

$$\varphi_{F_1}^{MULT} + \varphi_{SYN\_TX}^M(0) - \varphi_{SYN\_RX\_1}^{AM}(0) - \varphi_{ADC\_CLK}^{AM}(0) -$$

$$\varphi_{SYN\_RX\_2}^{AM}(0) +$$

$$\varphi_{SYN\_TX}^{AM}(0),$$

$$10^{-6} < t < T_1\beta^M + t_{DAC}^M + t_{TX}^M + t_{RX}^{AM} +$$

$$t_{IF\_1}^{AM} + t_{ADC}^{AM} + t_{FIR}\beta^{AM} +$$

$$t_{RTX}\beta^{AM} + t_{DAC}^{AM} + t_{TX}^{AM};$$

$$\varphi_{RF}^{AM}(t) = \gamma^M \times \omega_{OSC} \times (K_{F_1}(T_1\beta^M) + K_{F_2}(t - T_1\beta^M - t_{DAC}^M - t_{TX}^M -$$

$$t_{RX}^{AM} - t_{IF\_1}^{AM} - t_{ADC}^{AM} - t_{FIR}\beta^{AM} - t_{RTX}\beta^{AM} - t_{DAC}^{AM} - t_{TX}^{AM}) +$$

$$K_{SYN\_TX}(t - t_{TX}^M - t_{RX}^{AM} - t_{IF\_1}^{AM} - t_{ADC}^{AM} - t_{FIR}\beta^{AM} -$$

$$t_{RTX}\beta^{AM} - t_{DAC}^{AM} - t_{TX}^{AM})) - \gamma^{AM} \times \omega_{OSC} \times$$

$$(K_{SYN\_RX\_1}(t - t_{IF\_1}^{AM} - t_{ADC}^{AM} - t_{FIR}\beta^{AM} - t_{RTX}\beta^{AM} - t_{DAC}^{AM} - t_{TX}^{AM}) +$$

$$K_{ADC}(t - t_{FIR}\beta^{AM} - t_{RTX}\beta^{AM} - t_{DAC}^{AM} - t_{TX}^{AM}) +$$

$$K_{SYN\_RX\_2}(t - t_{RTX}\beta^{AM} - t_{DAC}^{AM} - t_{TX}^{AM}) - K_{SYN\_TX}(t - t_{TX}^{AM})) +$$

$$\varphi_{F_2}^{MULT} + \varphi_{SYN\_TX}^M(0) - \varphi_{SYN\_RX\_1}^{AM}(0) -$$

$$\varphi_{ADC\_CLK}^{AM}(0) -$$

$$\varphi_{SYN\_RX\_2}^{AM}(0) +$$

$$\varphi_{SYN\_TX}^{AM}(0),$$

$$t > T_1\beta^M + t_{DAC}^M + t_{TX}^M + t_{RX}^{AM} + t_{IF\_1}^{AM} +$$

$$t_{ADC}^{AM} + t_{FIR}\beta^{AM} +$$

$$t_{RTX}\beta^{AM} + t_{DAC}^{AM} + t_{TX}^{AM} + 10^{-6}$$

By the time the signal from the transponder reaches the master' (M) receiver antenna the RF signal from transponder (AM) experiences another phase shift $\varphi^{MULT}$ that is a function of the multi-path. As discussed above, this phase shift happens after a certain time period when all reflected signals have arrived at the master' receiver antenna:

$$\varphi_{ANT}^M(t) =$$

$$\gamma^M \times \omega_{OSC} \times (K_{F_1}(t - t_{DAC}^M - t_{TX}^M - t_{RX}^{AM} - t_{IF\_1}^{AM} - t_{ADC}^{AM} - t_{FIR}\beta^{AM} -$$

$$t_{RTX}\beta^{AM} - t_{DAC}^{AM} - t_{TX}^{AM}) + K_{SYN\_TX}(t - t_{TX}^M - t_{RX}^{AM} - t_{IF\_1}^{AM} -$$

$$t_{ADC}^{AM} - t_{FIR}\beta^{AM} - t_{RTX}\beta^{AM} - t_{DAC}^{AM} - t_{TX}^{AM})) - \gamma^{AM} \times \omega_{OSC} \times$$

$$(K_{SYN\_RX\_1}(t - t_{IF\_1}^{AM} - t_{ADC}^{AM} - t_{FIR}\beta^{AM} - t_{RTX}\beta^{AM} - t_{DAC}^{AM} - t_{TX}^{AM}) +$$

$$K_{ADC}(t - t_{FIR}\beta^{AM} - t_{RTX}\beta^{AM} - t_{DAC}^{AM} - t_{TX}^{AM}) +$$

$$K_{SYN\_RX\_2}(t - t_{RTX}\beta^{AM} - t_{TX}^{AM} - t_{TX}^{AM}) - K_{SYN\_TX}(t - t_{TX}^{AM})) +$$

$$2 \times \varphi_{F_1}^{MULT} + \varphi_{SYN\_TX}^M(0) - \varphi_{SYN\_RX\_1}^{AM}(0) -$$

$$\varphi_{ADC\_CLK}^{AM}(0) -$$

$$\varphi_{SYN\_RX\_2}^{AM}(0) +$$

$$\varphi_{SYN\_TX}^{AM}(0),$$

$$2 \times 10^{-6} < t < T_1\beta^M + t_{DAC}^M + t_{TX}^M + t_{RX}^{AM} +$$

$$t_{IF\_1}^{AM} + t_{ADC}^{AM} + t_{FIR}\beta^{AM} +$$

$$t_{RTX}\beta^{AM} + t_{DAC}^{AM} + t_{TX}^{AM};$$

$$\varphi_{ANT}^M(t) = \gamma^M \times \omega_{OSC} \times (K_{F_1}(T_1\beta^M) + K_{F_2}(t - T_1\beta^M - t_{DAC}^M - t_{TX}^M -$$

$$t_{RX}^{AM} - t_{IF\_1}^{AM} - t_{ADC}^{AM} - t_{FIR}\beta^{AM} - t_{RTX}\beta^{AM} - t_{DAC}^{AM} - t_{TX}^{AM}) +$$

$$K_{SYN\_TX}(t - t_{TX}^M - t_{RX}^{AM} - t_{IF\_1}^{AM} - t_{ADC}^{AM} - t_{FIR}\beta^{AM} -$$

$$t_{RTX}\beta^{AM} - t_{DAC}^{AM} - t_{TX}^{AM})) - \gamma^{AM} \times \omega_{OSC} \times$$

$$(K_{SYN\_RX\_1}(t - t_{IF\_1}^{AM} - t_{ADC}^{AM} - t_{FIR}\beta^{AM} - t_{RTX}\beta^{AM} - t_{DAC}^{AM} - t_{TX}^{AM}) +$$

$$K_{ADC}(t - t_{FIR}\beta^{AM} - t_{RTX}\beta^{AM} - t_{DAC}^{AM} - t_{TX}^{AM}) +$$

$$K_{SYN\_RX\_2}(t - t_{RTX}\beta^{AM} - t_{TX}^{AM} - t_{TX}^{AM}) - K_{SYN\_TX}(t - t_{TX}^{AM})) +$$

$$2 \times \varphi_{F_2}^{MULT} + \varphi_{SYN\_TX}^M(0) - \varphi_{SYN\_RX\_1}^{AM}(0) -$$

$$\varphi_{ADC\_CLK}^{AM}(0) -$$

$$\varphi_{SYN\_RX\_2}^{AM}(0) +$$

$$\varphi_{SYN\_TX}^{AM}(0),$$

$$t > T_1\beta^M + t_{DAC}^M + t_{TX}^M + t_{RX}^{AM} + t_{IF\_1}^{AM} +$$

$$t_{ADC}^{AM} + t_{FIR}\beta^{AM} +$$

$$t_{RTX}\beta^{AM} + t_{DAC}^{AM} + t_{TX}^{AM} + 2 \times 10^{-6}$$

In the master receiver the signal from transponder goes through the same down-conversion process as in the transponder receiver. The result is the recovered base-band ranging signal that was originally sent by the master.

For the first frequency component $F_1$:

$$\varphi_{BB\_RECOV}^M(t) =$$

$$\gamma^M \times \omega_{OSC} \times (K_{F_1}(t - t_{DAC}^M - t_{TX}^M - t_{RX}^{AM} - t_{IF\_1}^{AM} - t_{ADC}^{AM} - t_{FIR}\beta^{AM} -$$

$$t_{RTX}\beta^{AM} - t_{DAC}^{AM} - t_{TX}^{AM} - t_{RX}^M - t_{IF\_1}^M - t_{ADC}^M - t_{FIR}\beta^M) +$$

$$K_{SYN\_TX}(t - t_{TX}^M - t_{RX}^{AM} - t_{IF\_1}^{AM} - t_{ADC}^{AM} - t_{FIR}\beta^{AM} -$$

$$t_{RTX}\beta^{AM} - t_{DAC}^{AM} - t_{TX}^{AM} - t_{RX}^M - t_{IF\_1}^M - t_{ADC}^M - t_{FIR}\beta^M) -$$

$$K_{SYN\_RX\_1}(t - t_{IF\_1}^M - t_{ADC}^M - t_{FIR}\beta^M) -$$

$$K_{ADC}(t - t_{FIR}\beta^M) - K_{SYN\_RX\_2}(t)) -$$

$$\gamma^{AM} \times \omega_{OSC} \times (K_{SYN\_RX\_1}(t - t_{IF\_1}^{AM} - t_{ADC}^{AM} - t_{FIR}\beta^{AM} -$$

$$t_{RTX}\beta^{AM} - t_{TX}^{AM} - t_{RX}^M - t_{IF\_1}^M - t_{ADC}^M - t_{FIR}\beta^M) +$$

$$K_{ADC}(t - t_{FIR}\beta^{AM} - t_{DAC}^{AM} - t_{RTX}\beta^{AM} - t_{DAC}^{AM} - t_{TX}^{AM} -$$

$$t_{RX}^M - t_{IF\_1}^M - t_{ADC}^M - t_{FIR}\beta^M) + K_{SYN\_RX\_2}($$

$$t - t_{RTX}\beta^{AM} - t_{DAC}^{AM} - t_{TX}^{AM} - t_{RX}^M - t_{IF\_1}^M - t_{ADC}^M - t_{FIR}\beta^M) -$$

$$K_{SYN\_TX}(t - t_{TX}^{AM} - t_{RX}^M - F_{IF\_1}^M - t_{ADC}^M - t_{FIR}\beta^M)) +$$

$$2 \times \varphi_{F_1}^{MULT} + \varphi_{SYN\_TX}^M(0) - \varphi_{SYN\_RX\_1}^{AM}(0) -$$

$$\varphi_{ADC\_CLK}^{AM}(0) -$$

$$\varphi_{SYN\_RX\_2}^{AM}(0) +$$

$$\varphi_{SYN\_TX}^{AM} -$$

$$\varphi_{SYN\_RX\_1}^M(0) -$$

$$\varphi_{ADC\_CLK}^M(0) -$$

$$\varphi_{SYN\_RX\_2}^M(0),$$

-continued
$$2 \times 10^{-6} < t < T_1\beta^M + t_{DAC}^M + t_{TX}^M +$$
$$t_{RX}^{AM} + t_{IF\_1}^{AM} +$$
$$t_{ADC}^{AM} + t_{FIR}\beta^{AM} +$$
$$t_{RTX}\beta^{AM} + t_{DAC}^{AM} + t_{TX}^{AM} +$$
$$t_{RX}^M + t_{IF\_1}^M + t_{ADC}^M + t_{FIR}\beta^{AM};$$

For the second frequency component F2:

$$\varphi_{BB\_RECOV}^M(t) =$$
$$\gamma^M \times \omega_{OSC} \times (K_{F_1}(T_1\beta^M) + K_{F_2}(t - T_1\beta^M - t_{DAC}^M - t_{TX}^M - t_{RX}^{AM} - t_{IF\_1}^{AM} -$$
$$t_{ADC}^{AM} - t_{FIR}\beta^{AM} - t_{RTX}\beta^{AM} - t_{DAC}^{AM} - t_{TX}^{AM} - t_{RX}^M - t_{IF\_1}^M - t_{ADC}^M -$$
$$t_{FIR}\beta^M) + K_{SYN\_TX}(t - t_{TX}^M - t_{RX}^{AM} - t_{IF\_1}^{AM} - t_{ADC}^{AM} - t_{FIR}\beta^{AM} -$$
$$t_{RTX}\beta^{AM} - t_{DAC}^{AM} - t_{TX}^{AM} - t_{RX}^M - t_{IF\_1}^M - t_{ADC}^M - t_{FIR}\beta^M) -$$
$$K_{SYN\_RX\_1}(t - t_{IF\_1}^M - t_{ADC}^M - t_{FIR}\beta^M) -$$
$$K_{ADC}(t - t_{FIR}\beta^M) - K_{SYN\_RX\_2}(t)) -$$
$$\gamma^{AM} \times \omega_{OSC} \times (K_{SYN\_RX\_1}(t - t_{IF\_1}^{AM} - t_{ADC}^{AM} - t_{FIR}\beta^{AM} - t_{RTX}\beta^{AM} -$$
$$t_{DAC}^{AM} - t_{TX}^{AM} - t_{RX}^M - t_{IF\_1}^M - t_{ADC}^M - t_{FIR}\beta^{AM}) +$$
$$K_{ADC}(t - t_{FIR}\beta^{AM} - t_{RTX}\beta^{AM} - t_{DAC}^{AM} - t_{TX}^{AM} - t_{RX}^{AM} -$$
$$t_{IF\_1}^M - t_{ADC}^M t_{FIR}\beta^M) + K_{SYN\_RX\_2}($$
$$t - t_{RTX}\beta^{AM} - t_{DAC}^{AM} - t_{TX}^{AM} - t_{RX}^M - t_{IF\_1}^M - t_{ADC}^M - t_{FIR}\beta^M) -$$
$$K_{SYN\_TX}(t - t_{TX}^{AM} - t_{RX}^M - F_{IF\_1}^M - t_{ADC}^M - t_{FIR}\beta^M)) +$$
$$2 \times \varphi_{F_2}^{MULT} + \varphi_{SYN\_TX}^M(0) - \varphi_{SYN\_RX\_1}^{AM}(0) -$$
$$\varphi_{ADC\_CLK}^{AM}(0) -$$
$$\varphi_{SYN\_RX\_2}^{AM}(0) +$$
$$\varphi_{SYN\_TX}^{AM} -$$
$$\varphi_{SYN\_RX\_1}^{AM}(0) -$$
$$\varphi_{ADC\_CLK}^M(0) -$$
$$\varphi_{SYN\_RX\_2}^M(0),$$
$$t > T_1\beta^M + t_{DAC}^M + t_{TX}^M + t_{RX}^{AM} +$$
$$t_{IF\_1}^{AM} +$$
$$t_{ADC}^{AM} +$$
$$t_{FIR}\beta^{AM} +$$
$$t_{RTX}\beta^{AM} + t_{DAC}^{AM} +$$
$$t_{TX}^{AM} + t_{RX}^M +$$
$$t_{IF\_1}^M + t_{ADC}^M + t_{FIR}\beta^{AM} + 2 \times 10^{-6}$$

Substitutions:

$$T_{D\_M\_AM} = t_{DAC}^M + t_{TX}^M + t_{RX}^{AM} + t_{IF\_1}^{AM} +$$
$$t_{ADC}^{AM} + t_{FIR}\beta^{AM} + t_{RTX}\beta^{AM} + t_{DAC}^{AM} +$$
$$t_{TX}^{AM} + t_{RX}^M + t_{IF\_1}^M + t_{ADC}^M + t_{FIR}\beta^M;$$

where $T_{D\_M\_AM}$ is the propagation delay through master (M) and transponder (AM) circuitry.

$$\varphi_{BB\_M\_AM}(0) = \varphi_{SYN\_TX}^M(0) - \varphi_{SYN\_RX\_1}^{AM}(0) - \varphi_{ADC\_CLK}^{AM}(0) - \varphi_{SYN\_RX\_2}^{AM}(0) + \varphi_{SYN\_RX\_1}^M(0) - \varphi_{ADC\_CLK}^M(0) - \varphi_{SYN\_RX\_2}^M(0) = Const;$$

where: $\varphi_{BB\_M\_AM}(0)$ is the LO phase shift, at time t=0, from master (M) and transponder (AM) frequency mixers, including ADC(s).

Also: $K_{SYN\_TX} = K_{SYN\_RX\_1} K_{ADC} + K_{SYN\_RX\_2}$

First frequency component F1:

$$\varphi_{BB\_RECOV}^M(t) = \gamma^M \times \omega_{OSC} \times$$
$$(K_{F_1}(t - T_{D\_M\_AM}) - K_{SYN\_TX}(t) + K_{SYN\_RX\_1}(t) - K_{ADC}(t) -$$
$$K_{SYN\_RX\_2}(t) + K_{SYN\_TX}(-t_{TX}^M - t_{RX}^{AM} - t_{IF\_1}^{AM} - t_{ADC}^{AM} - t_{FIR}\beta^{AM} -$$
$$t_{RTX}\beta^{AM} - t_{DAC}^{AM} - t_{TX}^{AM} - t_{RX}^M - t_{IF\_1}^M - t_{ADC}^M - t_{FIR}\beta^M) -$$
$$K_{SYN\_RX\_1}(-t_{IF\_1}^M - t_{ADC}^M - t_{FIR}\beta^M) - K_{ADC}(-t_{FIR}\beta^M)) -$$
$$\gamma^{AM} \times \omega_{OSC} \times (K_{SYN\_RX\_1} + K_{ADC}(t) + K_{SYN\_RX\_2}(t) - K_{SYN\_TX}(t) +$$
$$K_{SYN\_RX\_1}(t - t_{IF\_1}^{AM} - t_{ADC}^{AM} - t_{FIR}\beta^{AM} - t_{RTX}\beta^{AM} - t_{DAC}^{AM}) + K_{ADC}($$
$$-t_{FIR}\beta^{AM} - t_{RTX}\beta^{AM} - t_{DAC}^{AM}) + K_{SYN\_RX\_2}(-t_{RTX}\beta^{AM} - t_{DAC}^{AM})$$
$$K_{SYN\_RX\_1}(-t_{TX}^{AM} - t_{RX}^M - t_{IF\_1}^M - t_{ADC}^M - t_{FIR}\beta^M) +$$
$$K_{ADC}(-t_{TX}^{AM} - t_{RX}^M - t_{IF\_1}^M - t_{ADC}^M - t_{FIR}\beta^M) +$$
$$K_{SYN\_RX\_2}(-t_{TX}^{AM} - t_{RX}^M - t_{IF\_1}^M - t_{ADC}^M - t_{FIR}\beta^M) -$$
$$K_{SYN\_TX}(-t_{TX}^{AM} - t_{RX}^M - t_{IF\_1}^M - t_{ADC}^M - t_{FIR}\beta^M)) +$$
$$2 \times \varphi_{F_1}^{MULT} + \varphi_{BB\_M\_AM}(0), 2 \times 10^{-6} <$$
$$t < T_1\beta^M + T_{D\_M\_AM};$$

First frequency component F1 continued:

$$\varphi_{BB\_RECOV}^M(t) = \gamma^M \times \omega_{OSC} \times$$
$$(K_{F_1}(t - T_{D\_M\_AM}) - K_{SYN\_TX}(-t_{TX}^M - t_{RX}^{AM} - t_{IF\_1}^{AM} - t_{ADC}^{AM} - t_{FIR}\beta^{AM} -$$
$$t_{RTX}\beta^{AM} - t_{DAC}^{AM} - t_{TX}^{AM} - t_{RX}^M - t_{IF\_1}^M - t_{ADC}^M - t_{FIR}\beta^M) -$$
$$K_{SYN\_RX\_1}(-t_{IF\_1}^M - t_{ADC}^M - t_{FIR}\beta^M) - K_{ADC}(-t_{FIR}\beta^M)) -$$
$$\gamma^{AM} \times \omega_{OSC} \times (K_{SYN\_RX\_1}(-t_{IF\_1}^{AM} - t_{ADC}^{AM} - t_{FIR}\beta^{AM} - t_{RTX}\beta^{AM} - t_{DAC}^{AM}) +$$
$$K_{ADC}(-t_{FIR}\beta^{AM} - t_{RTX}\beta^{AM} - t_{DAC}^{AM}) +$$
$$K_{SYN\_RX\_2}(-t_{RTX}\beta^{AM} - t_{DAC}^{AM})) +$$
$$2 \times \varphi_{F_1}^{MULT} + \varphi_{BB\_M\_AM}(0), 2 \times 10^{-6} <$$
$$t < T_1\beta^M + T_{D\_M\_AM};$$

Second frequency component F2:

$$\varphi_{BB\_RECOV}^M(t) =$$
$$\gamma^M \times \omega_{OSC} \times (K_{F_1}(T_1\beta^M) + K_{F_2}(t - T_1\beta^M - T_{D\_M\_AM}) - K_{SYN\_TX}(t) +$$
$$K_{SYN\_RX\_1} - K_{ADC}(t) - K_{SYN\_RX\_2}(t) +$$
$$K_{SYN\_TX}(-t_{TX}^M - t_{RX}^{AM} - t_{IF\_1}^{AM} - t_{ADC}^{AM} - t_{FIR}\beta^{AM} -$$
$$t_{RTX}\beta^{AM} - t_{DAC}^{AM} - t_{TX}^{AM} - t_{RX}^M - t_{IF\_1}^M - t_{ADC}^M - t_{FIR}\beta^M) -$$
$$K_{SYN\_RX\_1}(-t_{IF\_1}^M - t_{ADC}^M - t_{FIR}\beta^M) - K_{ADC}(-t_{FIR}\beta^M)) -$$
$$\gamma^{AM} \times \omega_{OSC} \times (K_{SYN\_RX\_1}(t) + K_{ADC}(t) + K_{SYN\_RX\_2}(t) - K_{SYN\_TX}(t) +$$
$$K_{SYN\_RX\_1}(-t_{IF\_1}^{AM} - t_{ADC}^{AM} - t_{FIR}\beta^{AM} - t_{RTX}\beta^{AM}) + K_{ADC}($$
$$-t_{FIR}\beta^{AM} - t_{RTX}\beta^{AM} - t_{ADC}^{AM}) + K_{SYN\_RX\_2}(-t_{RTX}\beta^{AM} - t_{DAC}^{AM})$$
$$K_{SYN\_RX\_1}(-t_{TX}^{AM} - t_{RX}^M - t_{IF\_1}^M - t_{ADC}^M - t_{FIR}\beta^M) +$$
$$K_{ADC}(-t_{TX}^{AM} - t_{RX}^M - t_{IF\_1}^M - t_{ADC}^M - t_{FIR}\beta^M) +$$
$$K_{SYN\_RX\_2}(-t_{TX}^{AM} - t_{RX}^M - t_{IF\_1}^M - t_{ADC}^M - t_{FIR}\beta^M) -$$
$$K_{SYN\_TX}(-t_{TX}^{AM} - t_{RX}^M - t_{IF\_1}^M - t_{ADC}^M - t_{FIR}\beta^M)) +$$

-continued $$2 \times \varphi_{F_2}^{MULT} + \varphi_{BB\_M-AM}(0), t > T_1\beta^M + T_{D\_M-AM} + 2\times 10^{-6}$$

Second frequency component F2, continued:

$$\varphi_{BB\_RECOV}^M(t) =$$
$$\gamma^M \times \omega_{OSC} \times (K_{F_1}(T_1\beta^M) + K_{F_2}(t - T_1\beta^M - T_{D\_M-AM}) + K_{SYN\_TX}(-t_{TX}^M - t_{RX}^{AM} - t_{IF\_1}^{AM} - t_{ADC}^{AM} - t_{FIR}\beta^{AM} - t_{RTX}\beta^{AM} -$$
$$t_{DAC}^{AM} - t_{TX}^{AM} - t_{RX}^M - t_{IF\_1}^M - t_{ADC}^M - t_{FIR}\beta^M) -$$
$$K_{SYN\_RX\_1}(-t_{IF\_1}^M - t_{ADC}^M - t_{FIR}\beta^M) - K_{ADC}(-t_{FIR}\beta^M)) -$$
$$\gamma^{AM} \times \omega_{OSC} \times (K_{SYN\_RX\_1}(-t_{IF\_1}^{AM} - t_{ADC}^{AM} - t_{FIR}\beta^{AM} - t_{RTX}\beta^{AM}) + K_{ADC}(-t_{FIR}\beta^M - t_{RTX}\beta^{AM} - t_{DAC}^{AM}) + K_{SYN\_RX\_2}(-t_{RTX}\beta^{AM} - t_{DAC}^{AM})) +$$
$$2 \times \varphi_{F_2}^{MULT} + \varphi_{BB\_M-AM}(0), t > T_1\beta^M + T_{D\_M-AM} + 2\times 10^{-6}$$

Further substituting:

$$\alpha =$$
$$\gamma^M \times \omega_{OSC} \times (K_{SYN\_TX}(-t_{TX}^M - t_{RX}^{AM} - t_{IF\_1}^{AM} - t_{ADC}^{AM} - t_{FIR}\beta^{AM} - t_{RTX}\beta^{AM} -$$
$$t_{DAC}^{AM} - t_{TX}^{AM} - t_{RX}^M - t_{IF\_1}^M - t_{ADC}^M - t_{FIR}\beta^M) -$$
$$K_{SYN\_RX\_1}(-t_{IF\_1}^M - t_{ADC}^M - t_{FIR}\beta^M) - K_{ADC}(-t_{FIR}\beta^M)) -$$
$$\gamma^{AM} \times \omega_{OSC} \times (K_{SYN\_RX\_1}(-t_{IF\_1}^{AM} - t_{ADC}^{AM} - t_{FIR}\beta^{AM} - t_{RTX}\beta^{AM}) + K_{ADC}(-t_{FIR}\beta^{AM} - t_{RTX}\beta^{AM} - t_{DAC}^{AM}) + K_{SYN\_RX\_2}(-t_{RTX}\beta^{AM} - t_{DAC}^{AM})),$$

where $\alpha$ is a constant.
Then the final phase equations is:

$$\varphi_{BB\_RECOV}^M(t) = \qquad (5)$$
$$\gamma^M \times \omega_{OSC} \times (K_{F_1}(t - T_{D\_M-AM})) + 2\times\varphi_{F_2}^{MULT} + \varphi_{BB\_M-AMN}(0) + \alpha,$$
$$2\times 10^{-6} < t < T_1\beta^M + T_{D\_M-AM};$$
$$\varphi_{BB\_RECOV}^M(t) =$$
$$\gamma^M \times \omega_{OSC} \times (K_{F_1}(T_1\beta^M) + K_{F_2}(t - T_1\beta^M - T_{D\_M-AM})) +$$
$$2\times\varphi_{F_2}^{MULT} + \varphi_{BB\_M-AM}(0) + \alpha, t > T_1\beta^M + T_{D\_M-AM} + 2\times 10^{-6}$$

From the equation (5):

$$L\hat{A}_{RT}(f_n) =$$
$$\begin{cases} 2\times\varphi_{F_1}^{MULT}; 2\times\varphi_{F_1}^{MULT} + 2\times\Delta\Phi_{F_1/F_2}; 2\times\varphi_{F_1}^{MULT} + 2\times\Delta\Phi_{F_1/F_3}; \\ 2\times\varphi_{F_1}^{MULT} + 2\times\Delta\Phi_{F_1/F_4}; \ldots ; 2\times\varphi_{F_1}^{MULT} + 2\times\Delta\Phi_{F_1/F_2}; \end{cases}$$

where i=2, 3, 4 . . . ; and $2\times\Delta\Phi_{F_1/F_1}$ is equal to $2\times(\varphi_{F_1}^{MULT} - \varphi_{F_1}^{MULT})$.

For example, the difference $2\times(\varphi_{F_2}^{MULT} - \varphi_{F_2}^{MULT})$ at time instances t1 and t2:

$$2\times\varphi_{F_2}^{MULT} - 2\times\varphi_{F_1}^{MULT} = 2\times\Delta\Phi_{F_1/F_2} = \varphi_{BB\_RECOV}^M(t_2) - \varphi_{BB\_RECOV}^M(t_1) - \gamma^M\times\omega_{OSC}\times[K_{F_1}(T_1\beta^M) + (K_{F_2}(t_2-T_1\beta^M-T_{D\_M-AM})) - (K_{F_1}(t_1-T_{D\_M-AM}))],$$
$$2\times 10^{-6} < t_1 < T_1\beta^M + T_{D\_M-AM}; t_2 > T_1\beta^M + T_{D\_M-AM} + 2\times 10^{-6}$$

To find $2\times\Delta\Phi_{F_1/F_2}$ difference we need to know $T_{D\_M-AM}$:

$$T_{D\_M-AM} = T_{LB\_M}\beta^M + T_{LB\_AM}\beta^{AM} + t_{RTX}\beta^{AM};$$

$$T_{LB\_M} = t_{DAC}^M + t_{TX}^M + t_{RX}^M + t_{IF\_1}^M + t_{ADC}^M + t_{FIR}\beta^M;$$
$$T_{LB\_AM} = t_{DAC}^{AM} + t_{TX}^{AM} + t_{RX}^{AM} + t_{IF\_1}^{AM} + t_{ADC}^{AM} + t_{FIR}\beta^{AM},$$

where $T_{LB\_M}$ and $T_{LB\_AM}$ are propagation delays through the master (M) and transponder (AM) TX and RX circuitries that are measured by placing devices in the loop-back mode. Note that the master and the transponder devices can measure $T_{LB\_M}$ and $T_{LB\_AM}$ automatically; and we also know the $t_{RTX}$ value.

From the above formulas and $t_{RTX}$ value $T_{D\_M-AM}$ can be determined and consequently, for a given $t_1$, and $t_2$ the $2\times\Delta\Phi_{F_1/F_2}$ value can be found as follows:

$$2\times\Delta\Phi_{F_1/F_2} = \varphi_{BB\_RECOV}^M(t_2) - \varphi_{BB\_RECOV}^M(t_1) - \gamma^M\times\omega_{OSC}\times \qquad (6)$$
$$[K_{F_1}(T_1\beta^M) + K_{F_2}t_2 - K_{F_2}T_1\beta^M - K_{F_1}t_1 - K_{F_2}T_{LB\_M}\beta^M +$$
$$K_{F_1}T_{LB\_M}\beta^M - K_{F_2}(T_{LB\_AM}\beta^{AM}\beta^M + t_{RTX}\beta^M) +$$
$$K_{F_1}(T_{LB\_AM}\beta^{AM}\beta^M + t_{RTX}\beta^M)],$$
$$2\times 10^{-6} < t_1 < T_1\beta^M + T_{D\_M-AM}; t_2 = t_1 + T_1\beta^M$$

$$2\times\Delta\Phi_{F_1/F_2} = \varphi_{BB\_RECOV}^M(t_2) - \varphi_{BB\_RECOV}^M(t_1) -$$
$$\gamma^M\times\omega_{OSC}\times[K_{F_2}t_2 - K_{F_1}t_1 -$$
$$(K_{F_2} - K_{F_1})\times T_1\beta^M - (K_{F_2} - K_{F_1})\times T_{LB\_M}\beta^M -$$
$$(K_{F_2} - K_{F_1})\times(T_{LB\_AM}\beta^{AM}\beta^M + t_{RTX}\beta^M)],$$
$$2\times 10^{-6} < t_1 < T_1\beta^M + T_{D\_M-AM}; t_2 = t_1 + T_1\beta^M$$

$$2\times\Delta\Phi_{F_1/F_2} = \varphi_{BB\_RECOV}^M(t_2) - \varphi_{BB\_RECOV}^M(t_1) -$$
$$\gamma^M\times\omega_{OSC}\times[K_{F_2}t_2 - K_{F_1}t_1 - (K_{F_2} - K_{F_1})\times(T_1\beta^M -$$
$$T_{LB\_M}\beta^M - T_{LB\_AM}\beta^{AM}\beta^M + t_{RTX}\beta^M)],$$
$$2\times 10^{-6} < t_1 < T_1\beta^M + T_{D\_M-AM}; t_2 = t_1 + T_1\beta^M;$$

Or, assuming that $\beta^M = \beta^{AM} = 1$:

$$2\times\Delta\Phi_{F_1/F_2} = \varphi_{BB\_RECOV}^M(t_2) - \varphi_{BB\_RECOV}^M(t_1) - \gamma^M\times\omega_{OSC}\times[K_{F_2}t_2 - K_{F_1}t_1 - (K_{F_2} - K_{F_1})\times(T_1 - T_{D\_M-AM})], \qquad (6A)$$

$$2\times 10^{-6} < t_1 < T_1 + T_{D\_M-AM}; t_2 = t_1 \pm T_1;$$

From the equation (6) it can be concluded that at operating frequency(s) ranging signal(s) complex amplitude values can be found from processing the returned base-band ranging signal.

The initial phase value $2\times\varphi_{F_1}^{MULT}$ can be assumed to be equal zero because the subspace algorithms are not sensitive to a constant phase offset. If necessary, the $2\times\varphi_{F_1}^{MULT}$ value (phase initial value) can be found by determining the TOA (Time Of Arrival) using the narrow-bandwidth ranging signal method as described in U.S. Pat. No. 7,561,048, incorporated herein by reference in its entirety. This method estimates the ranging signal round trip delay, which is equal to $2\times T_{FLT}\beta^M$ and the $2\times\varphi_{F_1}^{MULT}$ value can be found from the following equation:

$$2\times\varphi_{F_1}^{MULT} = 2\times\beta^M\times\gamma^M\times\omega_{OSC}(K_{SYN\_TX} + K_{F_1})\times(T_{FLT}),$$

Or:

$$2\times\varphi_{F_1}^{MULT} = 2\times\omega_{OSC}\times(K_{SYN\_TX} + K_{F_1})\times(T_{FLT}),$$

In the preferred embodiment, the returned base-band ranging signal phase values $\varphi_{BB\_RECOV}^M(t)$ are calculated by the multi-path processor's arctan block 250. To improve SNR, the multi-path mitigation processor phase compare block 255 calculates $2\times\Delta\Phi_{F_1/F_1}$ $\varphi_{BB\_RECOV}^M(t_m)-\varphi_{BB\_RECOV}^M(t_n)$ for many instances n (n=2, 3, 4 . . . ) using the equation (6A), and then average them out to improve SNR. Note that $2\times10^{-6} < t_n < T_f + T_{D\_M-AM}$; $t_m = t_1 + T_f$.

From the equations 5 and 6 it becomes apparent that the recovered (i.e., received) base-band ranging signal has the same frequency as the original base-band signal that was sent by the master. Thus, there is no frequency translation despite the fact that the master (M) and the transponder (AM) system clocks can differ. Because the base-band signal consists of several frequency components, each component is consists of multiple periods of a sinusoid, it is also possible to estimate the phase and the amplitude of the received ranging signal by sampling the received base-band signal individual component frequency with the corresponding original (i.e., sent by the master) base-band signal individual frequency component and integrating the resulting signal over period $T \le T_f$.

This operation generates complex amplitude values $\hat{A}_{RT}(f_n)$ of received ranging signal in the I/Q format. Note that each base-band signal individual frequency component that was sent by the master has to be shifted in time by the $T_{D\_M-AM}$. The integration operation produces effect of averaging out the multiple instances of the amplitude and the phase (e.g., increasing the SNR). Note that the phase and the amplitude values can be translated from the I/Q format to the $|\hat{A}(f_n)|$ and $\angle \hat{A}_{RT}(f_n)$ format.

This method of sampling, integrating over period of $T \le T_f$ and subsequent conversion from the I/Q format to the $|\hat{A}(f_n)|$ and $\angle \hat{A}(f_n)$ format can be implemented in the phase compare block 255 in FIG. 3C. Thus, depending upon the block's 255 design and implementation, either the method of the preferred embodiment, based on the equation (5), or an alternative method, described in this section, can be used.

Although the ranging signal bandwidth is narrow, the frequency difference $f_n - f_1$ can be relatively large, for example, in an order of several megahertz. As a result, the receiver's bandwidth has to be kept wide enough to pass all of the $f_1 : f_n$ ranging signal frequencies components. This wide receiver bandwidth impacts the SNR. To reduce the receiver effective bandwidth and improve the SNR, the received ranging signal base-band frequency components can be filtered by the RF back-end processor in FPGA 150 by the digital narrow bandwidth filters tuned for each individual frequency component of the received base-band ranging signal. However, this large number of digital filters (the number of filters equals to the number of individual frequency components, n) puts additional burden on the FPGA resources, increasing its cost, size and power consumption.

In the preferred embodiment only two narrow bandwidth digital filters are used: one filter is always tuned for $f_1$ frequency component and the other filter can be tuned for all other frequencies components: $f_2 : f_n$. Multiple instances of ranging signal are sent by the master. Each instance consists of only two frequencies: $f_1 : f_2$; $f_1 : f_3$ . . . ; $f_1 : f_i$ . . . ; $f_1 : f_n$. Similar strategies are also possible.

Please note that it is also entirely possible to keep the base-band ranging signal components to only two (or even one) generating the rest of the frequency components by adjusting the frequency synthesizers, e.g. changing $K_{SYN}$. It is desirable that LO signals for up-converters and down-converters mixers are generated using the Direct Digital Synthesis (DDS) technology. For high VHF band frequencies this can present an undesired burden on the transceiver/FPGA hardware. However, for lower frequencies this might be a useful approach. Analog frequency synthesizers can also be used, but may take additional time to settle after frequency is changed. Also, in case of analog synthesizers, two measurements at the same frequency would have to be made in order to cancel a phase offset that might develop after changing the analog synthesizer's frequency.

The actual $T_{D\_M-AM}$ that is used in the above equations is measured in both: the master (M) and the transponder (AM) systems clocks, e.g. $T_{LB\_AM}$ and $t_{RTX}$ are counted in the transponder (AM) clocks and $T_{LB\_M}$ is counted in the master (M) clock. However, when $2\times\Delta\Phi_{F_1/F_2}$ is calculated both: $T_{LB\_AM}$ and $t_{RTX}$ are measured (counted) in master (M) clock. This introduces an error:

$$2\times\Delta\Phi_{ERROR} = \gamma^M \times \omega_{OSC} \times (K_{F_2} - K_{F_1}) \times (T_{LB\_AM}(\beta^{AM}\beta^M - \beta^{AM}) + t_{RTX}(\beta^M - \beta^{AM})) \quad (7)$$

The phase estimation error (7) impacts the accuracy. Therefore, it is necessary to minimize this error. If $\beta^M = \beta^{AM}$, in other words, all master(s) and transponders (tags) system clocks are synchronized, then the contribution from the $t_{RTX}$ time is eliminated.

In the preferred embodiment, the master and the transponder units (devices) are capable of synchronizing clocks with any of the devices. For example, a master device can serve as a reference. Clock synchronization is accomplished by using the remote control communication channel, whereby under FPGA 150 control, the frequency of temperature compensated crystal oscillator TCXO 20 is adjusted. The frequency difference is measured at the output of the summer 270 of the master device while the selected transponder device is transmitting a carrier signal.

Thereafter, the master sends a command to the transponder to increase/decrease TCXO frequency. This procedure may be repeated several times to achieve greater accuracy by minimizing frequency at the summer 270 output. Please note that in an ideal case the frequency at the summer 270 output should become equal to zero. An alternative method is to measure the frequency difference and make a correction of the estimated phase without adjusting the transponder' TCXO frequency.

While $\beta^M - \beta^{AM}$ can be considerably reduced there is a phase estimation error when $\beta^M \ne 1$. In this case the margin of error depends upon a long term stability of the reference device (usually master (M)) clock generator. In addition, the process of clock synchronization may take considerable amount of time, especially with large number of units in the field. During the synchronization process the track-locate system becomes partially or fully inoperable, which negatively impacts the system readiness and performance. In this case the abovementioned method that does not require the transponder' TCXO frequency adjustment is preferred.

Commercially available (off the shelf) TCXO components have high degree of accuracy and stability. Specifically, TCXO components for the GPS commercial applications are very accurate. With these devices, the phase error impact on locating accuracy can be less than one meter without the need for frequent clock synchronization.

After narrow bandwidth ranging signal multi-path mitigation processor obtains the returned narrow bandwidth ranging signal complex amplitude $\hat{A}_{RT}(f_n)$ the further processing (i.e., execution of super-resolution algorithms), is implemented in the software-based component, which is a part of the multi-path mitigation processor. This software component can be implemented in the master (reader) host computer CPU and/or the microprocessor that is embedded in the FPGA 150 (not shown). In the preferred embodiment the multi-path mitigation algorithm(s) software component is executed by the master host computer CPU.

The super-resolution algorithm(s) produce estimation of $(2\pi \times \tau_K)$ "frequencies", e.g. $\tau_K$ values. At the final step the multi-path mitigation processor selects r with the smallest value (i.e., the DLOS delay time).

In certain cases where the ranging signal narrow bandwidth requirements are somewhat relaxed, the DLOS path can be separated from MP paths by employing a continuous (in time) chirp. In the preferred embodiment this continuous chirp is Linear Frequency Modulation (LFM). However, other chirp waveforms can be also used.

Let's assume that under multi-path mitigation processor control a chirp with bandwidth of B and duration of T is transmitted. That gives a chirp rate of $$\beta = 2\pi \frac{B}{T}$$

radians per second. Multiple chirps are transmitted and received back. Note that chirps signals are generated digitally with each chirp started at the same phase.

In the multi-path processor each received single chirp is aligned so that the returned chirp is from the middle of the area of interest.

The chirp waveform equation is:

$s(t)=\exp(i(\omega_0 t+\beta t^2))$, where $\omega_0$ is the initial frequency for $0<t<T$.

For a single delay round-trip $\tau$, e.g. no multi-path, the returned signal (cirp) is $s(t-\tau)$.

The multi-path mitigation processor then "deramps" the $s(t-\tau)$ by performing complex conjugate mix with the originally transmitted chirp. The resulting signal is a complex sinusoid:

$$f_\tau(t)=\exp(-\omega_0\tau)\exp(-2i\beta\tau t)\exp(i\beta\tau^2), \quad (8)$$

where $\exp(-iw_0\tau_k)$ is the amplitude and $2\beta\tau$ is the frequency and $0\le t\le T$. Note that the last term is a phase and it is negligible.

In case of multi-path, the composite deramped signal consists of multiple complex sinusoids:

$$f_{MP}(t) = \sum_{k=0}^{k=L} \exp(-iw_0\tau_k)\exp(-i2\beta\tau_k)(t), \quad (9)$$

where L is the number of ranging signal paths, including the DLOS path and $0\le t\le T$.

Multiple chirps are transmitted and processed. Each chirp is individually treated/processed as described above. Thereafter, the multi-path mitigation processor assembles results of individual chirps processing:

$$f_{MP}^N(t) = \left[\sum_{n=0}^{n=N-1} P(t-n\rho)\right] \times \left[\sum_{k=0}^{k=L} \exp(-iw_0\tau_k)\exp(-i2\beta\tau_k)t\right] \quad (10)$$

where N is the number of chirps, $$P(t) = \begin{cases} 1; 0 \le t \le T \\ 0; t > T \end{cases},$$

$\rho=T+t_{dead}$; $t_{dead}$ is the dead time zone between two consecutive chirps; $2\beta\tau_k$ are artificial delay "frequencies". Again, the most interesting is the lowest "frequency", which corresponds to the DLOS path delay.

In the equation (10) $f_{MP}^N(t)$ can be thought of as N samples of a sum of complex sinusoids at times:

$0\le t_\alpha \le T; t_1=t_\alpha+\rho; t_2=t_\alpha+2\rho \ldots ; t_{m-1}=t_\alpha+(N-1)\rho; m\in 0:$
$m-1;$ Thus, the number of samples can be a multiple of N, e.g. $\alpha N$; $\alpha=1, 2, \ldots$.

From the equation (10) the multi-path mitigation processor produces $\alpha N$ complex amplitude samples in time domain that are used in further processing (i.e., execution of super-resolution algorithms). This further processing is implemented in the software component, which is a part of the multi-path mitigation processor. This software component can be executed by the master (reader) host computer CPU and/or by the microprocessor that is embedded in the FPGA 150 (not shown), or both. In the preferred embodiment the multi-path mitigation algorithm(s) software is executed by the master host computer CPU.

The super-resolution algorithm(s) produce estimation of $2\beta\tau_k$ "frequencies", e.g. $\tau_K$ values. At the final step the multi-path mitigation processor selects r with the smallest value, i.e. the DLOS delay time.

An explanation will be given of a special processing method, called the "threshold technique," which can serve as an alternative to the super-resolution algorithms. In other words, it is used to enhance reliability and accuracy in distinguishing DLOS path from other MP paths using the artificially generated synthetic wider bandwidth ranging signal.

The frequency domain base-band ranging signal shown in FIG. 1 and FIG. 1A can be converted into time domain base-band signal s(t):

$$s(t) = \frac{\sin\pi(2N+1)\Delta ft}{\sin\pi\Delta ft} \quad (11)$$

It is readily verified that s(t) is periodic with period $1/\Delta t$, and for any integer k, that $s(k/\Delta t)=2N+1$, which is the peak value of the signal. Where n=N in FIG. 1 and FIG. 1A.

Figure 4:
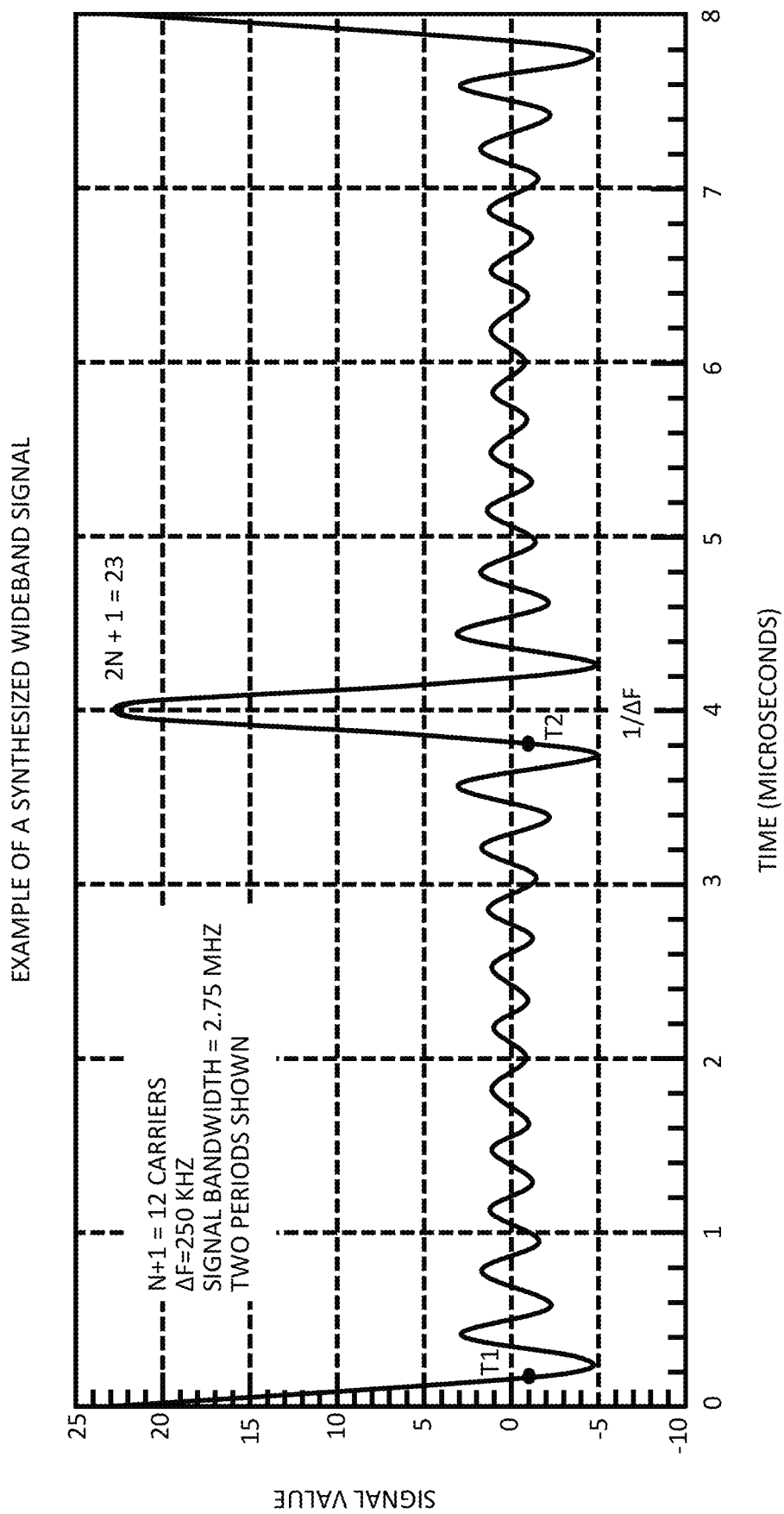
FIG. 4 illustrates an embodiment synthesized wideband base band ranging signal.

FIG. 4 shows two periods of s(t) for the case where N=11 and $\Delta f=250$ kHz. The signal appears as a sequence of pulses of height 2N+1=23 separated by $1/\Delta f=4$ microseconds. Between the pulses is a sinusoidal waveform with varying amplitude and 2N zeros. The wide bandwidth of the signal can be attributed to the narrowness of the tall pulses. It can be also seen that the bandwidth extends from zero frequency to $N\Delta f=2.75$ MHz.

The basic idea of the threshold method that is used in the preferred embodiment is to enhance the artificially generated synthetic wider bandwidth ranging reliability and accuracy in distinguishing DLOS path from other MP paths. The threshold method detects when the start of the leading edge of a wideband pulse arrives at a receiver. Because of filtering in the transmitter and receiver, the leading edge does not rise instantaneously, but rises out of the noise with smoothly increasing slope. The TOA of the leading edge is measured by detecting when the leading edge crosses a predetermined threshold T.

A small threshold is desirable because it gets crossed sooner and the error delay $\tau$ between the true start of the pulse and the threshold crossing is small. Thus, any pulse replica arriving due to multi-path has no effect if the start of the replica having a delay greater than $\tau$. However, the presence of noise places a limit on how small the threshold T can be. One way to decrease the delay τ is to use the derivative of the received pulse instead of the pulse itself, because the derivative rises faster. The second derivative has an even faster rise. Higher order derivatives might be used, but in practice they can raise the noise level to an unacceptable value, so the threshold second derivative is used.

Although the 2.75 MHz wide signal depicted in FIG. 4 has a fairly wide bandwidth, it is not suitable for measuring range by the abovementioned method. That method requires transmitted pulses each having a zero-signal precursor. However, it is possible to achieve that goal by modifying the signal so that the sinusoidal waveform between the pulses is essentially cancelled out. In the preferred embodiment it is done by constructing a waveform which closely approximates the signal on a chosen interval between the tall pulses, and then subtracting it from the original signal.

The technique can be illustrated by applying it to the signal in FIG. 1. The two black dots shown on the waveform are the endpoints of an interval I centered between the first two pulses. The left and right endpoints of the interval I, which have been experimentally determined to provide the best results, are respectively at:

$$t_1 = \frac{1.1}{(2N+1)\Delta f} = \frac{1.1}{23 \times 250,000} \cong 191.3 \ nsec \tag{12}$$

$$t_2 = \frac{1}{\Delta f} - t_1 = \frac{1}{250,000} - \frac{1.1}{23 \times 250,000} \cong 3,808.7 \ nsec$$

An attempt to generate a function g(t) which essentially cancels out the signal s(t) on this interval, but does not cause much harm outside the interval, is performed. Since the expression (11) indicates that s(t) is the sinusoid sin π(2N+1)Δft modulated by 1/sin πΔft, first a function h(t) which closely approximates 1/sin πΔft on the interval I is found, and then form g(t) as the product:

$$g(t) = h(t)\sin \pi(2N+1)\Delta ft \tag{13}$$

h(t) is generated by the following sum:

$$h(t) = \sum_{k=0}^{M} a_k \phi_k(t) dt, \ t \in I \tag{14}$$

where $$\phi_0(t) \equiv 1, \phi_k(t) = \sin k\pi\Delta ft \ \text{for} \ k=1,2,\ldots,M \tag{15}$$

and the coefficients $a_k$ are chosen to minimize the least-square error $$J = \int_{t_1}^{t_2} \left(1/\sin\pi\Delta ft - \sum_{k=0}^{M} a_k \phi_k(t)\right)^2 dt \tag{16}$$

over the interval I.

The solution is readily obtained by taking partial derivatives of J with respect to the $a_k$ and setting them equal to zero. The result is the linear system of M+1 equations $$\sum_{k=0}^{M} a_k R_{jk} = R_j, \ j = 0, 1, 2, \ldots, M \tag{17}$$

that can be solved for the $a_k$, where $$R_j = \int_{t_1}^{t_2} \phi_j \cdot 1/\sin\pi\Delta ft dt, \ R_{jk} = \int_{t_1}^{t_2} \phi_j(t)\phi_k(t) dt \tag{18}$$

Then, $$g(t) = h(t)\sin\pi(2N+1)\Delta ft \tag{19}$$

$$= \left(\sum_{k=0}^{M} a_k \phi_k(t)\right)\sin\pi(2N+1)\Delta ft$$

Using the definition of the functions $\phi_k(t)$ given by (12)

$$g(t) = \left(a_0 + \sum_{k=1}^{M} a_k \sin k\pi\Delta ft\right)\sin\pi(2N+1)\Delta ft \tag{20}$$

The g(t) is subtracted from s(t) to get a function r(t), which should essentially cancel s(t) on the interval I. An appropriate choice for the upper limit M for the summation in the equation (20) is M=2N+1. Using this value, $$r(t) = s(t) - g(t) \tag{21}$$

$$= b_0 + \sum_{k=1}^{2N+1} b_k \cos 2\pi k\Delta ft + c\sin 2\pi\left(N + \frac{1}{2}\right)\Delta ft$$

where $$b_0 = 1 - \frac{1}{2}a_{2N+1} \tag{22}$$

$$b_k = 2 - \frac{1}{2}a_{2(N-k)+1} \ \text{for} \ k = 1, 2, \ldots, N$$

$$b_k = -\frac{1}{2}a_{2(k-N)-1} \ \text{for} \ k = N+1, N+2, \ldots, 2N+1$$

$$c = -a_0$$

Figure 5:
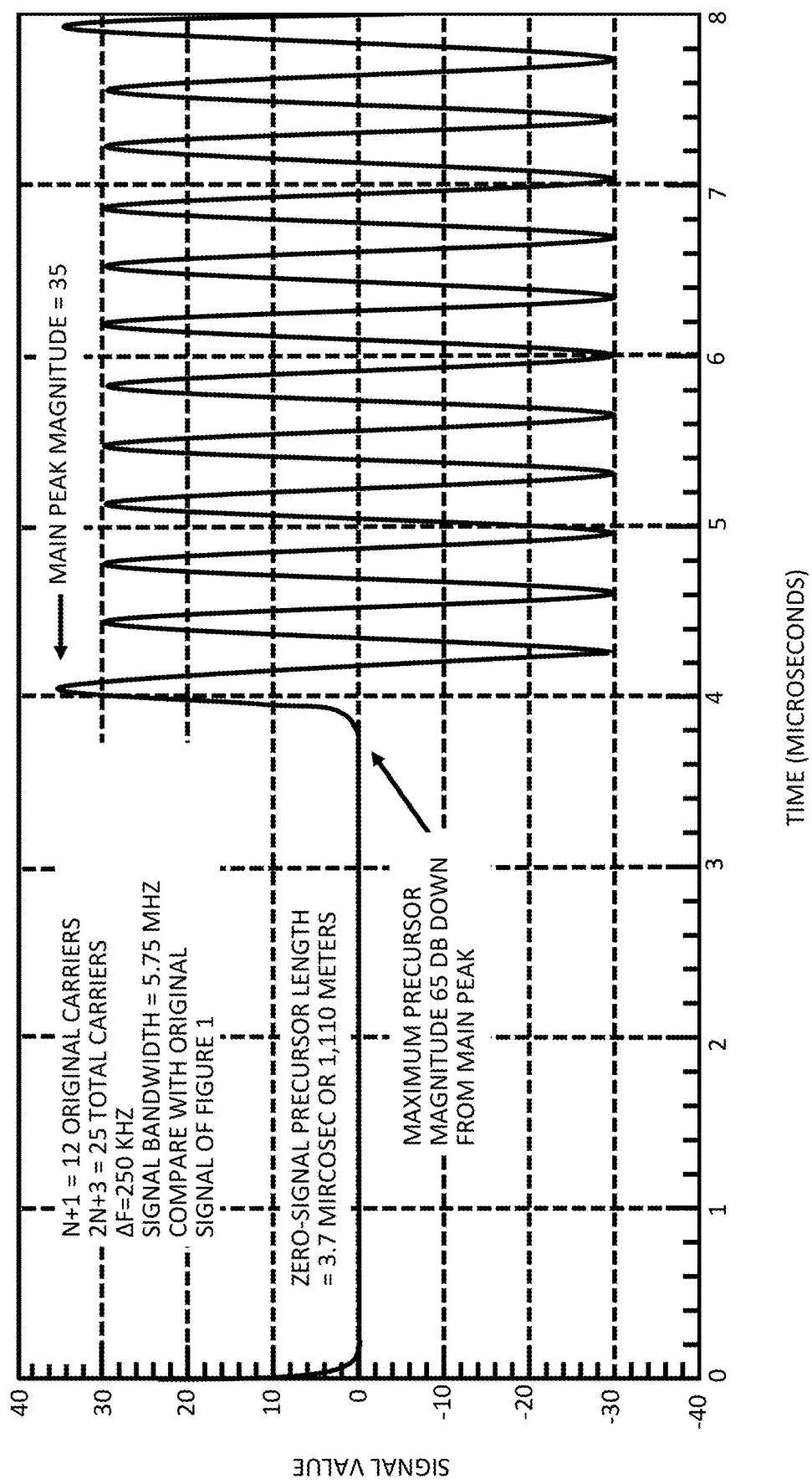
FIG. 5 illustrates elimination of signal precursor by cancellation, in accordance with an embodiment.

From the equation (17) it is seen that a total of 2N+3 frequencies (including the zero-frequency DC term) are required to obtain the desired signal r(t). FIG. 5 shows the resulting signal r(t) for the original signal s(t) shown in FIG. 1, where N=11. In this case the construction of r(t) requires 25 carriers (including the DC term $b_0$).

The important characteristics of r(t) as constructed above are as follows:

1. The lowest frequency is zero Hz and the highest frequency is (2N+1)Δf Hz, as seen from (14). Thus, the total bandwidth is (2N+1)Δf Hz.

2. All carriers are cosine functions (including DC) spaced Δf apart, except for one carrier, which is a sine function located at frequency (N+½)Δf.

3. Although the original signal s(t) has period 1/Δf, r(t) has period 2/Δf. The first half of each period of r(t), which is a full period of s(t), contains a cancelled portion of the signal, and the second half-period of r(t) is a large oscillatory segment. Thus, cancellation of the precursor occurs only in every other period of s(t).

This occurs because the canceling function g(t) actually strengthens s(t) in every other period of s(t). The reason is that g(t) reverses its polarity at every peak of s(t), whereas s(t) does not. A method of making every period of s(t) contain a cancelled portion to increase processing gain by 3 dB is described below.

4. The length of the cancelled portion of s(t) is about 80-90% of $1/\Delta f$. Therefore, $\Delta f$ needs to be small enough to make this length long enough to eliminate any residual signal from previous non-zero portions of r(t) due to multi-path.

5. Immediately following each zero portion of r(t) is the first cycle of an oscillatory portion. In the preferred embodiment, in the TOA measurement method as described above, the first half of this cycle is used for measuring TOA, specifically the beginning of its rise. It is interesting to note that the peak value of this first half-cycle (which will be called the main peak) is somewhat larger than the corresponding peak of s(t) located at approximately the same point in time. The width of the first half-cycle is roughly inversely proportional to $N\Delta f$.

6. A large amount of processing gain can be achieved by:
(a) Using the repetitions of the signal r(t), because r(t) is periodic with period $2/\Delta f$. Also, an additional 3 dB of processing gain is possible by a method to be described later.
(b) Narrowband filtering. Because each of the 2N+3 carriers is a narrowband signal, the occupied bandwidth of the signal is much smaller than that of a wideband signal spread out across the entire allocated band of frequencies.

For the signal r(t) shown in FIG. 5, where N=11 and $\Delta f$=250 kHz, the length of the cancelled portion of s(t) is about 3.7 microseconds or 1,110 meters. This is more than enough to eliminate any residual signal from previous non-zero portions of r(t) due to the multi-path. The main peak has value of approximately 35, and the largest magnitude in the precursor (i.e., cancellation) region is about 0.02, which is 65 dB below the main peak. This is desirable for getting good performance using the TOA measurement threshold technique as described above.

Figure 6:
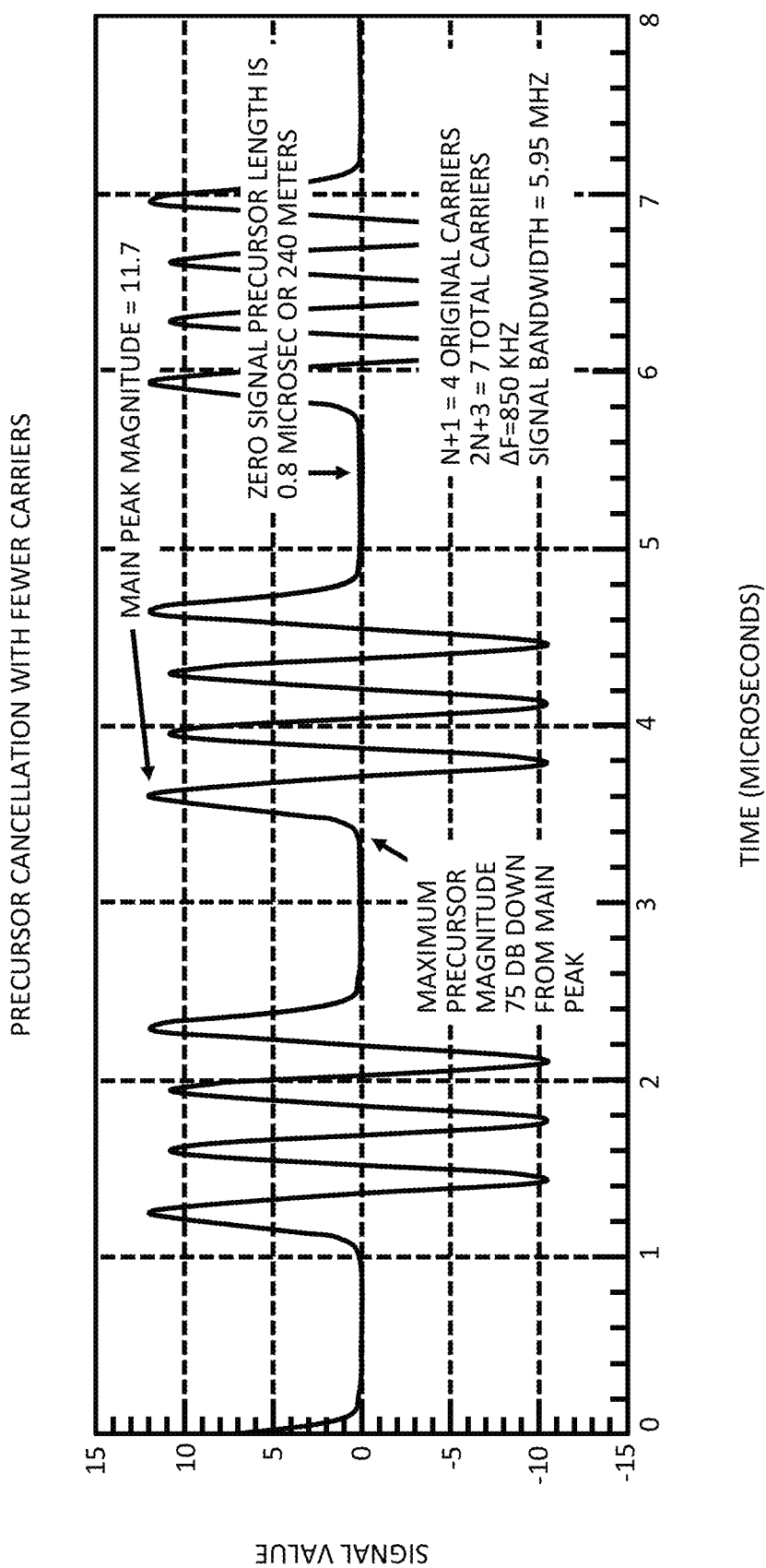
FIG. 6 illustrates precursor cancellation with fewer carriers, in accordance with an embodiment.

Use of fewer carriers is depicted in FIG. 6, which illustrates a signal that is generated using $\Delta f$=850 kHz, N=3, and M=2N+1=7, for a total of only 2N+3=9 carriers. In this case, the period of the signal is only $2/\Delta f \approx 2.35$ microseconds as compared to the signal in FIG. 5, where the period is 8 microseconds. Since this example has more periods per unit time, one might expect that more processing gain could be achieved.

However, since fewer carriers are used, the amplitude of the main peak is about ⅓ as large as before, which tends to cancel the expected extra processing gain. Also, the length of the zero-signal precursor segments is shorter, about 0.8 microseconds or 240 meters. This should still be enough to eliminate any residual signal from previous non-zero portions of r(t) due to the multi-path. Note that the total bandwidth of $(2N+1)\Delta f$=5.95 MHz is about the same as before, and that the width of the half-cycle of the main peak is also roughly the same. Since fewer carriers are used, there should be some extra processing gain when each carrier is narrowband filtered at the receiver. Moreover, the largest magnitude in the precursor (i.e., cancellation) region is now about 75 dB below the main peak, a 10 dB improvement from the previous example.

Transmission at RF Frequencies: up to this point r(t) has been described as a base-band signal for purposes of simplicity. However, it can be translated up to RF, transmitted, received, and then reconstituted as a base-band signal at the receiver. To illustrate, consider what happens to one of the frequency components $\omega_k$ in the base-band signal r(t) traveling via one of the multi-path propagation paths having index j (radian/sec frequencies are used for notational simplicity):

$b_k \cos \omega_k t$ (at baseband in transmitter)

$b_k \cos(\omega+\omega_k)t$ (translated by frequency $\omega$ up to RF)

$a_j b_k \cos [(\omega+\omega_k)(t-\tau_j)+\phi_j]$ (at receiver antenna) (23)

$a_j b_k \cos [\omega_k(t-\tau_j)+\phi_j+\theta]$ (translated by frequency $\omega$ to baseband)

It is assumed here that the transmitter and receiver are frequency synchronized. The parameter $b_k$ is the $k^{th}$ coefficient in expression (21) for r(t). The parameters $\tau_j$ and $\phi_j$ are respectively the path delay and phase shift (due to dielectric properties of a reflector) of the $j^{th}$ propagation path. The parameter $\theta$ is the phase shift occurring in the down-conversion to base-band in the receiver. A similar sequence of functions can be presented for the sine component of the equation (21).

It is important to note that as long as the zero-signal precursors in r(t) have length sufficiently larger than the largest significant propagation delay, the final base-band signal in the equation (20) will still have zero-signal precursors. Of course, when all frequency components (index k) over all paths (index j) are combined, the base-band signal at the receiver will be a distorted version of r(t), including all phase shifts.

Sequential Carrier Transmissions and Signal Reconstruction are illustrated in FIG. 1 and FIG. 1A. It is assumed that the transmitter and the receiver are time and frequency synchronized, the 2N+3 transmitted carriers need not be transmitted simultaneously. As an example, consider the transmission of the signal whose base-band representation is that of FIG. 1A and FIG. 6.

In FIG. 6, N=3, and suppose each of the 9 frequency components for 1 millisecond are sequentially transmitted. The start and the end times for each frequency transmission are known at the receiver, so it can sequentially start and end its reception of each frequency component at those respective times. Since the signal propagation time is very short compared to 1 millisecond (it will normally be less than several microseconds in the intended application), a small portion of each received frequency component should be ignored, and the receiver can easily blank it out.

The entire process of receiving 9 frequency components can be repeated in 9-millisecond blocks of additional reception to increase the processing gain. In one second of total reception time there would be about 111 such 9-millisecond blocks available for processing gain. Additionally, within each block there would be additional processing gain available from $0.009/(2/\Delta f) \approx 383$ main peaks.

It is worth noting that in general the signal reconstruction can be made very economical, and will inherently permit all possible processing gain. For each of the 2N+3 received frequencies:
1. Measure the phase and amplitude of each 1-millisecond reception of that frequency to form a sequence of stored vectors (phasors) corresponding to that frequency.
2. Average the stored vectors for that frequency.
3. Finally, use the 2N+3 vector averages for the 2N+3 frequencies to reconstruct 1 period of base-band signal having duration $2/\Delta f$, and use the reconstruction to estimate signal TOA.

This method is not restricted to 1-millisecond transmissions, and the length of the transmissions may be increased or decreased. However, the total time for all transmissions should be short enough to freeze any motion of the receiver or transmitter.

Obtaining Cancellation on Alternate Half-Cycles of r(t): by simply reversing the polarity of the canceling function g(t), cancellation between the peaks of s(t) is possible where r(t) was formerly oscillatory. However, to obtain cancellation between all peaks of s(t), the function g(t) and its polarity reversed version must be applied at the receiver, and this involves coefficient weighting at the receiver.

Coefficient Weighting at the Receiver: if desired, the coefficients $b_k$ in the equation (21) are used for construction of r(t) at the transmitter and may be introduced at the receiver instead. This is easily seen by considering the sequence of signals in the equation (20) in which the final signal is the same if $b_k$ is introduced at the last step instead of at the beginning. Ignoring noise, the values are as follows:

$\cos \omega_k t$ (at baseband in transmitter)

$\cos(\omega+\omega_k)t$ (translated by frequency $\omega$ up to RF)

$a_j \cos [(\omega+\omega_k)(t-\tau_j)+\phi_j]$ (at receiver antenna)     (24)

$a_j \cos [\omega_k(t-\tau_j)+\phi_j+\theta]$ (translated by frequency $-\omega$ to baseband)

$a_j b_k \cos [\omega_k(t-\tau_j)+\phi_j+\theta]$ (weighted by coefficient $b_k$ at baseband)

The transmitter can then transmit all frequencies with the same amplitude, which simplifies its design. It should be noted, that this method also weights the noise at each frequency, the effect of which should be considered. It should also be noted that coefficient weighting should be done at the receiver in order to affect the polarity reversal of g(t) to get twice as many useable main peaks.

Scaling of $\Delta f$ to Center Frequencies in Channels: to meet the FCC requirements at the VHF or lower frequencies a channelized transmission with constant channel spacing will be required. In a channelized transmission band with constant channel spacing that is small compared to the total allocated band, which is the case for the VHF and lower frequencies band(s), small adjustments to $\Delta f$, if necessary, permit all transmitted frequencies to be at channel centers without materially changing performance from original design values. In the two examples of base-band signals previously presented, all frequency components are multiples of $\Delta f/2$, so if the channel spacing divides $\Delta f/2$, the lowest RF transmitted frequency can be centered in one channel and all other frequencies fall at the center of channels.

In some Radio Frequency (RF)-based identification, tracking and locating systems in addition to performing the distance measurement function, both: the Master Unit and the Tag Unit also perform voice, data and control communication functions. Similarly, in the preferred embodiment both the Master Unit and the Tag perform voice, data and control communication functions in addition to the distance measurement function.

According to the preferred embodiment, the ranging signal(s) are subject to the extensive sophisticated signal processing techniques, including the multi-path mitigation. However, these techniques may not lend themselves to the voice, data and control signals. As a result, the operating range of the proposed system (as well as other existing systems) may be limited not by its ability to measure distance reliably and accurately, but by being out of range during voice and/or data and/or control communications.

In other Radio Frequency (RF)-based identification, tracking and locating systems the distance measurement functionality is separated from the voice, data and control communication functionality. In these systems separate RF Transceivers are used to perform voice, data and control communication functions. The drawback of this approach is system increased cost, complexity, size, etc.

To avoid abovementioned drawbacks, in the preferred embodiment, a narrow bandwidth ranging signal or baseband narrow bandwidth ranging signal several individual frequency components are modulated with the identical data/control signals and in case of voice with digitized voice packets data. At the receiver the individual frequency components that have the highest signal strength are demodulated and the obtained information reliability may be further enhanced by performing "voting" or other signal processing techniques that utilize the information redundancy.

This method allows to avoid the "null" phenomena, wherein the incoming RF signals from multiple paths are destructively combining with the DLOS path and each other, thus significantly reducing the received signal strength and associated with it SNR. Moreover, such method allows to find a set of frequencies at which the incoming signals from multiple paths are constructively combining with DLOS path and each other, thus increasing the received signal strength and associated with it SNR.

As mentioned earlier, spectrum estimation-based super-resolution algorithms generally use the same model: a linear combination of complex exponentials and their complex amplitudes of frequencies. This complex amplitude is given by equation 3 above.

All spectrum estimation-based super-resolution algorithms require a priori knowledge of number of complex exponentials, i.e., the number of multipath paths. This number of complex exponentials is called the model size and is determined by the number of multi-path components L as shown in equations 1-3. However, when estimating path delay, which is the case for RF track-locate applications, this information is not available. This adds another dimension, i.e., the model size estimation, to the spectrum estimation process via super-resolution algorithms.

It has been shown (Kei Sakaguchi et al., Influence of the Model Order Estimation Error in the ESPRIT Based High Resolution Techniques) that in case of model size underestimation the accuracy of frequency estimation is impacted and when the model size is overestimated the algorithm generates spurious, e.g., non-existent, frequencies. Existing methods of model size estimation such as AIC (Akaikes Information Criterion), MDL (Minimum Description Length), etc. have a high sensitivity to correlation between signals (complex exponentials). But in the case of RF multipath, this is always the case. Even, for example, after Forward-Backward smoothing algorithms are applied, there will always be a residual amount of correlation.

In the Sakaguchi paper, it is suggested to use an overestimated model and differentiating actual frequencies (signals) from spurious frequencies (signals) by estimating these signals power (amplitude) and then rejecting the signals with very low power. Although this method is an improvement over existing methods, it is not guaranteed. The inventors implemented the Kei Sakaguchi et al. method and ran simulations for more complex cases with a larger model size. It was observed that, in some cases, a spurious signal may have amplitude that is very close to actual signals amplitude.

All spectrum estimation-based super-resolution algorithms work by splitting the incoming signal complex amplitude data into two sub-spaces: the noise sub-space and signals sub-space. If these sub-spaces are properly defined (separated), then the model size is equal to the signal sub-space size (dimension).

In one embodiment, the model size estimation is accomplished using an "F" statistic. For example, for ESPRIT algorithm, the singular value decomposition of the estimate of the covariance matrix (with forward/backward correlation smoothing) is ordered in ascending order. Thereafter, a division is made whereby the (n+1) eigenvalue is divided by the n-th eigenvalue. This ratio is an "F" random variable. The worst case is an "F" random variable of (1,1) degree of freedom. The 95% confidence interval for a "F" random variable with (1,1) degrees of freedom is 161. Setting that value as a threshold determines the model size. Note also that for the noise subspace, the eigenvalues represent an estimate of the noise power.

This method of applying "F" statistics to the ratio of the eigenvalues is a more accurate method of estimating the model size. It should be noted that other degrees of freedom in "F" statistics can be also used for threshold calculation and consequently model size estimation.

Nevertheless, in some cases, two or more very closely spaced (in time) signals can degenerate into one signal because of real-world measurement imperfections. As a result, the above mentioned method will underestimate the number of signals, i.e., the model size. Since model size underestimation reduces the frequency estimation accuracy, it is prudent to increase the model size by adding a certain number. This number can be determined experimentally and/or from simulations. However, when signals are not closely spaced, the model size will be overestimated.

In such cases spurious, i.e., non-existent, frequencies may appear. As noted earlier, using signal amplitude for spurious signals detection does not always work because in some cases a spurious signal(s) was observed to have amplitude that is very close to actual signal(s) amplitude. Therefore, in addition to the amplitude discrimination, filters can be implemented to improve spurious frequencies elimination probability.

The frequencies that are estimated by super-resolution algorithms are artificial frequencies (equation 2). In fact, these frequencies are individual paths delays of the multipath environment. As a result, there should be no negative frequencies and all negative frequencies that are produced by a super-resolution algorithm are spurious frequencies to be rejected.

Furthermore, a DLOS distance range can be estimated from the complex amplitude $\hat{A}(f_n)$ values obtained during measurements using methods that are different from super-resolution methods. While these methods have lower accuracy, this approach establishes range that is used to discriminate delays, i.e., frequencies. For example, the ratio of $$\frac{\Delta[\angle \hat{A}(2\pi\Delta f)]}{2\pi\Delta f}$$

in $\Delta f$ intervals where the signal amplitude $|\hat{A}(f_n)|$ is close to maximum, i.e., avoiding nulls, provides a DLOS delay range. Although actual DLOS delay can be up to two times larger or smaller, this defines a range that helps to reject spurious results.

In the embodiment, the ranging signal makes a round-trip. In other words, it travels both ways: from a master/reader to a target/slave and from the target/slave back to the master/reader:

Master transmits a tone: $\alpha \times e^{-j\omega t}$, where $\omega$ is an operating frequency in the operating band and $\alpha$ is the tone signal amplitude.

At the target's receiver, the received signal (one-way) is as follows:

$$S_{one-way}(t) = \alpha \times \sum_{m=0}^{m=N} K_m \times e^{-j\omega t} \times e^{-j\omega \tau_m} \quad (25)$$

Where: N is number of signal paths in the multipath environment; K0 and $\tau_0$ are amplitude and time-of-flight of the DLOS signal; $|K_0|=1$, $K_0>0$, $|K_{m\neq 0}|\leq 1$ and $K_{m\neq 0}$ can be positive or negative.

$$S_{one-way}(t) = \alpha \times e^{-j\omega t} \times A(\omega) \times e^{-j\theta(\omega)} \quad (26)$$

Where:

$$A(\omega) \times e^{-j\theta(\omega)} = \sum_{m=0}^{m=N} K_m \times e^{-j\omega \tau_m}$$

is one way multipath RF channel transfer function in the frequency domain; and $A(\omega) \geq 0$.

Target retransmits the received signal:

$$S_{retransmit}(t) = \alpha \times e^{-j\omega t} \times A(\omega) \times e^{-j\theta(\omega)} \quad (27)$$

At the master receiver, the round-trip signal is:

$$S_{round\_trip}(t) = \alpha \times e^{-j\omega t} \times A(\omega) \times e^{-j\theta(\omega)} \times \sum_{m=0}^{m=N} K_m \times e^{-j\omega \tau_m}$$

Or:

$$S_{round\_trip}(t) = \alpha \times e^{-j\omega t} \times A^2(\omega) \times e^{-j2\theta(\omega)} \quad (28)$$

On the other hand from equations (26) and (28):

$$S_{round\_trip}(t) = \alpha \times e^{-j\omega t} \times A^2(\omega) \times \left(\sum_{m=0}^{m=N} K_m \times e^{-j\omega \tau_m}\right)^2 \quad (29)$$

Where:

$$A^2(\omega) \times \left(\sum_{m=0}^{m=N} K_m \times e^{-j\omega \tau_m}\right)^2 = A^2(\omega) \times e^{-j2\theta(\omega)}$$

is roundtrip multipath RF channel transfer function in the frequency domain.

From equation 29, the roundtrip multipath channel has a larger number of paths than one-way channel multipath because the $$\left(\sum_{m=0}^{m=N} K_m \times e^{-j\omega \tau_m}\right)^2$$

expression in addition to the $\tau_0 \div \tau_N$ paths delays, includes combinations of these paths delays, for example: $\tau_0+\tau_1$, $\tau_0+\tau_2 \ldots, \tau_1+\tau_2, \tau_1 \pm \tau_3, \ldots$, etc.

These combinations dramatically increase the number of signals (complex exponentials). Hence the probability of very closely spaced (in time) signals will also increase and may lead to significant model size underestimation. Thus, it is desirable to obtain one-way multipath RF channel transfer function.

In preferred embodiment, the one-way amplitude values $|\hat{A}(f_n)|$ are directly obtainable from target/slave device. However, the one-way phase values $\angle \hat{A}(f_n)$ cannot be measured directly. It is possible to determine the phase of the one-way from the roundtrip phase measurements observation:

$$\left(\sum_{m=0}^{m=N} K_m \times e^{-j\omega \tau_m}\right)^2 = e^{-j2\beta(\omega)} \text{ and } \left(\sum_{m=0}^{m=N} K_m \times e^{-j\omega \tau_m}\right) = e^{-j\theta(\omega)}$$

However, for each value of $\omega$, there are two values of phase $\alpha(\omega)$ such that $$e^{j2\alpha(\omega)} = e^{j\beta(\omega)}$$

A detailed description of resolving this ambiguity is shown below. If the ranging signal different frequency components are close to each other, then for most part the one-way phase can be found by dividing the roundtrip phase by two. Exceptions will include the areas that are close to the "null", where the phase can undergo a significant change even with small frequency step. Note: the "null" phenomena is where the incoming RF signals from multiple paths are destructively combining with the DLOS path and each other, thus significantly reducing the received signal strength and associated with it SNR.

Let h(t) be the one-way impulse response of a communications channel. The corresponding transfer function in the frequency domain is $$H(\omega) = \int_{-\infty}^{\infty} h(t) e^{-j\omega t} dt = A(\omega) e^{j\alpha(\omega)} \tag{30}$$

where $A(\omega) \geq 0$ is the magnitude and $\alpha(\omega)$ is the phase of the transfer function. If the one-way impulse response is retransmitted back through the same channel as it is being received, the resulting two-way transfer function is $$G(\omega) = B(\omega) e^{j\beta(\omega)} = H^2(\omega) = A^2(\omega) e^{j2\alpha(\omega)} \tag{31}$$

where $B(\omega) \geq 0$. Suppose the two-way transfer function $G(\omega)$ is known for all $\omega$ in some open frequency interval $(\omega_1, \omega_2)$. Is it possible to determine the one-way transfer function $H(\omega)$ defined on $(\omega_1, \omega_2)$ that produced $G(\omega)$?

Since the magnitude of the two-way transfer function is the square of the one-way magnitude, it is clear that $$A(\omega) = \sqrt{B(\omega)} \tag{32}$$

However, in trying to recover the phase of the one-way transfer function from observation of $G(\omega)$, the situation is subtler. For each value of $\omega$, there are two values of phase $\alpha(\omega)$ such that $$e^{j2\alpha(\omega)} = e^{j\beta(\omega)} \tag{33}$$

A large number of different solutions might be generated by independently choosing one of two possible phase values for each different frequency $\omega$.

The following theorems, which assume that any one-way transfer function is continuous at all frequencies, help resolve this situation.

Theorem 1: Let I be an open interval of frequencies w containing no zeros of the two-way transfer function $G(\omega) = B(\omega) e^{j\beta(\omega)}$. Let $J(\omega) = \sqrt{B(\omega)} e^{j\gamma(\omega)}$ be a continuous function on I where $\beta(\omega) = 2\gamma(\omega)$. Then $J(\omega)$ and $-J(\omega)$ are the one-way transfer functions which produce $G(\omega)$ on I, and there are no others.

Proof:

One of the solutions for the one-way transfer function is the function $H(\omega) = \sqrt{B(\omega)} e^{j\alpha(\omega)}$, continuous on I since it is differentiable on I, and where $\beta(\omega) = 2\alpha(\omega)$. Since $G(\omega) \neq 0$ on I, $H(\omega)$ and $J(\omega)$ are nonzero on I. Then, $$\frac{H(\omega)}{J(\omega)} = \frac{\sqrt{B(\omega)} e^{j\alpha(\omega)}}{\sqrt{B(\omega)} e^{j\gamma(\omega)}} = e^{j[\alpha(\omega) - \gamma(\omega)]} \tag{34}$$

Since $H(\omega)$ and $J(\omega)$ are continuous and nonzero on I, their ratio is continuous on I, hence the right side of (34) is continuous on I. The conditions $\beta(\omega) = 2\alpha(\omega) = 2\gamma(\omega)$ imply that for each $\omega \in I$, $\alpha(\omega) - \gamma(\omega)$ is either 0 or $\pi$. However, $\alpha(\omega) - \gamma(\omega)$ cannot switch between these two values without causing a discontinuity on the right side of (34). Thus, either $\alpha(\omega) - \gamma(\omega) = 0$ for all $\omega \in I$, or $\alpha(\omega) - \gamma(\omega) = \pi$ for all $\omega \in I$. In the first case, we get $J(\omega) = H(\omega)$, and in the second we get $J(\omega) = -H(\omega)$.

This theorem proves that to get a one-way solution on any open interval I containing no zeros of the transfer function $G(\omega) = B(\omega) e^{j\beta(\omega)}$, we form the function $J(\omega) = \sqrt{B(\omega)} e^{j\gamma(\omega)}$, choosing the values of $\gamma(\omega)$ satisfying $\beta(\omega) = 2\gamma(\omega)$ in such a way as to make $J(\omega)$ continuous. Since it is known that there is a solution having this property, namely $H(\omega)$, it is always possible to do this.

An alternate procedure for finding a one-way solution is based on the following theorem:

Theorem 2: Let $H(\omega) = A(\omega) e^{j\alpha(\omega)}$ be a one-way transfer function and let I be an open interval of frequencies w containing no zeros of $H(\omega)$. Then the phase function $\alpha(\omega)$ of $H(\omega)$ must be continuous on I.

Figure 7:
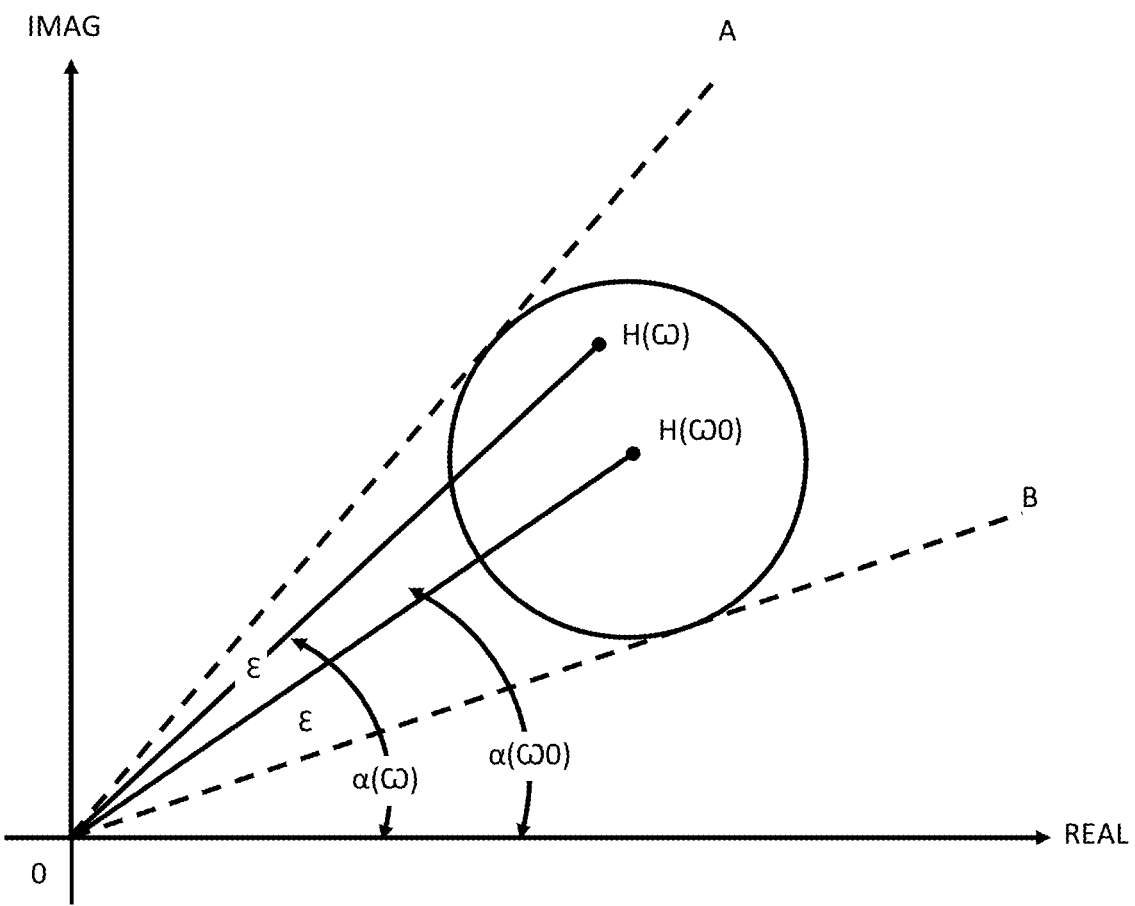
FIG. 7 illustrates an embodiment of one-way transfer function phase.
Figure 8:
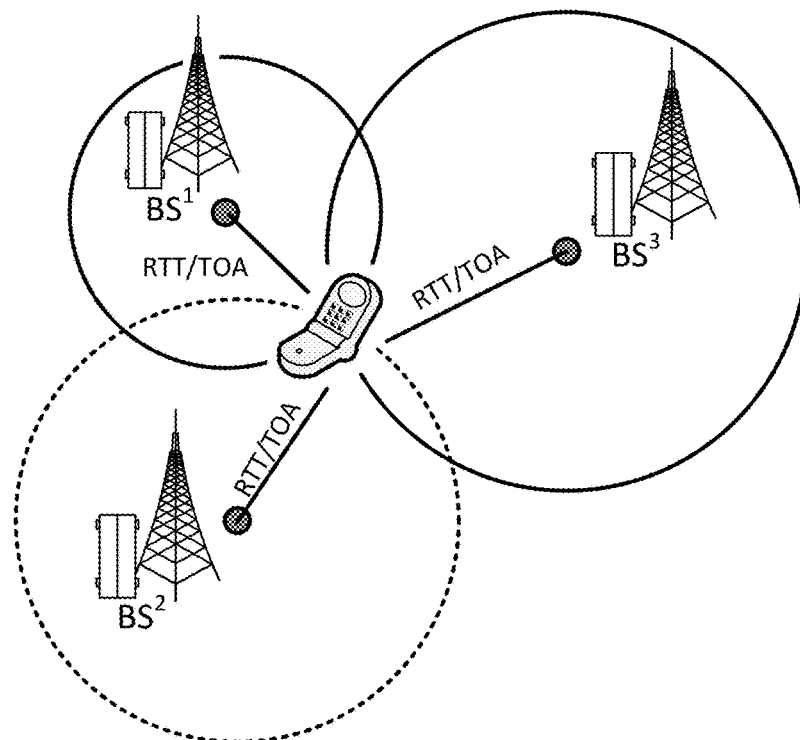
FIG. 8 illustrates an embodiment of a location method.

Proof:

Let $\omega_0$ be a frequency in the interval I. In FIG. 7, the complex value $H(\omega_0)$ has been plotted as a point in the complex plane, and by hypothesis, $H(\omega) \neq 0$. Let $\varepsilon > 0$ be an arbitrarily small real number, and consider the two angles of measure $\varepsilon$ shown in the FIG. 7, as well as the circle centered at $H(\omega_0)$ and tangent to the two rays OA and OB. By assumption, $H(\omega)$ is continuous for all $\omega$. Thus, if $\omega$ is sufficiently close to $\omega_0$, the complex value $H(\omega)$ will lie in the circle, and it is seen that $|\alpha(\omega) - \alpha(\omega_0)| < \varepsilon$. Since $\varepsilon > 0$ was chosen arbitrarily, we conclude that $\alpha(\omega) \to \alpha(\omega_0)$ as $\omega \to \omega_0$, so that the phase function $\alpha(\omega)$ is continuous at $\omega_0$.

Theorem 3: Let I be an open interval of frequencies w containing no zeros of the two-way transfer function $G(\omega) = B(\omega) e^{j\beta(\omega)}$. Let $J(\omega) = \sqrt{B(\omega)} e^{j\gamma(\omega)}$ be a function on I where $\beta(\omega) = 2\gamma(\omega)$ and $\gamma(\omega)$ is continuous on I. Then $J(\omega)$ and $-J(\omega)$ are the one-way transfer functions which produce $G(\omega)$ on I, and there are no others.

Proof:

The proof is similar to the proof of Theorem 1. We know that one of the solutions for the one-way transfer function is the function $H(\omega) = \sqrt{B(\omega)} e^{j\alpha(\omega)}$, where $\beta(\omega) = 2\alpha(\omega)$. Since $G(\omega) \neq 0$ on I, $H(\omega)$ and $J(\omega)$ are nonzero on I. Then, $$\frac{H(\omega)}{J(\omega)} = \frac{\sqrt{B(\omega)} e^{j\alpha(\omega)}}{\sqrt{B(\omega)} e^{j\gamma(\omega)}} = e^{j[\alpha(\omega) - \gamma(\omega)]} \tag{35}$$

By hypothesis $\gamma(\omega)$ is continuous on I and by Theorem 2 $\alpha(\omega)$ is also continuous on I. Thus, $\alpha(\omega) \gamma(\omega)$ is continuous on I. The conditions $\beta(\omega)=2\alpha(\omega)=2\gamma(\omega)$ imply that for each $\omega \in I$, $\alpha(\omega)-\gamma(\omega)$ is either 0 or $\pi$. However, $\alpha(\omega)-\gamma(\omega)$ cannot switch between these two values without becoming discontinuous on I. Thus, either $\alpha(\omega)-\gamma(\omega)=0$ for all $\omega \in I$, or $\alpha(\omega)-\gamma(\omega)=\pi$ for all $\omega \in I$. In the first case, we get $J(\omega)=H(\omega)$, and in the second $J(\omega)=-H(\omega)$.

Theorem 3 tells us that to get a one-way solution on any open interval I containing no zeros of the transfer function $G(\omega)=B(\omega)e^{j\beta(\omega)}$, we simply form the function $J(\omega)=\sqrt{B(\omega)}e^{j\gamma(\omega)}$, choosing the values of $\gamma(\omega)$ satisfying $\beta(\omega)=2\gamma(\omega)$ in such a way as to make the phase function $\gamma(\omega)$ continuous. Since it is known that there is a solution having this property, namely $H(\omega)$, it is always possible to do this.

Although the above theorems show how to reconstruct the two one-way transfer functions which generate the two-way function $G(\omega)$, they are useful only on a frequency interval I containing no zeros of $G(\omega)$. In general, $G(\omega)$ will be observed on a frequency interval $(\omega_1, \omega_2)$ which may contain zeros. The following is a method that might get around this problem, assuming that there are only a finite number of zeros of $G(\omega)$ in $(\omega_1,\omega_2)$, and that a one-way transfer function has derivatives of all orders on $(\omega_1,\omega_2)$, not all of which are zero at any given frequency $\omega$:

Let $H(\omega)$ be a one-way function that generates $G(\omega)$ on the interval $(\omega_1,\omega_2)$, and assume that $G(\omega)$ has at least one zero on $(\omega_1,\omega_2)$. The zeros of $G(\omega)$ will separate $(\omega_1,\omega_2)$ into a finite number of abutting open frequency intervals $J_1$, $J_2$, . . . , $J_n$. On each such interval the solution $H(\omega)$ or $-H(\omega)$) will be found using either Theorem 1 or Theorem 3. We need to "stitch together" these solutions so that the stitched solution is either $H(\omega)$ or $-H(\omega)$ across all of $(\omega_1,\omega_2)$. In order to do this, we need to know how to pair the solutions in two adjacent subintervals so that we aren't switching from $H(\omega)$ to $-H(\omega)$ or from $-H(\omega)$ to $H(\omega)$ in moving from one subinterval to the next.

We illustrate the stitching procedure starting with the first two adjacent open subintervals $J_1$ and $J_2$. These subintervals will abut at a frequency $\omega_1$ which is a zero of $G(\omega)$ (of course, $\omega_1$ is not contained in either subinterval). By our above assumption about the properties of a one-way transfer function, there must be a minimum positive integer n such that $H^{(n)}(\omega_1) \neq 0$, where the superscript (n) denotes the $n^{th}$ derivative. Then the limit of the $n^{th}$ derivative of our one-way solution in $J_1$ as $\omega \to \omega_1$ from the left will be either $H^{(n)}(\omega_1)$ or $-H^{(n)}(\omega_1)$ according to whether our solution in $J_1$ is $H(\omega)$ or $H(\omega)$. Similarly, the limit of the $n^{th}$ derivative of our one-way solution in $J_2$ as $\omega \to \omega_1$ from the right will be either $H^{(n)}(\omega_1)$ or $-H^{(n)}(\omega_1)$ according to whether our solution in $J_2$ is $H(\omega)$ or $-H(\omega)$. Since $H^{(n)}(\omega_1) \neq 0$, the two limits will be equal if and only if the solutions in $J_1$ and $J_2$ are both $H(\omega)$ or both $-H(\omega)$. If the left and right hand limits are unequal, we invert the solution in subinterval $J_2$. Otherwise, we don't.

After inverting the solution in subinterval $J_2$ (if necessary), we perform an identical procedure for subintervals $J_2$ and $J_3$ inverting the solution in subinterval $J_3$ (if necessary). Continuing in this fashion, we eventually build up a complete solution on the interval $(\omega_1, \omega_2)$.

It would be desirable that high-order derivatives of $H(\omega)$ not be required in the above reconstruction procedure, since they are difficult to compute accurately in the presence of noise. This problem is unlikely to occur, because at any zero of $G(\omega)$ it seems very likely that the first derivative of $H(\omega)$ will be nonzero, and if not, very likely that the second derivative will be nonzero.

In a practical scheme, the two-way transfer function $G(\omega)$ will be measured at discrete frequencies, which must be close enough together to enable reasonably accurate computation of derivatives near the zeros of $G(\omega)$.

For RF-based distance measurements it is necessary to resolve an unknown number of closely spaced, overlapping, and noisy echoes of a ranging signal with a priori known shape. Assuming that ranging signal is a narrow-band, in frequency domain this RF phenomena can be described (modeled) as a sum of a number of sine waves, each per multipath component, and each with the complex attenuation and propagation delay of the path.

Taking the Fourier transform of the above mentioned sum will express this multipath model in the time domain. Exchanging the role of time and frequency variables in this time domain expression, this multipath model will become harmonic signals spectrum in which the propagation delay of the path is transformed to a harmonic signal.

The super (high) resolution spectral estimation methods are designed to distinguish closely-placed frequencies in the spectrum and used for estimating the individual frequencies of multiple harmonic signals, e.g., paths delays. As a result, path delays can be accurately estimated.

The super resolution spectral estimation makes use of the eigen-structure of the covariance matrix of the baseband ranging signal samples and covariance matrix intrinsic properties to provide a solution to an underlying estimation of individual frequencies, e.g. paths delays. One of the eigen-structure properties is that the eigenvalues can be combined and consequently divided into orthogonal noise and signal eigenvectors, aka subspaces. Another eigen-structure property is the rotation-invariant signal subspaces property.

The subspace decomposition technology (MUSIC, root-MUSIC, ESPRIT, etc.) relies on breaking the estimated covariance matrix of the observed data into two orthogonal subspaces, the noise subspace and the signal subspace. The theory behind the subspace decomposition methodology is that the projection of the observable onto the noise subspace consists of only the noise and the projection of the observable onto the signal subspace consists of only the signal.

The spectral estimation methods assume that signals are narrow-band, and the number of harmonic signals is also known, i.e., the size of the signal subspace needs to be known. The size of the signal subspace is called as the model size. In general, it cannot be known in any detail and can change rapidly—particularly indoors—as the environment changes. One of the most difficult and subtle issues when applying any subspace decomposition algorithm is the dimension of the signal subspace that can be taken as the number of frequency components present, and which is the number multipath reflections plus the direct path. Because of real-world measurement imperfections there always will be an error in the model size estimation, which in turn will result in loss of accuracy of frequencies estimation, i.e., distances.

To improve the distance measurement accuracy, one embodiment includes six features that advance the state of the art in the methodology of subspace decomposition high resolution estimation. Included is combining two or more algorithms estimating individual frequencies by using different eigen-structure properties that further reduces the delay path determination ambiguity.

Root Music finds the individual frequencies, that when the observable is projected onto the noise subspace, minimizes the energy of the projection. The Esprit algorithm determines the individual frequencies from the rotation operator. And in many respects this operation is the conjugate of Music in that it finds the frequencies that, when the observable is projected onto the signal subspace, maximizes the energy of the projection.

The model size is the key to both of these algorithms, and in practice, in a complex signal environment such as seen in indoor ranging—the model size which provides the best performance for Music and Esprit are in general not equal, for reasons that will be discussed below.

For Music it is preferable to err on the side of identifying a basis element of the decomposition as a "signal eigen value" (Type I Error). This will minimize the amount of signal energy that is projected on the noise subspace and improve the accuracy. For Esprit—the opposite is true—it is preferable to err on the side of identifying a basis element of the decomposition as a "noise eigenvalue." This is again a Type I Error. This will minimize the impact of noise on the energy projected onto the signal subspace. Therefore, the model size for Music will, in general, be somewhat larger than that for Esprit.

Secondly, in a complex signal environment, there arise occasions where, with the strong reflections and the potential that the direct path is in fact much weaker than some of the multipath reflections, the model size is difficult to estimate with sufficient statistical reliability. This issue is addressed by estimating a "base" model size for both Music and Esprit and the processing the observable data using Music and Esprit in a window of model sizes defined by the base model size for each. This results in multiple measurements for each measurement.

The first feature of the embodiment is the use of the F-statistic to estimate the model size (see above). The second feature is the use of different Type I Error probabilities in the F-statistic for Music and Esprit. This implements the Type I Error differences between Music and Esprit as discussed above. The third feature is the use of a base model size and a window in order to maximize the probability of detecting the direct path.

Because of the potentially rapidly changing physical and electronic environment, not every measurement will provide robust answers. This is addressed by using cluster analysis on multiple measurements to provide a robust range estimate. The fourth feature of the embodiment is the use of multiple measurements.

Because there are multiple signals present, the probability distribution of the multiple answers resulting from multiple measurements, each using multiple model sizes from both a Music and Esprit implementation, will be multimodal. Conventional cluster analysis will not be sufficient for this application. The fifth feature is the development of multi-modal cluster analysis to estimate the direct range and equivalent range of the reflected multipath components. The sixth feature is the analysis of the statistics of the range estimates provided by the cluster analysis (range and standard deviation and combing those estimates that are statistically identical. This results in a more accurate range estimate.

The abovementioned methods can be also used in wide bandwidth ranging signal location-finding systems.

For the derivation of r(t) in the threshold method, starting with expression (20), we obtain $$g(t) = \left(a_0 + \sum_{k=1}^{M} a_k \sin k\pi \Delta f t\right) \sin \pi (2N+1)\Delta f t \quad \text{(A1)}$$

-continued $$= a_0 \sin \pi (2N+1)\Delta f t + \sum_{k=1}^{M} a_k \sin \pi (2N+1)\Delta f t \sin k\pi \Delta f t$$

$$= a_0 \sin \pi (2N+1)\Delta f t +$$

$$\sum_{k=1}^{M} \frac{1}{2} a_k \cos \pi (2N+1-k)\Delta f t - \sum_{k=1}^{M} \frac{1}{2} a_k \cos \pi (2N+1+k)\Delta f t$$

$$= a_0 \sin 2\pi \left(N + \frac{1}{2}\right)\Delta f t +$$

$$\sum_{k=1}^{M} \frac{1}{2} a_k \cos 2\pi \left(N + \frac{1}{2} - \frac{k}{2}\right)\Delta f t -$$

$$\sum_{k=1}^{M} \frac{1}{2} a_k \cos 2\pi \left(N + \frac{1}{2} + \frac{k}{2}\right)\Delta f t$$

where the trigonometric identity $$\sin x \sin y = \frac{1}{2}\cos(x-y) - \frac{1}{2}\cos(x+y)$$

is used.

Except for $a_0$, the coefficients $a_k$ are zero for even k. The reason for this is that on the interval I, the function $1/\sin \pi \Delta f t$ that we are trying to approximate by h(t) is even about the center of I, but the basis functions $\sin k\pi \Delta f t$ for even k, $k \neq 0$, are odd about the center of I, hence are orthogonal to $1/\sin \pi \Delta f t$ on I. Thus, we can make the substitution $k=2n+1$ and let M be an odd positive integer. In fact, we will let $M=2N+1$. This choice has been experimentally determined to provide a good amount of cancellation of the oscillations in the interval I.

$$g(t) = a_0 \sin 2\pi \left(N + \frac{1}{2}\right)\Delta f t + \quad \text{(A2)}$$

$$\sum_{n=0}^{N} \frac{1}{2} a_{2n+1} \cos 2\pi (N-n)\Delta f t - \sum_{n=0}^{N} \frac{1}{2} a_{2n+1} \cos 2\pi (N+n+1)\Delta f t$$

Now we make the substitution $k=N-n$ in the first summation and $k=N+n+1$ in the second summation to obtain $$g(t) = a_0 \sin 2\pi \left(N + \frac{1}{2}\right)\Delta f t + \sum_{n=0}^{N} \frac{1}{2} a_{2(N-k)+1} \cos 2\pi k \Delta f t - \quad \text{(A3)}$$

$$\sum_{k=N+1}^{2N+1} \frac{1}{2} a_{2(k-N)-1} \cos 2\pi k \Delta f t$$

$$= a_0 \sin 2\pi \left(N + \frac{1}{2}\right)\Delta f t + \frac{1}{2} a_{2N+1} + \sum_{k=1}^{N} \frac{1}{2} a_{2(N-k)+1} \cos 2\pi k \Delta f t -$$

$$\sum_{k=N+1}^{2N+1} \frac{1}{2} a_{2(k-N)-1} \cos 2\pi k \Delta f t$$

Subtracting g(t) from s(t) results in $$r(t) = s(t) - g(t) \quad (A4)$$

$$= 1 + 2\sum_{k=1}^{N} \cos 2\pi k \Delta f t - \frac{1}{2} a_{2N+1} - \sum_{k=1}^{N} \frac{1}{2} a_{2(N-k)+1} \cos 2\pi k \Delta f t +$$

$$\sum_{k=N+1}^{2N+1} \frac{1}{2} a_{2(k-N)-1} \cos 2\pi k \Delta f t - a_0 \sin 2\pi \left(N + \frac{1}{2}\right) \Delta f t$$

Now let $$b_0 = 1 - \frac{1}{2} a_{2N+1} \quad (A5)$$

$$b_k = 2 - \frac{1}{2} a_{2(N-k)+1} \text{ for } k = 1, 2, \ldots, N$$

$$b_k = -\frac{1}{2} a_{2(k-N)-1} \text{ for } k = N+1, N+2, \ldots, 2N+1$$

$$c = -a_0$$

Then (A4) can be written as $$r(t) = b_0 + \sum_{k=1}^{2N+1} b_k \cos 2\pi k \Delta f t + c \sin 2\pi \left(N + \frac{1}{2}\right) \Delta f t \quad (A6)$$

The present embodiments relate to a positioning/locating method in wireless communication and other wireless networks that substantially obviate one or more of the disadvantages of the related art. The present embodiments advantageously improve the accuracy of tracking and locating functionality in multiple types of wireless network by utilizing multi-path mitigation processes, techniques and algorithms, described in U.S. Pat. No. 7,872,583, These wireless networks include Wireless Personal Area Networks (WPGAN) such as ZigBee and Blue Tooth, wireless local area network (WLAN) such as WiFi and UWB, Wireless Metropolitan Area Networks, (WMAN) typically consisting of multiple WLANs, WiMax being the primary example, wireless Wide Area Networks (WAN) such as White Space TV Bands, and Mobile Devices Networks (MDN) that are typically used to transmit voice and data. MDNs are typically based on Global System for Mobile Communications (GSM) and Personal Communications Service (PCS) standards. A more recent MDN is based on the Long Term Evolution (LTE) standard. These wireless networks are typically comprised of a combination of devices, including base stations, desktop, tablet and laptop computers, handsets, smartphones, actuators, dedicated tags, sensors as well as other communication and data devices (generally, all these devices are referred to as "wireless network devices").

Existing location and positioning information solutions use multiple technologies and networks, including GPS, AGPS, Cell Phone Tower Triangulation, and Wi-Fi. Some of the methods used to derive this location information include RF Fingerprinting, RSSI, and TDOA. Although acceptable for the current E911 requirements, existing location and ranging methods do not have the reliability and accuracy required to support the upcoming E911 requirements as well as LBS and/or RTLS applications requirements, especially indoors and urban environments.

Figure 10:
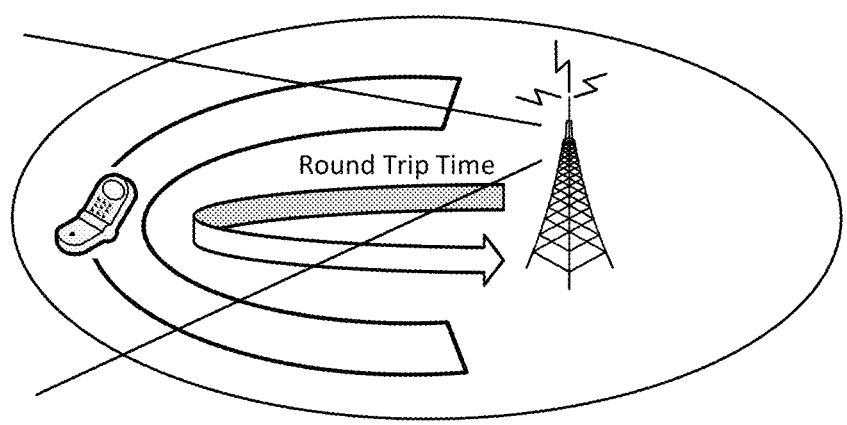
FIG. 10 illustrates an embodiment of an enhanced Cell ID+RTT locating technique.

The methods described in U.S. Pat. No. 7,872,583 significantly improve the ability to accurately locate and track targeted devices within a single wireless network or a combination of multiple wireless networks. The embodiment is a significant improvement to the existing implementation of tracking and location methods used by wireless networks that use Enhanced Cell-ID and OTDOA (Observed Time Difference of Arrival), including DL-OTDOA (Downlink OTDOA), U-TDOA, UL-TDOA and others Cell ID location technique allows estimating the position of the user (UE-User Equipment) with the accuracy of the particular sector coverage area. Thus, the attainable accuracy depends on the cell (base station) sectoring scheme and antenna beam-width. In order to improve accuracy, the Enhanced Cell ID technique adds RTT (Round Trip Time) measurements from the eNB. Note: Here, the RTT constitutes the difference between transmission of a downlink DPCH Dedicated Physical Channel, (DPDCH)/DPCCH: Dedicated Physical Data Channel/Dedicated Physical Control Channel) frame and the beginning of a corresponding uplink physical frame. In this instance the abovementioned frame(s) act as a ranging signal. Based on the information of how long this signal propagates from eNB to the UE, the distance from eNB can be calculated (see FIG. 10).

In the Observed Time Difference of Arrival (OTDOA) technique the time of arrival of the signal coming from neighboring base stations (eNB) is calculated. The UE position can be estimated in the handset (UE-based method) or in the network (NT-based, UE-assisted method) once the signals from three base stations are received. The measured signal is the CPICH (Common Pilot Channel). The propagation time of signals is correlated with a locally generated replica. The peak of correlation indicates the observed time of propagation of the measured signal. Time difference of arrival values between two base stations determines a hyperbola. At least three reference points are needed to define two hyperbolas. The location of the UE is in the intersection of these two hyperbolas (see FIG. 11).

Idle Period Downlink (IPDL) is further OTDOA enhancement. The OTDOA-IPDL technique is based on the same measurements as the regular OTDOA Time measurements are taken during idle periods, in which serving eNB ceases its transmissions and allows the UE within the coverage of this cell to hear pilots coming from distant eNB(s). Serving eNB provides idle periods in continuous or burst mode. In the continuous mode, one idle period is inserted in every downlink physical frame (10 ms). In the burst mode, idle periods occur in a pseudo-random way. Further improvement is obtained via Time Aligned IPDL (TA-IPDL). Time alignment creates a common idle period, during which, each base station will either cease its transmission or transmit the common pilot. The pilot signal measurements will occur in idle period. There are several other techniques that may further enhance the DL OTDOA-IPDL method, for example Cumulative Virtual Blanking, UTDOA (Uplink TDOA), etc. All these techniques improve the ability to hear other (non-serving) eNB(s).

One significant drawback of the OTDOA based techniques is that the base stations timing relationships must be known, or measured (synchronized), for this method to be viable. For unsynchronized UMTS networks the 3GPP standard offers suggestion of how this timing may be recovered. However, networks operators are not implementing such solution. As a result, an alternative that uses the RTT measurements in lieu of the CPICH signal measurements was proposed (see U.S. Patent Publication No. 20080285505, John Carlson et al., SYSTEM AND

METHOD FOR NETWORK TIMING RECOVERY IN COMMUNICATIONS NETWORKS).

All abovementioned methods/techniques are based on the terrestrial signals time of arrival and/or time difference of arrival measurements (RTT, CPICH, etc.). An issue with such measurements is that these are severely impacted by the multi-path. This, in turn, significantly degrades the abovementioned methods/techniques locate/track accuracy (see Jakub Marek Borkowski: Performance of Cell ID+RTT Hybrid Positioning Method for UMTS).

One Multi-path mitigation technique uses detections/measurements from excess number of eNB(s) or Radio Base Stations (RBS). The minimum is three, but for multipath mitigation the number of RBS's required is at least six to eight (see METHOD AND ARRANGEMENT FOR DL-OTDOA (DOWNLINK OBSERVED TIME DIFFERENCE OF ARRIVAL) POSITIONING IN A LTE (LONG TERM EVOLUTION) WIRELESS COMMUNICATIONS SYSTEM, WO/2010/104436). However, the probability of an UE hearing from this large number of eNB(s) is much lower than from three eNB(s). This is because with large number of RBS (eNBs) there will be several ones that are far away from the UE and the received signal from these RBS may fall below the UE receiver sensitivity level or the received signal will have low SNR.

In case of RF reflections (e.g., multi-path), multiple copies of the RF signal with various delay times are superimposed onto the DLOS (Direct Line of Site) signal. Because CPICH, uplink DPCCH/DPDCH and other signals that are used in various CELL ID and OTDOA methods/techniques, including the RTT measurements, are of a limited bandwidth the DLOS signal and reflected signals cannot be differentiated without proper multi-path processing/mitigation; and without this multi-path processing these reflected signals will induce an error in the estimated time difference of arrival (TDOA) and time of arrival (TOA) measurements, including RTT measurements.

For example, 3 G TS 25.515 v.3.0.0 (199-10) standards define the RTT as " . . . the difference between transmission of a downlink DPCH frame (signal) and the reception of the beginning (first significant path) of the corresponding uplink DPCCH/DPDCH frame (signal) from UE". The standard does not define what constitutes this "first significant path". The standard goes on noting that "The definition of the first significant path needs further elaboration". For example, in heavy multipath environment it is a common occurrence whereby the DLOS signal, which is the first significant path, is severely attenuated (10 dB 20 dB) relatively to one or more reflected signal(s). If the "first significant path" is determined by measuring the signal strength, it may be one of the reflected signal(s) and not the DLOS signal. This will result in erroneous TOA/DTOA/RTT measurement(s) and loss of locating accuracy.

In prior wireless networks generations the locating accuracy was also impacted by the low sampling rate of frames (signals) that are used by the locate methods—RTT, CPCIH and other signals. The current third and following wireless network generations have much higher sampling rate. As a result, in these networks the locating accuracy real impact is from the terrestrial RF propagation phenomena (multipath).

The embodiment can be used in all wireless networks that employ reference and/or pilot signals, and/or synchronization signals, including simplex, half-duplex and full duplex modes of operation. For example, the embodiment operates with wireless networks that employ OFDM modulation and/or its derivatives. Thus, the embodiment operates with LTE networks.

It is also applicable to other wireless networks, including WiMax, WiFi, and White Space. Other wireless networks that do not use reference and/or pilot or synchronization signals may employ one or more of the following types of alternate modulation embodiments as described in U.S. Pat. No. 7,872,583: 1) where a portion of frame is dedicated to the ranging signal/ranging signal elements as described in U.S. Pat. No. 7,872,583; 2) where the ranging signal elements (U.S. Pat. No. 7,872,583) are embedded into transmit/receive signals frame(s); and 3) where the ranging signal elements (described in U.S. Pat. No. 7,872,583) are embedded with the data.

These alternate embodiments employ multi-path mitigation processor and multi-path mitigation techniques/algorithms described in U.S. Pat. No. 7,872,583 and can be used in all modes of operation: simplex, half-duplex and full duplex.

It is also likely that multiple wireless networks will, at the same time, utilize the preferred and/or alternate embodiments. By way of example, a smart phone can have Blue Tooth, WiFi, GSM and LTE functionality with the capability of operating on multiple networks at the same time. Depending on application demands and/or network availability, different wireless networks can be utilized to provide positioning/locating information.

The proposed embodiment method and system leverages the wireless network reference/pilot and/or synchronization signals. Furthermore, the reference/pilot signal/synchronization signals measurements might be combined with RTT (Round Trip Time) measurements or system timing. According to an embodiment, RF-based tracking and locating is implemented on 3GPP LTE cellular networks, but could be also implemented on other wireless networks, for example WiMax, Wi-Fi, LTE, sensors networks, etc. that employ a variety of signaling techniques. Both the exemplary and mentioned above alternative embodiments employ multi-path mitigation method/techniques and algorithms that are described in U.S. Pat. No. 7,872,583. The proposed system can use software implemented digital signal processing.

The system of the embodiment leverages User Equipment (UE), e.g. cell phone or smart phone, hardware/software as well as Base Station (Node B)/enhanced Base Station (eNB) hardware/software. A base station generally consists of transmitters and receivers in a cabin or cabinet connected to antennas by feeders. These base stations include, Micro Cell, Pico Cell, Macro Cell, Umbrella Cell, Cell Phone towers, Routers and Femtocells. As a result, there will be little or no incremental cost to the UE device and overall system. At the same time the locate accuracy will be significantly improved.

The improved accuracy comes from the multipath mitigation that is provided by the present embodiments and U.S. Pat. No. 7,872,583. The embodiments use multi-path mitigation algorithms, network reference/pilot and/or synchronization signals and network node (eNB). These might be supplemented with RTT (Round Time Trip) measurements. The multi-path mitigation algorithms are implemented in UE and/or base station (eNB), or both: UE and eNB The embodiments advantageously use the multi-path mitigation processor/algorithms (see U.S. Pat. No. 7,872,583) that allow separating the DLOS signal and reflected signals, even when DLOS signal is significantly attenuated (10 dB-20 dB lower) relatively to one or more reflected signals. Thus, the embodiments significantly lower the error in the estimated ranging signal DLOS time-of-flight and consequently TOA, RTT and DTOA measurements. The proposed multi-path mitigation and DLOS differentiating (recognizing) method can be used on all RF bands and wireless systems/networks. And it can support various modulation/demodulation techniques, including Spread Spectrum techniques, such as DSS (Direct Spread Spectrum) and FH (Frequency Hopping).

Additionally, noise reduction methods can be applied in order to further improve the method's accuracy. These noise reduction methods can include, but are not limited to, coherent summing, non-coherent summing, Matched filtering, temporal diversity techniques, etc. The remnants of the multi-path interference error can be further reduced by applying the post-processing techniques, such as, maximum likelihood estimation (e.g., Viterbi Algorithm), minimal variance estimation (Kalman Filter), etc.

In present embodiments the multi-path mitigation processor and multi-path mitigation techniques/algorithms do not change the RTT, CPCIH and other signals and/or frames. The present embodiments leverage wireless network reference, pilot and/or synchronization signals that are used to obtain the channel response/estimation. The invention uses the channel estimation statistics that is generated by UE and/or eNB (see Iwamatsu et al., APPARATUS FOR ESTIMATING PROPAGATION PATH CHARACTERISTICS, US 2003/008156; U.S. Pat. No. 7,167,456 B2).

Figure 9:
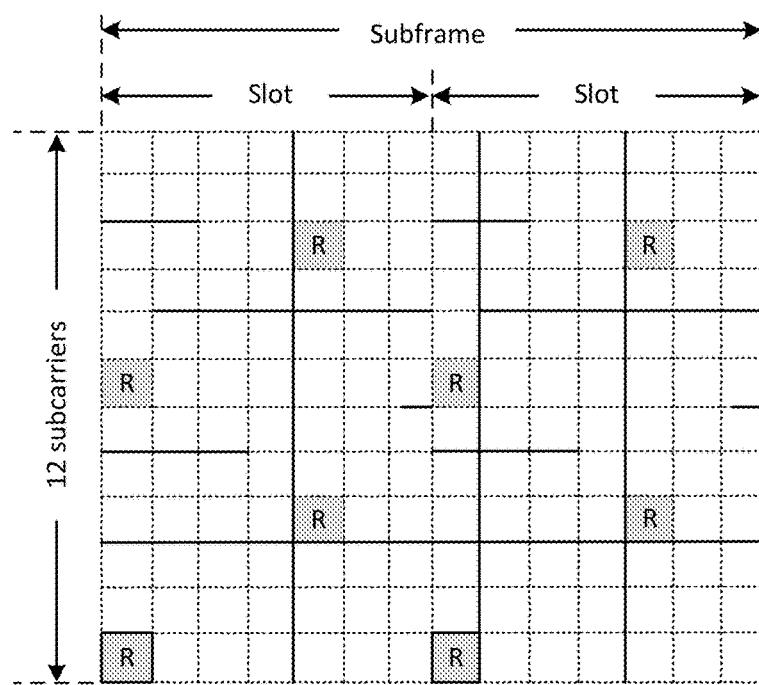
FIG. 9 illustrates LTE reference signals mapping.

LTE networks use specific (non-data) reference/pilot and/or synchronization s signals (known signals) that are transmitted in every downlink and uplink subframe, and might span entire cell bandwidth. For simplicity from now on we will refer to reference/pilot and synchronization signals as reference signals. An example of the LTE reference signals is in FIG. 9 (these signals are interspersed among LTE resource elements). From FIG. 2, reference signals (symbols) are transmitted every sixth subcarrier. Further, reference signals (symbols) are staggered in both time and frequency. In total, reference signals are covering every third subcarrier.

These reference signals are used in the initial cell search by the UE, downlink signal strength measurements, scheduling and handover, etc. Included in the reference signals are UE-specific reference signals for channel estimation (response determination) for coherent demodulation. In addition to the UE-specific reference signals, other reference signals may be also used for channel estimation purposes, (see Chen et al., US patent publication No. 2010/0091826 A1).

LTE employs the OFDM (Orthogonal Frequency Division Multiplexing) modulation (technique). In LTE the ISI (Inter Symbol Interference) caused by multipath is handled by inserting Cyclic prefix (CP) at the beginning of each OFDM symbol. The CP provides enough delay so that delayed reflected signals of the previous OFDM symbol will die out before reaching the next OFDM symbol.

An OFDM symbol consists of multiple very tightly spaced subcarriers. Inside the OFDM symbol time-staggered copies of the current symbol (caused by multipath) result in Inter Carrier Interference (ICI). In LTE the ICI is handled (mitigated) by determining the multipath channel response and correcting the channel response in the receiver.

In LTE the multipath channel response (estimation) is computed in the receiver from subcarriers bearing the reference symbols. Interpolation is used to estimate the channel response on the remaining subcarriers. The channel response is calculated (estimated) in form of channel amplitude and phase. Once the channel response is determined (by periodic transmission of known reference signals), the channel distortion caused by multipath is mitigated by applying an amplitude and phase shift on a subcarrier-by-subcarrier basis (see Jim Zyren, Overview of the 3GPP Long Term Evolution Physical Layer, white paper).

LTE multipath mitigation is designed to remove the ISI (by inserting a Cyclic Prefix) and ICI, but not to separate the DLOS signal from reflected signals. For example, time-staggered copies of the current symbol make each modulated subcarrier signals spread in time, thus causing ICI. Correcting multipath channel response using the abovementioned LTE technique will shrink modulated subcarrier signals in time, but this type of correction does not guarantee that the resulting modulated subcarrier signals (inside the OFDM symbol) are DLOS signals. If DLOS modulated subcarrier signals are significantly attenuated relatively to delayed reflected signal(s), the resulting output signal will be the delayed reflected signal(s) and the DLOS signal will be lost.

In LTE compliant receiver, further signal processing includes DFT (Digital Fourier Transformation). It is well known that DFT technique(s) can resolve (remove) only copies of signal(s) that are delayed for times that are longer than or equal to the time that is inversely proportional to the signal and/or channel bandwidth. This method accuracy may be adequate for an efficient data transfer, but not accurate enough for precise distance measurement in a heavy multipath environment. For example, to achieve thirty meters accuracy, the signal and receiver channel bandwidths should be larger than or equal to ten megahertz ($1/10$ MHz=100 ns.). For better accuracy the signal and receiver channel bandwidths should be wider—one hundred megahertz for three meters.

However, CPICH, uplink DPCCH/DPDCH and other signals that are used in various CELL ID and OTDOA methods/techniques, including the RTT measurements, as well as the LTE received signal subcarriers have bandwidths that are significantly lower than ten megahertz. As a result, the currently employed (in LTE) method/technique will produce locating errors in the range of 100 meters.

To overcome the abovementioned limitations the embodiments use a unique combination of implementations of subspace decomposition high resolution spectral estimation methodologies and multimodal cluster analysis. This analysis and related multi-path mitigation method/techniques and algorithms, described in U.S. Pat. No. 7,872,583, allow a reliable and accurate separation of DLOS path from other reflected signals paths.

Compared to methods/techniques used in the LTE, in a heavy multipath environment this method/techniques and algorithms (U.S. Pat. No. 7,872,583) deliver 20× to 50× accuracy improvement in the distance measurement via reliable and accurate separation of DLOS path from other multi-path (MP) paths.

Methods/techniques and algorithms described in U.S. Pat. No. 7,872,583 require ranging signal complex amplitude estimation. Accordingly, the LTE reference signals used for channel estimation (response determination) as well as other reference signals (including pilot and/or synchronization signals, can be also construed as a ranging signal in methods/techniques and algorithms described in U.S. Pat. No. 7,872,583. In this case the ranging signal complex amplitude is the channel response that is calculated (estimated) by the LTE receiver in form of amplitude and phase. In other words, the channel response statistics that is calculated (estimated) by the LTE receiver can provide complex amplitude information that is required by the method/techniques and algorithms described in U.S. Pat. No. 7,872,583.

In ideal open space RF propagation environment with no multipath the phase change of the received signal (ranging signal), e.g. channel response phase, will be directly proportional to the signal's frequency (a straight line); and the RF signal time-of-flight (propagation delay) in such environment can be directly computed from the phase vs. frequency dependency by computing first derivative of the phase vs. frequency dependency. The result will be the propagation delay constant.

In this ideal environment the absolute phase value at initial (or any) frequency is not important because the derivative is not affected by the phase absolute values.

In a heavy multipath environment the received signal phase change vs. frequency is a complicated curve (not a straight line); and the first derivative does not provide information that could be used for accurate separation of DLOS path from other reflected signals paths. This is the reason for employing multipath mitigation processor and method(s)/techniques and algorithms described in U.S. Pat. No. 7,872,583.

If the phase and frequency synchronization (phase coherency) achieved in a given wireless network/system is very good, then multipath mitigation processor and method(s)/techniques and algorithms described in U.S. Pat. No. 7,872,583 will accurately separate DLOS path from other reflected signals paths and determine this DLOS path length (time-of-flight).

In this phase coherent network/system no additional measurements are required. In other words, one way ranging (simplex ranging) can be realized.

However, if the degree of synchronization (phase coherency) achieved in a given wireless network/system is not accurate enough, then in a heavy multipath environment the received signal phase and amplitude change vs. frequency might be very similar for measurements conducted at two or more different locations (distances). This phenomenon might lead to an ambiguity in received signal DLOS distance (time-of-flight) determination.

To resolve this ambiguity it is necessary to know the actual (absolute) phase value for at least one frequency.

However, the amplitude and phase vs. frequency dependency that is computed by the LTE receiver does not include an actual phase value because all amplitude and phase values are computed from the downlink/uplink reference signals, e.g. relative to each other. Thus, the amplitude and phase of the channel response that is calculated (estimated) by the LTE receiver needs actual phase value at least at one frequency (subcarrier frequency).

In LTE this actual phase value can be determined from one or more RTT measurement(s), TOA measurements; or from time-stamping of one or more received reference signals, provided that 1) these time stamps of transmitting these signals by eNB are also known at the receiver (or vice versa), 2) the receiver and eNB clocks are well synchronized in time, and/or 3) by using multilateration techniques.

All of the above methods provide the time-of-flight values of one or more reference signals. From the time-of-flight values and frequencies of these reference signals actual phase values at one or more frequencies can be calculated.

The present embodiments achieve a highly accurate DLOS distance determination/locating in a heavy multipath environment by combining multi-path mitigation processor, method(s)/techniques and algorithms described in U.S. Pat. No. 7,872,583 with: 1) the amplitude and phase vs. frequency dependency that is computed by the LTE UE and/or eNB receiver or 2) a combination of the amplitude and phase vs. frequency dependency that is computed by the LTE UE and/or eNB receiver and actual phase value(s) for one or more frequencies obtained via RTT and/or TOA; and/or time-stamping measurements.

In these cases the actual phase value(s) is affected by the multipath. However, this does not impact the performance of methods/techniques and algorithms described in U.S. Pat. No. 7,872,583.

In LTE RTT/TOA/TDOA/OTDOA, including DL-OTDOA, U-TDOA, UL-TDOA, etc., measurements can be carried out with the resolution of 5 meters. RTT measurements are carried during dedicated connections. Thus, multiple simultaneous measurements are possible when UE is in handover state and times when UE periodically collects and reports measurements back to the UE, in which the DPCH frames are exchanged between the UE and different networks (base stations). Similar to RTT, TOA measurements provide the signal's time-of-flight (propagation delay), but TOA measurements cannot be made simultaneously (Jakub Marek Borkowski: Performance of Cell ID+RTT Hybrid Positioning Method for UMTS).

In order to locate UE on plane DLOS distances have to be determined at least from/to three eNB(s). To locate UE in three-dimensional space minimum four DLOS distances from/to four eNB(s) would have to be determined (assuming that at least one eNB is not on the same plane).

An example of UE positioning method is shown in FIG. 1.

In case of very good synchronization RTT measurements are not required.

If the degree of synchronization is not accurate enough, then methods like OTDOA, Cell ID+RTT and others, for example AOA (Angle-of-Arrival) and its combinations with other methods, can be used for the UE locating.

The Cell ID+RTT track-locate method accuracy is impacted by the multipath (RTT measurements) and the eNB (base station) antenna beamwidth. Base stations antennas beamwidths are between 33 and 65 degrees. These wide beamwidths results in locating error of 50-150 meters in urban areas (Jakub Marek Borkowski: Performance of Cell ID+RTT Hybrid Positioning Method for UMTS). Considering that in a heavy multipath environment the current LTE RTT distance measurement average error is approximately 100 meters, the overall expected average locate error of the currently employed by LTE Cell ID+RTT method is approximately 150 meters.

One of the embodiments is the UE locating based on the AOA method, whereby one or more reference signals from the UE is used for the UE locate purposes. It involves an AOA determination device location for determining the DLOS AOA. The device can be collocated with the base station and/or installed at another one or more locations independent from the base station location. The coordinates of these locations are presumably known. No changes are required on the UE side.

This device includes a small antenna array and is based on a variation of the same multipath mitigation processor, method(s)/techniques and algorithms described in U.S. Pat. No. 7,872,583. This one possible embodiment has the advantage of precise determination (very narrow beamwidth) of the AOA of the DLOS RF energy from an UE unit.

In one other option this added device is receive only device. As a result, its size/weight and cost are very low.

The combination of embodiments in which accurate DLOS distance measurements are obtained and embodiments in which an accurate DLOS AOA determination can be made will greatly improve the Cell ID+RTT track-locate method precision 10× or greater. Another advantage of this approach is that the UE location can be determined at any moment with a single tower, (does not require placing UE in soft handover mode). Because an accurate location fix can be obtained with a single tower there is no need to synchronize multiple cell towers. Another option of determining the DLOS AOA is to use the existing eNB antenna array and the eNB equipment. This option may further lower the cost of implementation of the improved Cell ID+RTT method. However, because eNB antennas are not designed for the locating applications, the positioning accuracy may be degraded. Also, network operators may be unwilling to implement required changes in base station (software/hardware).

In the LTE (Evolved Universal Terrestrial Radio Access (E-UTRA); Physical channels and modulation; 3GPP TS 36.211 Release 9 technical Specification) Positioning Reference Signals (PRS), were added. These signals are to be used by the UE for the DL-OTDA (Downlink OTDOA), positioning. Also, this release 9 requires eNB(s) to be synchronized. Thus, clearing the last obstacle for OTDOA methods (see paragraph 274 above). The PRS improves UE hear-ability at UE of multiple eNBs. Note: Release 9 did not specify the eNB synchronization accuracy (some proposals: 100 ns.).

The U-TDOA/UL-TDOA are in a study phase; to be standardized in 2011.

The DL-OTDOA method (in Release 9) is detailed in the US patent US 2011/0124347 A1 (Method and Apparatus for UE positioning in LTE networks, Chen, at al.). The Release 9 DL-OTDOA suffers from the multipath. Some of the multipath mitigation can be achieved via increased PRS signal bandwidth. However, the trade-off is increased scheduling complexity and longer times between UE positions fixes. Moreover, for networks with limited operating bandwidth, for example 10 MHz, the best possible accuracy is 100 meters, see Chen, Table 1.

The above numbers are the best possible case. Other cases, especially when the DLOS signal strength is significantly lower (10-20 dB) compared to the reflected signal(s) strength, result in significantly larger (2×-4×) of the above-mentioned locate/ranging errors.

Embodiments described herein allow for up to 50× ranging/locate accuracy improvement for a given signal bandwidth over the performance achieved by the Release 9 DL-OTDOA method and the UL-PRS method of Chen et al. described in the Background section. Thus, applying embodiments of the methods described herein to the Release 9 PRS processing reduces the locate error down to 3 meters or better in 95% of all possible cases. In addition, this accuracy gain will reduce the scheduling complexity and the time between UE position fixes.

With the embodiments described herein further improvements for the OTDOA method are possible. For example, the ranging to the serving cell can be determined from other serving cells' signals, thus improving the neighboring cells hearability and reducing the scheduling complexity, including the time between UE positions fixes.

Embodiments also enable the accuracy of the U-TDOA method and UL-TDOA from Chen et al. (described in the Background) to be improved up to 50 times. Applying embodiments to the Chen's UL-TDOA variant, reduces the locate error down to 3 meters or better in 95% of all possible cases. Moreover, this accuracy gain further reduces the scheduling complexity and the time between UE positions fixes.

Again, with the present embodiments, Chen's UL-TDOA method accuracy can be improved up to 50×. Thus, applying the present embodiments to the Chen's U-TDOA variant, will reduce the locate error down to 3 meters or better in 95% of all possible cases. Moreover, this accuracy gain will further reduce the scheduling complexity and the time between UE positions fixes.

The abovementioned DL-TDOA and U-TDOA/UL-TDOA methods rely on one-way measurements (ranging). Present embodiments and practically all other ranging technologies require that the PRS and/or other signals used in the process of one-way ranging would be frequency and phase coherent. The OFDM based systems, like LTE, are frequency coherent. However, the UE units and eNB(s) are not phase or time synchronized by a common source—like UTC, to a couple nanoseconds, e.g. there exists a random phase adder.

To avoid the phase coherency impact on the ranging accuracy, the embodiment of the multipath processor calculates the differential phase between the ranging signal(s), e.g. reference signals, individual components (subcarriers). This eliminates the random phase term adder.

As identified above in the discussion of Chen et al., applying the embodiments described herein result in significant accuracy improvement in indoor environments compared to the performance achieved by Chen et al. For example, according to Chen, at al. the DL-OTDOA and/or U-TDOA/UL-TDOA are mostly for outdoor environments, indoors (buildings, campuses, etc.) the DL-OTDOA and U-TDOA technologies may not perform well. Several reasons are noted (see Chen, #161-164), including the Distributed Antenna Systems (DAS) that are commonly employed indoors, whereby each antenna does not have a unique ID.

The embodiment described below operates with wireless networks that employ OFDM modulation and/or its derivatives; and reference/pilot/and or synchronization signals. Thus, the embodiment described below operates with LTE networks and it is also applicable to other wireless systems and other wireless networks, including other types of modulation, with or without reference/pilot/and/or synchronization signals.

The approach described herein is also applicable to other wireless networks, including WiMax, WiFi, and White Space. Other wireless networks that do not use reference/pilot and/or synchronization signals may employ one or more of the following types of alternate modulation embodiments as described in U.S. Pat. No. 7,872,583: 1) where a portion of frame is dedicated to the ranging signal/ranging signal elements; 2) where the ranging signal elements are embedded into transmit/receive signals frame(s); and 3) where the ranging signal elements are embedded with the data.

Embodiments of the multipath mitigation range estimation algorithm described herein (also described in U.S. Pat. Nos. 7,969,311 and 8,305,215) works by providing estimates of the ranges in the ensemble made up of the direct path (DLOS) of a signal plus the multipath reflections.

The LTE DAS system produces multiple copies of the same signal seen at various time offsets to a mobile receiver (UE). The delays are used to uniquely determine geometric relationships between the antennas and the mobile receiver. The signal seen by the receiver resembles that seen in a multipath environment—except the major "multipath" components result from the sum of the offset signals from the multiple DAS antennas.

The signal ensemble seen by the receiver is identical to the type of signal ensemble embodiments are designed to exploit—except that in this case the major multipath components are not traditional multipath. The present multipath mitigation processor (algorithms) is capable of determining the attenuation and propagation delay of the DLOS and each path, e.g. reflection, (see equations 1-3 and associated descriptions). While multipath can be present because of the dispersive RF channel (environment), the major multipath components in this signal ensemble are associated with transmissions from multiple antennas. Embodiments of the present multipath algorithm can estimate these multipath components, isolate the ranges of the DAS antennas to the receiver, and provide range data to the location processor (implemented in software). Depending on the antenna placing geometry, this solution can provide both X, Y and X, Y, Z location coordinates.

As a result, present embodiments do not require any hardware and/or new network signal(s) additions. Moreover, the positioning accuracy can be significantly improved by 1) mitigating the multipath and 2) in case of active DAS the lower bound of positioning error can be drastically reduced, such as reducing from approximately 50 meters to approximately 3 meters.

It is assumed that the position (location) of each antenna of a DAS is known. The signal propagation delay of each antenna (or relative to other antenna) also has to be determined (known).

For active DAS systems the signal propagation delay may be determined automatically, using the loopback techniques, whereby the known signal is sent round trip and this round trip time is measured. This loopback technique also eliminates the signal propagation delay changes (drift) with temperature, time, etc.

Using multiple macro cells and associated antennas, Pico cells and micro cells further enhance the resolution by providing additional reference points.

The embodiment described above of individual range estimates in a signal ensemble of multiple copies from multiple antenna can be further enhanced by changes to the signal transmit structure in the following two ways. The first is to time multiplex the transmissions from each antenna. The second approach is to frequency multiplex for each of the antennas. Using both enhancements, time and frequency multiplexing simultaneously, further improve the ranging and location accuracy of the system. Another approach is to add a propagation delay to each antenna. The delay values would be chosen to be large enough to exceed the delay spread in a particular DAS environment (channel), but smaller than the Cyclic Prefix (CP) length so that the multipath caused by additional delays will not result in ISI (Inter Symbol Interference).

The addition of a unique ID or unique identifier for each antenna increases the efficiency of the resulting solution. For example, it eliminates the need for the processor to estimate all the ranges from the signals from each of the antennas In one embodiment utilizing the LTE downlink, one or more reference signal(s) subcarriers, including pilot and or synchronization signal(s) subcarriers, are used to determine subcarriers phase and amplitude that are in turn applied to the multi-path processor for multipath interference mitigation and generation of range based location observables and locate estimate using multilateration and location consistency algorithms to edit out wild points.

Another embodiment takes advantage of the fact that the LTE uplink signaling also includes reference signals, mobile device to base, which also contains reference subcarriers. In fact there is more than one mode in which contain these subcarriers from a full sounding mode used by the network to assign a frequency band to the uplink device to a mode where are reference subcarriers are used to generate a channel impulse responses to aid in demodulation of the uplink signal, etc. Also, similarly to the DL PRS added in rel.9 additional UL reference signals might be added in the upcoming and future standard releases. In this embodiment, the uplink signal is processed by multiple base units (eNB) using the same range to phase, multipath mitigation processing to generate range related observables. In this embodiment, location consistency algorithms are used as established by the multilateration algorithm to edit wild point observables and generate a location estimate.

Yet another embodiment, relevant one or more reference (including pilot and/or synchronization) subcarriers of both the LTE downlink and LTE uplink are collected, the range to phase mapping is applied, multipath mitigation is applied, and the range associated observable is estimated. These data would then be fused in such a way that would provide a more robust set of observables for location using the multilateration algorithm and location consistency algorithms. The advantage would be the redundancy that results in improved accuracy since the downlink and up link two different frequency bands or in case of the TDD (Time Division Duplexing) improving the system coherency.

In a DAS (Distributed Antenna System) environment where multiple antennas transmitting the same downlink signal from a microcell the location consistency algorithm(s) are extended to isolate the ranges of the DAS antennas from observables generated by the multipath mitigation processing from reference signal(s) (including pilot and/or synchronization) subcarriers and to obtain the location estimates from the multiple DAS emitters (antennas) ranges.

In a DAS system (environment) obtaining accurate location estimate is possible only if the signals paths from individual antennas can be resolved with a high accuracy, whereby the path error is only a fraction of the distance between antennas (accuracy of 10 meters or better). Because all existing techniques/methods cannot provide such accuracy in a heavy multipath environment (signals from multiple DAS antennas will appear as induced heavy multipath) the existing techniques/methods cannot take advantage of the abovementioned extension of the location consistency algorithm(s) and this locate method/technique in the DAS environment.

The multi-path mitigation methods and systems for object identification and location finding, described in U.S. Pat. No. 7,872,583, is applied to the range to signal phase mapping, multipath interference mitigation and process to generate range based location observables utilizing the LTE downlink, uplink and/or both (downlink and uplink), one or more reference signal(s) subcarriers and using multilateration and location consistency to generate a location estimate.

In all above embodiments trilateration positioning algorithms can be also employed.

The DL-OTDOA locating was specified in the LTE release 9: Evolved Universal Terrestrial Radio Access (E-UTRA); Physical channels and modulation; 3GPP TS 36.211 Release 9 technical Specification. However, it has not been implemented by the wireless operators (carriers). In the meantime, a Downlink locating can be implemented within current, e.g. unmodified, LTE network environment by using the existing physical layer measurements operation(s).

In LTE the UE and the eNB are required to make physical layer measurements of the radio characteristics. The measurement definitions are specified in 3GPP TS 36.214. These measurements are performed periodically and are reported to the higher layers and are used for a variety of purposes including intra- and inter-frequency handover, inter-radio access technology (inter-RAT) handover, timing measurements, and other purposes in support of RRM (Radio Resource Management).

For example, the RSRP (Reference Signal Received Power) is the average of the power of all resource elements which carry cell-specific reference signals over the entire bandwidth.

Another example is the RSRQ (Reference Signal Received Quality) measurement that provides additional information (RSRQ combines signal strength as well as interference level).

The LTE network provides the UE with eNB neighbor (to serving eNB) lists. Based on the network knowledge configuration, the (serving) eNodeB provides the UE with neighboring eNB's identifiers, etc. The UE then measures the signal quality of the neighbors it can receive. The UE reports the results back to the eNodeB. Note: UE also measures the signal quality of the serving eNB.

According to the specification, the RSRP is defined as the linear average over the power contributions (in [W]) of the resource elements that carry cell-specific reference signals within the considered measurement frequency bandwidth. The measurement bandwidth that is used by the UE to determine RSRP is left up to the UE implementation with the limitation that corresponding measurement accuracy requirements have to be fulfilled.

Considering the measurement bandwidth accuracy requirements this bandwidth is fairly large and the cell-specific reference signals that are used in the RSRP measurements can be further processed to determine these reference signals subcarriers phase and amplitude that are in turn applied to the multi-path processor for multipath interference mitigation and generation of range based location observables. In addition, other reference signals that are used in the RSRP measurement, for example SSS (Secondary Synchronization Signal) might be also used.

Thereafter, based on range observables from three or more cells the location fix can be estimated using multilateration and location consistency algorithms.

As was mentioned previously while there are several causes of the RF fingerprinting database instability one of the major ones is the multipath (the RF signature is very sensitive to multipath). As a result, the RF Fingerprinting method(s)/technology locate accuracy is heavily impacted by multipath dynamics—changes over time, environment (for example weather), people and/or objects movement, including vertical uncertainty: >100% variability depending upon device Z-height and/or antenna orientation (see Tsung-Han Lin, et al. Microscopic Examination of an RSSI-Signature-Based Indoor Localization System).

The present embodiments can significantly improve the RF Fingerprinting locate accuracy because of the ability (multipath processor) to find and characterize each individual path, including significantly attenuated DLOS. As a result, the RF Fingerprinting decision on the location fix can be supplemented with the real-time multipath distribution information As was mentioned above, the locate fix will require position references synchronization in time. In wireless networks these position references may include Access Points, Macro/Mini/Pico and Femto cells, as wells as so called Small cells (eNB). However, wireless operators do not implement the synchronization accuracy that is needed for an accurate position fix. For example, in case of LTE the standard does not require any time synchronization between eNB(s) for the FDD (Frequency Division Duplexing) networks. For LTE TDD (Time Division Duplexing) this time synchronization accuracy is limit is +/−1.5 microseconds. This is equivalent to 400+ meters locate uncertainty. Although not required, the LTE FDD networks are also synchronized but use even larger (than 1.5 microseconds) limits.

Wireless LTE operators are using GPS/GNSS signals to synchronize eNB(s) in frequency and time. Note: The LTE eNB has to maintain a very accurate carrier frequency: 0.05 ppm for macro/mini cells and slightly less accurate for other type of cells (0.1-0.25 ppm). The GPS/GNSS signals can also enable a required (for locate) time synchronization accuracy of better than 10 nanoseconds. However, network operators and network equipment manufacturers are trying to reduce costs associated with the GPS/GNSS units in favor of Packet Transport/, e.g. Internet/Ethernet networking time synchronization by employing NTP (Network Time Protocol) and/or PTP (Precision Time Protocol), for example IEEE 1588v2 PTP.

The IP network-based synchronization has a potential of meeting the minimum frequency and time requirements, but is lacking the GPS/GNSS precision that is needed for locate fix.

The approach described herein is based on the GPS/GNSS signals and signals generated by the eNB and/or AP, or other wireless networks equipment. It also can be based on the IP networking synchronization signals and Protocols and signals generated by the eNB and/or AP, or other wireless networks equipment. This approach is also applicable to other wireless networks, including WiMax, WiFi, and White Space.

Figure 12:
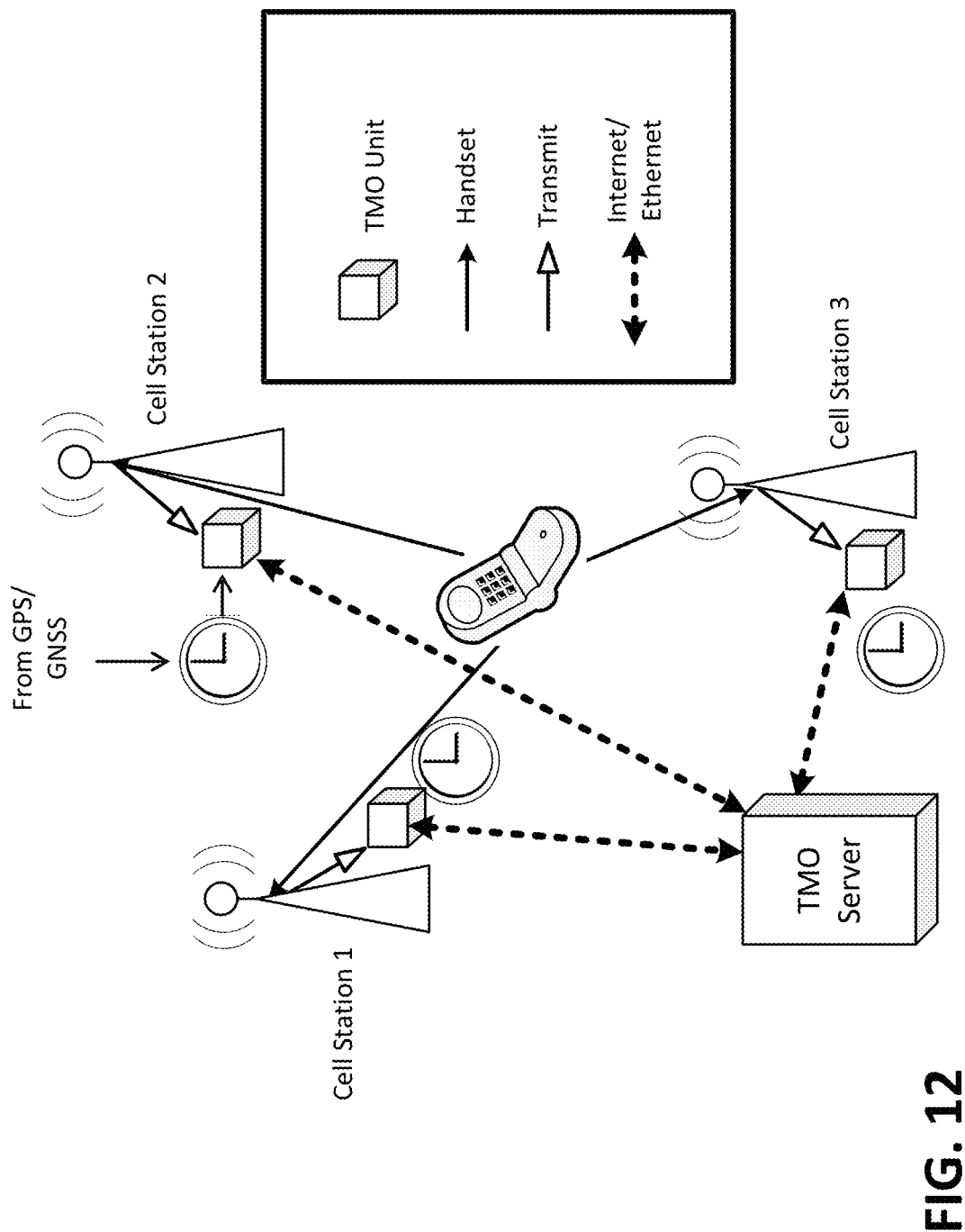
FIG. 12 illustrates the operation of a Time Observation Unit (TMO) installed at an operator's eNB facility, in accordance with an embodiment.

The eNB signals are received by the Time Observation Unit (TMO) installed at the operator's eNB facility (FIG. 12). The TMO also include the External Synchronization Source input.

The eNB signals are processed by the TMO and are time stamped using clocks that are synchronized with the External Synchronization Source input.

The External Synchronization Source could be from the GPS/GNSS and/or Internet/Ethernet networking, for example PTP or NTP, etc.

The time-stamped processed signal, for example the LTE frame start (could be other signals, especially in other networks), also includes the eNB (cell) location and/or cell ID, is sent via the Internet/Ethernet backhaul to a central TMO Server that creates, maintains and updates a data base of all eNBs.

The UE and/or eNB(s) involved in the process of ranging and obtaining a location fix will quire the TMO Server and the server will return the time synchronization offsets between the eNB(s) involved. These time synchronization offsets will be used by the UE and/or eNB(s) involved in the process of obtaining a location fix to adjust the location fix.

Alternatively, the location fix calculations and adjustment can be carried out by the TMO Server when UE and/or eNB(s) involved in the process of ranging will also supply the obtained ranging information to the TMO Server. The TMO Server will then return an accurate (adjusted) position (locate) fix.

If more than one cell eNB equipment is co-located together a single TMO can process and time stamp signals from all eNB(s).

The RTT (Round Time Trip) measurements (ranging) can be used for locating. The drawback is that the RTT ranging is subject to multipath which has drastic impact on the locate accuracy.

On the other hand, RTT locating does not require the position references synchronization (in time) in general and in case of LTE the eNB in particular.

At the same time, when operating with Pilot Reference and/or other signals of the wireless network the multipath mitigation processor, method(s)/techniques and algorithms described in U.S. Pat. No. 7,872,583 are capable of determining the channel response for the RTT signal(s), e.g. identify the multipath channel that the RTT signal(s) are going through. This allows for correction of the RTT measurements so that the actual DLOS time will be determined.

With DLOS time known it will be possible to obtain the location fix using trilateration and/or similar locating methods without the need of eNB or position references synchronization in time.

Even with TMO and TMO Server in place the technology integration described herein and in related applications will require changes in the macro/mini/pico and small cells and/or UE (cell phone). Although these changes are limited only to SW/FW (software/firmware) it takes a lot of effort to revamp the existing infrastructure. Also, in some cases network operators and/or UE/cell phone manufacturers/suppliers resisting equipment modifications. Note: UE is wireless network User Equipment.

This SW/FW change can be completely avoided if the TMO and TMO Server functionality is expanded to support the locate technology described herein and in related applications. In other words, another embodiment described below operates with wireless networks signals, but do not require any modifications of the wireless network equipment/infrastructure. Thus, the embodiment described below operates with LTE networks and it is also applicable to other wireless systems/networks, including Wi-Fi.

In essence this embodiment creates a parallel wireless locate infrastructure that uses the wireless network signals to obtain location fix.

Similarly to TMO and TMO Server, the locate infrastructure described herein and in related applications will consists of one or more wireless Network Signals Acquisition Units (NSAU) and one or more Locate Server Units (LSU) that collect data from NSAU(s) and analyze it, determining range and locations, and to convert it into a table, e.g. of phone/UEs IDs and locations at an instant of time. The LSU interfaces to the wireless network via network's API.

Multiple of these units could be deployed in various locations in a large infrastructure. If NSAU(s) have coherent timing—the results for all can be used which will give better accuracy.

The coherent timing can be derived from the GPS clock and/or other stable clock sources.

The NSAU communicates with LSU via LAN (Local Area Network), Metro Area Network (MAN) and/or Internet.

In some installation/instances the NSAU and LSU could be combined/integrated into a single unit.

In order to support location services using LTE or other wireless networks, the transmitters are required to be clock and event synchronized to within tight tolerances. Normally this is accomplished by locking to the 1 PPS signal of GPS. This will result in timing synchronization in a local area to within 3 nanosecond 1-sigma.

However, there are many instances when this type of synchronization is not practical. The present embodiments provide time offset estimates between the downlink transmitters and tracking of the time offsets in order to provide delay compensation values to the location process so the location process can proceed as if the transmitters were clock and event synchronized. This is accomplished by prior knowledge of the transmit antenna (which is required for any location services) and a receiver with known a priori antenna location. This receiver called the synchronization unit will collect data from all the downlink transmitters and given its knowledge of the locations, calculate the offset timing from a preselected base antenna. These offsets are tracked by the system through the use of a tracking algorithm that compensates for clock drifts the downlink transmitters. Note: The processing to derive pseudo ranges from the received data will utilize the Multipath mitigation algorithms (described in U.S. Pat. No. 7,872,583). Hence the synchronization will not be impacted by multipath.

These offset data are used by the location processor (Location Server, LSU) to properly align the data from each downlink transmitter so that it appears to have been generated by synchronized transmitters. The time accuracy is comparable with the best 1-PPS tracking and will support 3 meter location accuracy (1-sigma).

The synchronization receiver and/or receiver's antennas will be located based on optimal GDOP for best performance. In large installations multiple synchronization receivers can be utilized to provide an equivalent 3 nsec 1-sigma synchronization offset throughout the network. By utilizing synchronization receivers(s) the requirements for synchronization of the downlink transmitters is eliminated.

The synchronization receiver unit can be a standalone unit communicating with the NSAU and/or LSU. Alternatively, this synchronization receiver can be integrated with the NSAU.

Figure 13:
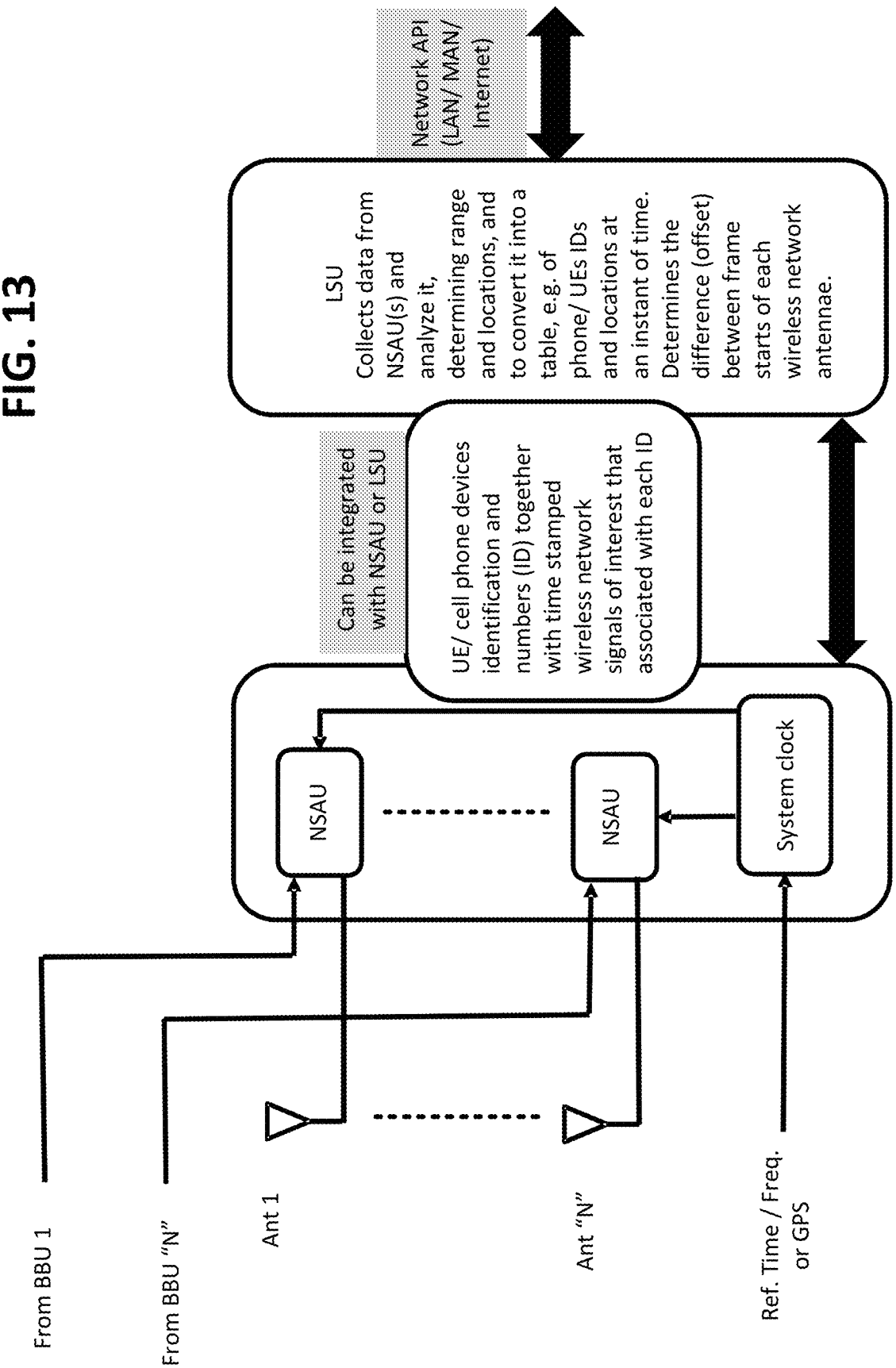
FIG. 13 illustrates an embodiment of a wireless network locate equipment diagram.

The exemplary wireless network locate equipment diagram is depicted in FIG. 13.

Figure 14:
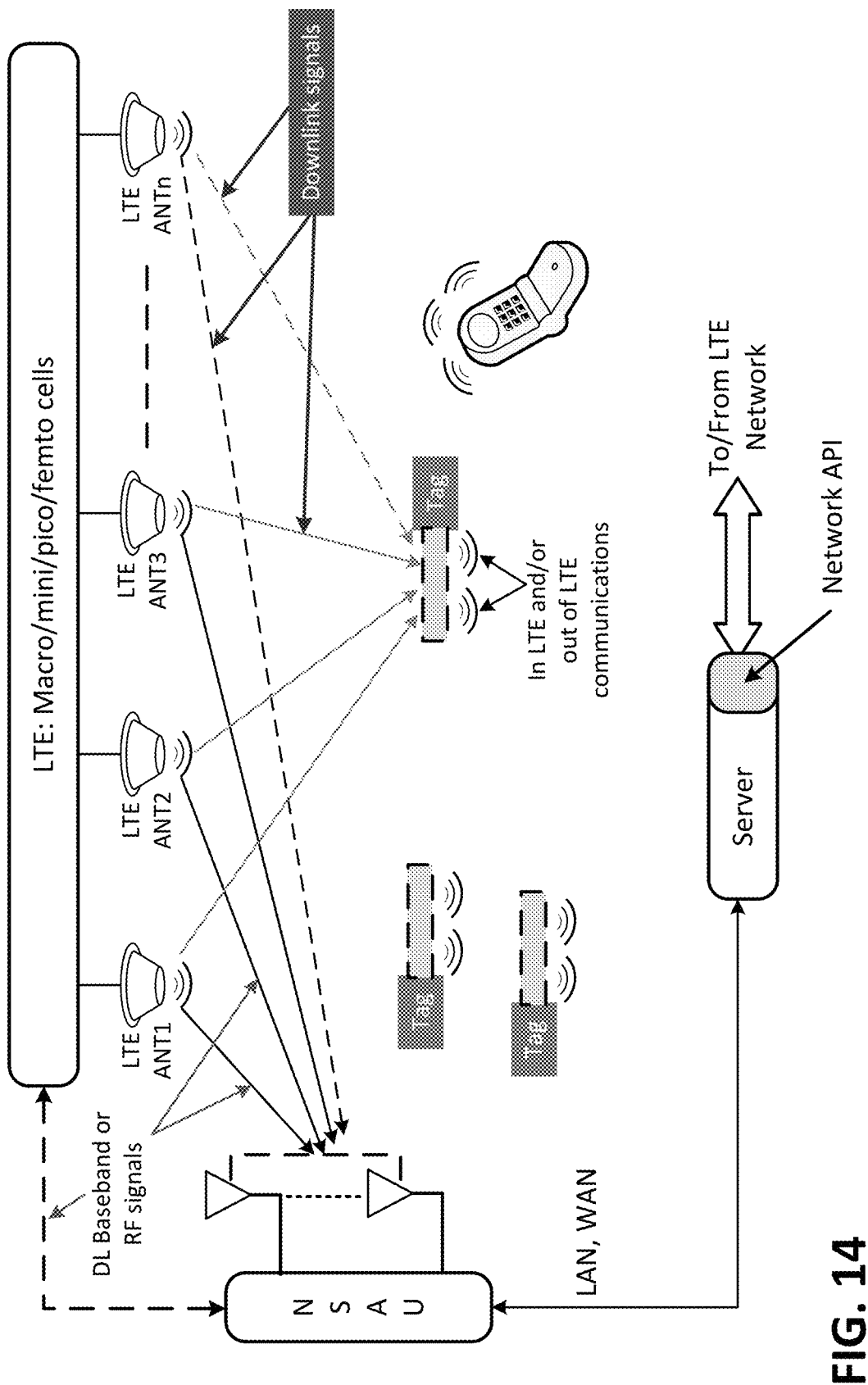
FIG. 14 illustrates an embodiment of a wireless network locate downlink ecosystem for enterprise applications.
Figure 15:
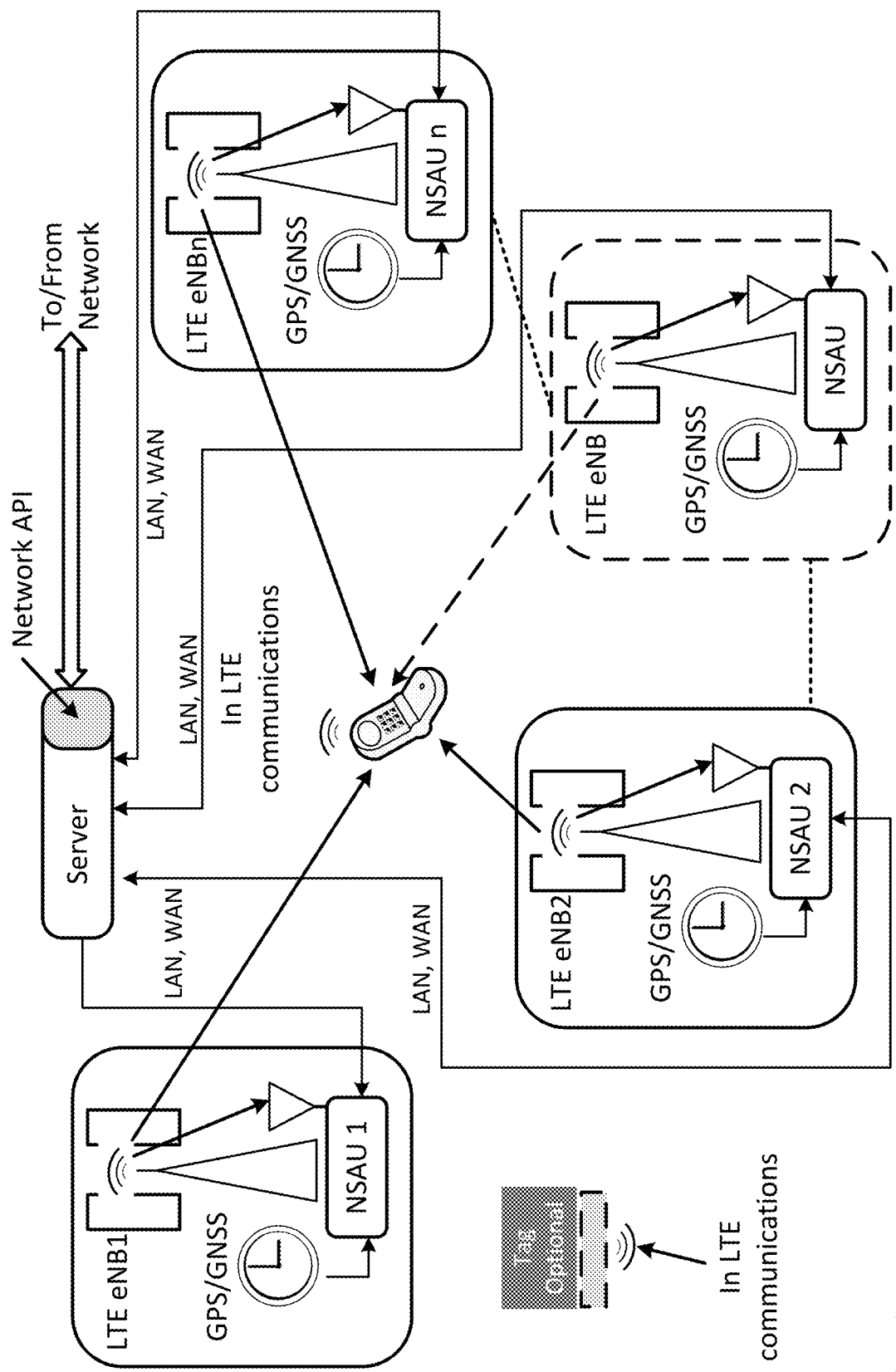
FIG. 15 illustrates an embodiment of a wireless network locate downlink ecosystem for network wide applications.

The embodiment of a completely autonomous system, no Customer Network Investment, which utilizes LTE signals operates in the following modes:

1. Uplink mode—uses wireless network Uplink (UL) signals for the purpose of locating (FIGS. 16 and 17)
2. Downlink mode—uses wireless network Downlink (DL) signals for the purpose of locating (FIGS. 14 and 15).
3. Two-way mode—uses both: UL and DL signals for locating.

In the Uplink mode multiple antennas are connected to one or more NSAUs. These antennae locations are independent from the wireless network antennas; NSAU(s) antennae locations are selected to minimize the GDOP (Geometric Dilution of Precision).

Network' RF signals from the UE/cell phone devices are collected by NSAU(s) antennae and are processed by NSAU(s) to produce time stamped samples of the processed network' RF signals during a time interval that is adequate for capturing one or more instances of all signals of interest.

Optionally, NSAU will also receive, process and time stamped samples of Downlink signals to obtain additional information, for example for determining UE/phone ID, etc.

From captured time stamped samples the UE/cell phone devices identification numbers (ID) together with time stamped wireless network signals of interest that associated with each UE/cell phone ID(s) will be determined (obtained). This operation can be performed either by the NSAU or by the LSU.

The NSAU will periodically supply data to the LSU. If unscheduled data is needed for one or more UE/cell phone ID(s) then LSU will request additional data.

No changes/modifications will be needed in wireless network infrastructure and/or existing UE/cell phone for the UL mode operation.

In the Downlink (DL) mode a location-enabled UE will be required. Also, the cell phone FW would have to be modified if phone is used to obtain location fix.

In some instances operators can make baseband signals available from BBU(s) (Base Band Units). In such cases NSAU(s) will also be capable process these available base band wireless network signals instead of RF wireless network signals.

In the DL mode there is no need to associate the UE/cell phone ID with one or more wireless network signals because these signals will be processed in the UE/cell phone or UE/cell phone will periodically produce time stamped samples of the processed network' RF signals and send these to the LSU; and the LSU will send result(s) back to the UE/cell phone.

In the DL mode the NSAU will process and time stamp processed RF or baseband (when available) wireless network signals. From captured time stamped samples wireless network signals DL frames starts associated with the network antennas will be determined (obtained) and the difference (offset) between these frame starts will be calculated. This operation can be performed either by the NSAU or by the LSU. Frame starts offsets for network antennas will be stored on the LSU.

In the DL mode frame starts offsets of network antennas will be sent from LSU to the UE/phone device in case when the device will process/determine its own location fix using technology described herein and in related applications. Otherwise, when UE/cell phone device will periodically send time stamped samples of the processed network' RF signals to the LSU, the LSU will determine the device's location fix and will send the location fix data back to the device.

In DL mode the wireless network RF signals will come from one or more wireless network antennae. To avoid multipath impact on results accuracy the RF signal should be sniffed out from the antenna or the antenna connection to the wireless network equipment.

The two-way mode encompasses determination of the location fix from both: UL and DL operations. This allows further improve the locate accuracy.

Some Enterprise set ups use one or more BBUs feeding one or more Remote Radio Heads (RRH), with each RRH in turn feeding multiple antennae with the same ID. In such environments, depending on wireless network configuration, determining the DL mode frame starts offsets of network antennas might not be required. This includes a single BBU set up as well as multiple BBUs, whereby antennae of each BBU are assigned to a certain zone and adjacent zones coverages are overlapping.

On the other hand a configuration, configuration whereby antennae that are fed from multiple BBUs are interleaved in the same zone will require determining the DL mode frame starts offsets of network antennas.

In DL mode of operation in DAS environment multiple antennae may share the same ID.

In the present embodiments, location consistency algorithm(s) are extended/developed to isolate the ranges of the DAS antennas from observables generated by the multipath mitigation processing from reference signal(s) (including pilot and/or synchronization) subcarriers and to obtain the location estimates from the multiple DAS emitters (antennas) ranges.

However, these consistency algorithms have limits of number of antennae that emit the same ID. It is possible to reduce the number of antennae that emit the same ID by 1. For a given coverage zone interleave Antennas that are fed from different sectors of sectorized BBU (BBUs are capable of supporting up to six sectors)
2. For a given coverage zone interleave Antennas that are fed from different sectors of sectorized BBU as well as Antennas that are fed from different BBUs
3. Adding a propagation delay element to each antenna. The delay values would be chosen to be large enough to exceed the delay spread in a particular DAS environment (channel), but smaller than the Cyclic Prefix (CP) length so that the multipath caused by additional delays will not result in ISI (Inter Symbol Interference). The addition of a unique delay ID for one or more antenna further reduces the number of antennae that emit the same ID.

In an embodiment, an autonomous system with no Customer Network Investment can be offered. In such embodiment, the system can operate on a band other than the LTE band. For example, ISM (industrial Scientific and Medical) bands and/or White Space bands can be used in places where LTE services are not available.

The embodiment can be also integrated with the macro/mini/pico/femto station (s) and/or UE (cell phone) equipment. Although the integration may require Customer Network Investment, it can reduce cost overhead and can dramatically improve the TCO (Total Cost of Ownership).

As mentioned herein above, PRS can be used by the UE for the Downlink Observed Time Difference of Arrival (DL-OTDOA) positioning. Regarding the synchronization of neighboring base stations (eNBs), the 3GPP TS 36.305 (Stage 2 functional specification of User Equipment (UE) positioning in E-UTRAN) specifies transferring timing to the UE, the timing being relative to an eNode B service of candidate cells (e.g., neighboring cells). The 3GPP TS 36.305 also specifies Physical cell IDs (PCIs) and global cell IDs (GCIs) of candidate cells for measurement purposes.

According to the 3GPP TS 36.305, this information is delivered from the E-MLC (Enhanced Serving Mobile Location Centre) server. It is to be noted that the TS 36.305 does not specify the abovementioned timing accuracy.

Additionally, the 3GPP TS 36.305 specifies that the UE shall return to the E-MLC the downlink measurements, which includes Reference Signal Time Difference (RSTD) measurements.

The RSTD is the measurement taken between a pair of eNBs (see TS 36.214 Evolved Universal Terrestrial Radio Access (E-UTRA); Physical Layer measurements; Release 9). The measurement is defined as a relative timing difference between a subframe received from the neighboring cell j and a corresponding subframe of the serving cell i. Positioning Reference Signals are used to take these measurements. The results are reported back to the location server that calculates the position.

In an embodiment, a hybrid method can be defined to accommodate both the newly introduced PRS and the already existing reference signals. In other words, the hybrid method can use/operate with PRS, with other reference signals (e.g., cell or node-specific reference signals (CRS)), or with both signal types.

Such a hybrid method provides the advantage of allowing network operator(s) to dynamically choose the mode of operation depending on circumstances or network parameters. For example, the PRS have better hearability than CRS, but may result in up to 7% reduction in the data throughput. On the other hand, CRS signals do not cause any throughput reduction. In addition, CRS signals are backward compatible with all previous LTE releases, for example Rel-8 and lower. As such, the hybrid method provides a network operator the ability to trade-off or balance between hearability, throughput, and compatibility.

In Long Term Evolution (LTE) implementations, LTE downlink baseband signals (generated by a cell or wireless node and referred to herein as "nodes") are generally combined into downlink frames. A receiver for detecting and receiving such signals may detect downlink frames from multiple cells or nodes (two or more). Each downlink frame includes multiple CRS or reference signals. In a Downlink (DL) frame, these reference signals have predetermined positions in time and frequency, e.g., there are deterministic time offsets between the frame start and each CRS in a given frame.

In addition, each CRS is modulated with a special code. The modulation and the code are also predetermined. The CRS modulation is the same for all nodes, but the code (seed) is determined by the ID (identification) number of the node.

As a result, by knowing the node ID(s), it is possible to estimate a course location of a frame start time for each frame from each node (cell), in the spectrum of the reference signals. To do so, it is first necessary to determine the frame start times or frame starts for all DL signals from different nodes. For example, in an embodiment, by correlating the received DL baseband signal with known replicas of code modulated CRS (generated internally by a detector and/or a multipath mitigation processor) it is possible to find all CRS sequences or other reference signals from various nodes, and with this information find coarse location frame starts of all observable nodes. In an embodiment, the detector may also demodulate/decode the CRS and then correlate the demodulated/decoded CRS with baseband sub-carriers that are assigned to the CRS.

At the same time, in an embodiment, the CRS may also be used as ranging signals by the multipath mitigation processor. Therefore, in addition to finding coarse frame starts the detector's correlation process is also capable of isolating the CRS from other signals (such as payload) in the frame using the code that was used to modulate those signals. Thereafter, these isolated CRS, and associated frames starts, are transferred to a multipath mitigation processor for ranging.

A similar approach can be used in the Uplink mode, whereby timing offsets between different node receivers can be determined.

In a downlink embodiment, a system for tracking and locating one or more wireless network devices in communication with a network comprises a user equipment receiver configured to receive multiple signals from two or more nodes in communication with the network, the multiple signals being modulated with a code determined by an identification of each node of the two or more nodes transmitting the multiple signals, the user equipment receiver including a detector configured to detect and isolate reference signals from the multiple signals based on the identification, and a processor configured to use the reference signals as ranging signals from each node for tracking and locating the one or more wireless network devices.

In the embodiment, wherein the multiple signals from each node of the two or more nodes are combined into a frame that includes the reference signals, and wherein the detector is further configured to estimate a course location of frame starts from each node.

In the embodiment, wherein the detector is further configured to estimate the course location by correlating the reference signals with known replicas of such reference signals.

In the embodiment, wherein the detector is further configured to isolate the reference signals from any other signals in the frame, and wherein the detector is further configured to isolate the reference signals for each node of the two or more nodes.

In the embodiment, wherein the processor is at least one multipath mitigation processor, and wherein the multipath mitigation processor is configured to receive the course location and isolated reference signals and estimate a relative time of arrival of the ranging signals from each node.

In the embodiment, wherein the processor is at least one multipath mitigation processor.

In the embodiment, wherein the multiple signals from each node of the two or more nodes are in a frame, wherein the detector is further configured to estimate a course location of frame starts from each node, wherein the detector is configured to isolate the reference signals from any other signals in the frame, wherein the detector is further configured to isolate the reference signals for each node of the two or more nodes, wherein the detector is configured to pass the course location and isolated reference signals for each node to the multipath mitigation processor, and wherein the multipath mitigation processor is configured to receive the course location and isolated reference signals and estimate a relative time of arrival of the ranging signals from each node.

In the embodiment, the system further comprises an uplink embodiment where a node receiver is configured to receive device signals from the one or more wireless network devices, the device signals being modulated with a device code determined by a device identification of each wireless network device of the one or more wireless network devices transmitting the device signals, the node receiver including a device detector configured to detect and isolate device reference signals from the device signals based on the device identification, and a second processor is configured to use the device reference signals as ranging signals from each wireless network device for tracking and locating the one or more wireless network devices.

In an embodiment, a system for tracking and locating one or more wireless network devices in communication with a network, comprises a user equipment receiver configured to receive multiple signals from two or more nodes in communication with the network, the multiple signals being modulated with a code determined by an identification of each node of the two or more nodes transmitting the multiple signals, and a processor configured to detect and isolate reference signals from the multiple signals based on the identification and to use the reference signals as ranging signals from each node for tracking and locating the one or more wireless network devices.

In the embodiment, wherein the multiple signals from each node of the two or more nodes are combined into a frame that includes the reference signals, and wherein the processor is further configured to estimate a course location of frame starts from each node.

In the embodiment, wherein the processor is further configured to estimate the course location by correlating the reference signals with known replicas of the reference signals.

In the embodiment, wherein the processor is further configured to estimate a relative time of arrival of the ranging signals from each node based on the course location and isolated reference signals.

In the embodiment, wherein the processor is further configured to isolate the reference signals from any other signals in the frame, and wherein the processor is further configured to isolate the reference signals for each node of the two or more nodes.

In the embodiment, wherein the multiple signals from each node of the two or more nodes are in a frame, wherein the processor is further configured to estimate a course location of frame starts from each node by correlating the reference signals with known replicas of the reference signals, wherein the processor is further configured to isolate the reference signals from any other signals in the frame and to isolate the reference signals for each node of the two or more nodes, and wherein the processor is further configured to estimate a relative time of arrival of the ranging signals from each node based on the course location and isolated reference signals.

In an embodiment, a system for tracking and locating one or more wireless network devices in communication with a network, comprises a detector configured to receive multiple signals from two or more nodes in communication with the network, the multiple signals being modulated with a code determined by an identification of each node of the two or more nodes transmitting the multiple signals, and to detect and isolate reference signals from the multiple signals based on the identification, and a processor configured to use the reference signals as ranging signals from each node for tracking and locating the one or more wireless network devices.

In the embodiment, wherein the multiple signals from each node of the two or more nodes are combined into a frame that includes the reference signals, and wherein the detector is further configured to estimate a course location of frame starts from each node.

In the embodiment, wherein the detector is further configured to estimate the course location by correlating the reference signals with known replicas of such reference signals.

In the embodiment, wherein the detector is further configured to isolate the reference signals from any other signals in the frame, and wherein the detector is further configured to isolate the reference signals for each node of the two or more nodes.

In the embodiment, wherein the processor is at least one multipath mitigation processor, and wherein the multipath mitigation processor is configured to receive the course location and isolated reference signals and estimate a relative time of arrival of the ranging signals from each node.

In the embodiment, wherein the processor is at least one multipath mitigation processor.

In the embodiment, wherein the multiple signals from each node of the two or more nodes are in a frame, wherein the detector is further configured to estimate a course location of frame starts from each node, wherein the detector is configured to isolate the reference signals from any other signals in the frame, wherein the detector is further configured to isolate the reference signals for each node of the two or more nodes, wherein the detector is configured to pass the course location and isolated reference signals for each node to the multipath mitigation processor, and wherein the multipath mitigation processor is configured to receive the course location and isolated reference signals and estimate a relative time of arrival of the ranging signals from each node.

In an embodiment, a system for tracking and locating one or more wireless devices in communication with a network, comprises a node receiver configured to receive device signals from the one or more wireless network devices, the device signals being modulated with a device code determined by a device identification of each wireless network device of the one or more wireless network devices transmitting the device signals, the node receiver including a device detector configured to detect and isolate device reference signals from the device signals based on the device identification, and a processor configured to use the device reference signals as ranging signals from each wireless network device for tracking and locating the one or more wireless network devices.

Furthermore, the hybrid method can be transparent to the LTE UE positioning architecture. For instance, the hybrid method can operate in the 3GPP TS 36.305 framework.

In an embodiment, RSTD can be measured and, according to the 3GPP TS 36.305, transferred from a UE to an E-SMLC.

The UL-TDOA (U-TDOA) is currently in a study phase and is expected to be standardized in the upcoming release 11.

Figure 16:
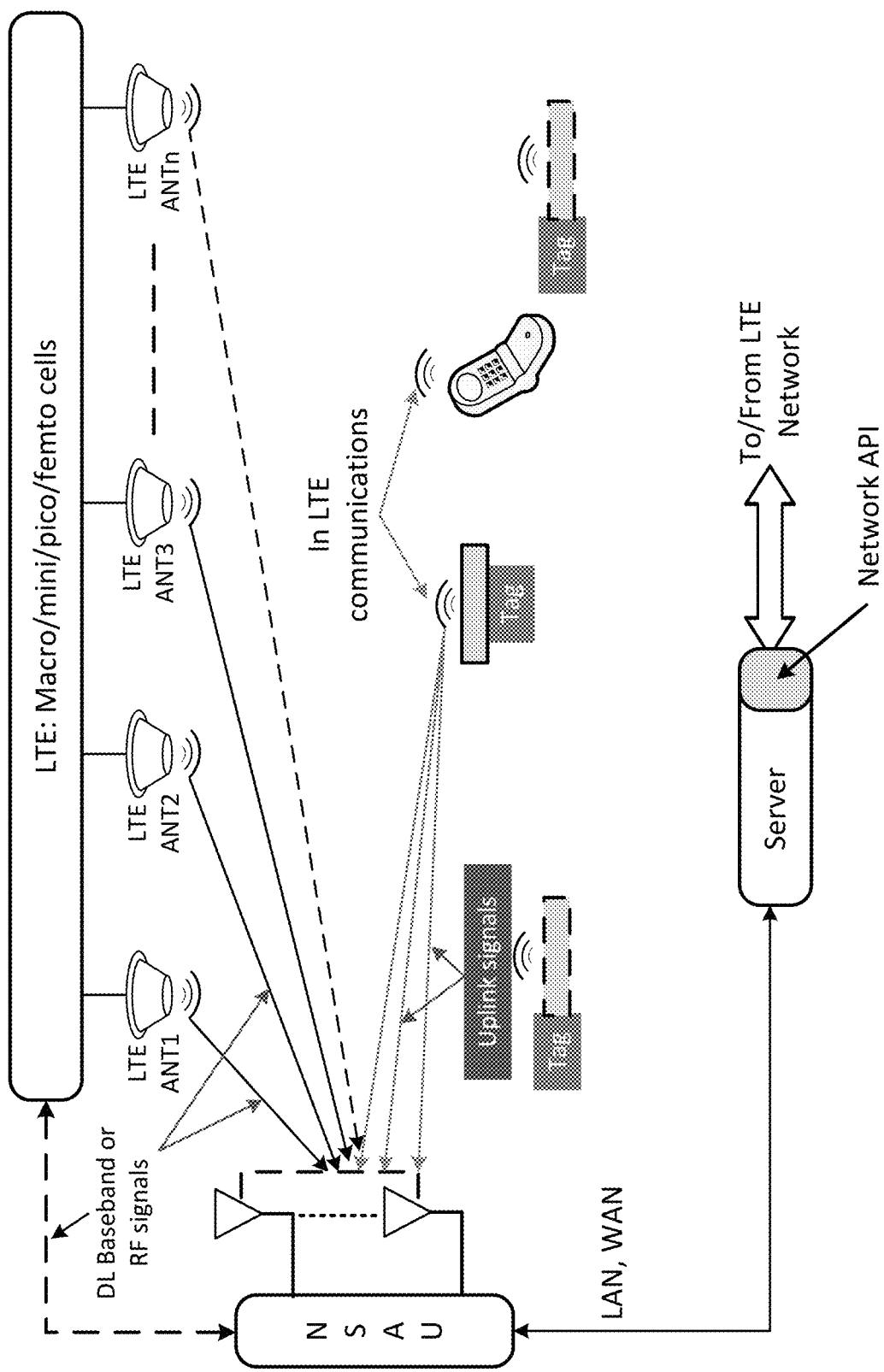
FIG. 16 illustrates an embodiment of a wireless network locate uplink ecosystem for enterprise applications.
Figure 17:
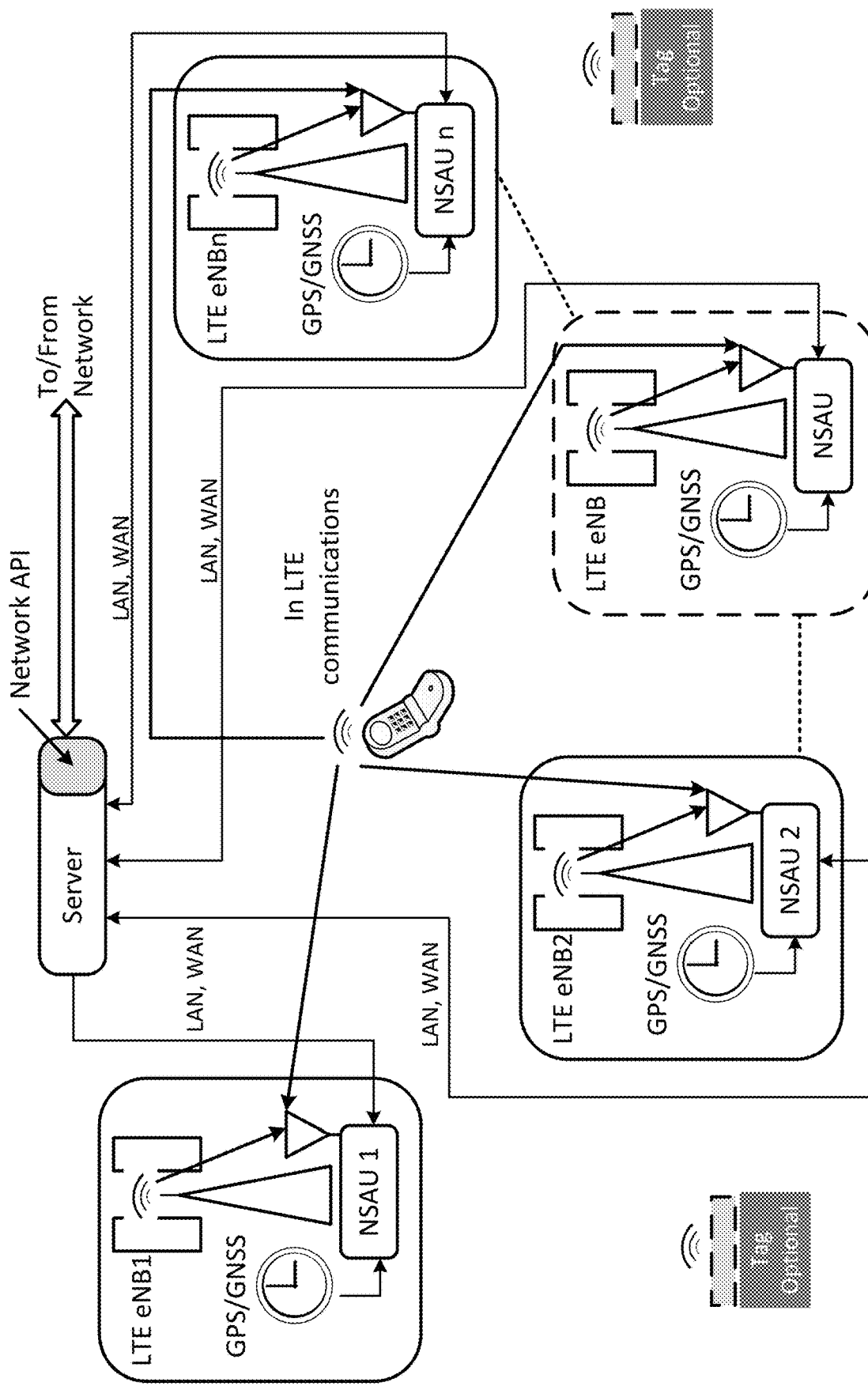
FIG. 17 illustrates an embodiment of a wireless network locate uplink ecosystem for network wide applications.
Figure 18:
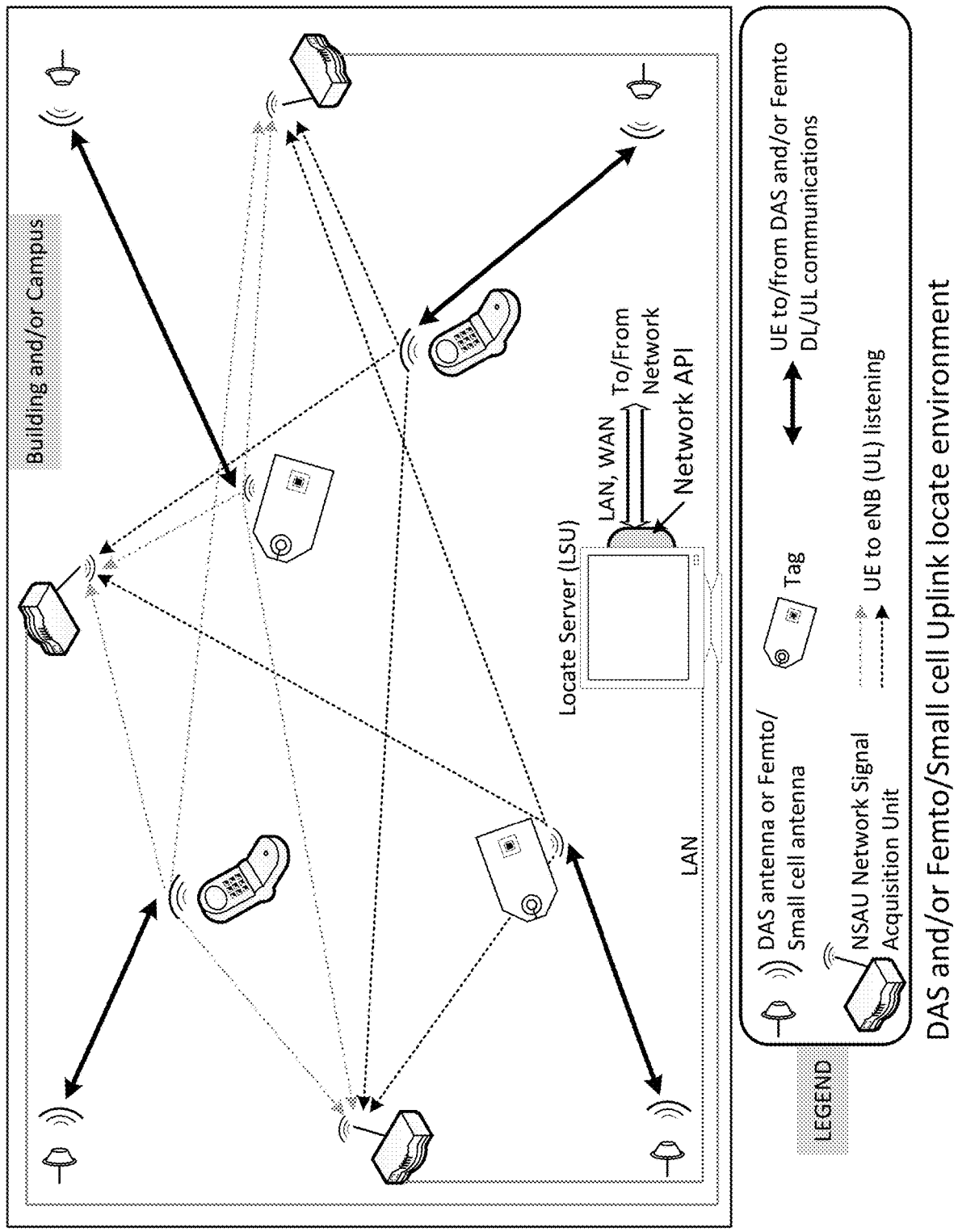
FIG. 18 illustrates an embodiment of an UL-TDOA environment that may include one or more DAS and/or femto/small cell antennas.
Figure 19:
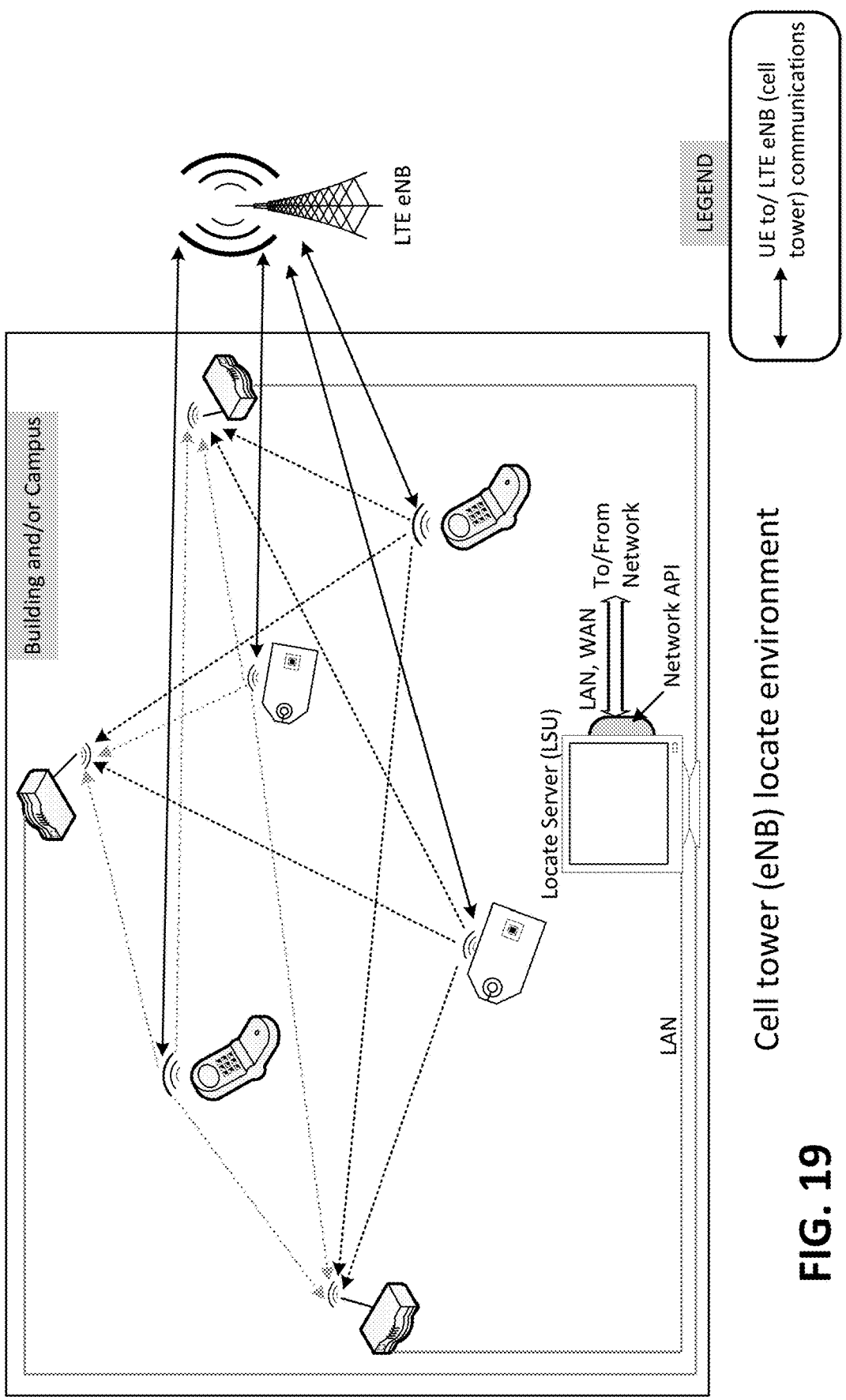
FIG. 19 illustrates an embodiment of an UL-TDOA like that of FIG. 18 that may include one or more cell towers that can be used in lieu of DAS base stations and/or femto/small cells.

Embodiments of the UL-TDOA (Uplink) are described herein above and are also shown in FIGS. 16 and 17. FIGS. 18 and 19, described herein below, provide examples of alternative embodiments of the UL-TDOA.

FIG. 18 presents an environment that may include one or more DAS and/or Femto/Small cell antennas. In this example embodiment, each NSAU is equipped with a single antenna. As depicted, at least three NSAUs are required. However, additional NSAUs can be added to improve hearability because each UE must be "heard" by at least three NSAUs.

Furthermore, the NSAU(s) can be configured as receivers. For example, each NSAU receives but does not transmit information over the air. In operation, each NSAU can listen to the wireless Uplink network signals from UEs. Each of the UEs can be a cell phone, a Tag, and/or another UE device.

Moreover, the NSAUs can be configured to communicate with a Locate Server Unit (LSU) over an interface, such as a wired service or a LAN. In turn, the LSU can communicate with a wireless or an LTE network. The communication can be via a network API, where the LSU can, for example, communicate with an E-SMLC of the LTE network and can use a wired service such as a LAN and/or a WAN.

Optionally, the LSU may also communicate directly with DAS base station(s) and or Femto/Small cells. This communication can use the same or a modified Network API.

In this embodiment, the Sounding Reference Signal (SRS) can be used for locate purposes. However, other signals may also be employed.

The NSAUs can convert the UE Uplink transmission signals to a digital format, for example I/Q samples, and can periodically send a number of the converted signals to the LSU with a time stamp.

The DAS base station(s) and or Femto/Small cells can pass to the LSU one or all of the following data:
1) the SRS, the I/Q samples, and the time stamp;
2) a list of served UE IDs; and
3) SRS schedule per UE with a UE ID, the schedule including SRS SchedulingRequestConfig information and SRS-UL-Config information.

The information passed to the LSU may not be limited by the abovementioned information. It can include any information needed to correlate each UE device uplink signal, such as a UE SRS, with each UE ID.

The LSU functionality can include ranging calculations and obtaining the location fix of a UE. These determinations/ calculations can be based on the information passed from the NSAUs, the DAS bases stations, and/or Femto/Small cells to the LSU.

The LSU may also determine timing offsets from the available downlink transmission information passed from the NSAUs to the LSU.

In turn, the LSU can provide the wireless or LTE network with UE location fix and other calculations and data. Such information can be communicated via the Network API.

For synchronization purposes, each NSAU may receive, process, and time stamp samples of Downlink signals. Each NSAU may also periodically send a number of such samples to the LSU, including the time stamp(s).

Additionally, each NSAU may include an input configured for synchronization with external signal(s).

FIG. 19 depicts another embodiment of a UL-TDOA. In addition to the components depicted under FIG. 18, the environment of this embodiment may include one or more cell towers that can be used in lieu of the DAS base stations and/or Femto/Small cells. Data from the one or more cell towers can be used to obtain the location fix of a UE.

As such, an advantage of this embodiment includes obtaining a location fix with only a single cell tower (eNB). In addition, this embodiment can be configured to operate in a similar manner as described under FIG. 18, with the exception that one or more eNBs can replace the DAS base stations and/or the Femto/Small cells.

Figure 20:
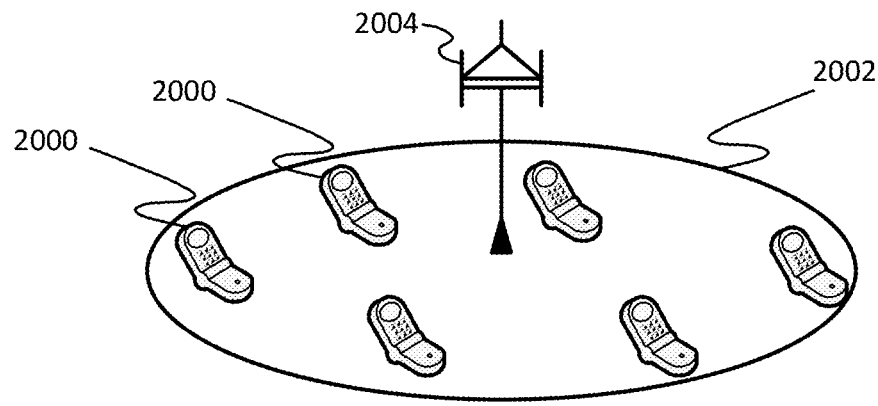
FIG. 20 illustrates an embodiment of cell level locating.
Figure 21:
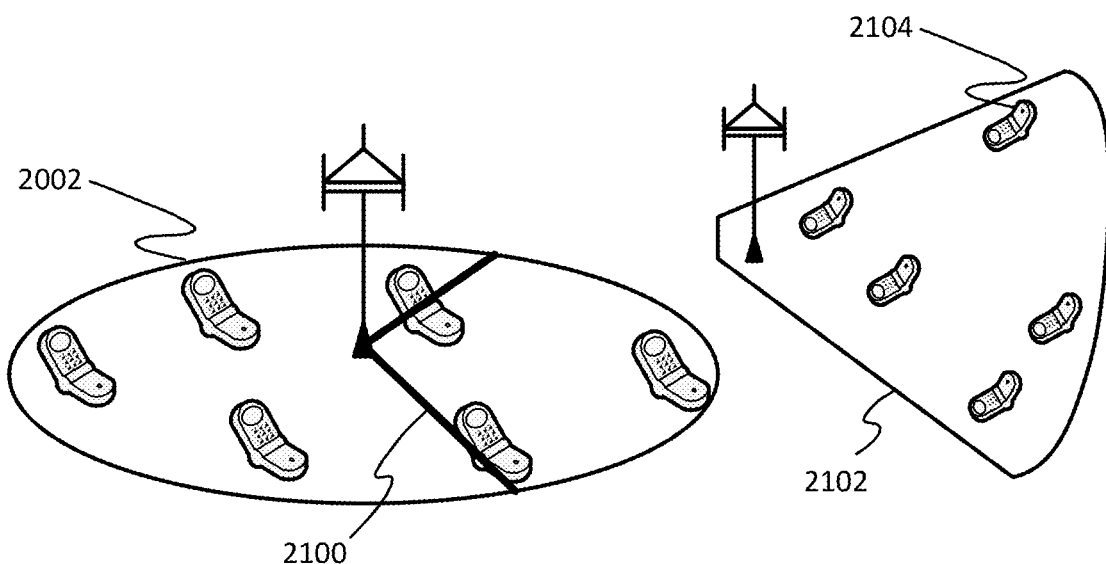
FIG. 21 illustrates an embodiment of serving cell and sector ID locating.

One method of uplink locating of UE is the Cell Identification method (CID). In the basic CID method, the UE position may be determined on the cell level. This method is purely network based. As a result, the UE, for example a handset, is not aware of the fact that it is being tracked. While this is a relatively simple method, it lacks accuracy because the locate uncertainty is equal to the cell diameter. For example, as illustrated in FIG. 20, any of the handsets 2000 within the cell diameter 2002 of a serving cell tower 2004 effectively have the same location, even though they are not at the same location. The accuracy of the CID method can be improved when combined with serving sector identification (sector ID) knowledge. For example, as illustrated in FIG. 21, sector ID 2100 identifies a section 2102 within the cell diameter 2002 that includes a number of handsets 2104 that are known to have a different location than the other handsets 2000 in other sectors of the cell diameter 2002.

Further enhancement to the CID method may be possible through the Enhanced Cell ID (E-CID) method, which provides further refinements to the basic CID method described above. One enhancement uses timing measurements to calculate how far away the UE is from the eNB (the network node). This distance can be calculated as half the round trip time (RTT), or Timing Advance (TA) in LTE (LTE TA), times the speed of light. If the UE is connected, then RTT or TA may be used for distance estimation. In this case both: the serving cell tower or sector and the UE (upon the serving eNB command) will measure the timing difference between Rx sub-frames and Tx sub-frames. The UE will report its measurements to the eNB (also under the eNB control). It should be noted that LTE Rel-9 adds the TA type 2 measurements that rely on the timing advance estimated from receiving a PRACH preamble during the random access procedure. A PRACH (physical/packet random access channel) preamble specifies the maximum number of preambles to be sent during one PRACH ramping cycle when no response is received from the UE being tracked. The LTE Type 1 TA measurement is the equivalent to the RTT measurement, as follows:

RTT=TA(type 1)=eNB(Rx-Tx)+UE(Rx-Tx)

With knowledge of the eNB's coordinates and the height of the serving cell tower antenna, the position of the UE can be calculated by the network.

The E-CID locating method is still limited, however, because in one dimension the locate accuracy depends upon the sector width and the distance from the serving cell tower, and in the other dimension the error depends upon the TA (RTT) measurement accuracy. The sector width varies with network topology and is impacted by the propagation phenomena, specifically multipath. Sector accuracy estimates vary from 200 meters to in excess of 500 meters. The LTE TA measurement resolution is 4 Ts, which corresponds to 39 meters of maximum error. The actual error in the LTE TA measurement is even larger, however, due to calibration inaccuracies and the propagation phenomena (multipath), and may reach as much as 200 meters.

Figure 22:
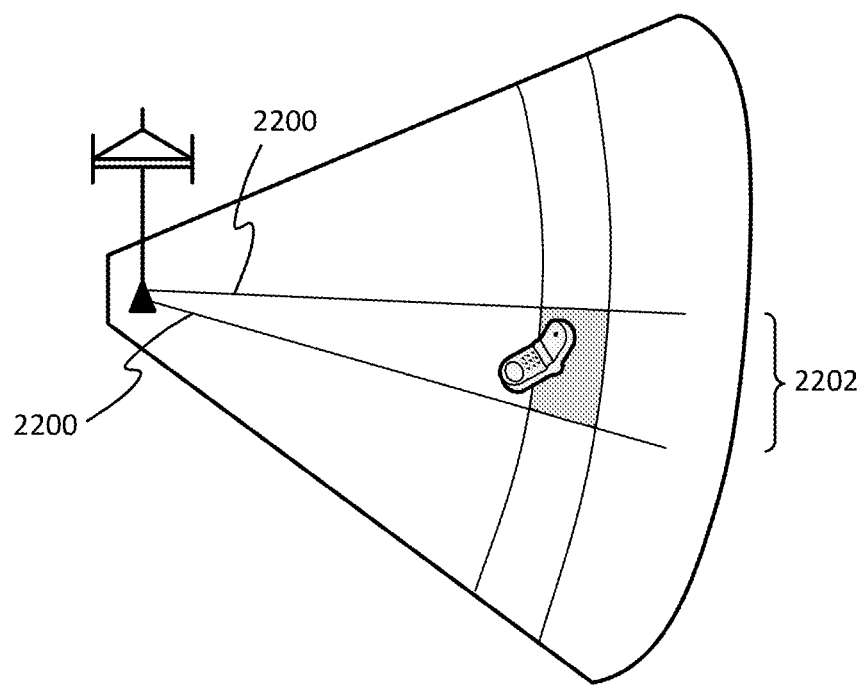
FIG. 22 illustrates an embodiment of E-CID plus AoA locating.
Figure 23:
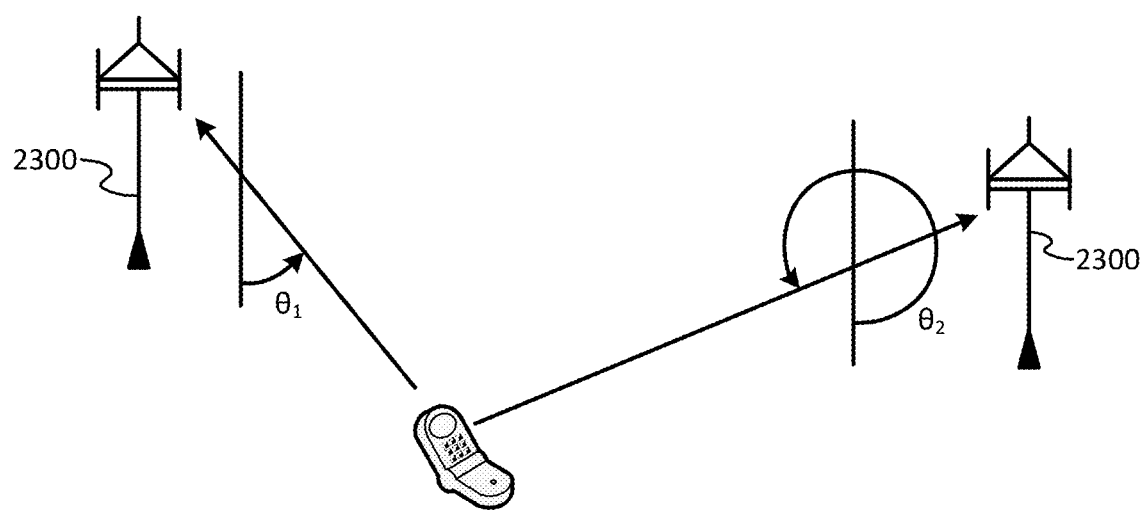
FIG. 23 illustrates an embodiment of AoA locating.

As illustrated in FIG. 22 the E-CID method may be further improved with the addition of a feature known as Angle of Arrival (AoA). The eNB estimates the direction from which the UE is transmitting using a linear array of equally spaced antenna elements 2200. Typically, reference signals are used for the AoA determination. When reference signals are received from the UE at two adjacent antenna elements 2200, the reference signals may be phase rotated, as shown in FIG. 23 by an amount which depends on the AoA, the carrier frequency, and the element spacing. The AoA will require each eNB to be equipped with antenna arrays/adaptive antennas. It is also exposed to multipath and topology variances. Nevertheless, sophisticated antenna arrays can significantly reduce the width 2202 of the sector 2100, which may lead to better locate accuracy. Moreover, if two or more serving cell towers 2300 (eNB's base stations equipped with directional antenna arrays) can be used to make the handset AoA determination, as illustrated in FIG. 23 then the accuracy may be considerably improved. In such a case, the accuracy is still subject to the multipath/propagation phenomena.

Deploying antenna arrays/adaptive antennas network-wide over multiple LTE bands requires a monumental effort in terms of capital, time, maintenance, etc. As a result, the antenna arrays/adaptive antennas have not been deployed for the purpose of UE locating. Other approaches, such as signal strength based methods, do not produce significant accuracy improvement. One such signal strength approach is finger-printing, which requires creating and continuously updating an enormous, continuously changing (in time) fingerprint database, e.g. large capital and reoccurring expenses without significant accuracy improvement. Moreover, fingerprinting is UE based technology, whereby the UE position cannot be determined without UE assistance on the UE application level.

A solution to the limitations of other uplink location methods involves the use of AoA capabilities without the need for antenna arrays/adaptive antennas. Such an embodiment may employ TDOA (Time Difference of Arrival) location techniques for AoA determination, which may be based on estimating the difference in the arrival times of the signal from the source at multiple receivers. A particular value of the time difference estimate defines a hyperbola between two receivers in communication with a UE. When the distance between the receiving antennas is small relative to the distance of the emitter (the handset) being located, then the TDOA is equivalent to the angle between the baseline of the sensors (receivers antennas) and the incident RF energy from the emitter. If the angle between the baseline and true North is known, then the line of bearing (LOB) and/or AoA can be determined.

While general locate methods that use either TDOA or LOB (also known as AoA) are known, TDOA locate methods have not been used to determine LOB because the TDOA reference points are too close to one another to make the accuracy of such a technique acceptable. Rather, LOB is usually determined using directional antennas and/or beamforming antennas. The super resolution methods described herein, however, make it possible to use TDOA for LOB determination while dramatically improving accuracy. In addition, without the reference signal processing techniques described herein, it may not be possible to "hear", e.g. detect, reference signals coming from a UE outside of the serving sectors, e.g. by the non-serving sectors and/or antennas. Without the resolution and processing capabilities described herein, it may not be possible to employ TDOA for LOB determination because at least two points of reference are needed, e.g. two or more sectors and/or antennas). Similarly, a UE may not be able to detect reference signals coming to the UE from other than serving sectors, e.g. from the non-serving sectors and/or antennas.

Figure 24:
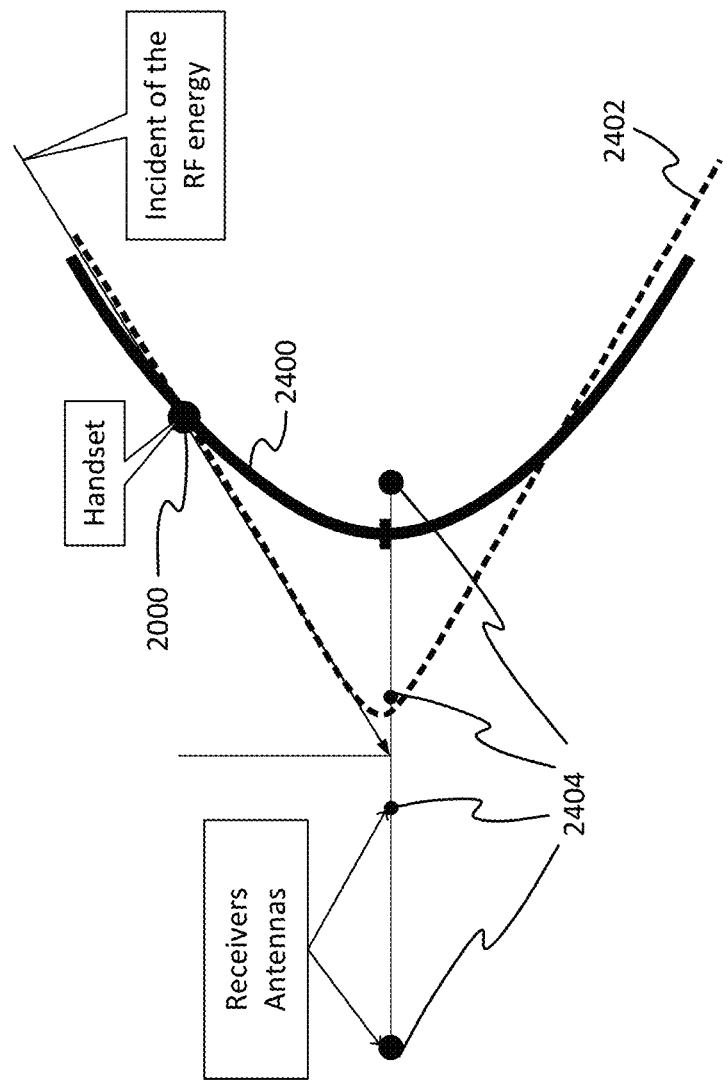
FIG. 24 illustrates an embodiment of TDOA with wide and close distances between receiving antenna.

For example, in FIG. 24 two antenna separation scenarios are illustrated: wide separation and close (small) separation. In both scenarios the hyperbola 2400 and the incident line 2402 are crossing at the handset 2000 location, but in the case of where the antenna 2404 separation is wide, this happens at a steeper angle, which in turn substantially reduces the locate error. At the same time, in case of the antennas 2404 being close to each other the hyperbola 2400 becomes interchangeable with the line 2402 of the RF energy incident or the LOB/AoA.

The formula set forth below can be used to determine the incident RF energy from the emitter, where the time difference in arrival time of RF energy between two antennas (sensors) is given by:

$$\Delta t = \frac{x \sin \Theta}{c}$$

where:
$\Delta t$ is the time difference in seconds;
x is the distance between the two sensors in meters;
$\Theta$ is the angle between the baseline of the sensors and the incident RF wave, in degrees;
and
c is the speed of light.

Several locate strategies are available through use of the TDOA locating embodiment, including: (1) when the TDOA measurements (multilateration) between two or more serving cells are available, e.g., wide separation; (2) when the TDOA measurements are only from two or more sectors at one or more serving cells, e.g., small antenna separations, such LOB/AoA; (3) a combination of strategies (2) and (3); and (4) a combination of TA measurements and strategies (1)-(3), e.g., improved E-CID.

As further explained below, in the case of closely positioned antennas, the TDOA locating embodiment may use a line of bearing when the signals from two or more antennas are from the same cell tower. These signals can be detected in the received composite signal. By knowing the tower location and the azimuth of each sector and/or antenna, the line of bearing and/or AoA can be calculated and utilized in the location process. The LOB/AoA accuracy may be impacted by multipath, noise (SNR), etc., However, this impact may be mitigated by advanced signal processing and the multipath mitigation processing techniques described above, which may be based on super resolution technology. Such advanced signal processing includes, but is not limited to, signal correlation/correlating, filtering, averaging, synchronous averaging and other methods/techniques.

Figure 25:
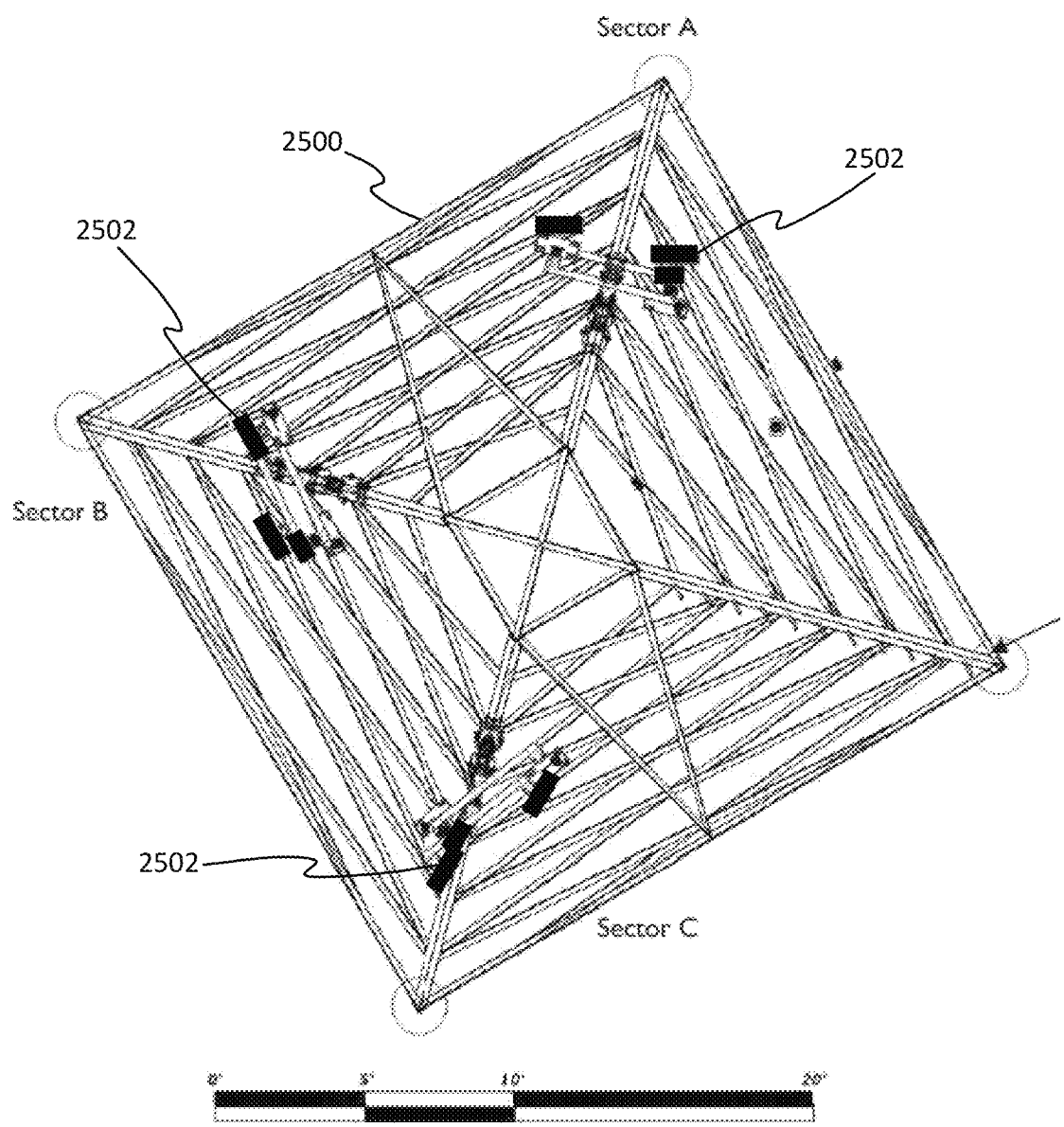
FIG. 25 illustrates an embodiment of a three sector deployment.

The serving cell tower 2500 typically consists of multiple sectors, as illustrated in FIG. 25 which shows a three sector (Sector A, Sector B and Sector C) configuration. The three sector deployment illustrated may include one or more antennas 2502 per sector. A single sector, such as sector A, may be in control of the UE (handset) because the handset transmissions will be in Sector A's main lobe (the main lobe's center coincides with the sector azimuth). At the same time the handset transmissions will fall outside Sectors B's and C's main lobes, e.g., into antennas side lobes. Thus, the handset signals will still be present in the output signal spectrums of Sectors B and C, but will be significantly attenuated relative to signals from other handset(s) that are located in Sector B's or Sector C's main lobes. Nevertheless, through the use of advanced signal processing, as described above and below, it is possible to obtain sufficient processing gain on ranging signals to make them detectable from the neighboring sectors' side lobes, such as the Sector B and Sector C side lobes. For network-based locating purposes, the LTE Uplink SRS (Sounding Reference Signals) may be employed as ranging signals.

In other words, while the UE uplink reference signal might be in the side lobe of the neighboring sector(s) antennas, the processing gain through reference signal processing methods described herein may be sufficient to allow a calculation of TDOA between the two (or more) sector antennas. The accuracy of this embodiment may be significantly enhanced by the multipath mitigation processing algorithms described above. Thus, LOB/AOA intersected with the annulus calculated by the LTE TA timing may provide a UE location to within an error ellipse of approximately 20 meters by 100 meters.

Further locate error reduction may be achieved when the UE can be heard by two or more LTE towers, which is highly probable with the processing gains and multipath mitigation technology described above, In such a case, the intersection of the TDOA hyperbola and one or more LOB/AoA lines may result in a 30 by 20 meter error ellipse (for a two sector cell tower). If each cell tower supports three or more sectors, then the error ellipse may be further reduced down to 10-15 meters. If the UE is heard by three or more eNB's (cell towers), then 5 to 10 meters accuracy may be achieved. In high value areas, such as malls, office parks and the like, additional small cells or passive listening devices may be used to create the necessary coverage.

As was mentioned, above each sector of the cell tower 2500 may include one or more antennas 2502. In a typical installation, for a given sector, signals from each antenna are combined at the sector's receiver input. As a result, for locate purposes, two or more sector antennas can be viewed as a single antenna with composite directionality pattern, azimuth and elevation. The hypothetical antenna composite directionality and its (main lobe) azimuth and elevation may also be assigned to the sector itself.

In an embodiment, the received signals (in a digital format) from all sectors of each serving cell tower and neighboring serving cell towers are sent to a locate server unit (LSU) for location determination. Also, SRS schedules and TA measurements per each served UE is provided to the LSU by each serving sector from each serving cell tower. Assuming that each serving cell tower and each neighboring cell tower location coordinates, the number of sectors per tower with each hypothetical (composite) sector antenna azimuth and elevation, and each sector position at the cell tower are known, the LSU may determine each UE position relative to the serving cell tower and/or neighboring cell towers. All of the abovementioned information may be sent through wired networks, for example LAN, WAN, etc., using one or more standardized or proprietary interfaces. The LSU may also interface the wireless network infrastructure using a standardized interface and/or a network carrier's defined interface/API. The location determination may also be split between the network node and the LSU or performed solely in the network node.

In an embodiment, the location determination may be performed in the UE or split between the UE and LSU or network node. In such cases, the UE may communicate over the air using standard networking protocols/interfaces. In addition, the location determination can be performed through a combination of the UE, the LSU and/or network nodes, or the LSU functionality can be implemented (embedded) into a SUPL server, a E-SMLC server, and/or a LCS (LoCation Services) system that can then be used in place of the LSU.

Embodiments of a Downlink (DL) locate method are reciprocals to the Uplink (UL) locate embodiments described above. In a DL embodiment, a sector may become a transmitter with a transmit pattern, azimuth and elevation that matches the sector's received directionality, azimuth and elevation. Unlike the uplink embodiments, in DL embodiments, the UE typically has a single receive antenna. Thus, for UE there is no sensors baseline that can be used to determine the RF wave incident. However, the UE can determine the TDOA(s) between different sectors and consequently a hyperbola(s) (multilateration) between sectors, and because the same cell tower sectors are close to each other the hyperbola becomes interchangeable with the line of the RF energy incident or the LOB/AoA, as described above with reference to FIG. 24 While the LOB/AoA accuracy may be impacted by multipath, noise (SNR), etc., this impact may be mitigated through use of the advanced signal processing and the multipath mitigation processing, which is based on the super resolution technology, described above.

As noted, UE DL locating can be accomplished in ways that are similar to the UE uplink locating, with the exception of that the RF wave incident angle cannot be determined from the formula above. Instead, the multilateration technique may be used for determining the LOB/AoA for each serving cell tower.

UE DL locate embodiments also employ reference signals. In the DL case, one approach for such network-based locating may be to employ the LTE Cell-Specific Reference Signals (CRS) as ranging signals. Also, Position Reference Signals (PRS) introduced in LTE Release 9 may be used. Thus, locate may be done using CRS only, PRS only, or both CRS and PRS.

As with UE uplink locate embodiments, for UE downlink locate embodiments, a snap-shot of the UE received signal in digital format may be sent to the LSU for processing. The UE may also obtain the TA measurements and provide those to the LSU. Optionally, TA measurements per each served UE may be provided to the LSU by each serving sector from each serving cell tower (network node). As previously noted, assuming that each serving cell tower and each neighboring cell tower location coordinates, the number of sectors per tower with each sector transmit pattern azimuth and elevation, and each sector position at the tower are known, the LSU may determine each UE position relative to the serving cell tower and/or neighboring cell towers. In embodiments, the location determination may be performed in the UE or split between the UE and LSU or network node. In embodiments, all location determinations can be performed in the LSU or the network node or split between the two.

The UE will communicate/receive measurements results and other information over the air using standard wireless protocols/interfaces. The information exchange between the LSU and network node(s) may be through wired networks, for example LAN, WAN, etc., using proprietary and/or one or more standardized interfaces. The LSU may interface the wireless network infrastructure using a standardized interface and/or network carrier's defined interface/API. The location determination may also be split between the network node and the LSU or performed solely in the network node.

Figure 26:
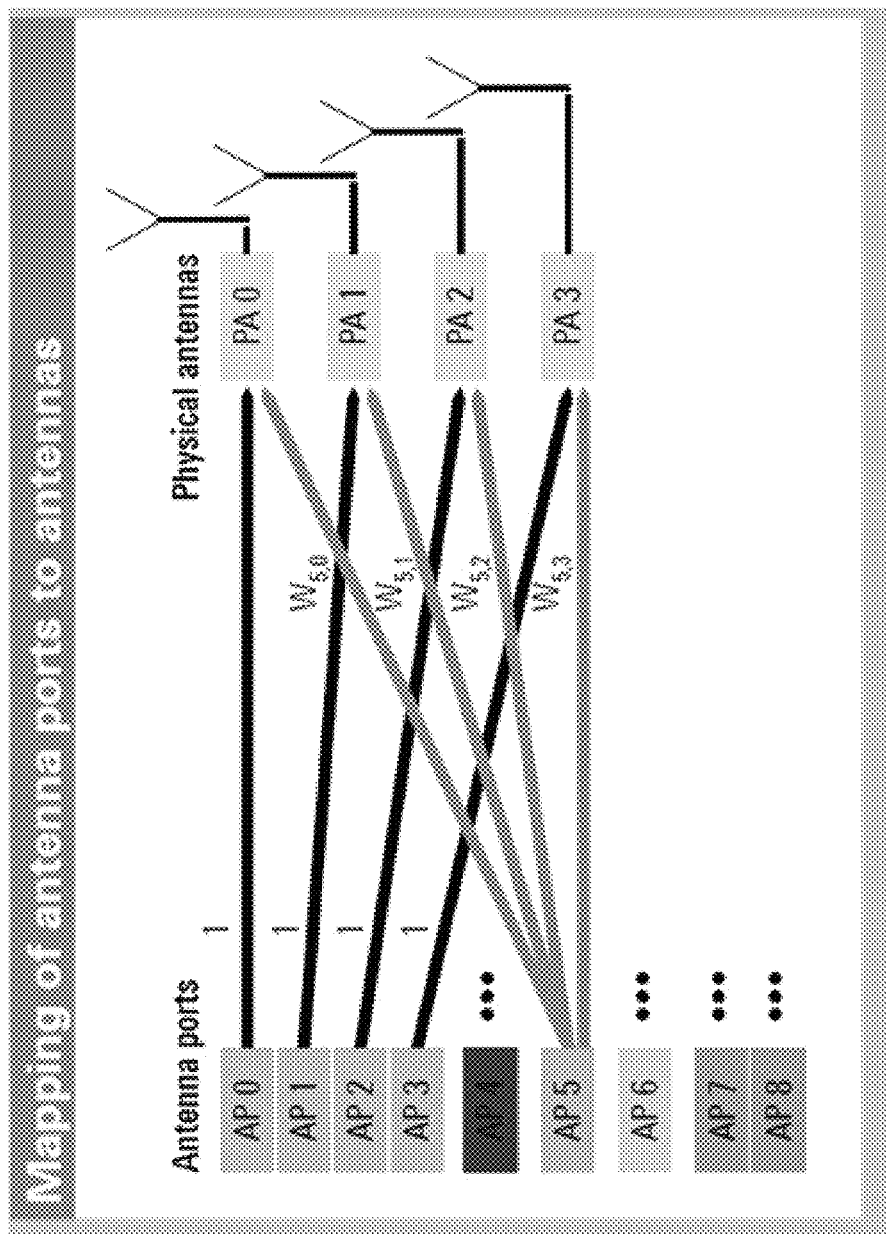
FIG. 26 illustrates an embodiment of antenna ports mapping.

For the UE DL location embodiments described above, antenna port mapping information can also be used to determine location. The 3GPP TS 36.211 LTE standard defines antenna ports for the DL. Separate reference signals (pilot signals) are defined in the LTE standard for each antenna port. Thus, the DL signals also carry the antenna port information. This information is included in the PDSCH (Physical Downlink Shared Channel). The PDSCH uses the following antenna ports: 0; 0 and 1; 0, 1, 2 and 3); or 5. These logical antenna ports are assigned (mapped) to the physical transmit antennas, as illustrated in FIG. 26 As a result, this antenna port information can be used for the antenna identification (antenna ID).

For example, the antenna port mapping information can be used to determine the RF wave incident and the hyperbola(s) (multilateration) between antennas (assuming that the antennas locations are known). Depending upon where the location determination is performed, the antenna mapping information must be available to the LSU or UE, or network node. It should be noted that antenna ports are indicated by placing CRS signals in different time slots and different resource elements. Only one CRS signal is transmitted per DL antenna port.

In the event of MIMO (Multiple Input Multiple Outputs) deployment in the eNB or network node, receiver(s) may be able to determine the time differences of arrivals from a given UE. With knowledge of antennas to the receiver(s) mapping, e.g. MIMO mapping, including antennas locations, it may also be possible to determine the RF wave incident (LOB/AoA) to antennas and the hyperbola(s) (multilateration) for given eNB antennas. Likewise, at the UE, the UE receiver(s) may be able to determine the time differences of arrival(s) from two or more eNB or network node, and MIMO antennas. With knowledge of the eNB antenna locations and antennas mapping, it will be possible to determine the RF wave incident (LOB/AoA) from antennas and the hyperbola(s) (multilateration) for given eNB antennas. Depending on where the location determination is performed; the antenna mapping information has to be available to the LSU or UE, or network node.

There are other configurations that are subsets of MIMO, such as Single Input Multiple Outputs (SIMO), Single Output Multiple Inputs (SOMI), Single Input Single Output (SISO), etc. All of these configurations may be defined/determined by the antenna ports mapping and/or MIMO antenna mapping information for locate purposes.

In an aspect, the present embodiments relate to methods and systems for RF-based identification, tracking, and locating of objects, including RTLS. According to one embodiment, the methods and systems employ geographically distributed clusters of receivers and/or transmitters that are precisely synchronized in time, e.g., within 10 ns or better, within each cluster, while the inter-cluster time synchronization can be much less accurate or not required at all. While a precise synchronization time of 10 ns or better is described with respect to one particular embodiment, it is important to note that the predetermined synchronization time required to achieve an accurate location depends on the equipment being utilized. For example, for some wireless system equipment, where an accuracy of 3 m is required for an accurate location determination, the predetermined time may need to be 10 ns or better, but with other wireless system equipment, a location accuracy of 50 m may be more than sufficient. Hence, the predetermined time is based on the desired accuracy location for the wireless system. The disclosed methods and systems are a significant improvement to the existing implementation of tracking and location DL-OTDOA and U-TDOA techniques, which rely on geographically distributed standalone (individual) transmitters and/or receivers.

For example, in the DL-OTDOA technique, the relative timing difference between signals coming from neighboring base stations (eNB) is calculated and the UE position can be estimated in the network with the UE (handset) with or without UE assistance or in the UE (handset) with network assistance (control plane or user plane with SUPL based only) or without the network assistance. In DL-OTDOA, once the signals from three or more base stations are received, the UE measures the relative timing difference between signals coming from a pair of base stations and produces hyperbolic lines of position (LOPs). At least three reference points (base stations not belonging to a straight line) are needed to define two hyperbolas. The location (position fix) of the UE is in the intersection of these two hyperbolas (see FIG. 11). The UE position fix is relative to the base stations' RF emitters' (antennas) locations. As an example, when using the LPP (LTE Positioning Protocol, Rel-9) the DL-OTDOA locating is UE assisted and the E-SMLC (Evolved Serving Mobile Location Centre) is server based.

The U-TDOA technique is similar to the DL-OTDOA, but the roles are reversed. Here, the neighboring Location Management Unit (LMU) calculates the Relative Time of Arrival of the uplink signal coming from the UE (handset) and the UE position can be estimated in the network without the UE assistance. Thus, the U-TDOA is LMU assisted and the E-SMLC (Evolved Serving Mobile Location Centre) is server based. Once the Relative Time of Arrival values from three or more LMUs are available, the network's E-SMLC server produces hyperbolic lines of position (LOPs) and the location (position fix) of the UE (see FIG. 27). The UE position fix is relative to the LMUs antennas locations. In an aspect, unlike the DL-OTDOA, the eNB's (base station's) time synchronization in case of U-TDOA is not necessary—only the LMU(s) will need precision time synchronization for locating purposes. As an example, the LMU is essentially a receiver with computing capabilities. As a further example, the LMU receiver employs the SDR (Software Defined Radio) technology. In a further example, the LMU may be a small cell, macro cell or a special purpose small cell type device that only receives.

Regardless of the implementation, correlating the location of the SRS for the specific UE, as provisioned by the network, will enable identification and location of the UE. Location of the SRS may be done at the network level or within a local sector, such as a DAS for a building, a small cell or combination of small cells and macro cells that serve a specific area. If the location of the SRS for the UE is not known a priori, the solution may be able to correlate the UE's location through the covered area. Doing so will show the location history of where the UE has traveled. In some circumstances, it may be desirable to determine the location of the UE, even if the network does not provide an indication of where the SRS is located for a particular UE. The location of the UE may be correlated with the SRS by determining the location or proximity of the UE to a known point, thereby correlating the UE with the SRS it is transmitting. Such location can be accomplished through other location/proximity solutions, such as Wi-Fi and Bluetooth. The user may also identify their location via a UE application or by walking over to a predetermined location in order to identify their UE to a location solution.

Figure 11:
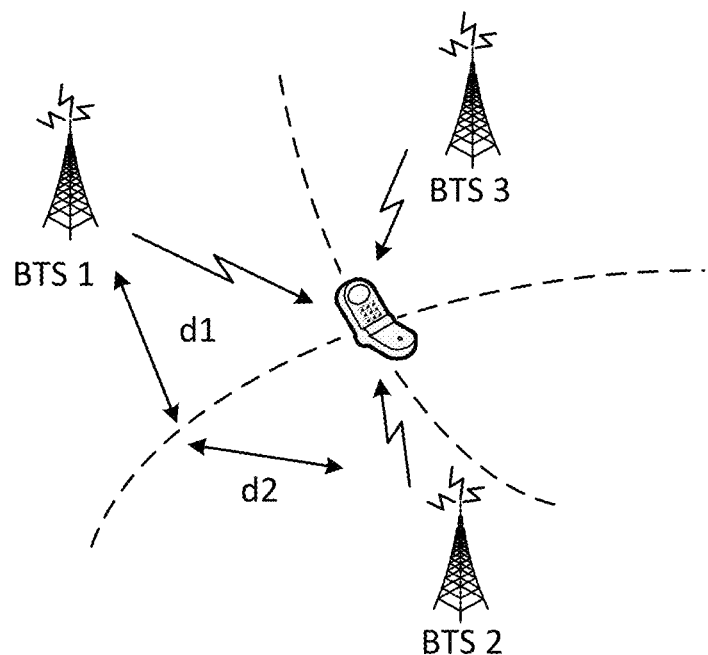
FIG. 11 illustrates an embodiment of an OTDOA locating technique.
Figure 27:
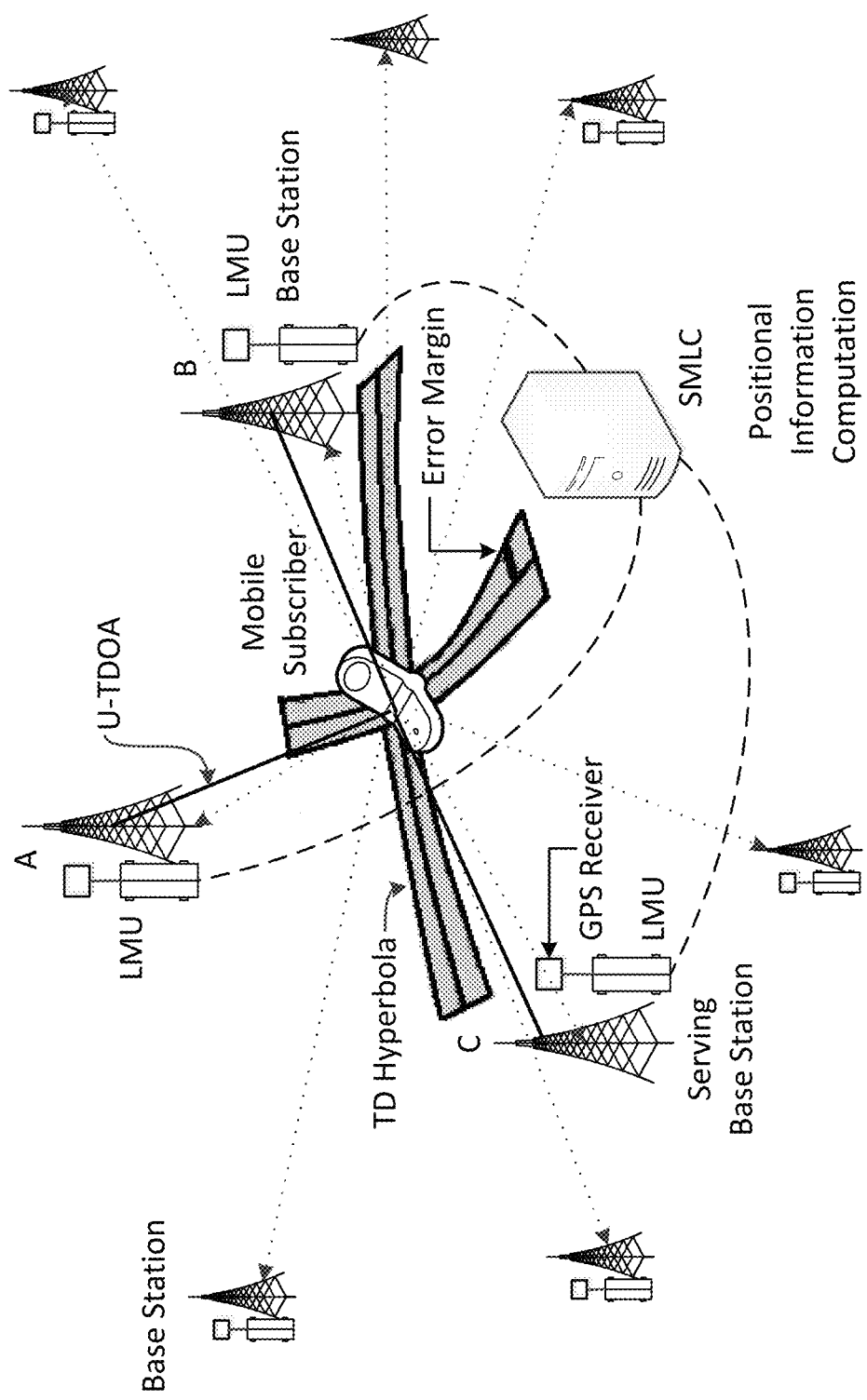
FIG. 27 illustrates an embodiment of an LTE Release 11 U-TDOA locating technique.

In FIGS. 11 and 27 only the macro base stations are shown. Also, FIG. 27 depicts the LMUs being co-located with the base stations. These depictions are valid options, but the LTE standards do not specify where the LMUs can be placed, as long as LMUs placement satisfies the multilateration/trilateration requirements.

In an aspect, a common deployment for indoor environments is DAS (Distributed Antenna System) and/or small cells, which are inexpensive base stations highly integrated with the RF. The LMU(s) can be placed indoors and/or within a campus-type environment as well, e.g. the U-TDOA can be used in a DAS and/or small cell environment. In another aspect, the U-TDOA based accurate indoors locating can be achieved with a combination of LMUs positioned indoors and macro cells that are positioned outside, e.g. without the need of deploying DAS and/or small cells; or have a reduced number of the small cells. Thus, the LMUs can be deployed with or without DAS and/or small cells being present. In a further aspect, the LMUs can be placed in environments where cellular signal amplifiers/boosters are used; with or without DAS and/or small cells being present.

The LTE release 11 also contemplates the integration of the LMU and the eNB into a single unit. This, however, will put additional burden on the time synchronization requirements between small cells if individual small cells eNBs are geographically distributed, which wireless/cellular service providers are not ready to meet, especially indoors and/or in other GPS/GNSS denied environments.

DAS systems are inherently time synchronized to a much higher degree (precision) than geographically distributed macro/mini/small cell/LMUs. Using a DL-DTOA solution in a DAS environment will alleviate the time synchronization issue, but in a DAS environment, a single base station serves a large number of distributed antennas, such that multiple antennas are transmitting the same downlink signal with the same cell ID (identification number). As a result, the traditional DL-OTDOA approach fails because there are no identifiable neighboring cells (antennas) generating signals with a different ID. Nevertheless, it is possible to use the DL-OTDOA technique when employing a multi-path mitigation processor and multi-path mitigation techniques/algorithms, as described in U.S. Pat. No. 7,872,583, and extending the use of location consistency algorithm(s), as described in U.S. Nonprovisional application Ser. No. 13/566,993, filed Aug. 3, 2012, entitled MULTI-PATH MITIGATION IN RANGEFINDING AND TRACKING OBJECTS USING REDUCED ATTENUATION RF TECHNOLOGY; which are incorporated herein by reference in their entirety. However, these consistency algorithms have limits of the number of antennae that emit signal(s) with the same ID. One solution is to reduce the number of antennae that emit the same ID, e.g., split a large number of DAS antennas into two or more time synchronized clusters with different IDs. Such an arrangement will increase the system cost (increase the number of base stations) and require the handset/UE to support the above-mentioned technology.

Employing U-TDOA in a DAS environment will also add cost relative to adding/installing LMU units. However, no changes to the UE (handset) will be needed; only the base station software would have to be upgraded to support the U-TDOA functionality. Also, it is possible to integrate multiple LMUs with (into) a DAS system. Therefore, using the U-TDOA method with LMUs has many advantages when utilized indoors, in campus environments, and in other GPS/GNSS challenging, geographically limited environments.

Precise time synchronization amongst geographically distributed multiple base stations and/or small cells and/or LMUs in indoors and other GPS/GNSS denied environments is more complex than time synchronizing macro cells and/or the LMU equipment used in the macro cell outdoor, e.g., GPS/GNSS friendly environment. This is because the macro cells in the outdoor environment have antennas, that are elevated and in the open. As a result, the GPS/GNSS signal(s) quality is very good and macro cells antennas transmissions and/or LMU receivers can be synchronized using GPS/GNSS to a very high accuracy—standard deviation 10 ns, over a sufficiently large area.

In an aspect, for indoor and other GPS/GNSS denied environments, time synchronization amongst multiple distributed base station and/or small cells/LMUs is achieved by using an External Synchronization Source that produces the synchronization signal shared by many base stations and/or small cells and/or LMUs. This synchronization signal can be derived from GPS/GNSS, for example the 1 PPS signal, and/or Internet/Ethernet networking, for example PTP or NTP, etc. The latter is a low cost solution, but it cannot provide the time synchronization precision required for accurate location, the GPS/GNSS derived external synchronization signal(s) are more precise—standard deviation down to 20 ns, but require additional hardware and installation requirements, e.g. wiring up these signals, is more complex/expensive. Also, changes to base station and/or small cells hardware/low level firmware might be needed to accommodate the external synchronization signal higher level of precision. Beside the 20 ns standard deviation is not accurate enough to satisfy the 3 meters requirements, e.g. standard deviation of about 10 ns.

Figure 28:
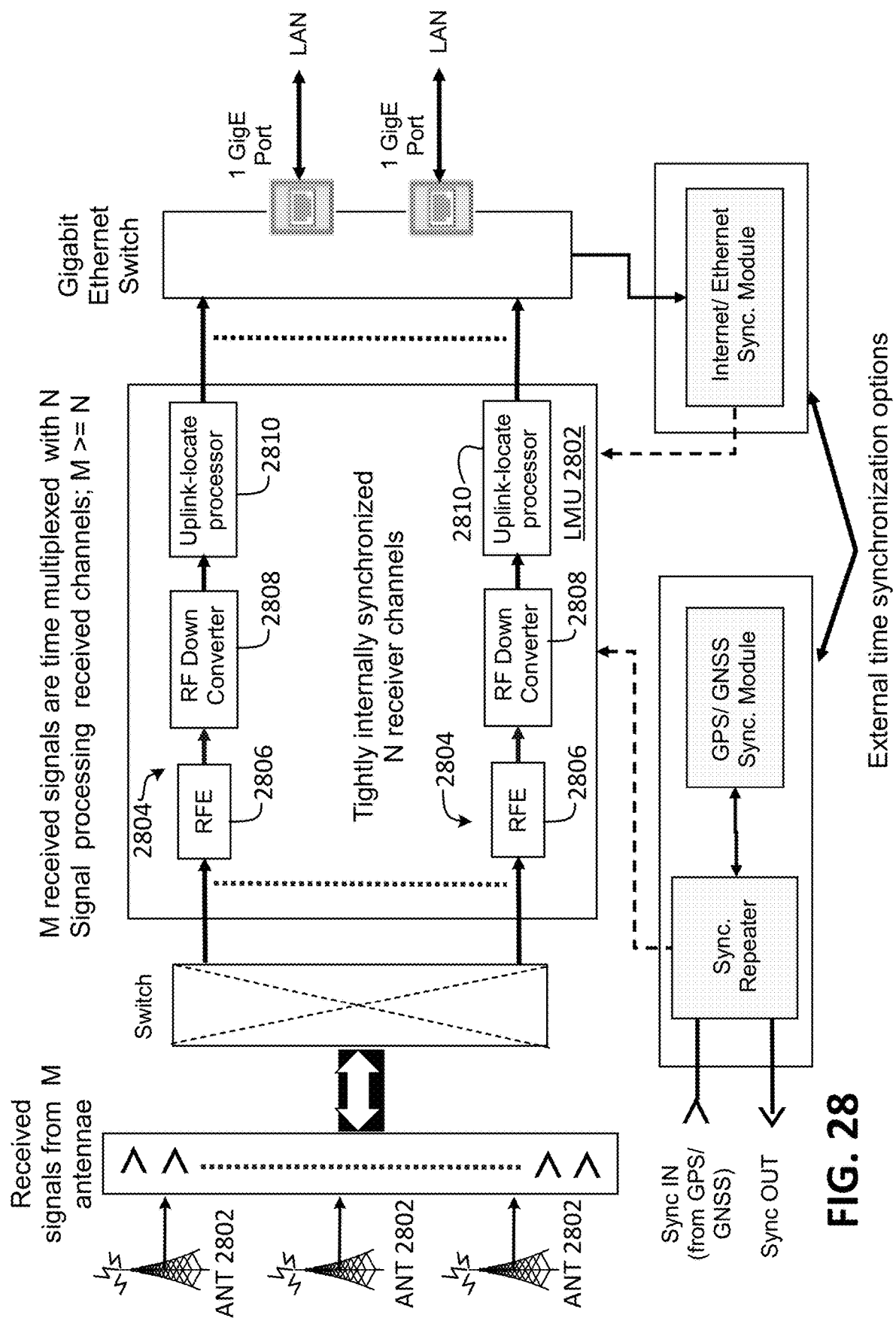
FIG. 28 illustrates an embodiment of a multichannel Location Management Unit (LMU) high level block diagram.

In order to overcome the above mentioned limitations, as illustrated by the multichannel LMU high level block diagram of FIG. 28, one embodiment uses a LMU device 2800 having multiple receive antennas 2802 and signal channels 2804. As an example, one or more signal channels 2804 can comprising signal processing components such as an RFE (RF front end) 2806, RF down converter 2808, and/or uplink-locate processor 2810. Other components and configurations can be used. In an aspect, the signal channels 2804 are co-located within the LMU device 2800 and tightly time synchronized (e.g., standard deviation of about 3 ns to about 10 ns). In another example, antennae 2802 from each LMU signal channel 2804 are geographically distributed (e.g., similarly to DAS). As a further example, external time synchronization components (e.g., GPS/GNSS, Internet/Ethernet, etc.) can be in communication with the LMU device 2800. The Precise time synchronization is more readily achieved inside the device (e.g., LMU device 2800) than it is by trying to tightly synchronize a number of geographically distributed devices.

As an example, when two or more multichannel LMUs (e.g., LMU device 2800) are deployed, the time synchronization between these LMUs can be relaxed so that a low cost and low complexity approach can be used to synchronize (using an external source signal) a number of distributed multichannel LMUs. For example, Internet/Ethernet networking synchronization can be used or a common sensor (device) can be deployed to provide timing synchronization between different multichannel LMUs.

On the other hand, the multichannel LMU approach reduces the number of hyperbolic lines of position (LOPs) that can be used in determining the position fix, but the time synchronization improvement overcomes this deficiency (see explanation and example below).

When using multilateration/trilateration methods, the UE positioning accuracy is a function of two factors: the geometrical dilution of precision (GDOP), which is due to geometrical arrangement of macro cell towers/small cells/LMUs, and the accuracy of single ranging $\sigma_{R\_pseudo}$ measurement (See Gunter Seeber, *Satellite Geodesy*, 2003):

$$\sigma_{POS} = GDOP \times \sigma_{R\_pseudo}$$

The GDOP is function of the geographical distribution of transmitting antennas (in case of DL-OTDOA) or receiving antennas (in case of U-TDOA). In case of the regularly placed antennae, the two dimensional GDOP estimation is equal to $2/\sqrt{N}$ (H. B. LEE, ACCURACY LIMITATIONS OF HYPERBOLIC MULTILATERATION SYSTEMS, 1973); where in case of cellular networks N is the number of emitters (macro cell towers/small cells/DAS antennas) that are "hearable" by the UE (in case of DL-OTDOA) or the number of LMUs/LMUs receive channels that can "hear" the UE uplink transmission (in case of U-TDOA). Therefore, the standard deviation of UE position error can be calculated as follows:

$$\sigma_{POS} = \frac{2}{\sqrt{N}} \times \sigma_{R\_pseudo}$$

Assume that eight geographically distributed (indoors) single receive channel LMUs (regularly placed) are detecting the UE uplink transmission and these LMUs are synchronized via the 1 PPS signal (e.g., standard deviation of 20 ns). In this case N=8 and there will be seven independent LOPs that can be used for UE position fix. Let's further assume that ranging error standard deviation, $\sigma_R$ is 3 meters (about 10 ns); then the accuracy of single ranging measurement is:

$$\sigma_{R\_pseudo} = \sqrt{(\sigma_R^2) + (\sigma_{SYNC}^2)} = \sqrt{10^2 + 20^2} = 22.4 \text{ ns (6.7 meters);}$$

where $\sigma_{SYNC}$ is the external time synchronization signal standard deviation (20 ns).

In this case (N=8) the single ranging measurement and the standard deviation of UE position error $\sigma_{POS}$ is equal to 4.74 meters.

As an example, if two, four receive channel LMUs (e.g., multichannel LMU device 2800) with regularly placed distributed antennae, are detecting the UE uplink transmission, then each LMU will produce a set of three tightly time synchronized LOPs (e.g., standard deviation of about 3 ns); and for three independent LOPs the N=4. In this case, two UE position fixes is generated, each with standard deviation error $\sigma_{POS}$ of 3.12 meters. Combining these two position fixes by averaging and/or other means/methods will further reduce the UE position fix error. One estimate is that the error reduction is proportional to the square root of the number of the UE position fixes. In the present disclosure, this number is equal two and the final UE position fix error $\sigma_{POS\_FINAL}$ is 2.21 meter; obtained as: 3.12/√2.

Figure 31:
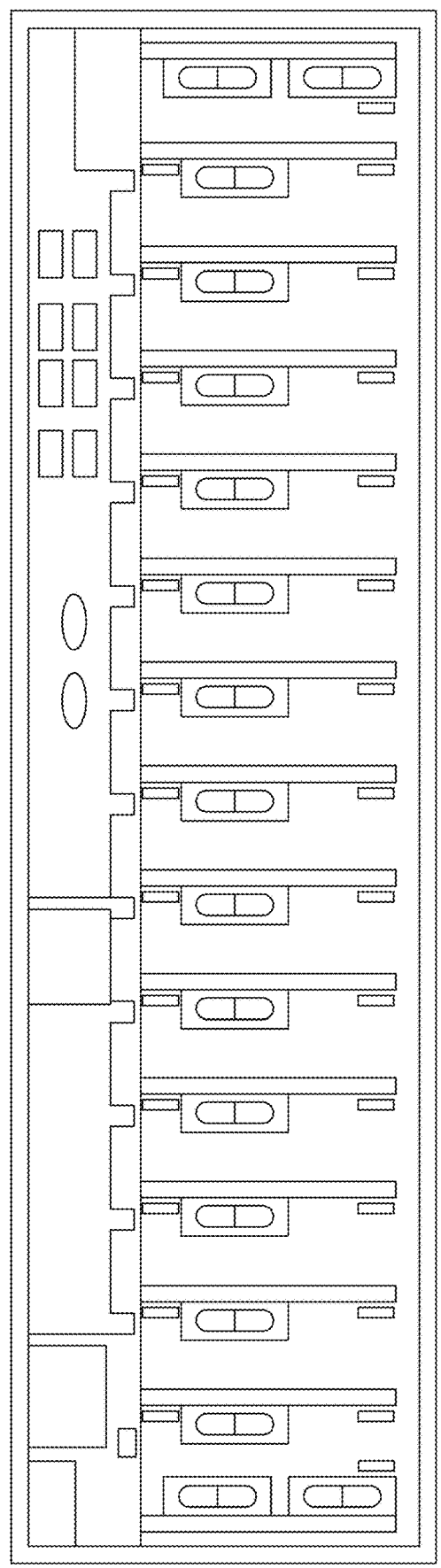
FIG. 31 illustrates an embodiment of a depiction of a rackmount enclosure.
Figure 32:
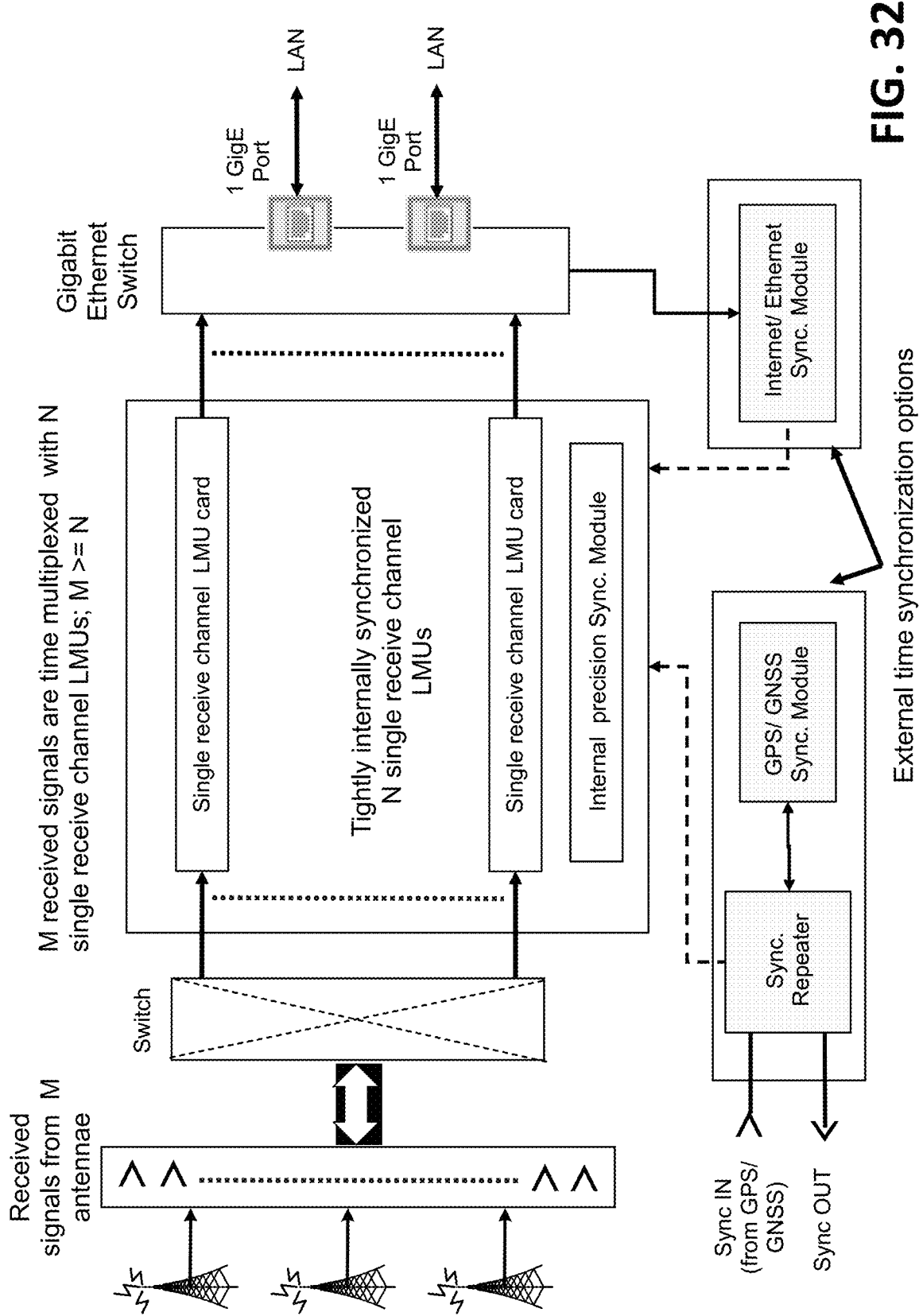
FIG. 32 illustrates an embodiment of a high level block diagram of multiple single channel LMUs clustered (integrated) in a rackmount enclosure.
Figure 33:
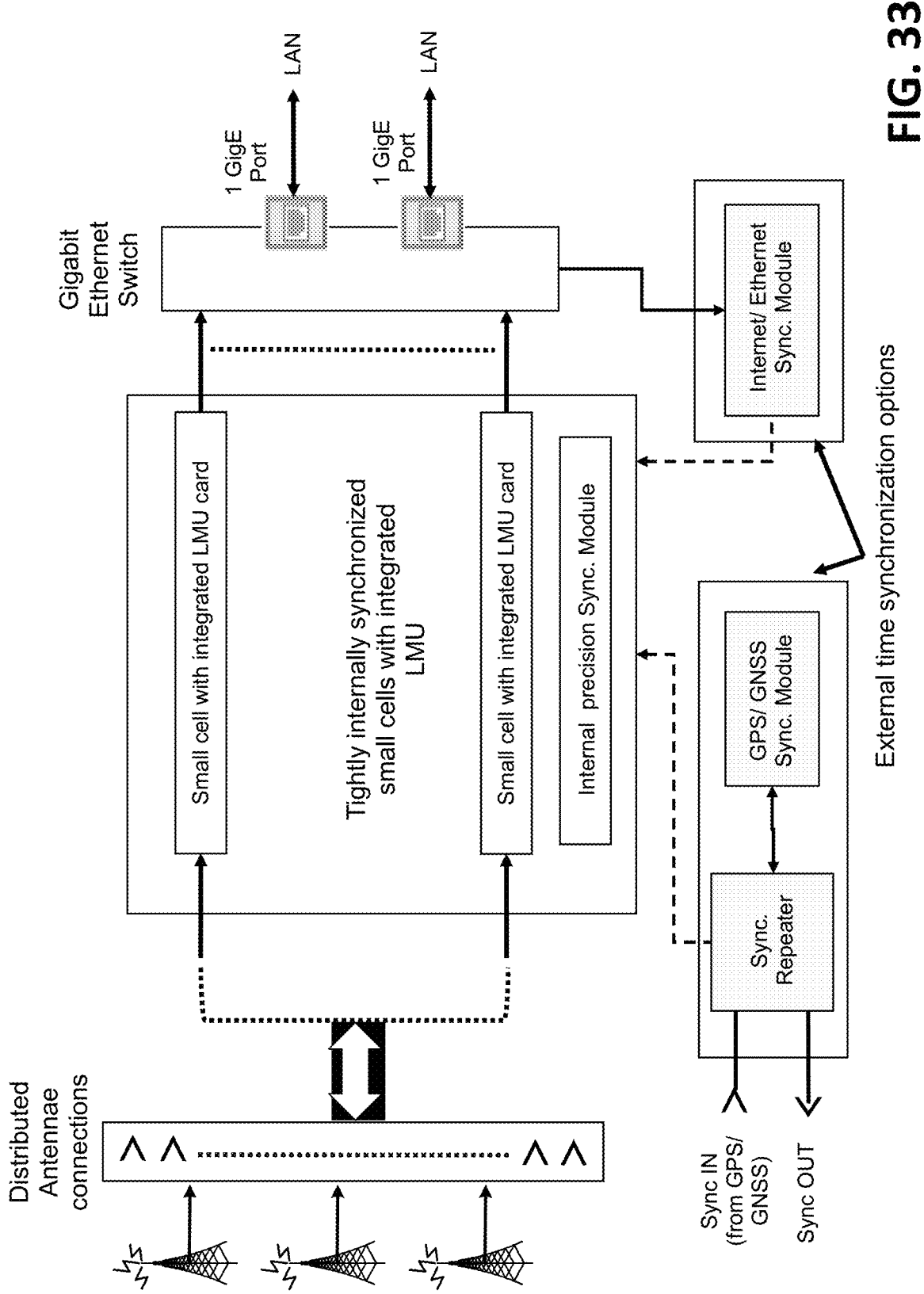
FIG. 33 illustrates an embodiment of a high level block diagram of multiple small cells with integrated LMU clustered (integrated) in a rackmount enclosure (one-to-one antenna connection/mapping)

In an aspect, several multichannel LMU (e.g., LMU device 2800) with relaxed synchronization between these multichannel LMUs can be used for indoors and other GPS/GNSS denied environments. As an example, within the multichannel LMU device, the LMUs can be tightly synchronized (e.g., standard deviation of between about 3 ns and about 10 ns). Another embodiment takes advantage of the fact that a number of single channel small cell/LMU and/or small cells with integrated LMU devices electronics (the LMU functionality is embedded into the eNB) can be clustered (e.g., integrated, co-located, etc.) in a rackmount enclosure (FIG. 31, FIG. 32 and FIG. 33) and/or a cabinet, for example a 19-inch rack. Each single channel device antenna can be geographically distributed, like in DAS. The devices within a cluster can be tightly time synchronized (e.g., standard deviation of less than or equal to 10 ns). Multiple rackmount enclosures can be synchronized per communication requirements, for example VoLTE, whereby a low cost and low complexity approach can be used. Precise (tight) time synchronization between a number of devices clustered (integrated) inside the rackmount enclosure/cabinet is more readily achieved and less costly than in the case of tightly time synchronizing a number of geographically distributed devices.

Figure 34:
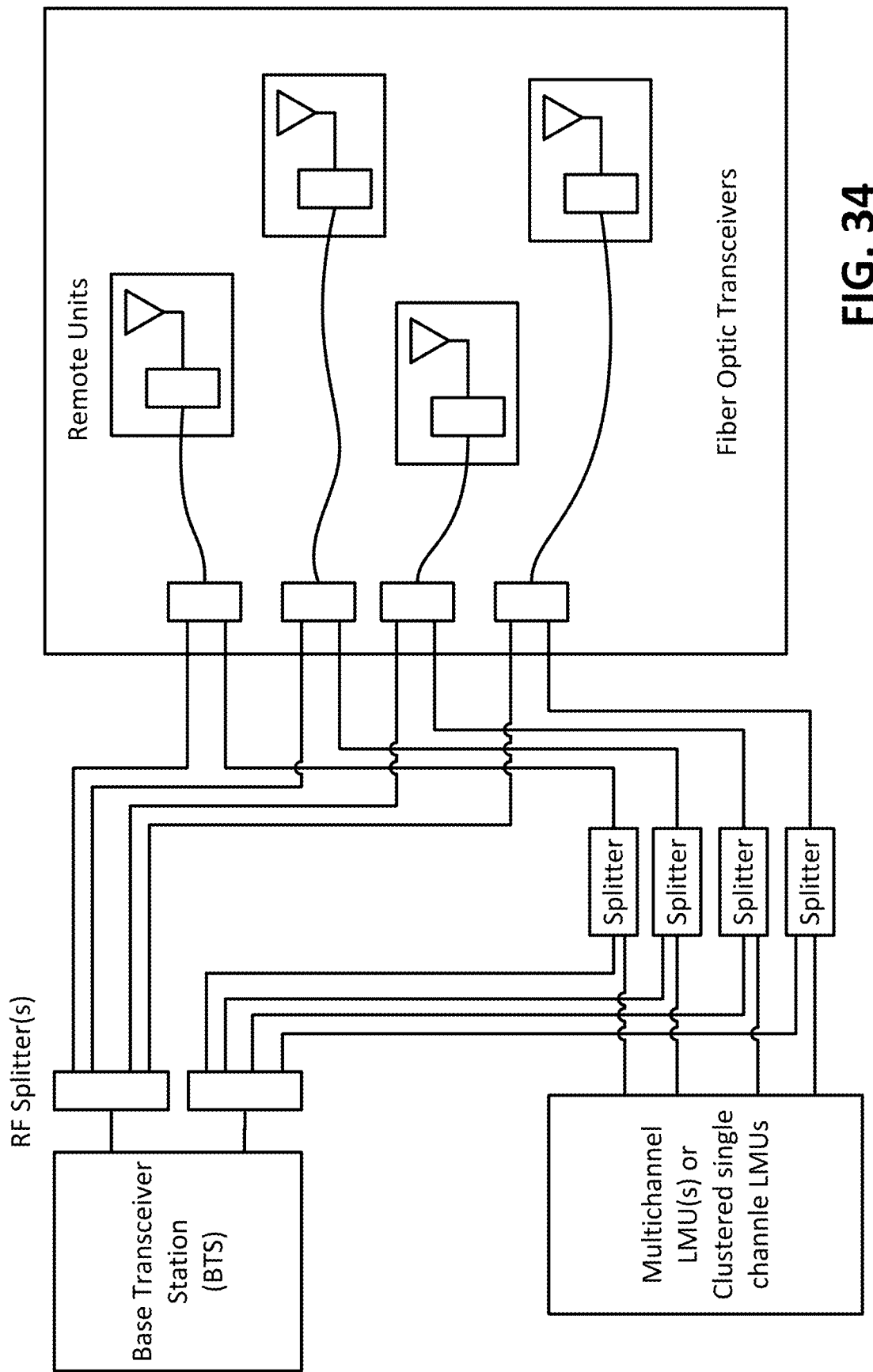
FIG. 34 illustrates an embodiment of a high level block diagram of LMUs and DAS integration.

In another aspect, multiple LMUs can be integrated with (into) the DAS system as illustrated in FIG. 34. As an example, the LMU receivers can share the received signal(s) generated by the each DAS antenna, e.g., sharing DAS antennas. The actual distribution of these received signals depends upon the DAS implementation: active DAS vs. passive DAS. However, the LMU and DAS integration embodiment entails sharing the received signal(s) generated by the each DAS antenna with LMU receiver channel and creating an almanac that matches (correlates) each DAS antenna coordinates with corresponding LMU/LMU receiver channel. Again, the clustering approach and/or employing multichannel LMU(s) are preferable ways for LMU and DAS integration.

Also, in a similar fashion, it is possible to share the received signal(s) generated by the each small cell antenna with the LMU receiver channel. Here, the small cell's time synchronization can be relaxed, e.g. does not need to meet the locate requirements, while the LMU/LMU channels will require precision time synchronization. The clustering approach and/or employing multichannel LMU(s) are a preferable way for LMU(s) for such option.

Integration of the LMU and the eNB into a single unit has a cost advantage over a combination of standalone eNB and LMU devices. However, unlike the integrated LMU and the eNB receiver, a standalone LMU receive channel does not have to process the data payload from UE. Furthermore, because the UE uplink ranging signals (SRS, sounding reference signal, in case of LTE) are repeatable and time synchronized (to the serving cell), each standalone LMU receive channel can support (be time multiplexed with) two or more antennae, for example serve two or more small cells. This, in turn, can lower the number of LMUs (in small cells/DAS and/or other U-TDOA locate environments) and reduce the cost of the system (see also FIG. 28).

Figure 29:
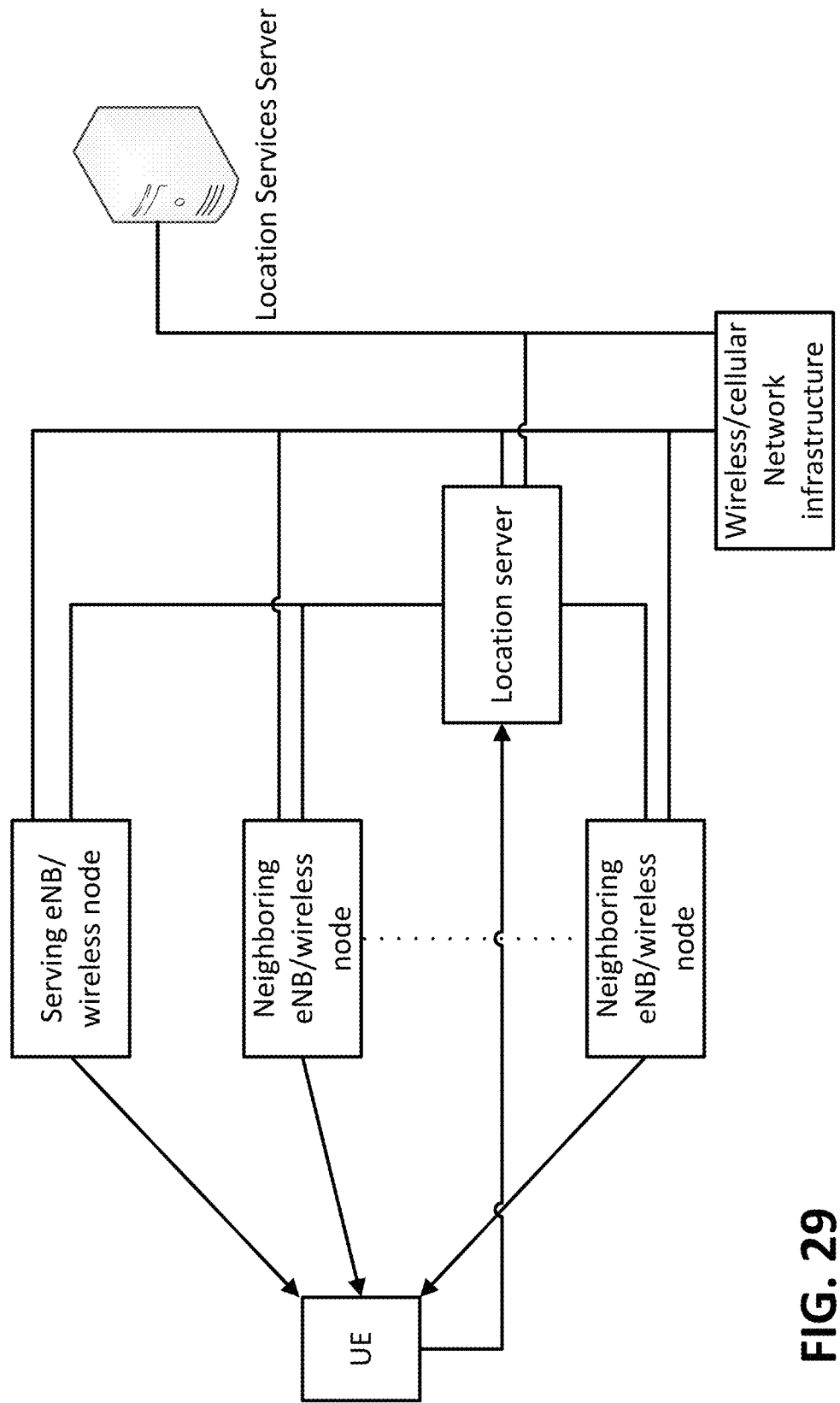
FIG. 29 illustrates an embodiment of a DL-OTDOA technique in wireless/cellular network with a location Server.
Figure 30:
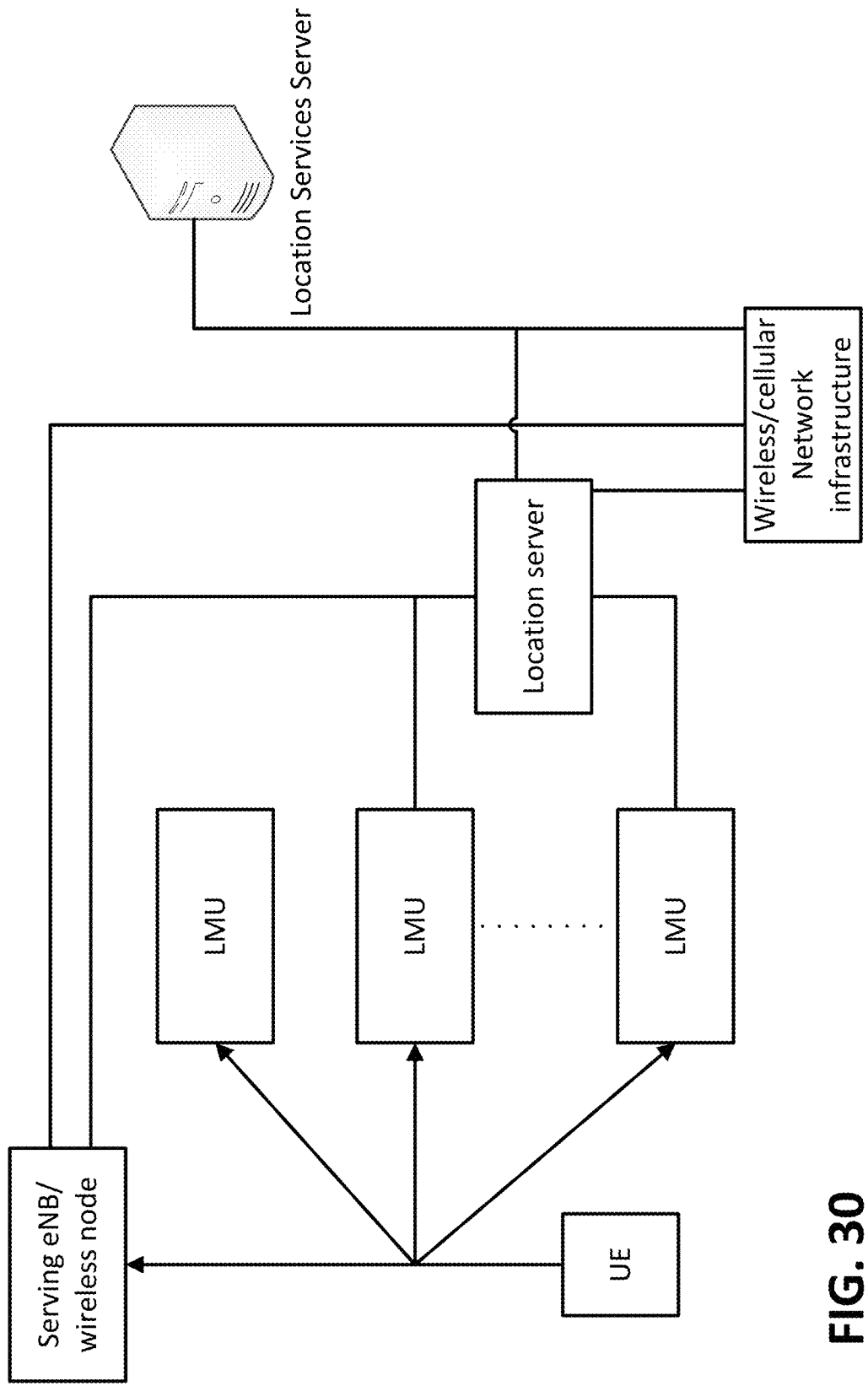
FIG. 30 illustrates an embodiment of a U-TDOA technique in wireless/cellular network with a location Server.

If wireless/cellular network E-SMLC server is lacking the functionality required for DL-OTDOA and/or U-TDOA techniques, this functionality can be carried out by a location server that can communicate with the UE and/or LMU and the wireless/cellular network infrastructure and/or a location services server (see FIG. 29 and FIG. 30). Other configurations can be used.

Figure 35:
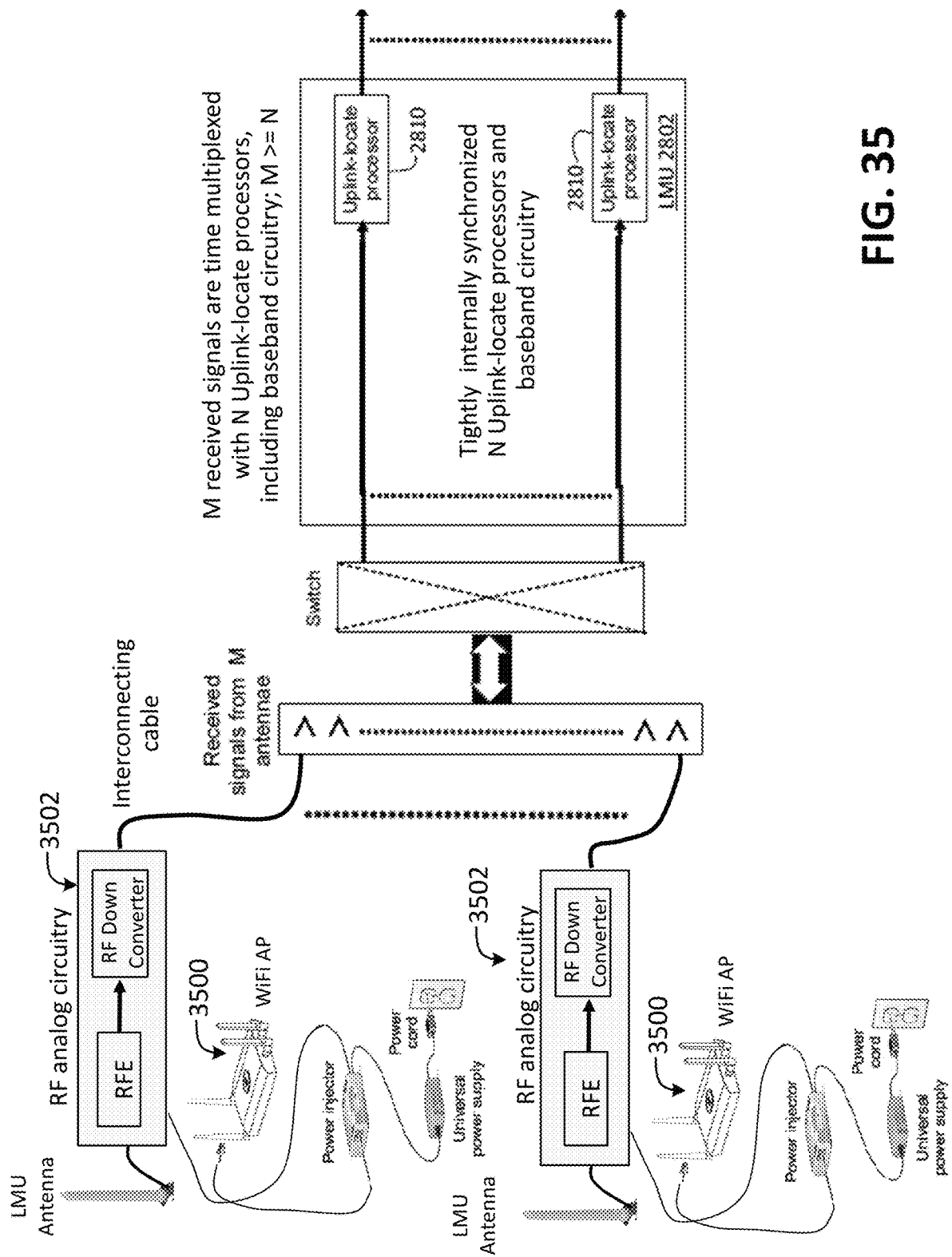
FIG. 35 illustrates an embodiment of a high level block diagram of LMUs and WiFi infrastructure integration.

In another aspect, one or more LMU devices (e.g., LMU 2802) can be deployed with WiFi infrastructure, for example, as illustrated in FIG. 35. Alternatively, a listening device could be used to monitor the LMU antenna in the same manner as the WiFi infrastructure. As such, the LMU devices and/or channel antennas servicing the LMUs can be co-located with one or more WiFi/listening devices 3500, such as one or more WiFi access points (APs). As an example, the WiFi devices 3500 can be geographically distributed.

In one embodiment the WiFi device 3500 can be connected to a power source. An RF analog portion 3502 (e.g., circuitry) of one or more LMU devices or channels can be integrated with the LMU antenna such that the RF analog portion 3502 can share the power source with the WiFi device 3500 (see FIG. 35). As an example, the RF analog portion 3502 of the LMU device or channel can be connected via cable to the Uplink-Locate processor circuitry (e.g., Uplink-Locate processor 2810), which can include the baseband signal processing. As a further example, because there can be signal amplification between the antenna and the interconnecting cable between the RF analog portion 3502 and the baseband circuitry, such an embodiment facilitates improved signal-to-noise ratio (SNR). Moreover, the RF analog portion 3502 can down-convert the received signal (e.g., down to the baseband) and, because the baseband signal frequencies are several magnitudes smaller than the received signal in antenna, the cable requirements can be relaxed. Such relaxation of cable requirements can translate into cost reduction of the connections and can significantly increase the transmission distance.

It is understood that the ranging signals are not limited to the SRS only and can utilize other reference signals, including MIMO, CRS (Cell-Specific Reference Signal), etc.

In a further embodiment, the network-centric locating approach of 5G may be improved by fusing downlink OTDOA and uplink OTDOA methods. For example, in the macro-cell environment, the uplink AoA method suffers from a lack of range. This is because uplink signal transmission by the UE is orders of magnitude lower in power than corresponding downlink signal transmissions by the macro-cell. As a result, the probability of the UE signals being detected by neighboring cells is low. For uplink OTDOA, the 3GPP standards contemplate the deployment of LMUs to help improve the detectability of the uplink signals (i.e., LMUs are essentially uplink transmission receivers with additional signal processing capabilities). The deployment of many LMUs address the uplink signal detectability issue and enable multilateration positioning for locating UEs, but there is a significant cost associated with the deployment and maintaining a large number of such devices. As a result, wireless networks carriers did not deploy LMUs in the LTE 4G environment.

Accordingly, in order to enable uplink locating in 4G and 5G environments, it may be necessary to leverage serving cell antenna system characteristics (properties) for different methods of determining UE position. For example, depending on the serving cell antenna system design, it may be possible to use an uplink method that estimates the direction (angle) of arrival (DoA/AoA) of the UE reference signal transmissions in the horizontal (aka azimuth) plane. Theoretically, it may also be possible to estimate the DoA/AoA in the vertical (aka elevation) plane. By combining DoA/

AoA calculations in both the horizontal and vertical plane, it may be it possible to locate the UE. In practice, however, because of macro-cell antennas designs, DoA/AoA estimates for the vertical plane are too low for precise position determination.

To improve the uplink DoA/AOA method, it may therefore be necessary to estimate a distance from the UE to a serving cell. This distance may be derived from the round-trip time (RTT) and Time Advance (TA) information, which are based on measurements performed by the serving cell. However, because of the radio wave propagation phenomena these measurements may lack required precision. One possible way to address the precision issue is to use downlink OTDOA to estimate the distance between the UE and the serving cell. The drawback to this solution is that downlink OTDOA requires an accurate synchronization between the serving cell and neighboring cells that are used for the UE position determination, e.g., the locate accuracy is impacted by the synchronization error. Uplink OTDOA also suffers from the same effect, so that is no alternative.

However, uplink DoA/AoA is free from this error because only the serving cell is used, i.e. no neighboring cells are used, so no synchronization is required. In contrast, when downlink OTDOA is used to determine the distance between the serving cell and the UE, this measurement may include the aforementioned synchronization error, although that error may be mitigated if downlink OTDOA is only used to determine the initial UE position. Thereafter, as long as the same serving cell is used, the UE position may be calculated by state-of-the art tracking algorithms based on UE DoA/AoA and UE velocity (estimated from reference signals as the DoA/AoA) measurements. Over time (i.e., a number of measurements), the tracking algorithms or tracker will reduce the impact of the synchronization error. It should be noted that soft/softer handover between serving cells is not supported by 4G LTE, so the initial UE distance to the serving cell measurement may have to be repeated every time the UE switched from one serving cell to another serving cell.

Tracking algorithms may be based on radar and sonar performance enhancement strategies. The tracking algorithms or tracker may provide the ability to predict future positions of multiple moving objects based on the history of positions of the individual objects reported by sensor systems. There are a number of different types of trackers, including particle filter algorithms, Kalman algorithms, etc. Use of a tracker may also improve UE positioning when the initial UE position is calculated based on RTT measurements as discussed above. The choice of whether to use downlink OTDOA or uplink RTT/TA to measure the distance from the UE to the serving cell depends on the magnitude of error in the distance estimation. The larger the error, the more the performance of the tracker may be impacted. In an embodiment, two different independent trackers are utilized at the same time and use the position of the one that converges faster (i.e., is first to determine the position). Yet another embodiment is to utilize a tracker to estimate the distance and to correct the synchronization error. This approach may yield the best accuracy.

As noted above, uplink methods are inherently network-centric as the relevant UE reference signal transmissions may be collected and pre-processed by the eNodeB and then forwarded to a LSU for further processing and UE position determination using one or more network protocols. In case of downlink OTDOA, the task of collecting and pre-processing the downlink reference signals is performed by the UE. The UE than sends collected downlink data to the LSU.

The UE handles the communication with the LSU, using the control plane and/or the LTE user plane. Consequently, signaling may be in line with the OMA Secure User Plane Location (SUPL) protocol and/or 3GPP, e.g., LTE Positioning Protocol (LPP).

Many uplink and downlink reference signals may be employed for UE position determination. The most commonly used for uplink locate include the Sounding Reference Signal (SRS) and/or Demodulation Reference Signal (DMRS). The most commonly used for downlink locate include Positioning Reference Signal (PRS) and/or Cell-Specific Reference Signal (CRS). The reference signals may be collected in a digital format, i.e., samples, which may be pre-processed before being sent to the LSU. The digital samples of the reference signal may be extracted from the baseband I/Q samples in time domain or the baseband I/Q samples in frequency domain, as well as the Resource Elements (RE) from the OFDM symbols. REs are complex-valued coefficients representing symbols in frequency domain. The I/Q values represent the signal in-phase (I) and quadrature (Q) components. As a result, the reference signals may be represented by the I/Q samples in time domain or the I/Q samples in frequency domain, or REs of symbols containing the reference signals.

In a downlink OTDOA UE embodiment, both the PRS and the CRS reference signals may be collected. In other words, this method may utilize PRS, CRS, or both types of signals. This hybrid mode of operation (i.e., PRS or CRS or both PRS and CRS) has the advantage of allowing network operator(s) to dynamically choose the mode of operation depending on the circumstances or certain network parameters. For example, PRS may have better hearability than CRS, but using PRS may cause a reduction in data throughput. CRS do not effect throughput and have a higher reference signal density, which is advantageous when the UE is moving. In addition, CRS is backward compatible with all previous LTE releases, for example Rel-8 and lower. As such, the hybrid method provides a network operator with the ability to trade-off or balance between hearability, throughput, and compatibility.

In an embodiment of downlink OTDOA, the UE receiver may include a detector configured to detect and isolate OFDM symbols that carrying reference signals, for example PRS and/or CRS, from one or more downlink frames. This detector may be further configured to extract Resource Elements (REs) from the OFDM symbols on a per symbol basis, and may be also configured to collect and store REs from a number of OFDM symbols on a per symbol basis, i.e., produce for each symbol identification (ID) a downlink data structure that includes REs correlated with this symbol ID. In addition, the detector may be configured to collect downlink metadata, including each frame start and other relevant and/or auxiliary information.

In an embodiment, an exemplary data structure of the OFDM symbols with CRS RE elements is as follows:
  CRSR_data_sruct: [Number of captured radio slots in one capture block, Time interval (in number of slots) between capture blocks, CRS data length and CRS data (the Resource Elements)].

In an embodiment, exemplary metadata transferred from UE to LSU includes:
  Serving cell information: [physCellId, cellGlobalId, CellGlobalIdEUTRA-AndUTRA, earfcn-DL, systemFrameNumber, Slot number, UTC timestamp, rsrp-Result, rsrq-Result,
  ue-RxTxTimeDiff, DownlinkPathLoss, Bandwidth, in Physical Resource Blocks (PRB).

Neighbour cell information (0 to 32 neighbor cells): [physCellId, cellGlobalId, CellGlobalIdEUTRA-AndUTRA, earfcn-DL, systemFrameNumber, rsrp-Result, rsrq-Result, UE information: [UE ID, UE category, Mobility state, MobilityHistoryReport].

In an embodiment of downlink OTDOA, the UE receiver may include a communication processor configured to signal and exchange downlink data with the LSU, including being configured to send RE data and metadata to the LSU and to receive commands and assistance information. It should be noted that the signaling may be in line with OMA SUPL protocol and/or 3GPP LPP, or combination of LPP and SUPL.

In an embodiment of downlink OTDOA, the UE receiver's detector may be configured to extract the reference signal I/Q samples in time domain from OFDM symbols on a per symbol basis, and also be configured to collect these I/Q samples in time domain from a number of OFDM symbols on a per symbol basis, i.e., produce for each symbol ID a downlink data structure that includes I/Q samples in time domain correlated with this symbol ID. In addition, the detector may be configured to collect downlink metadata, including each frame start and other relevant and/or auxiliary information.

In an embodiment of downlink OTDOA, the UE receiver's detector may be configured to extract the reference signals I/Q samples in time domain from OFDM symbols on a per symbol basis, and also may be configured to collect the I/Q samples in frequency domain from a number of OFDM symbols on per symbol bases, i.e., produce for each symbol ID a downlink data structure that includes I/Q samples in frequency domain correlated with this symbol ID. In addition, the detector may be configured to collect downlink metadata, including each frame start and other relevant and/or auxiliary information.

OFDM symbols carrying reference signals Res may include both payload and reference signals REs. As a result, the REs collected by the detector from a number of OFDM symbols, and consequently the downlink data structures generated from these collections, include both payload and reference signals REs. When this data is sent to the LSU, the payload REs becoming an overhead, reducing the uplink capacity.

The location of CRS and PRS reference signal REs in the symbol's frequency dimension may be determined by cell ID; antenna configuration; antenna port; the slot number within a radio frame and the OFDM symbol number within the slot (see also, 3GPP 36.211 v13 or ETSI TS 136 211 V13.0.0). If this information is known to the UE receiver's detector, the detector may be configured to remove the payload REs, thereby decreasing the size of the downlink data transmitted to the LSU, i.e., reducing the overhead. The amount of reduction may vary depending upon the reference signal type, neighbor cell IDs and other cell parameters. For example, for CRS, the data size reduction may be 3× (for a cell with a dual antenna sector). In other instances, there may be no appreciable reduction, but this may be rather rare because the reference signal REs locations in the symbol's frequency dimension are repeated on [(cell ID) mod 6] basis. Thus, for the CRS, on average, the data size reduction may be approximately 40% relatively to a worst case scenario.

In an embodiment of downlink OTDOA, the LSU is configured to process the downlink reference signal data and other relevant and/or auxiliary downlink information, including the frame start, that was sent from one or more UEs. The output of the LSU is the position of the one or more UEs and other downlink position related metadata, such as Confidence Radius Values, FCC NG911 location accuracy metric, etc.

The LSU may include a downlink signal processor configured to estimate the time of arrival (TOA) and/or time of flight (TOF) of reference signals from the downlink reference signal data and other information sent by the UE. This processor is also configured to determine the time difference (i.e., RSTD/TDOA, where RSTD means Reference Signal Time Difference) between reference signals from several cells. The downlink signal processor may include locating signal processing algorithms and other technology and techniques, including multi-path mitigation algorithms and methods, including advanced spectrum estimation algorithms, Constant False Alarm Rate (CFAR) detection algorithms, Space-Time Adaptive Processing (STAP), etc. In addition, the downlink signal processor may be configured to estimate the Doppler shift, utilizing one or more Doppler specific algorithms and/or techniques, which may allow the LSU to track one or more moving UEs and to mitigate UE receiver clock drift. The Doppler shift is used to update (correct) the downlink reference signal data.

The signal processing may be applied individually to reference signals from each antenna for a given cell sector antenna subsystem. The cell sector antenna subsystem may include multiple (two or more) antennas, such as a dual antenna sector antenna subsystem, which are commonly deployed. These antennae may be spatially separated. As a result, at the UE receiver, the reference signals from each antenna may experience a different multipath phenomenon, i.e., each having a different impact on the strength of the direct line of sight (DLOS) of the reference signal from each sector antenna. It should be noted that the DLOS path is frequently obstructed to various degrees and DLOS signal strength may often be significantly (12 dB or more) lower than a reflected signal strength. On the other hand, even if the DLOS obstruction is severe, because of the RF propagation phenomena there is always a direct path for the RF signal to the UE receiver. This direct path is somewhat longer than the DLOS path, but is much closer to the DLOS path length than a reflected path, i.e., has minimal impact on the position determination accuracy.

Because of its nature, the direct path is highly attenuated to begin with and might be further impacted by the multipath. Subsequently, the downlink signal processor may compare the results between each antenna from a given sector because of the possibility that the direct path signal might not be detectable for each sector's antenna. It should be noted that the overall signal strength and/or SNR of the received reference signal from the sector's antenna does not always correlate with the DLOS and/or direct path signal strength, and/or SNR.

Furthermore, the downlink signal processor is configured to calculate the TOA confidence metric, which is for each TOA from each cell and each cell sector's antenna. This calculation may include whether the overall signal strength and/or SNR of the received signal meets a desired threshold and the TOA signal statistics, such as standard deviation, Mean Absolute Deviation (MAD), etc. This calculation may also include whether the direct path/DLOS was found and the direct path/DLOS SNR, if the direct path was identified. Additional information may include whether the serving cell is the closest cell and whether the serving cell has the highest SNR, as well as the Geometric Dilution Of Precision (GDOP) calculations for each RSTD combination. It should be noted that GDOP depends on the geometry of the cell locations. The GDOP may state how this geometry will affect the final UE position estimate. The GDOP values may depend upon the angle at which two given RSTD/TDOA lines intersect. In the best case (where GDOP=1), this angle is at 90 degrees. In the worst case (where GDOP >20), the angle is small. An RSTD/TDOA hyperbolic line may also be called the line of position (LOP).

As in the case of the cell sector antenna subsystem, the UE may include multiple (two or more) antennas and associate these antennas with multiple receive channels. Any of these antennas may be receiving a reference signal, thereby giving the UE the option of collecting incoming signals from each antenna. The reference signals from each antenna may be collected and pre-processed by the UE and then sent to the LSU, as per the aforementioned downlink OTDOA UE embodiments. The UE antennas may be closely spaced which reduces the multipath impact variation between antennas. However, the UE antennas may be designed for polarization diversity.

Embodiments of the LSU may include a downlink signal processor that compares results between each antenna from a given cell/sector. The downlink signal processor may also compare results between each UE antenna. The rationale behind such comparisons is that the antenna polarization phenomenon might result in attenuating some interference and/or reflected path while at the same time amplifying the DLOS/direct path signal. In other words, the information redundancy associated with such comparisons may increase the probability of the DLOS/direct path detection.

In an LSU embodiment, the output (results) from the downlink signal processor, including TOA/TOF values, RSTD/TDOA values, a confidence metric, DLOS/direct path probability, etc., is passed to a navigation (position) processor configured to estimate one or more UE positions and produce other downlink position related metadata, such as Confidence Radius Values, FCC NG911 location accuracy metric, etc.

For downlink OTDOA UE locate embodiments, the LSU may include a navigation processor that utilizes multilateration techniques or methods, which is also known as hyperbolic navigation. Hyperbolic navigation is based on the difference in timing, i.e., RSTD/TDOA, without reference to a common clock. The navigation processor may also be configured to utilize the information redundancy discussed above, e.g., TOA/TOF, confidence metric, DLOS/direct path probability, etc., to mitigate ambiguities of the multilateration position fix, such as by applying location consistency algorithms.

Multilateration techniques and methods entail solving a number of hyperbolic (RSTD/TDOA) equations, for which a number of different algorithms/approaches may be used to find the right solution. Some algorithms/approaches involve iterative methods that may begin with an initial estimate or "guess" of the location. That estimate may then be improved with each iteration by determining a local linear least-squares location solution. One drawback to this approach is that it requires the initial location estimate to be pretty close to the final location solution in order to guarantee convergence and/or the absence of local minima, which may result in a substantial position error. On the other hand, it may work well in the over-determined situation where there are more measurement equations than unknown quantities. In this regard, it should be noted that an over-determined situation reduces the possibility of ambiguous and/or extraneous solutions that might occur when only the minimum required number of measurements are available.

There are also non-iterative solutions to the hyperbolic position estimation problem. These solutions are in closed-form and may be valid for both distant and close sources, thereby eliminating the convergence and/or local minima issues of the iterative approaches. One drawback to non-iterative solutions is that they require a priori knowledge of the approximate location to be determined, such as the distance between the UE and a first cell, e.g., the serving cell. Another drawback to non-iterative solutions is that they are closed-form solutions that are not designed for over-determined situations. Nevertheless, it may be possible to make the non-iterative solutions work in the over-determined situation by transforming the original set of nonlinear TDOA equations into another set of linear equations with an extra variable. A weighted linear least squares, for example, provides an initial location solution, and a second weighted least squares then provides an improved position/location estimate using the known constraint of the source coordinates and the extra variable.

In the over-determined situation, it is also possible to have multiple sets of three RSTD/TDOA subsets and to find closed-form solutions for each subset. Thereafter, location consistency algorithms may be utilized to finalize the position fix. Moreover, it is also possible to improve the position fix utilizing a combination of iterative and non-iterative solutions from the same set of RSTD/TDOA values. In this regard, iterative and non-iterative approaches need to have a close initial estimate of the UE location. This estimate can be enhanced by the Time Advance (TA), aka RTT, information. TA is a negative offset at the UE, between the start of a received downlink subframe (frame) and a transmitted uplink subframe (frame). TA is equal to 2× the propagation delay, or the RTT; TA is available from the serving cell and represents an independent UE range estimate from the serving sector.

Based on the above, the UE may be located along an arc defined by the serving sector's azimuth beam width and the RTT/2 range, aka radius. Because the serving sector's azimuth beam width can be a large value, reaching 120 degrees, the length of the arc quickly grows with that distance impacting the initial UE position estimate accuracy. However, the accuracy of the position/location estimate may be improved by virtue of the fact that the UE may also be located by the intersection of the azimuth beam widths of the serving sector and neighboring cell sectors. This approach helps to mitigate arc growth impact. Further improvement may also be achieved by considering sector antennas mechanical down-tilt angle and/or electrical down-tilt angle, antenna gain, elevation beam width (in addition to the azimuth beam width), as well as cell tower height and tower structure type.

In order to develop an even finer initial UE position estimate, the LSU navigation processor may be configured to work with a LSU uplink signal processor. As with the LSU downlink signal processor, the LSU uplink signal processor may receive the uplink reference signal(s), for example SRS and/or DMRS, data that was collected from one or more UEs and pre-processed by the eNodeB (cell). At the eNodeB, digital samples of the uplink reference signals are extracted from the baseband and collected as uplink reference signal(s) data, together with relevant uplink metadata. The UE uplink data and the relevant uplink metadata is then sent to the LSU uplink signal processor. The uplink signal processor may be configured to determine the AoA observables based on the UE uplink data and the relevant uplink metadata, as well as the known configuration of the eNodeB sector antenna array, which is included in the uplink metadata. The AoA observables are then sent to the LSU navigation processor, which may reduce an ambiguity in the AoA observables and produce the AoA line of bearing (LOB) and/or direction of arrival (DoA) from the AoA observables and the uplink metadata.

The AoA/DoA estimate produced by the LSU navigation processor may dramatically limit the arc growth versus distance from the eNodeB (serving sector). This is because, unlike the sector azimuth beam width that might reach 120 degrees, the error of AoA line of bearing (LOB) and/or direction of arrival (DoA) estimated by the LSU navigation processor is on the order of one degree or less. Thus, compared with the traditional usage of the sector azimuth beam width, the arc growth when utilizing the LSU uplink signal processor and LSU navigation processor may be 100× less. Consequently, the initial UE position estimate may be 100× more accurate. The AoA/DoA estimate can therefore improve the downlink OTDOA UE positioning accuracy, and this more accurate UE location can, in turn, improve the uplink AoA/DoA UE position fix. Accordingly, this enables joint uplink/downlink or downlink/uplink UE positioning.

Wireless network environments sometimes defy use of the multilateration method, which requires at least three reference points (for 2-D locate) in order to obtain the UE location. For example, in some urban environments, the wireless networks use only two high power cells that flood a large area with RF signals because for data communication purposes, it is not necessary to have a DLOS/direct path to the UE. These communications can be carried using the reflected signals as long as the reflected path delay is less than the Cyclic Prefix (CP) length. This creates a problem for common navigation techniques that rely on at least three reference points being detectable.

Figure 36:
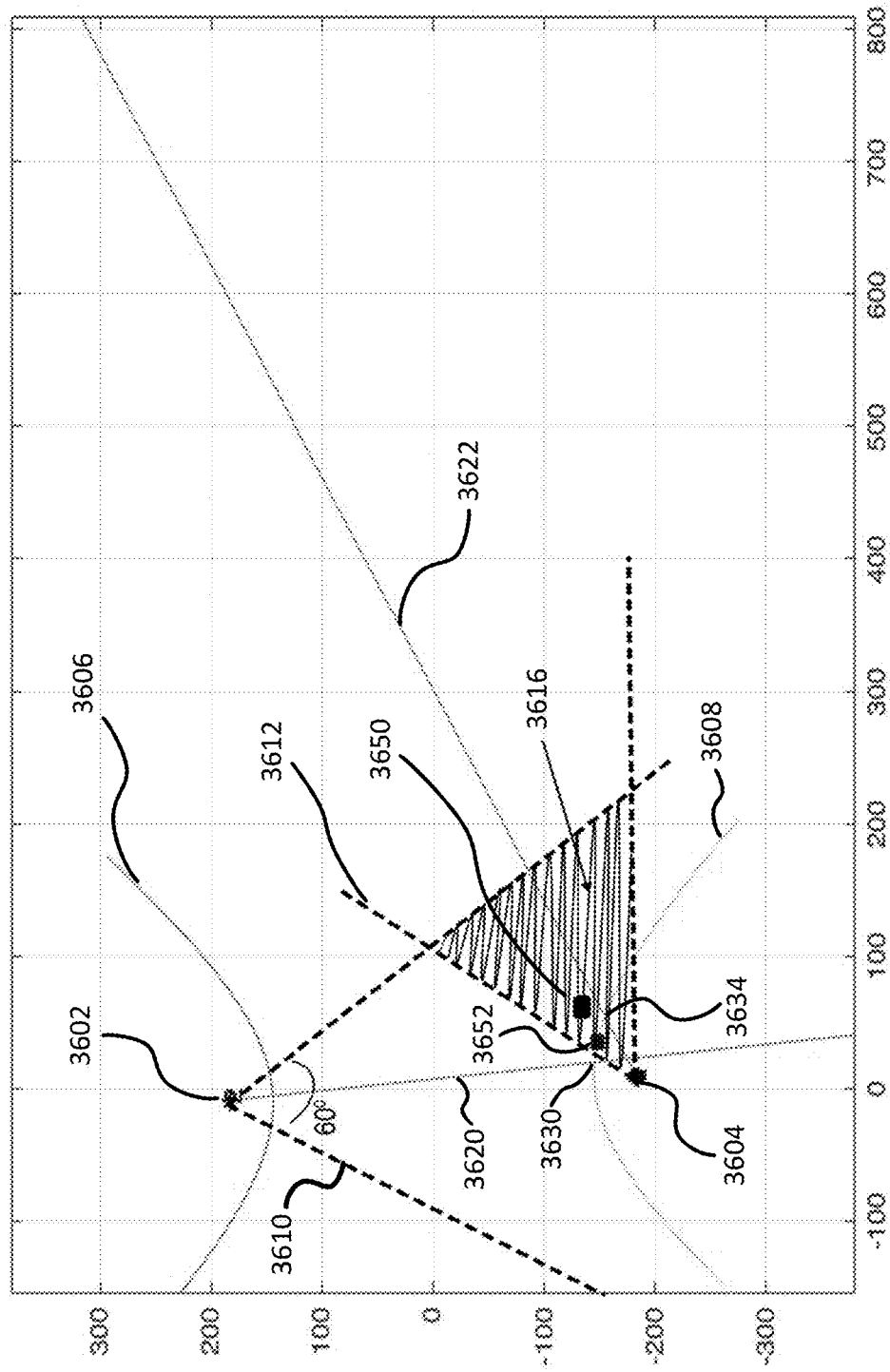
FIG. 36 illustrates a method for determining a UE location fix in a two tower/cell environment that involves plotting TDOA hyperbolas for the two cell/tower sectors.

In an embodiment, one solution to this problem (i.e., a two tower/cell environment) may be to use one or more heuristic approaches to obtain the UE location fix, as further illustrated in FIG. 36. The method may start with plotting the TDOA hyperbolas for the two cell/tower sectors 3602 and 3604 that are detectable, such as hyperbolas 3606 and 3608, and finding the hyperbola to which the target UE belongs. The UE's hyperbola can be determined by finding which sector azimuth beam from each of the cells/towers 3602 and 3604 that the UE also resides within. The hyperbola that belongs to both sector azimuth beams is the chosen hyperbola. As illustrated in FIG. 36, cell/tower 3602 has a sector azimuth beam width 3610, while cell/tower 3604 has a sector azimuth beam width 3612. Hyperbola 3608 is in the intersection between sector azimuth beam width 3610 and 3612, so hyperbola 3608 is the chosen hyperbola. The intersection 3616 between sector azimuth beam width 3610 and sector azimuth beam width 3612 is the area of highest probability of where the UE is located.

If TA (RTT) is available, the UE may then be located along an arc defined by the serving sector azimuth beam width and the RTT/2 range, aka radius. Thus, the UE may be positioned at the hyperbola and arc intersection vicinity. On the other hand, if the AoA/DoA estimate is available then the UE belongs to the LOB and the hyperbola. This latter solution may be more accurate than the former solution.

Yet, when neither TA/RTT, nor the AoA/DoA estimate is available, then the UE location can be determined by scoring intersection points corresponding to each cell/tower (sector) on the chosen hyperbola 3608. The score may be partly based on a cosine of the difference in angles between the direction a cell/tower is pointing and the direction to a point on the hyperbola being tested from the cell/tower sector. As shown in FIG. 36, cell/tower 3602 is pointing in the direction 3620 and cell/tower 3604 is pointing in direction 3622, which defines intersection points 3630 and 3634. The remaining part of the score may come from the distance from each point 3630 and 3634 to the corresponding cell/tower. Once a score for each point 3630 and 3634 has been determined, the point with the highest score from cell/tower 3602 and cell/tower 3604 may be determined. The two best scoring points on the hyperbola are then weighted according to their corresponding cell/tower's SNR. Finally, a point between the two best scoring points (closer to the higher weighted point by SNR) is picked as the UE location fix. As shown in FIG. 36, this results in a UE position 3650 being estimated, when the true location of the UE is location 3652.

Returning to the discussion of the LSU embodiment, the LSU may further include a communication processor configured for signaling and information exchange with the UE, the eNodeB, and the network elements. The signaling may be in line with the OMA SUPL protocol and/or 3GPP LPP/LPPa, or a combination of LPP, LPPa and SUPL, as well as other protocols that are or may be used for communication with the network, for example LCS-AP protocol.

An example of the information so exchanged may be as follows:

Site Name:
    Technology (i.e., 4G, 5G), Active (e.g., Y/N)(i.e., On-Air), In building (e.g., Y/N);
    Global CellID, PCI value, Frequency, IsGPSsynchronized, DL Tx configuration (i.e., number of Tx ports, maxTx power, DL bandwidth);
    Tower structure type (i.e., rooftop, monopole, building-side, etc.), cable length and losses; Antenna type (i.e., omni, directional), Latitude, Longitude, Antenna altitude AGL (i.e., above ground level), Towerbase altitude MSL (i.e., mean sea level), Geoid;
    Antenna Azimuth, Elevation, Mechanical down-tilt angle Electrical down-tilt angle, Gain, H-Beamwidth, V-Beamwidth;
    Cell Bandwidth, TA, Neighbour Cells list, PRS configuration;
    eNodeB Sector antenna array configuration.

In an LSU embodiment, all LSU components/elements (such as the communication processor, downlink signal processor, uplink signal processor, and navigation processor) may be implemented in software that may be executed on one or more network core elements. These LSU components may also be run on evolving 4.5G MEC (Mobile Edge Computing) server at a facility's edge. For example, the LSU components may be integrated as a hosted app on a 4.5G MEC. Finally, in 5G deployment, the LSU components may be hosted in the core network computing cloud. The LSU being hosted in the core network computing cloud supports the Location-as-a-Service (LaaS) data delivery, whereby the UE acts as a gateway to the core network computing cloud and LaaS specifically for protected physical location data.

In accordance with the disclosure above, a network-centric architecture has been described that supports LaaS data delivery, and which is designed for 5G and other networks when all signal processing and position estimates are done in the cloud, i.e., outside of the EU and/oreNodeB. There are several options in terms of how this can be done. In the case of uplink locate, the relevant UE reference signals transmissions can be collected/pre-processed by the eNodeB and forwarded to the Locate Server Unit (LSU) for further processing and UE position determination. In case of the downlink (OTDOA), the task of collecting and pre-processing of the downlink reference signals may be performed by the UE. The UE may then send collected downlink data to the LSU. In case of the downlink (OTDOA), the UE may also handle the communication with the LSU, using the Control Plane and/or the LTE User Plane. Consequently, signaling may be in line with OMA Secure User Plane Location (SUPL) protocol and/or 3GPP, for example LTE Positioning Protocol (LPP). In case of the uplink AoA/DoA the eNodeB may handle the communication with the LSU, using the LPPa and SLmAP (SLm Application Protocol) protocols.

In accordance with the above, this network-centric architecture may enable advanced features that were not feasible before. These include: (a) utilizing the downlink OTDOA to determine the distance between the serving cell/tower and the UE and uplink AoA/DoA to determine the UE location, while also mitigating the OTDOA synchronization error impact on this uplink/downlink UE positioning by utilizing tracking algorithms/technology; (b) utilizing tracking algorithms/technology to improve the UE positioning in cases where the uplink AoA/DoA plus RTT method is used to determine the UE position; and (c) utilizing tracking algorithms/technology to estimate and to correct/mitigate the synchronization error in the downlink OTDOA locating method.

In accordance with the above, downlink (OTDOA) UE locate methods have also been described where the navigation processor is utilizing the multilateration technique/method, aka hyperbolic navigation. This multilateration technique entails solving a number of hyperbolic (RSTD/TDOA) equations. There are iterative methods and non-iterative (close form) solutions. In one embodiment, a hybrid approach is described that splits the number of available (hearable) reference points (base stations) to have multiple sets of three RSTD/TDOA subsets and finds closed-form solutions for each subset. Thereafter, location consistency algorithms may be utilized to finalize the position fix. In a second embodiment, the position fix may be improved utilizing a combination of iterative and non-iterative solutions from the same set of RSTD/TDOA values. In a third embodiment, initial position estimates may be determined for the UE location, based on iterative and non-iterative algorithms, by utilizing the uplink AoA/DoA estimate(s) and the RTT.

In accordance with the above, a wireless network environment has been described that sometimes defies the multilateration method, which requires at least three reference points (for 2-D locate) to obtain the locate fix because only two high power cells are used to flood a large area with RF signals. Accordingly, a method is described that when RTT is available, the UE is located along an arc defined by the serving sector azimuth beam width and the RTT/2 range. A method is also described, when AoA/DoA estimates are available, that the UE position may be determined at the hyperbola and arc intersection vicinity. Both of these methods may also be used. When neither RTT nor AoA/DoA estimates are available, the UE location is determined by scoring intersection points corresponding to each cell/tower (sector) on a chosen hyperbola 3608. Scoring is based on a difference in angles between the direction a cell is pointing and the direction to a point on the hyperbola and a distance from each point to the corresponding cell/tower. Scores may be weighted according to their corresponding cell/tower's SNR.

In accordance with the above, the LSU may include a communication processor that is configured for signaling and information exchange with UEs, the eNodeB, and/or network elements. The signaling may be in line with the OMA SUPL protocol and/or 3GPP LPP/LPPa, or a combination of LPP, LPPa and SUPL, as well as other protocols that are or may be used for communication with the network, for example LCS-AP protocol.

In accordance with the above, the LSU components may be instructions stored in memory and configured to execute on a processor of a 4.5G MEC (Mobile Edge Computing) server located at a communication network's edge, The LSU components may be integrated as a hosted app on 4.5G MEC. In a 5G deployment, the LSU components may be hosted in the core network computing cloud. The LSU being hosted in the core network computing cloud may support LaaS data delivery, whereby the UEs act as gateways to the core network computing cloud and LaaS specifically for protected physical location data.

In accordance with the above, the LSU may include a downlink signal processor as well as an uplink signal processor and a navigation processor.

For the purpose of device (UE) localization the only requirement is that the signal used for this purpose be known in advance. Similarly, such signals can be also used for interference/noise cancellation. While the aforesaid requirement typically excludes payload (data) signals, it includes a large number of other LTE 5G and/or LTE 4G signals, for example synchronization, reference, pilot, sounding signals, etc.

On the other hand, advance knowledge of the signal may not be needed for the purpose of localization and/or interference/noise cancellation if the ideal states of a digitally modulated received signal are known in advance and/or can be estimated, e.g., states that were used in the transmit process of said signal. In this case, the aforementioned digitally modulated received signal can be used for the purpose of localization and/or interference/noise cancellation, including payload, supervisory and other signals.

In wireless networks the reference/pilot, control and some other signals (hereafter referred to as "the reference signals") may be frequency shifted relatively to the one used by the serving cell, and relatively to each other, reducing the interference to these reference signals that are received from the adjacent cells' signals. Through proper network engineering, the aforementioned signals that will utilize same frequencies as the serving cell will usually come from further away cells.

Thus, the distance from the UE to these interfering cells is much larger than the distance from the UE to the serving cell, resulting in significant signal attenuation relative to the serving cell's signals. Furthermore, in many instances the reference signals are generated with sequences which have low cross correlation properties, leading to reduction of the interference between any two signals (sequences). Consequently, the neighboring cells' signal impact is well mitigated when the UE is communicating with the serving cell as is typical for normal cellular communications. For example, in LTE cellular wireless networks there are 6 subsets of the available OFDM sub-carriers for a given cell that are determined using modulo six from the Cell ID (PCID). This means that any interference of the aforementioned signals generated by neighboring cells that utilize same frequencies as the serving cell will usually come from farther away distances.

As was mentioned before, these "reference signals" may be known in advance and can be used to derive observables for device (UE) localization algorithms. Many localization techniques/algorithms require observables from multiple cells; and the localization accuracy increases with the number of observables obtained from geographically distributed cells, e.g., the number of individual cells. Thus, it is always desirable to have a reliable signal detection, which depends on a certain signal to noise plus interference ratio (SNIR) value, from a largest number of neighboring cells, including cells with same frequency shift (sub-carrier subset) as the serving cell.

Unlike the case where a device is communicating with the serving cell, in the device localization case it is the serving cell's strong signals that interfere with the weaker signals of interest from one or more neighboring cells. The worst-case scenario is when the serving cell and a neighboring cell signals have the same frequency shift (sub-carrier subset). While the low cross correlation between these signals improves the desired signal power to interferer ratio, the interferer (signal from the serving cell) is much stronger thereby substantially lowering the desired signal to interferer margin (ratio) provided by the signals' low cross correlation a.k.a. orthogonality property.

Also, cellular and other wireless networks experiencing the near-far a.k.a. hearability phenomenon, when a UE receiver captures a strong signal from the serving cell and thereby makes it impossible for the receiver to detect a weaker signal from one or more neighboring/adjacent cells.

Because "the reference signals" are known in advance a correlation operation is performed across all of "the reference signals" carrying spectrum (sub-carrier subset). This correlation operation generating (derive) correlation coefficients between "the reference signals" received from the serving cell and known in advance, a.k.a., ideal reference signals. Thereafter, these correlation coefficients are used to cancel the serving cell signal in symbols that include "the reference signals" from the serving and one or more neighboring cells.

Accordingly, in the present invention embodiment, the detector and/or server is configured to cancel signals from the serving cell from the received signal. Thereafter, the residual signal left after the serving cell signal cancellation process is used for improved detection of "the reference signals" from a neighboring cell signals that have same frequency shift (sub-carrier subset) as the serving cell; also reducing the issues incident to the near-far phenomenon.

At the same time, this cancellation's process improved detection benefit is only for signals that share the same frequency shift (sub-carrier subset) as the serving cell. This is simply because a set of usable coefficients to perform cancellation are the ones derived from the serving cell's "the reference signals" content.

Therefore, in another embodiment said cancellation process is modified to enable the cancellation of "the reference signals" sequences that are transmitted in the symbol locations associated with other antenna port(s) from the serving cell as well as cancelling "the reference signals" for cells that do not share frequency shift value (sub-carrier subset) with the serving cell. However, in the latter case the cancellation process with "the reference signals" may be impacted by the data transmitted by the serving cell in the frequency spectrum (sub-carrier subset) occupied by said "reference signals" sequences.

This modification is taking advantage of wireless networks' certain symbols that include "the reference signals" and have a modulation scheme, for example QPSK, that is known in advance, whilst this modulation scheme remains unchanged for the whole spectrum of a given symbol. Performing channel equalization based on "the reference signals" that are known in advance allows to determine the channel model. Afterwards, the equalization of the rest (non "reference signals") of symbol's spectrum is carried out by various techniques, for example through interpolation.

Applying the knowledge of the modulation scheme to the equalized non "reference signals" portion of spectrum is making possible to estimate the most likely digitally modulated states that were used in the transmit process of the non "reference signals", i.e., the other signals in the symbol in addition to one or more of "the reference signals". Thus, making it possible to reconstruct/estimate the ideal states, also known as constellation points, of the digitally modulated received symbol signal over its entire spectrum.

Having obtained these constellation points, the next step is to derive correlation coefficients (via correlation with reconstructed ideal states) for all (the entire) modulated serving cell's received symbol's signal spectrum. With these correlation coefficients, it then possible to cancel much more of the serving cell signal in aforementioned symbols.

This additional modification will lead to further improvement in detection of signals from neighboring cells; detecting a larger number of neighboring cells and reducing the device localization error. Additionally, the serving cell signal cancellation will also be enhanced, thus enabling the serving cell signal cancellation for cells that do not share frequency shift value (sub-carrier subset) with the serving cell.

On the other hand, the number of symbols that meet the abovementioned conditions is typically lower than the overall number of symbols that that include "the reference signals". Hence, limiting the potential of possible detection improvement of signals from neighboring cells.

Examples of symbols that meet said conditions include the LTE 4G CRS carrying symbols (see Example A below). In particular, the very first symbol of each subframe, which carries CRS and has only the QPSK modulation scheme (constellation) for all symbol's signals (spectrum). In other words, all of the symbol's sub-carriers are only QPSK modulated because these first subframe symbols are carrying some form of control or supervisory content, which has to be extremely robust. At the same time, each LTE 4G subframe includes a total of four symbols carrying CRS sequences, but only one such symbol has the QPSK modulation scheme that is known in advance and remains unchanged for the whole symbol's spectrum (sub-carriers). Accordingly, there will only be ten usable CRS symbols in a frame (vs. a total of forty) for which this technique/modification will work.

Example A

In an embodiment, the exemplary extended cancellation process is applied to the very first CRS (Cell Specific Reference Signal) symbol of each subframe, which carries only QPSK constellation in all the sub-carriers. The aforesaid modulation information (knowledge in advance) allows for deriving the ideal states, constellation points, from the received signal. The process is as follows:

Step 1: The serving cell's signals equalization is performed. The equalization is based on all received CRS symbols, including the first CRS symbol of each subframe. Note: typically, the equalization of the sub-carriers between ones that carry the CRS, is derived through interpolation. Thus, an equalization can be determined for the entire symbol, for example all 600 subcarriers for Category 1, 72 subcarriers Cat-M, etc.

Step 2: The equalizer is applied to the first symbols of each sub-frame to generate the most likely (reference) constellation points that were used in the transmit process.

Step 3: The reference constellation points are utilized to perform correlation across all the modulated subcarriers of the serving cell's entire receive signal at the first symbol locations (of each subframe); thereby generating correlation coefficients.

Step 4: The correlation coefficients are used to cancel all of the serving cell signal sub-carriers in these first symbols in each subframe, resulting in serving cell signal cancellation in neighboring cells with other than the serving cell frequency shift values.

In order to alleviate the above described limitations on useable symbols, it is necessary to expand the ability to estimate the digitally modulated signal states (constellation points) for signals for which there is no advance knowledge of the modulation schemes (formats) used by the transmit process. Furthermore, some types of modulations, such as the various quadrature amplitude modulation (QAM) formats, might generate symbols' states (constellations) with forward error correction (FEC) information embedded in them. As a result, it is also necessary to track the FEC states.

At the same time, there is useful data generated by the receiver during the received signal equalization and demodulation operations. Listed below are extended cancellation process exemplary embodiments for obtaining such data:

1. According to an embodiment, the aforesaid information can be obtained from the receiver (from the received signal equalization and demodulation).
   a. The most economical approach as it reuses available resources, i.e. the receiver.
   b. However, in this embodiment only the serving cell signal is processed by the receiver limiting the ability to cancel interference from cells that are other than the serving cell. It is not uncommon for signals from one or more of the neighboring cells to be on a par or even exceed the serving cell's signal strength, wherein making them potent interferers.

2. In another embodiment, the received signals digital samples (in frequency and/or time domain) can be sent to the remote server for equalization/demodulation processing.
   a. This embodiment allows to process signals from the serving cell as well as neighboring cells in a serial, i.e. one at the time, or parallel (two or more at the time) fashion. This ability enabling interference cancellation from both: the serving cell and one or more neighboring cells.
   b. The drawback is that sending aforementioned digital samples produces an overhead for the uplink data network's throughput.

3. Yet, another embodiment, performing said equalization/demodulation by a logical entity, a.k.a. detector, residing in the UE/network device.
   a. Here, the logical entity can process signals from serving cell and/or one or more neighboring cells.
   b. Signals from individual cells can be processed either one signal at the time by the logical entity (detector) and/or server.
   c. By a combination, whereby the serving cell signal is processed by the UE receiver while the logical entity and/or server is simultaneously processing one or more neighboring cells' signals.
   d. This embodiment is reducing overhead for the uplink data throughput but demands additional computational resources.

Embodiments described above will produce the desired information from the receive signals in the form of ideal states (constellation point) estimates. These estimates are the closest approximation of the ideal symbols signals' constellations (states) at the transmitter.

When the received signal states/constellation points are part of a FEC process, the decision about which signal constellation point/state was transmitted, may be delayed as compared to other states/constellation points. Yet, this phenomenon does not impact the localization functionality/performance because the delay is limited to several symbols in time, for example less than 0.01 second.

Another phenomenon of the FEC process is a possibility of decision ambiguity during states/constellation points estimation. In present embodiments, this ambiguity can be mitigated by zeroing out these (ambiguous) states/points. Furthermore, the zeroing out technique may be extended to one or more symbols' signals of high ambiguity, e.g., generating multiple ambiguous states/constellation points. The extended cancellation process may be further enhanced. Below are possible embodiments for this enhancement:

1. A correlation process is performed on every (successive) individual neighboring cells, i.e., cells with different IDs, and the correlation response "quality" assessment may be made.

2. Responses that are deemed to be of relatively high "quality" may then be processed to allow cancellation of their cells signals' content from the received signal.

3. The resulting received signal residual may then be presented to the next step of the correlation process involving the next cell site's signals of interest.

Because, each neighboring cell has its correlation response assessed for "quality", this technique works without a need for reprocessing of the earliest of the correlated outputs.

Yet, in another embodiment an iterative technique is employed, whereby the correlation is repeated for previously processed cells signals to determine if the correlation "quality" has improved after later cell signals are removed from the original received signal.

In embodiments, received signals processing is applied to all symbols/signals that are received during the position occurrence data collection, e.g. data collection for a position fix.

Listed below are benefits of the embodiment of the extended and enhanced interference cancellation process:

1. Utilizing all of the received signal spectrum for localization, improving the signals SNIR/detection ability which enables better localization accuracy.
   a. Typically, "the reference signals" are using only a portion of the total available symbol's spectrum. For example, only every sixth or third sub-carrier of the LTE 4G symbol's spectrum is employed by the CRS.

2. The ability to utilize all of the received symbols for localization, i.e., not limited to symbols' carrying "the reference signals" and/or some other symbols signals, including these for which the modulation scheme is known in advance.
   a. Improving SNIR and detection ability.

3. Mitigates the correlation output time domain aliasing ambiguity, resulting from "the reference signals" utilizing only a portion of the symbol's spectrum.
   a. For example, in case of CRS only every third of symbol's sub-carrier is occupied by the CRS, e.g. a portion of symbol's spectrum.

4. Mitigate carrier frequency offset (CFO) estimation ambiguity produced when two or more frames are integrated because of the repetition of the "the reference signals", for example same CRS, sequences repeated in each LTE 4G frame.

As previously noted, for localization accuracy improvement, it is always desirable to obtain observables from the largest number of neighboring cells. However, the time delays of signals from far remote (relatively to UE) cells can exceed the Cyclic Prefix (CP) duration. In cases where not all available signals are utilized, the symbols used for determining observables are not contiguous in time, thereby impacting the accuracy of timing estimation of these delayed signals and producing interference from preceding symbols' signals.

However, in the aforementioned embodiments received signal processing includes all symbols/signals that are received during the position occurrence data collection for the purpose of determining observables. Accordingly, the embodiments accessing and processing the time domain data including the cyclic prefix for all of the available symbols, thereby cancelling early cells signals, and then computing the correct timing for delayed signals from remote cells while adjusting the correlation output for the computed delays. Thus, circumventing (mitigating) the said phenomenon.

The LTE 5G brings new and powerful capabilities to support high-speed data rates, improved connectivity and system capacity. In addition to using sub-6 GHz frequencies, 5G is also being deployed in the millimeter wave spectrum (28 GHz up to 100 GHz frequencies), which has significantly greater bandwidths. There are also changes in the physical layer including the frame structure, reference signals, etc., as well as in the scheduling and transmission modes.

At the same time, the methods/techniques and algorithms, including signal processing and locate observables post-processing and/or localization, described herein and in related applications may be applied to the 5G environment (physical layer and infrastructure).

At sub-6 GHz frequencies, in addition to the LTE 4G base station sector antenna subsystems, the 5G is contemplating deployment of massive MIMO antenna subsystems to simultaneously direct separate data streams towards multiple users, a.k.a. spatial multiplexing beamforming. In other words, a massive MIMO antenna subsystem is capable of simultaneously serving a plurality of UEs in the same time-frequency resource. The LTE 4G base station sectors also employ MIMO, which is in the form of multiple sector's antenna arrays. Antenna elements in each array are not controllable/not accessible. As a result, each antenna array has a fixed azimuth and elevation beam widths and beam directions. 5G systems take the LTE 4G MIMO concept further to a massive MIMO by employing a very large number of controllable/accessible antenna elements at the base station. Thus, massive MIMO is the extension of traditional LTE 4G MIMO technology to antenna arrays having a large number of controllable antenna elements.

The essence of the massive MIMO theory is as follows: as the number of elements approaches infinity, only the signal content, aimed at a given UE, survives while interference and noise content tends to zero out. At the same time, it turns out that this analysis holds in practical systems if the number of base station antennas is much greater than the number of served mobiles. For example, a 5G sub-6 GHz massive MIMO consists of 8×8 (total of 64) antenna elements.

Beamforming or spatial filtering is a signal processing technique that uses an antenna array for directional signal transmission or reception. Usually, beamforming (specifically, adaptive beamforming) is defined as the ability to steer a lobe of power in a particular direction toward a user, while the spatial environment that the antenna array and user are in is not generally considered. The advantage of such adaptive beamforming is a high transmit/receive antenna gain in the desired spatial direction, while suppressing of the signal to/from undesired directions. In LTE 5G, the millimeter wave spectrum adaptive beamforming techniques are used to overcome the high path loss experienced at these higher frequencies.

On the other hand, for the massive MIMO (or just multiuser MIMO, a.k.a., MU-MIMO) in order to perform the spatial multiplexing beamforming, the spatial channel between antenna elements and user terminals needs to be characterized. Specifically, the aforementioned spatial channel information applied to signals transmitted from the antenna array producing data streams to different UEs. Such filtering can also be used to linearly combine the data received by the antenna array, so that the data streams from different users can be discriminated.

Adaptive beamforming requires a large number of antenna elements to produce a high gain in a desired spatial direction with a steered beam. This condition limits the number of aforementioned beams that can be generated from a given number of antennas elements. On the other hand, spatial multiplexing beamforming uses all antenna elements to produce a larger number of spatially multiplexed beams at a lower spatial gain.

At sub-6 GHz frequencies the path loss is not a dominant factor. Consequently, there is no need for a high transmit/receive antenna gain. In this case, for a finite number of controllable antenna elements, the number of simultaneous spatially multiplexed data streams is limited by the interference. The estimated number of simultaneous data streams for a 5G sixty-four elements (8×8) MIMO is ten, sometimes larger, thus providing streams to approximately ten users. A further increase in number of streams, will require a massive MIMO with a larger (>64) number of elements.

However, in the LTE 5G millimeter wave spectrum the path loss is the dominant. As a result, the massive MIMO is used to produce high gain steered beams; and despite the larger number of the massive MIMO's antenna elements, for example 256 or more, the estimated number of beams is about four (providing beams to approximately four users).

For a UE there are two possible antenna subsystem implementation options:
1. Each UE has one or more antennas; and
2. The UE is equipped with an antenna array (where all antenna elements are controllable and fully accessible).

The first option enables communications with Internet of Things (IoT) UE devices, which in most cases are limited to a single antenna. If using the second option, the primary purpose of the UE's antenna array might be to form an adaptive beam when operating in the millimeter wave spectrum. In the case of the first option, these extra antennas are most likely be used to mitigate interference when utilizing spatially multiplexing while operating at sub-6 GHz frequencies.

There are many possible antenna element configurations and deployment scenarios for a massive MIMO base station, including rectangular, cylindrical, linear, distributed, etc.

The related applications describe the uplink AOA estimation process using the estimated time of flight (TOF) and/or time of arrival (AOA) difference, e.g. TDOA, of the wave to each of the LTE 4G base station sector's antenna array (see above). This process generates angulation location observables.

On the other hand, unlike the LTE 4G, all of the 5G base station's massive MIMO antenna elements are controllable and fully accessible. Thus, in embodiments, the uplink AOA estimation process that is described herein or in related applications is applied to two or more combinations of the massive MIMO antenna elements producing one or more azimuth and elevation AOA(s) and/or horizontal and vertical DOA(s) observables or LOB(s) from a single tower and/or multiple towers. In addition, the massive MIMO antenna elements accessibility feature makes it possible to produce a plurality of TDOA(s) and/or AOA/DOA/LOB estimates for the same UE that, upon further processing, will result in better UE position estimation accuracy and robustness by the way of employing a data fusion process.

In LTE 4G each base station sector's antenna array is sending orthogonal downlink pilot/reference signals, for example CRS and/or PRS.

In embodiments, in the LTE 4G environment, with a single antenna UE receiver detecting this antenna array specific downlink reference signals, the aforementioned AOA estimation process (described in related applications) is applied. This process utilizes the flight time difference (TDOA) of the wave from each of the LTE 4G base station sector's antenna array in order to determine the AOA (a.k.a. angular observable), which is relative to the base station's sector's antenna arrays baseline.

In another embodiment, when the UE has multiple antennas, these extra antennas may be used to improve the UE localization accuracy and robustness. Here, exemplary embodiments include combining signals from multiple antennas for better SNR (Signal to Noise Ratio) and/or SINR (Signal to Interference plus Noise Ratio); fusing angular location observables from each antenna; selecting location observables from one or more antenna(s) based on shortest TOF(s) and other criteria, for example SNR/SNIR, antenna polarization, etc.; or utilizing this redundant AOA information in the location consistency algorithms.

In yet another embodiment, in the LTE 4G environment the AOA may be determined by the UE with two or more antennas and associated with these receivers by employing the AOA estimation process described in the related applications. This process would be able to obtain the AOA estimate for each base station's sector's antenna array relative to the UE antennas baseline. Further processing can be applied to two or more AOA estimates from each of the base station sector's antenna arrays to improve accuracy and reliability, for example providing this UE AOA information to the location consistency algorithms. It should be noted that this technique of the AOA estimation will require UE's antennas baseline direction to be monitored (measured) or known in advance.

Furthermore, the TOF/TOA difference (TDOA) based AOA estimation process (described in the related applications) is mitigating the impact of limited number of antennas on the number of multipath components that one can resolve.

The aforesaid LTE 4G embodiments can be utilized in other wireless networks, for example Wi-Fi. Here, the AP (Access Point) is corresponding to the base station and a Wi-Fi enabled device is corresponding to the UE.

Compared with LTE 4G, the 5G base station's massive MIMO may send downlink pilots/reference signal from each of the antenna's element in an orthogonal manner, consuming the significant amount of radio resources such as time and bandwidth.

Currently 5G is assuming the TDD (Time Division Duplex) mode of operation because in the TDD mode uplink (UL) and downlink (DL) transmissions use the same frequency resource, permitting the UL/DL channel reciprocity assumption.

The reciprocity assumption means that the RF (propagation) channel only needs to be characterized in one direction. Therefore, in the TDD systems the state of downlink channels can be inferred from that of uplink channels using channel reciprocity. Thus, the base station can estimate the downlink channels without any downlink pilots/reference signals. Notes: 1) The uplink works in the same way in the TDD and FDD modes, while the distinct difference of TDD appears in the downlink, and 2) In LTE 5G uplink pilot/reference signals do include the SRS (Sounding Reference Signal) and the DMRS (Demodulation Reference Signal) signals, employed in the LTE 4G.

The TDD system does provide a remedy for the pilot/reference signals overhead issue, but many current wireless systems are operating in the frequency division duplex (FDD) mode. Thus, it is important to employ (operate) the massive MIMO for the existing FDD systems/mode.

In the absence of orthogonal DL pilots/reference signals from each of the massive MIMO's antenna elements, it is not possible to enable the aforementioned AOA estimation process using downlink signals. Nonetheless, it is possible to determine the UE position using the 5G LTE DL signals by employing the multilateration position estimation process described in related applications utilizing the LTE 5G downlink's one or more reference signals' and/or known in advance signals' subcarriers. The process is determining these subcarriers' phase and amplitude that are in turn applied to the multi-path processor for multipath interference mitigation and generation of range (time) based location observables, for example TDOA(s), TOF(s), TOA(s), etc.

In embodiments the multilateration position estimation for the LTE 5G uplink is identical to the process for LTE 4G, as described in the related applications. This is because the LTE 4G and LTE 5G both support the same SRS and DMRS uplink reference signals.

In LTE 4G, the DL multilateration position estimation process utilizes downlink reference signals, including CRS and/or PRS signals. Although the LTE 5G may not support the LTE 4G downlink CRS and PRS signals, other LTE 5G downlink known in advance signals can be used for this purpose, including PSS (Primary Synchronization Signal), SSS (Secondary Synchronization Signal); LTE 5G specific ESS (Extended Synchronization Signal) and Phase Noise Compensation Reference Signal (DL PNCRS), CSI-RS (Channel-State Information Reference Signal), etc.

PSS, SSS and ESS signals are transmitted, for example in symbols 0 to 13 in subframes 0 and 25; occupying total of 18 consecutive resource blocks (RB) at the baseband's center.

In embodiments, these PSS, SSS and ESS signals' structure and contiguous resource(s) allocation can be advantageously used for further localization accuracy and robustness improvement. Exemplary embodiments may include combining PSS, SSS and ESS signals' subcarriers phase and amplitude that are in turn applied to the above-mentioned multi-path processor for multipath interference mitigation and generation of location observables and/or employing a data fusion process that is utilizing each of PSS, SSS and ESS signals' observables.

The LTE 5G downlink UE positioning may be also based on the LTE 5G specific, i.e., new, reference signals supporting beamforming and/or spatial data streams multiplexing and include the downlink BRS (Beam Reference Signal) signal. The present embodiments may utilize these new LTE 5G downlink signals and technology to determine the UE position.

For a UE to send and receive data, it must first connect to the network by acquiring a beam's spatial stream. The SGNB (5G Node B) periodically transmits beams at different angles by transmitting BRS (Beam Reference Signal). This is known as beam sweeping. When the UE identifies the strongest beam, it starts a Random Access Procedure, using timing and/or angular information, to connect to this beam. When the UE has connected to a beam, data transfer can take place on the UE-specific (dedicated) beam. Here, the BRS signals for different beams and/or base stations are orthogonal.

During the sweep multiple beamformed downlink BRS signals transmitted at different angles. The number of BRS beams transmitted and the periodicity of beam sweeping is determined by the BRS configuration and transmission period parameters. The BRS occupies eight subcarriers (5th through 12th subcarrier) in every RB except the eighteen RB(s) at the baseband's center, which are allocated for PSS, SSS and ESS signals. The BRS reference signal is in the form of a Gold sequence (Pseudo Random Data). As a result, multiple beams from one or more base stations carrying orthogonal BRS signals can be generated.

The UE maintains a candidate beam set of a number of beams, for example four. For each beam the UE reports the Beam State Information (BSI). BSI is based on measurements of BRS, and the reported parameters are Beam Index (BI) and Beam Reference Signal Received Power (BRSRP). The beams are organized based on the best carrier-to-interference and noise ratio (CINR) measured for the (each) BRS (beam), rather than BRSRP value.

From the above, the beam selection is based on the best CINR. While this selection criterion is optimizing data communications performance, for accurate localization it is necessary to identify the beam that is along the direct path of signal propagation or direct line of sight (DLOS) between the UE (antenna(s)) and the base station antenna subsystem. The beam that is closest to the direct path or DLOS might not have the best CINR because in many instances the direct path or DLOS may be obstructed, significantly reducing this beam signals' strength. Also, because of RF propagation phenomena, for example multi-path, this direct path or DLOS signal may be further attenuated. As a result, it is not uncommon for a UE to select (lock onto) a beam that undergoes one or more reflections and has a considerably higher strength and CINR than the direct path or DLOS beam. However, generating observables (angulation and/or time/range) from a reflected beam will degrade the positioning accuracy.

In present embodiment, for each (detectable by UE) beamformed BRS signal, the signals time of flight (TOF) or time of arrival (TOA) is estimated via the process described in the related applications. This process is determining those beam signals subcarriers phase and amplitude that are in turn applied to the multi-path processor for multipath interference mitigation and generation of sub-sample precision time/range location observables (from BRS signals), for example TOF(s), TOA(s), TDOA(s), etc. Thereafter, the lowest (shortest) TOF criterion is applied to identify one or more candidate beam(s) that is (are) closest to the direct path or DLOS.

The present embodiment is locating UE based on known (provided by the network) localization candidate beams angular information, azimuth, elevation, beam-widths, etc., on per beam bases; known base station's antenna subsystem height and observables timing information, like TOF, TOA, TDOA, etc., of each localization candidate beam that is estimated using the aforementioned process; as well as the RTT (Round Time Trip) measurements (from base station) and/or the receive-transmit timing difference (RTTD) from the UE.

In present localization embodiment, the UE position in 2D can be estimated, for a given UE altitude, based on the localization candidate beams from a single base station. The 3D positioning, i.e. determining the UE's 2D position plus the UE's altitude, will require localization candidate beams from two or more base stations.

In the localization embodiment, the RTT and RTTD information is redundant. However, in another embodiment this information is used by the location consistency algorithms for position error reduction and reliability (robustness) improvement. For example, the estimated UE location should fall within the RTT/RTTD distance range that is based on the measured (reported) RTT/RTTD values and these values standard deviation.

Yet in anther embodiment, when two or more base stations are used to determine the UE position, the position estimate should be in the vicinity of one or more LOB(s) (Line of Bearing) defined by one or more TDOA(s) calculated from TOF/TOA observables estimated for each base station utilizing the above-mentioned process that is described in related applications.

During the beam sweeping, each of the aforementioned beams may include, in addition to the BRS, one or more beamformed DL reference, pilot and/or known in advance signals. The embodiments advantageously use these signals for further localization accuracy and robustness improvement. Exemplary embodiments generating location observables from any one or more individual PSS, SSS and ESS signals; or a combination of two or more such signals subcarriers using the aforementioned multi-path processor described in related applications. The exemplary embodiments utilize a data fusion process of observables from DL reference, pilot and/or known in advance signals and from BRS signals observables. Other examples include selecting DL reference, pilot and/or known in advance signals' observables based on shortest TOF(s) and other criteria, for example SNR/SNIR, etc.; or utilizing these observables in the location consistency algorithms.

When a UE has two or more standalone antennas the embodiments exploit these multiple antennas for position error reduction and reliability (robustness) improvement. Exemplary embodiments may include combining signals from multiple antennas for SNR (Signal to Noise Ratio) and/or SINR (Signal to Interference plus Noise Ratio) enhancement; fusing location observables from each antenna; selecting location observables from one or more antenna(s) based on shortest TOF(s) and other criteria, for example SNR/SNIR, antenna polarization, etc.; calculating the AOA utilizing the aforesaid AOA estimation process that is described in the related applications and providing this UE AOA information to the location consistency algorithms (the AOA determination will require the UE's antennas baseline direction to be monitored or known in advance).

When the UE antenna subsystem is an antenna array the embodiments also exploit the UE antenna array for position error reduction and reliability (robustness) improvement. With all antenna array elements being controllable/accessible, exemplary embodiments may include the AOA estimations (azimuth and elevation) utilizing one or more super-resolution (sub-space) algorithms (methods) as described in the related applications; employing the aforementioned TDOA based AOA estimation process that is described in the related applications (applied to two or more combinations of antenna array elements), producing one or more azimuth and/or elevation AOA(s) estimates. Thereafter, this AOA information will be used the location consistency algorithms (the AOA determination will require UE's antennas baseline direction to be monitored or known in advance).

It should be noted that in the 5G environment reference/pilot signals may perform multiple functions. For example, the ESS (Extended Synchronization Signal) functionality can be carried out by the PTRS (Phase Tracking Reference signal); the downlink CSI-RS (Channel State Information Reference Signal) can be used for beam management and in lieu of the BRS (Beam Reference Signal) functionality, etc.

Having thus described the different embodiments of a system and methods, it should be apparent to those skilled in the art that certain advantages of the described method and apparatus have been achieved. In particular, it should be appreciated by those skilled in the art that a system for tracking and locating objects can be assembled using FGPA or ASIC and standard signal processing software/hardware combination at a very small incremental cost. Such a system is useful in a variety of applications, e.g. locating people in indoor or in outdoor environments, harsh and hostile environments etc.

It should also be appreciated that various modifications, adaptations, and alternative embodiments thereof may be made within the scope and spirit of the present invention.

What is claimed:

1. A method for determining a location of a wireless mobile device in a wireless system, the method comprising:
   at a detector:
      buffering a plurality of samples in a digital format generated from signals provided by one or more receive channels;
      receiving reference signal parameters that describe known in advance reference signals within the signals;
      detecting the known in advance reference signals from each receive channel among the receive channels based on the reference signal parameters;
      isolating symbols carrying each known in advance reference signals from one or more frames;
      extracting resource elements or I/Q samples from the symbols on a per symbol basis; and
      sending the extracted resource elements or I/Q samples to a locate server physically remote from the detector;
   at the locate server:
      receiving the extracted resource elements or I/Q samples from the detector;
      estimating locate observables for the wireless mobile device based on the extracted resource elements or I/Q samples; and
      calculating the location of the wireless mobile device based on the estimated locate observables, the reference signal parameters and extracted resource elements or I/Q samples.

2. The method of claim 1, further comprising one or more of:
   determining at the locate server wireless mobile device position related metadata, including Confidence Radius Values and a location accuracy metric;
   wherein buffering at the detector includes buffering the plurality of samples in a digital format generated from downlink signals and/or uplink signals;
   utilizing at the locate server round-trip time (RTT) and Time Advance (TA) measurements for position determination and/or accuracy enhancement;
   utilizing at the locate server tracking algorithms to improve localization performance and accuracy;
   estimating at the locate server time of arrival (TOA), time of flight (TOF) and angle of arrival (AOA) of signals;
   estimating at the locate server time difference of arrival (TDOA) between reference signals from two or more nodes (cells) in the wireless system and/or between two or more receive channels;
   estimating at the locate server the AOA for one or more nodes (cells) of the wireless system;
   utilizing at the locate server joint downlink, uplink and RTT/TA observables for localization performance enhancement; and
   wherein signaling and information exchange of the plurality of samples is between the wireless mobile device, network nodes (eNodeB) of the wireless system, and/or network elements of the wireless system.

3. The method of claim 1, further comprising producing a data structure that includes the extracted resource elements or I/Q samples before sending the extracted resource elements or I/Q samples to the locate server.

4. The method of claim 1, wherein the signal processing may be applied individually to the signals from each receive channel and wherein the signal processing includes a comparison of signal processing results between each receive channel.

5. The method of claim 1, wherein the detector or the locate server is configured to estimate a Doppler shift, utilizing one or more Doppler specific algorithms and/or techniques, and to utilize one or more of a multi-path mitigation algorithm and method, including one or more of an advanced spectrum estimation algorithm, a Constant False Alarm Rate (CFAR) detection algorithm, and Space-Time Adaptive Processing (STAP).

6. The method of claim 1, wherein the detector is configured to:
   collect and transfer to the locate server round-trip time (RTT) and Time Advance (TA) measurements performed by a serving cell and/or wireless mobile device's receiver;
   collect metadata, including each frame starts and other relevant and/or auxiliary information;
   buffer the plurality of samples in a digital format generated from downlink signals and/or uplink signals; and
   remove payload samples from the plurality of samples to decrease an amount of the data sent to the locate server.

7. The method of claim 1, wherein the detector resides in a wireless mobile device and/or a network node (cell).

8. The method of claim 1, wherein the detector is configured to extract digital samples in time domain.

9. The method of claim 1, wherein the detector is configured to extract digital samples in frequency domain.

10. The method of claim 1, further comprising utilizing at the locate server tracking algorithms to adjust localization performance and accuracy, and wherein the tracking algorithms include one or more of particle filter algorithms and Kalman filter algorithms.

11. The method of claim 1, further comprising utilizing at the locate server tracking algorithms to adjust localization performance and accuracy, and wherein a tracker is used to adjust wireless mobile device positioning when the initial wireless mobile device's position is calculated based on RTT measurements.

12. The method of claim 2, further comprising utilizing at the locate server tracking algorithms to adjust localization performance and accuracy, and wherein a tracker is used to mitigate the synchronization error.

13. The method of claim 1, wherein wireless system is 4.5G, and wherein the locate server is a hosted application on a 4.5G MEC (Mobile Edge Computing) server at an edge of the 4.5G wireless system.

14. The method of claim 1, wherein the wireless system is 5G, and wherein the locate server is hosted in a core network computing cloud of the 5G wireless system.

15. The method of claim 14, wherein the locate server is configured to support Location-as-a-Service (LaaS) data delivery and the wireless mobile device acts as a gateway to the core network computing cloud and LaaS for protected physical location data.

16. The method of claim 1, further comprising:
one or more of (a) estimating at the locate server time difference of arrival (TDOA) between reference signals from two or more nodes (cells) in the wireless system and/or between two or more receive channels, (b) utilizing at the locate server round-trip time (RTT) and Time Advance (TA) measurements for position determination and/or accuracy enhancement, and (c) estimating at the locate server time of arrival (TOA), time of flight (TOF) and angle of arrival (AOA) of signals;
wherein calculating the location of the wireless mobile device includes one or more of (d) utilizing a multilateration technique/method to solve hyperbolic TDOA based equations, (e) utilizing a triangulation technique/method, (f) utilizing RTT together with AOA and/or TDOA observables, and (g) utilizing a combination of multilateration, triangulation, and/or RTT/receive-transmit timing difference (RTTD).

17. The method of claim 16, wherein utilizing includes iterative and/or non-iterative algorithms.

18. The method of claim 16, wherein a set of available TDOA data is split into multiple sets of three or more subsets and a closed-form solution is found for each subset.

19. The method of claim 18, wherein, location consistency algorithms are utilized to finalize a position fix for the location of the wireless mobile device.

20. The method of claim 17, wherein utilizing includes utilizing uplink AOA and RTT/TA to estimate an initial location of the wireless mobile device based on iterative and non-iterative algorithms.

21. The method of claim 1, further comprising one or more of estimating at the locate server time difference of arrival (TDOA) between reference signals from two or more nodes (cells) in the wireless system and/or between two or more receive channels, utilizing at the locate server round-trip time (RTT) and Time Advance (TA) measurements for position determination and/or accuracy enhancement, and estimating at the locate server time of arrival (TOA), time of flight (TOF) and angle of arrival (AOA) of signals; and further comprising determining the location of the wireless mobile device by scoring intersection points corresponding to each node (cell or sector) in the wireless system, wherein RTT/TA and AOA estimates are not available and only a single TDOA estimate is available.

22. The method of claim 21, wherein the scoring is based on a difference in angles between a direction of a node's antenna subsystem azimuth and a direction to a point on a TDOA based line of bearing and a distance from each intersection point to a corresponding node; and wherein scores may be weighted according to a corresponding node's signal to noise ratio (SNR).

23. The method of claim 1, wherein signaling and information exchange of the plurality of samples is between the wireless mobile device, network nodes (eNodeB) of the wireless system, and/or network elements of the wireless system, and wherein the signaling and information exchange is in line with an OMA SUPL protocol and/or a 3GPP LPP/LPPa, or a combination thereof and other protocols for communication with the wireless network.

24. The method of claim 1, further comprising:
at the detector and/or the locate server generating correlation coefficients between reference signals carrying spectrum received from a serving cell of the wireless system and the known in advance reference signals;
utilizing the correlation coefficients to cancel a serving cell signal in symbols that include the known in advance reference signals from the serving cell and one or more neighboring cells of the wireless system; and
utilizing a residual signal left after cancelling the serving cell signal for detection of reference signals from a neighboring cell signals having a frequency shift that is the same as a frequency shift of the serving cell.

25. The method of claim 1, further comprising:
wherein the signals provided by the one or more receive channels includes signals from a serving cell of the wireless system and signals from one or more neighboring cells and wherein the signals from the serving cell and the signals from one or more neighboring cells have an equal frequency shift;
cancelling the signals received from the serving cell to create a residual signal; and
utilizing the residual signal in detecting the known in advance reference signals from the signals from the one or more neighboring cells.

26. The method of claim 25, wherein cancelling the signals received from the serving cell includes:
generating correlation coefficients between serving cell reference signals within the signals from the serving cell and the known in advance reference signals within the signals received from the one or more neighboring cells; and
utilizing the correlation coefficients to cancel the signals from the serving cell in symbols that include the serving cell reference signals.

27. The method of claim 1, further comprising:
wherein the signals provided by the one or more receive channels includes signals from a serving cell of the wireless system and signals from one or more neighboring cells
wherein the reference signal parameters include a known in advance digital modulation scheme for the symbols;
performing channel equalization based on the known in advance reference signals and determining a propagation channel model;
equalizing non-reference signals carried by the digitally modulated symbols with the known in advance modulation scheme based on the propagation channel model;
estimating most likely digitally modulated states of the digitally modulated symbols used in transmission of the non-reference signals based on the known in advance modulation scheme to reconstruct constellation points of the digitally modulated symbols carrying the known in advance reference signals;
generating correlation coefficients between the reconstructed constellation points of signals within the digitally modulated symbols and serving cell reference signals within the signals received from the service cell;
utilizing the correlation coefficients to cancel all of the serving cell signal spectrum in symbols carrying the reference signals with the known in advance modulation scheme in each subframe resulting in cancellation of the signals from the serving cell in signals from one or more neighboring cells when the signals from the serving cell and the signals from the one or more neighboring cells that do and do not have an equal frequency shift and resulting in creation of a residual signal; and utilizing the residual signal in detecting the known in advance reference signals from the signals from the one or more neighboring cells.

28. The method of claim 27, wherein a modulation scheme for the symbols is known in advance and remains unchanged for a symbol's entire spectrum, including non-reference signals.

29. The method of claim 27, wherein the modulation scheme is based on quadrature modulation.

30. A method for determining a location of a wireless mobile device in a wireless system, the method comprising:

at a detector:
receiving signals that are not known in advance and for which there is no advance knowledge of a digital modulation scheme of the received signals;
reconstructing constellation points of digitally modulated signal states that were used to transmit digitally modulated received signals;
generating correlation coefficients between the received signals of each neighboring cell among one or more neighboring cells in the wireless system and reconstructed constellation points of digitally modulated received signals;
qualifying the correlation coefficients to identify symbols with qualified signals;
utilizing the correlation coefficients of the identified symbols to cancel signals corresponding to the identified symbol from the received signal resulting in creation of a residual signal;
utilizing the residual signal in detecting reference signals from the received signals from each neighboring cell;
isolating symbols carrying each reference signal;
extracting resource elements or I/Q samples from the symbols on a per symbol basis; and
sending the extracted resource elements or I/Q samples to a locate server physically remote from the detector;

at the locate server:
receiving the extracted resource elements or I/Q samples from the detector;
estimating locate observables for the wireless mobile device based on the extracted resource elements or I/Q samples; and
calculating the location of the wireless mobile device based on the estimated locate observables and extracted resource elements or I/Q samples.

31. The method of claim 30, wherein qualifying is based on an SNR estimate of a correlation response in a time domain and wherein a qualification of the SNR estimate is 15 dB or better.

32. The method of claim 30, wherein generating the correlation coefficients is repeated iteratively for previously processed signals to determine if correlation quality improves after later signals are removed from the received signals.

33. The method of claim 30, wherein the reconstructed constellation points are part of a forward error correction (FEC) process required to track FEC states.

34. The method of claim 33, further comprising:
zeroing out FEC ambiguous states, including signals for one or more symbols producing multiple ambiguous states.

35. The method of claim 30, wherein the received signals are sent by the detector to the locate server for reconstructing constellation points, generating correlation coefficients, qualifying the correlation coefficients, utilizing the correlation coefficients, and utilizing the residual signals.

36. The method of claim 30, wherein the detector performs reconstructing constellation points, generating correlation coefficients, qualifying the correlation coefficients, utilizing the correlation coefficients, and utilizing the residual signals.

37. The method of claim 30, wherein reconstructing constellation points, generating correlation coefficients, qualifying the correlation coefficients, utilizing the correlation coefficients, and utilizing the residual signals is performed by the wireless mobile device's receiver on received signals from a serving cell and is performed by the detector and the locate server in a parallel fashion on received signals from the one or more neighboring cells.

38. The method of claim 30, wherein reconstructing constellation points, generating correlation coefficients, qualifying the correlation coefficients, utilizing the correlation coefficients, and utilizing the residual signals is performed by the detector and/or the locate server on received signals from one cell among the serving cell and the one or more neighboring cells at a time or on received signals from the serving cell and the one or more neighboring cells simultaneously.

39. The method of claim 30, wherein the reconstructed constellation points of received signals are generated by the wireless mobile device's receiver.

* * * * *